(12) United States Patent
Tusch et al.

(10) Patent No.: US 12,444,201 B2
(45) Date of Patent: Oct. 14, 2025

(54) COMPUTER VISION SYSTEMS

(71) Applicant: UNIFAI HOLDINGS LIMITED, London (GB)

(72) Inventors: Michael Tusch, London (GB); Andrew Jackson, London (GB); John Dunne, London (GB)

(73) Assignee: UNIFAI HOLDINGS LIMITED, London (GB)

( * ) Notice: Subject to any disclaimer, the term of this patent is extended or adjusted under 35 U.S.C. 154(b) by 288 days.

(21) Appl. No.: 16/321,500

(22) PCT Filed: Jul. 31, 2017

(86) PCT No.: PCT/GB2017/052231
§ 371 (c)(1),
(2) Date: Jan. 29, 2019

(87) PCT Pub. No.: WO2018/020275
PCT Pub. Date: Feb. 1, 2018

(65) Prior Publication Data
US 2021/0279475 A1 Sep. 9, 2021

(30) Foreign Application Priority Data
Jul. 29, 2016 (GB) ..................................... 1613138

(51) Int. Cl.
*G06V 20/52* (2022.01)
*G06Q 30/0251* (2023.01)
(Continued)

(52) U.S. Cl.
CPC ......... *G06V 20/53* (2022.01); *G06Q 30/0252* (2013.01); *G06Q 30/0261* (2013.01);
(Continued)

(58) Field of Classification Search
CPC .. G06K 9/00778; G06K 9/00288; G06T 7/55; G06T 7/73; G06T 17/10; G06Q 30/0252; G06Q 30/0261; G06Q 30/0271
See application file for complete search history.

(56) References Cited

U.S. PATENT DOCUMENTS 10,068,129 B2 * 9/2018 Brandt ................. G06K 9/6218
2007/0217765 A1 * 9/2007 Itoh .......................... H04N 5/76
386/233

(Continued)

FOREIGN PATENT DOCUMENTS

EP          2 795 600 A1    10/2014
WO      2013/095773 A1     6/2013
(Continued)

OTHER PUBLICATIONS

International Search Report, dated Dec. 1, 2017, and Written Opinion issued in International Application No. PCT/GB2017/052231.

*Primary Examiner* — Allan J Woodworth, II
(74) *Attorney, Agent, or Firm* — Saul Ewing LLP

(57) ABSTRACT

A computer-vision system or engine that (a) generates from a pixel stream a digital representation of a person and (b) determines attributes or characteristics of the person from that digital representation and (c) based on those attributes or characteristics, outputs data to a cloud-based analytics system that enables that analytics system to identify and also to authenticate the person. The attributes or characteristics of the person include their pose, and the system or engine analyses that pose to extract a facial image from a video stream that is the best facial image for use by the cloud-based analytics system to identify and authenticate the person. The computer-vision system or engine outputs the facial image to the cloud-based analytics system, but does
(Continued)

not output the full-frame real-time video to the cloud-based analytics system.

21 Claims, 72 Drawing Sheets

(51) Int. Cl.
    *G06T 7/55*     (2017.01)
    *G06T 7/73*     (2017.01)
    *G06T 17/10*     (2006.01)
    *G06V 40/16*     (2022.01)

(52) U.S. Cl.
    CPC ........... *G06Q 30/0271* (2013.01); *G06T 7/55* (2017.01); *G06T 7/73* (2017.01); *G06T 17/10* (2013.01); *G06V 40/172* (2022.01)

(56) References Cited

U.S. PATENT DOCUMENTS

| | | | |
|---|---|---|---|
| 2008/0004951 A1 | 1/2008 | Huang et al. | |
| 2009/0031381 A1* | 1/2009 | Cohen ................... | H04L 67/125 725/115 |
| 2009/0141987 A1* | 6/2009 | McGarry ........... | G06V 10/7515 348/222.1 |
| 2010/0134619 A1* | 6/2010 | Hampapur ............. | G06Q 10/04 348/143 |
| 2010/0274816 A1* | 10/2010 | Guzik ................ | H04N 21/4223 348/207.99 |
| 2010/0298957 A1* | 11/2010 | Sanchez Rocha .. | H04L 12/2827 700/90 |
| 2011/0043625 A1* | 2/2011 | Cobb ..................... | G06T 7/254 382/209 |
| 2013/0054377 A1* | 2/2013 | Krahnstoever ......... | G09F 27/00 705/14.66 |
| 2013/0073114 A1* | 3/2013 | Nemat-Nasser ........ | B60R 25/25 382/104 |
| 2013/0231824 A1* | 9/2013 | Wilson ................. | G05D 1/0246 701/1 |
| 2014/0140572 A1 | 5/2014 | Ranjan et al. | |
| 2014/0211858 A1* | 7/2014 | Zhao .................... | H04N 19/117 375/240.26 |
| 2014/0250500 A1* | 9/2014 | Lee ...................... | H04L 63/0861 726/4 |
| 2014/0267544 A1* | 9/2014 | Li ........................ | G06V 40/176 348/14.02 |
| 2014/0333776 A1* | 11/2014 | Dedeoglu ........ | H04N 21/44008 348/159 |
| 2014/0365518 A1* | 12/2014 | Calo ................... | G06F 16/243 707/760 |
| 2014/0375886 A1* | 12/2014 | Galleguillos ........ | G06V 40/173 348/571 |
| 2015/0026708 A1* | 1/2015 | Ahmed ................ | H04N 21/812 725/12 |
| 2015/0111539 A1* | 4/2015 | Shim ................... | H04L 12/2803 455/411 |
| 2015/0161435 A1* | 6/2015 | Jung ..................... | G06V 40/171 382/103 |
| 2015/0170354 A1* | 6/2015 | Mukai ................... | G06V 20/52 382/112 |
| 2015/0172669 A1* | 6/2015 | Nishiyama ........... | H04N 19/137 375/240.08 |
| 2015/0264296 A1* | 9/2015 | Devaux .................. | H04N 5/77 386/226 |
| 2015/0381946 A1 | 12/2015 | Renkis | |
| 2016/0026253 A1* | 1/2016 | Bradski ................ | H04N 13/128 345/8 |
| 2016/0086018 A1 | 3/2016 | Lemoff | |
| 2016/0196728 A1 | 7/2016 | Suman et al. | |
| 2017/0083796 A1* | 3/2017 | Kim ....................... | G06V 10/82 |

FOREIGN PATENT DOCUMENTS

| | | | | |
|---|---|---|---|---|
| WO | WO-2014178853 A1 | * | 11/2014 | ....... G06F 17/30256 |
| WO | 2016/011204 A1 | | 1/2016 | |

\* cited by examiner

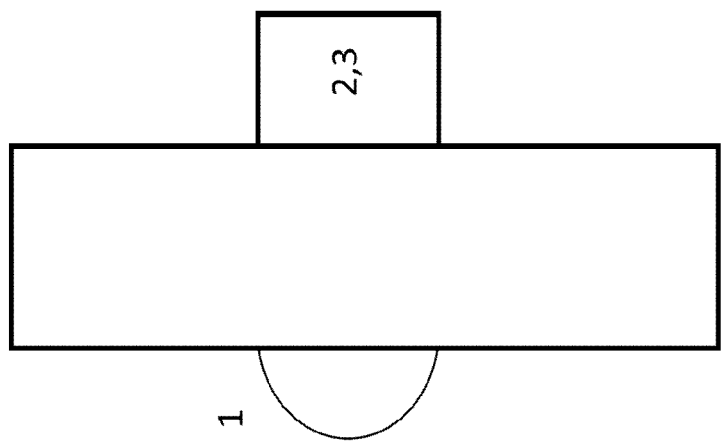
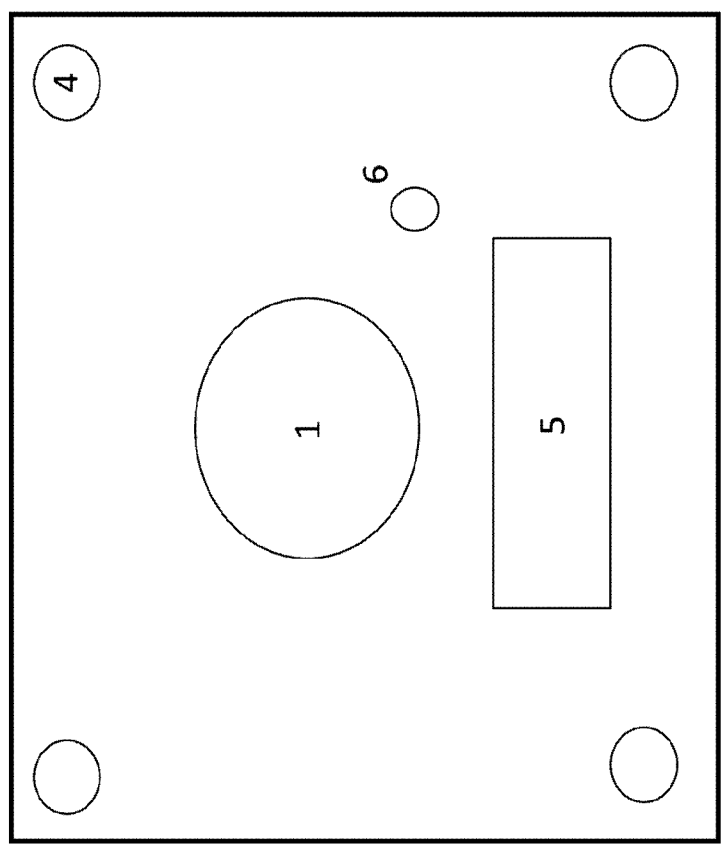
FIGURE 20

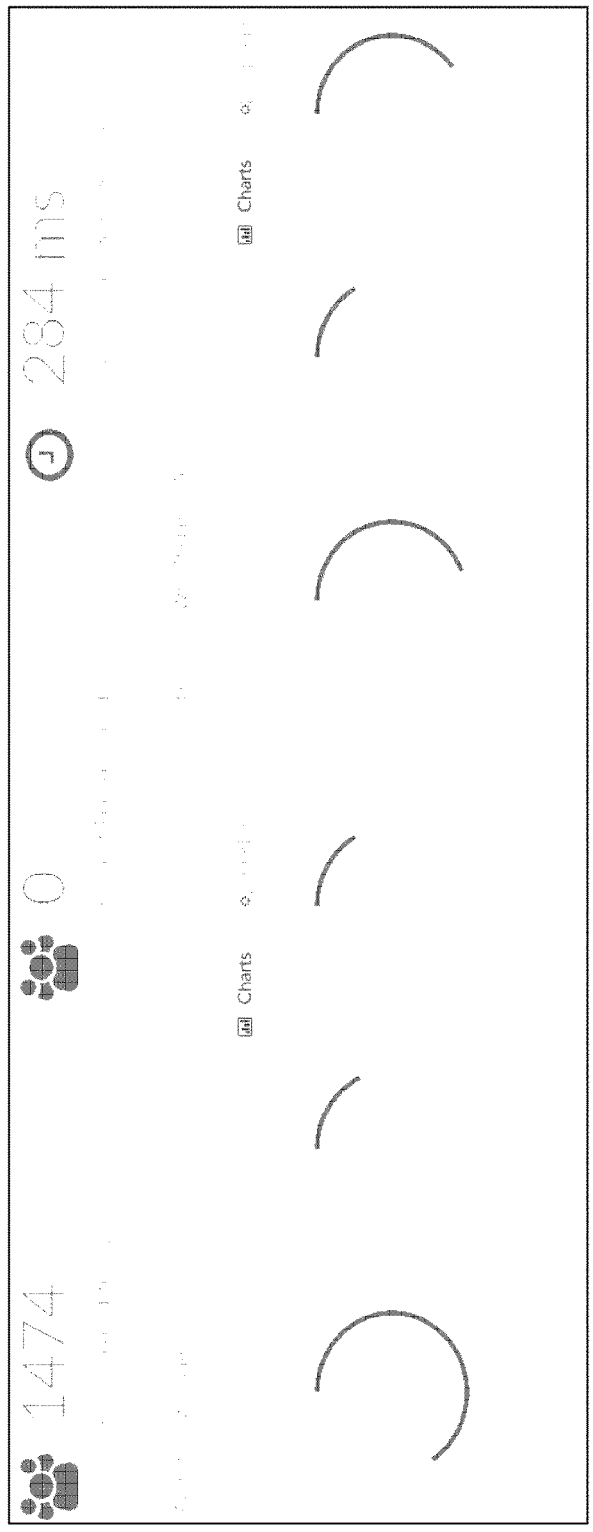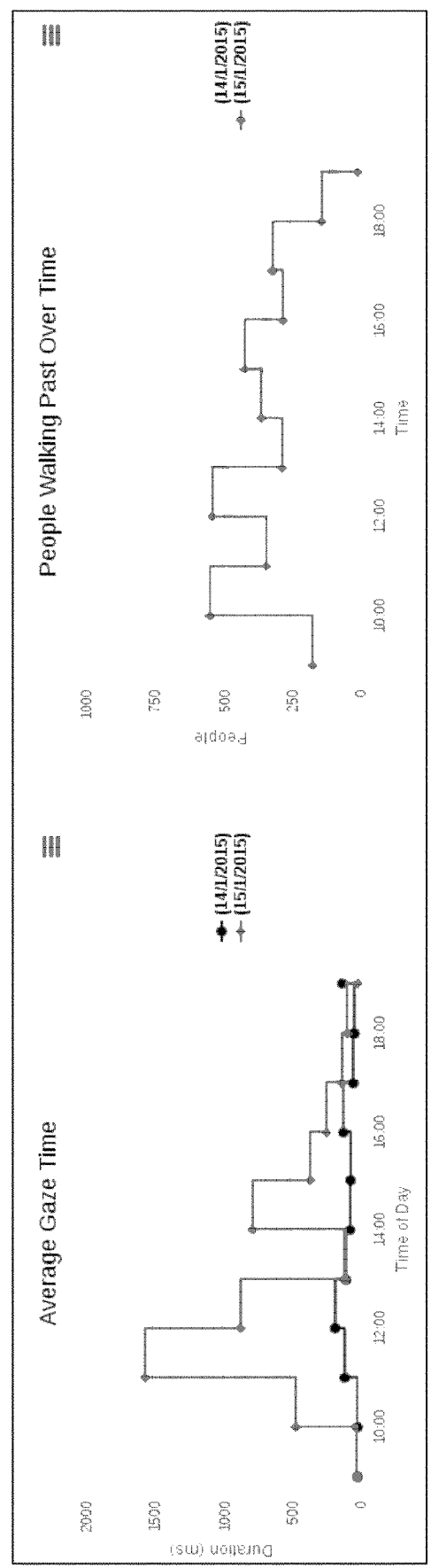
FIGURE 40

FIGURE 48

```
{ "Event":{
    "name":"Room Change",
    "eventID":"2B5788FA2387D6D5",
    "service":"Presence-A",
    "classOfService":2,
    "subscriberList":
        ["GE-Heating","MS-Xbox","Dolby-Sound","Google-Thermal","J&J-Health"],
    "people":["homeowner","child1"],
    "sensors":["sensor8","sensor9","sensor12"],
    "startTime":"2011-07-14 19:42:47 +0100",
    "startPosition":{"room":"hall",
        "people":[
            {"person":"homeowner",
             "position":[2,1]},
            {"person":"child1",
             "position":[2,1.5]}
        ]
    },
    "endTime": "2011-07-14 19:43:37 +0100",
    "endPosition": {"room":"kitchen",
        "people":[
            {"person":"homeowner",
             "position":[1,1]},
            {"person":"child1",
             "position":[3,1]}
        ]
    }
}
}
```

FIGURE 49

```
{ "EventRule":{
    "name":"Room Change Rule",
    "ruleID":"33C15F3E2219DD6C",
    "service":"Presence-A",
    "classOfService":2,
    "subscriberList":
        ["GE-Heating","MS-Xbox","Dolby-Sound","Google-Thermal","J&J-Health"],
    "people":{"includeList":["homeowner","adult2","child1","child2"],
              "ignoreList":["teenager1","adult3"],
              "other":true
             },
    "sensors":["sensor1","sensor2","sensor3","sensor4",
               "sensor6","sensor7","sensor8","sensor9","sensor12"],
    "timeWindow":30,
    "ruleDescription":"If people move between rooms within 30 second window create event"
  }
}
```

1502 Real World XML File Example of Sensor Data

HEADER
SOURCE 1 DESCRIPTION
SOURCE 2 DESCRIPTION
MODEL PACK
▶ FRAME 1
▶ FRAME ...
▶ FRAME N

```
<stream>
<frame num="7708334" time="2015-01-15T18:01:51.4//72">
  <set name="detect" num="0" type="face">
  </set>
  <set name="detect" num="2" type="hs">
    <obj id="7937">
      <coord x="133" y="448" z="0"/>
      <size d="0" h="128" w="128"/>
      <param model="6" pose="halfleft" score="2.916260" src="0"/>
      <angle pitch="0" roll="90" yaw="119"/>
    </obj>
    <obj id="7938">
      <coord x="1130" y="406" z="0"/>
      <size d="0" h="226" w="226"/>
      <param model="6" pose="halfleft" score="1.006105" src="0"/>
      <angle pitch="0" roll="90" yaw="128"/>
    </obj>
  </set>
  <set name="track" num="2" type="groupths">
    <obj id="7431">
      <coord x="133" y="448" z="0"/>
      <size d="0" h="126" w="126"/>
      <param kpred="7708334" life="99" score="2.846680"/>
      <angle pitch="0" roll="90" yaw="119"/>
      <set name="parent" num="1">
        <parent id="7937" name="hs"/>
      </set>
    </obj>
    <obj id="5866">
      <coord x="1130" y="406" z="0"/>
      <size d="0" h="226" w="226"/>
      <param kpred="7708334" life="99" score="1.518799"/>
      <angle pitch="0" roll="90" yaw="128"/>
      <set name="parent" num="1">
        <parent id="7938" name="hs"/>
      </set>
    </obj>
  </set>
</frame>
```

1501 Structure of XML Sensor Data Arriving at Hub Software

▼ FRAME 1
  Object 1
  Object 2
  Object N
  Group 1
  Group 2
  Group N
  N-Group 1
  N-Group 2
  N-Group N
  Track 1
  Track 2
  Track N
  N-Track 1
  N-Track 2
  N-Track N ▼ FRAME N
  Object 1
  Object 2
  Object N
  Group 1
  Group 2
  Group N
  N-Group 1
  N-Group 2
  N-Group N
  Track 1
  Track 2
  Track N
  N-Track 1
  N-Track 2
  N-Track N

COMPUTER VISION SYSTEMS

CROSS REFERENCE TO RELATED APPLICATIONS

This application claims the priority of PCT/GB2017/052231, filed on Jul. 31, 2017, which claims priority to GB Application No. GB1613138.5, filed on Jul. 29, 2016, the entire contents of each of which being fully incorporated herein by reference.

BACKGROUND OF THE INVENTION

1. Field of the Invention

The field of the invention relates to computer vision systems and methods providing real time data analytics on detected people or objects in the home environment or other environments.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Technical Background

The last few years have seen enormous advances in computer vision research and many teams are now attempting to deploy applications based on so-called intelligent video analysis. These usually fall into two camps: those doing very simple video analysis inside cameras, and those doing sophisticated video analysis on servers. However, the simple video analysis is too simple and unpredictable to be of much value in applications, while the sophisticated analysis is often completely un-scalable and uneconomical.

The reason for the latter is that state-of-the-art vision algorithms are unsuited for processing high-resolution video on CPUs, GPUs, and even dedicated vision processors: the costs of transmitting, storing and especially processing video are huge and scale linearly with the number of users, cameras and resolution.

Other systems have failed to provide an accurate and predictable solution for image and video processing implemented in a low-cost and low power sensor. Aspects of this invention address these failures.

Home automation/Smart home relates to the local and/or remote control of various devices or systems that are present in homes. Today's smart home services include a wide range of services, such as for example, automated door locks, energy monitoring devices, smart lighting systems, entertainment systems, vehicle detection systems and so on.

A Smart Home's connected devices must be able to monitor, contextualize and predict human behaviour as well as guarantee privacy. Smart Homes need to place the person at the heart of and in control of the home. Smart Home systems need to be functionally rich, accurate, predictable and able to interpret human behaviour. Current available solutions on the market are unable to deliver.

3. Discussion of Related Art

Various techniques providing data analytics on detected people or objects in an home environment are available. Examples are:

PIR sensors register only motion within their field of view. They fail when people are not moving, and give no information on the number of people present, their locations, their poses or their identities. They are triggered equally by any kind of movement.

Cloud cameras require transmission of full-frame video to a remote server and subsequent video analytics. Due to the very high computational requirements of the necessary algorithms, such systems are not real-time and are un-scalable as the storage and computational costs grow linearly with the number of sensors. In addition, they provide no possibility of guaranteeing privacy.

Gesture systems (such as Microsoft Kinect™) provide rich information but are close-range only, work reliably in a relatively narrow range of lighting conditions, and are relatively bulky and expensive.

Reference may also be made to GB2528330A, WO 2016/193716 and WO 2017/009649, the contents of which are hereby incorporated by reference.

SUMMARY OF THE INVENTION

A first aspect is a computer-vision system or engine that (a) generates from a pixel stream a digital representation of a person and (b) determines attributes or characteristics of the person from that digital representation and (c) based on those attributes or characteristics, outputs data to a cloud-based analytics system that enables that analytics system to identify and also to authenticate the person.

Optional features include any one or more of the following:

The attributes or characteristics of the person include their pose, and the system or engine analyses that pose to extract a facial image from a video stream that is the best facial image for use by the cloud-based analytics system to identify and authenticate the person.

The computer-vision system or engine outputs the facial image to the cloud-based analytics system, but does not output the full-frame real-time video to the cloud-based analytics system.

The video stream is indexed in real-time by the cloud-based analytics system with the identity of persons.

The computer-vision system or engine is implanted in an ASIC or SoC located in a camera, such as a security camera.

The computer-vision system or engine operates in real-time, directly processing raw image sensor data.

The cloud-based analytics system controls a digital advertising system or digital signage to provide one-to-one real time marketing to individuals whom it has recognised.

The computer-vision system or engine is capable of detecting an unlimited number of objects in each video frame.

The computer-vision system or engine dynamically preserves resolution of selective areas (or region of interest) within each frame.

The computer-vision system or engine dynamically adjusts the effective frame rate based on content and manages streaming level based on user control.

A second aspect is a system including (i) the computer engine defined above together with (ii) the cloud-based identification and authentication system defined above.

The result is, in one implementation, a scalable identification and authentication system where multiple (perhaps millions) of cameras at the edge that each incorporate in hardware the computer vision engine described above; these engines can, directly from the image sensor pixel stream from the image sensor in a low-cost IP camera, in real-time construct a digital representation of any arbitrary number of people or objects in a frame; a 'digital representation' of an object is a virtualisation of key elements of an object and is generated using conventional and well established object detection techniques. It is not a user-recognisable image of that object, but typically the vectors or other data points that define key points, or lines or shapes formed by an object (for a person, it could include the centres of each eye, the tips of the mouth, line drawn between the eyes, an oval or other shape containing the head, a square or rectangle defining the torso, a square or rectangle defining the entire body etc.).

From this digital representation, these engines can identify the parts of an image corresponding to each person's face ('facial extraction') and also the pose of each person (e.g. whether the person is facing the camera). They can then determine in real-time which image includes a facial image that is the 'best face' for a downstream facial recognition system; this will typically be full frontal, if the facial recognition system is populated with full frontal images. The engine then sends to the cloud-based facial recognition system the 'best face' facial image crops, which are small in byte size, for identification and authentication; there is no need to send full frame video to the cloud-based facial recognition system at all, but instead small, still images crops constituting the 'best face' alone are sufficient. A unique ID is then generated and associated with each person; since each person can be tracked across the field of views of multiple cameras, this enables an identified person to be followed in real-time across an entire journey, e.g. through a city, through buildings or other environments etc. Employing the 'best face' selection and related tagging with a unique ID, while the detected person remains in the field of view of multiple cameras, avoids the need for continuous and repeated re-running of any cloud-based facial recognition system, representing a significant saving in bandwidth and compute requirement and cost; instead, the unique ID need only be confirmed or assessed when a person passes from the field of view of one camera to another camera.

This overall approach results in a scalable system, able to provide meaningful and useful data from potentially millions of cameras, and that data can be analysed in real-time to yield identification data and permit authentication. None of this would be possible in a conventional system, sending full-frame video to the cloud-based analytics system; the bandwidth alone consumed by tens of thousands of cameras, each supplying full frame video, would make such a system impractical because of excessive data transmission costs, excessive compute requirements and storage costs, poor accuracy and the impossibility of real-time performance. But the implementation we describe above, by distributing the facial extraction and also 'best face' identification to hardware in the cameras themselves, and sending only the small facial crops to the cloud-based analytics system, overcomes these problems and enables a fully scalable yet very high performance identification and authentication system.

Because we have a machine-implemented system it is possible to train a deep learning system to identify patterns of physical behaviour that are related. So for example, a deep learning system could be trained from the output of the computer-vision system or engine—specifically, the digital representations could be used as inputs to a CNN (convolutional neural network).

Another aspect is hence a computer-vision system or engine that (a) generates from a pixel stream a digital representation of a person and (b) determines attributes or characteristics of the person from that digital representation and (c) provides a data input derived from the attributes or characteristics of the person to an external neural network or other form of deep learning system.

The computer-vision system or engine itself uses a neural network or other form of deep learning system for object detection and classification.

The input provided to the external deep learning system is used for training and operation.

The input provided to the external deep learning system enables that external deep learning system to identify patterns of related physical behaviours.

The external deep learning system is cloud-based.

The computer-vision system or engine provides the data input to the external deep learning system to train the deep learning system to differentiate between normal flow and abnormal flow of people within a building or street.

The computer-vision system or engine provides the data input to the external deep learning system to train the deep learning system to differentiate between normal and abnormal behavior of people.

The computer-vision system or engine provides the data input to the external deep learning system to train the deep learning system to differentiate between normal and abnormal passenger or driver behavior in a car, such as a tax A another aspect is a robot including a computer-vision system or engine that (a) generates from a pixel stream a digital representation of a person or other object and (b) determines attributes or characteristics of the person or object from, or associates those attributes of characteristics with, that digital representation and (c) enables one or more networked devices or sensors to be controlled.

The robot can be an electro-mechanical machine, such as an evolution of the Pepper robot from Softbank; the robot is then typically a mobile unit with humanoid characteristics. The robot may itself be one of the devices that is controlled by the computer-vision system or engine, and can hence contribute to the autonomous or semi-autonomous operation of the robot. Use cases include the following:

an industrial robot; a medical operating robot; a personal companion robot; a healthcare robot; a delivery robot; a customer services robot, for example in a retail store, or bank or other commercial environment; a drone.

the computer vision system or engine can track one or more parameters relating to the trajectory, pose, gesture, and identity of people and the digital representation can then be a virtualised abstraction of that person, including metadata capturing those parameters;

the virtualised abstraction is a machine readable description of the person or object that is suitable for data analysis; it is compact in data size and in transmission uses a tiny fraction of the bandwidth that video would require;

the virtualised abstraction can be rendered or shown on a display screen as an avatar; the avatar uses no actual video showing that person, so privacy issues are reduced. The behaviour, intent or emotional state of that person can be inferred or described from this virtualised abstraction.

A fifth aspect is a vehicle ADAS (advanced driver assistance system) including a computer-vision system or engine that (a) generates from a pixel stream a digital representation of a person or other object and (b) determines attributes or characteristics of the person or object from, or associates those attributes of characteristics with, that digital representation and (c) enables one or more networked devices or sensors to be controlled.

The vehicle-based ADAS computer-vision system or engine can then be used to generate a digital representation of the driver, passengers, nearby pedestrians, and/or nearby vehicles. The automobile can then be itself one of the networked devices controlled by the computer-vision system or engine. Use cases include the following:

- Enables a parked car to sense when someone is approaching it and to de-activate locks and open the appropriate doors if an authorised user approaches and to set memory seat settings and other personalised vehicle parameters (e.g. select the driver's favourite radio station, preferred cabin temperature and ventilation settings)
- Enables the car to sense the number of occupants in the vehicle and to alter vehicle settings appropriately (e.g. alter suspension settings for optimum performance depending on the number of people and where they are sitting; alter cabin temperature and ventilation settings depending on the number of people).
- Enables the car to sense pedestrians, cyclists etc. and to assess the likelihood of them colliding with the car; where the likelihood exceeds a threshold, then evasive action can be taken or a warning sounded to alert the driver A sixth aspect is a network of GPU-powered IoT devices, each including a computer-vision system or engine that (a) generates from a pixel stream a digital representation of a person or other object and (b) determines attributes or characteristics of the person or object from, or associates those attributes of characteristics with, that digital representation and (c) enables one or more networked devices or sensors to be controlled. A GPU is a graphics processing unit. Use cases include the following:

- the computer vision system or engine can track one or more parameters relating to the trajectory, pose, gesture, and identity of people and the digital representation can then be a virtualised abstraction of that person, including metadata capturing those parameters; the virtualised abstraction can be rendered or shown on a display screen but it uses no actual video showing that person, so privacy issues are reduced. The behaviour, intent or emotional state of that person can be inferred or described from this virtualised abstraction.
- a smart home could have a network of hundreds of these devices; building or cities could have millions. Novel services based on the ability to understand behaviour, intent or emotional states of people can be constructed using low-cost GPUs to handle significant portions of the computational load.

A seventh aspect is an emotion sensing device including a computer-vision system or engine that (a) generates from a pixel stream a digital representation of a person or other object and (b) determines attributes or characteristics of the person or object from, or associates those attributes of characteristics with, that digital representation and (c) enables one or more networked devices or sensors to be controlled.

The engine outputs data which enables the emotional state of the person, for whom a digital representation has been created, to be inferred from attributes or characteristics that have been determined for that person and that relate not to facial expressions, but instead to the body. Most theoretical emotion sensing models rely on the subjective assessment of facial expressions alone as a way of inferring emotion (e.g. a subject is shown a picture of someone's face and has to describe the emotion being experienced), however in this approach, we look at the entire body (and may or may not also detect facial expressions) and generate objective datasets describing body language. Body language, when captured systematically and objectively by a machine-implemented system as we describe here, is a surprisingly effective marker for emotional state and may, counter-intuitively, be more accurate when assessing extreme emotion than relying on facial expressions. Some of the physical aspects of body language that our computer-vision system or engine system can track or detect include the following:

- Anger: face and/or neck is flushed; clenched fists; raising fists; leaning forward; invasion of body space; lowering and spreading of the body; insulting gestures; hitting objects; exaggerated body movements
- Fear clenched hands or arms, elbows drawn in to the side, jerky movements; fidgeting; defensive body language, such as crossed arms, chin down, arms held across the chest, using a barrier; hiding
- Sadness: body drooping; slow movements and reactions
- Embarrassment: neck and/or face flushed, looking down or away from others
- Surprise: sudden backward movement
- Happiness: open body language, such as arms open, hands open, open and uncrossed legs; prolonged eye contact or had facing another person; head nodding in laughter, torso moving in laughter,
- The engine outputs data which enables the emotional interaction between several persons, for each of whom a digital representation has been created, to be inferred from attributes or characteristics that have been determined for that person.
- The system could also be used, for example in airports, train stations, public spaces, to monitor for activity that could indicate some criminal intent (for example, leaving bags unattended; the system can group a person and an object they are holding or moving with, and can then generate an alert if they are separated for any amount of time).

Optional features include the following, each of which can be combined with any other optional feature and can be used with any of the aspects described above. In the following, the term 'engine' also includes the term 'system'.

- The engine outputs a real-time stream of metadata from the pixel stream, the metadata describing the instantaneous attributes or characteristics of each object in the scene it has been trained to search for.
- The engine directly processes raw image sensor data or video data in the form of RGB, YUV or other encoding formats.
- The engine is an ASIC based product embedded in a device.
- The engine sends or uses those attributes or characteristics to enable one or more networked devices or sensors to be controlled.
- The engine can detect multiple people in a scene and continuously track or detect one or more of their: trajectory, pose, gesture, identity.
- The engine can infer or describe a person's behaviour or intent by analysing one or more of the trajectory, pose, gesture, identity of that person.
- The engine performs real-time virtualisation of the scene, detecting and extracting objects from the scene and grouping their virtualised representations together.
- The engine applies feature extraction and classification to find objects of known characteristics in each video frame or applies a convolutional or recurrent neural network or another object detection algorithm to do so.

The engine detects people by extracting independent characteristics including one or more of the following: the head, head & shoulders, hands and full body, each in different orientations, to enable an individual's head orientation, shoulder orientation and full body orientation to be independently evaluated for reliable people tracking.

The engine continuously monitors the motion of individuals in the scene and predicts their next location to enable reliable tracking even when the subject is temporarily lost or passes behind another object.

The engine contextualizes individual local representations to construct a global representation of each person as they move through an environment of multiple sensors in multiple locations.

The engine uses data from multiple sensors, each capturing different parts of an environment, to track and show an object moving through that environment and to form a global representation that is not limited to the object when imaged from a single sensor.

Approximate location of the object in 3D is reconstructed using depth/distance estimation to assist accuracy of tracking and construction of the global representation from multiple sensors.

The engine operates as an interface to enable control of multiple, networked computer-enabled sensors and devices in the smart home or office.

The digital representation conforms to an API.

The digital representation includes feature vectors that define the appearance of a generalized person.

The digital representation is used to display a person as a standardised shape.

The digital representation is used to display a person as a symbolic or simplified representation of a person.

The symbolic or simplified representation is a flat or 2-dimensional shape including head, body, arms and legs.

The symbolic or simplified representations of different people are distinguished using different colours.

The symbolic or simplified representation is an avatar.

The digital representation includes feature vectors that define the appearance of a specific person.

The digital representation of a person is used to analyse, or enable the analysis of one or more of trajectory, pose, gesture and identity of that person and smart home devices can respond to and predict the person's intent and/or needs based on that analysis.

The digital representation is not an image and does not enable an image of a person to be created from which that person can be recognised.

The engine does not output continuous or streaming video but instead metadata that defines various attributes of individual persons.

The engine outputs continuous or streaming video and also metadata that defines various attributes of individual persons.

The characteristics or attributes include one or more of trajectory, pose, gesture, identity.

The characteristics or attributes include each of trajectory, pose, gesture, and identity.

The engine works with standard images sensors working with chip-level systems that generate real-time data that enables a digital representation of people or other objects to be created.

The engine works with IP cameras to form a real-time metadata stream to accompany the output video stream providing an index of video content frame by frame.

The engine works with smart sensors that use visual information, but never form imagery or video at a hardware level.

System builds a virtualized digital representation of each individual in the home, comprising each individual's: Trajectory around the home, including for example the actions of standing and sitting, Pose, for example in which direction the person is facing, and/or in which direction they are looking; Gesture, for example motions made by the person's hands; and Identity, namely the ability to differentiate between people and assign a unique identity (e.g. name) to each person.

System understands a wide range of behaviours from the set: counting the number of people in the room, understanding people's pose, identifying persons using facial recognition data, determining where people are moving from/to, extracting specific gestures by an identified individual.

Data rate of the data sent from a computer-vision system is throttled up or based on event-triggering.

Multiple computer-vision systems send their data to a hub that stores and analyses that data and enables a digital representation of a person to be constructed from computer-vision systems with both shared and differing fields of view, tracking that person and also recognizing that person.

The hub exposes an open, person-level digital representation API, enabling various appliances to use and to be controlled in dependence on the data encoded in the API.

Digital representation is created locally at a computer-vision system, or at a hub, or in the cloud, or distributed across computer-vision systems and one or more hubs and the cloud.

Digital representation is a 'track record' that uses the reformatting of real-time metadata into a per-object (e.g. per-person) record of their trajectory, pose (and, possibly, identity) of that object.

The Track Records are stored in a MySQL-type database, correlated with a video database.

Digital representation includes an estimate or measurement of depth or distance from the sensor of a person or object or part of the environment.

Depth sensing uses a calibration object of approximately known size,

Depth sensing uses stereoscopic cameras or structured light.

Digital representation includes facial recognition data.

Sensor metadata is fed into a hub, gateway or controller that pushes events to smart devices in a network as specific commands, and differentiates the events created on a per service basis to allow each service to receive different data that is relevant to their service from the group of sensors as a single intelligent sensor.

The event streams are sent to cloud analytics apps such as for example cloud-based data monitoring, data gathering or learning service.

An event subscription service, to which a system controller subscribes, receives event notifications and data from the devices or sensors.

A virtual output queued event switch is used so that events being pushed to the control system can be differentiated by a class of service marker.

System generates event objects from a collection of individual sensor inputs in which each event object also contains subscriber information and class of service.

The event objects are coded in JSON format so that they can be directly used in Javascript-based software on Browser User Interfaces (BUIs) and web servers, or easily interpreted by standard server side programming languages or server Application Programming Interfaces (APIs).

System queues the generated events and switches them into an output channel based on destination and class of service using a virtual output queuing system.

The digital representation relates to other items selected from the list: animals, pets, inanimate objects, dynamic or moving objects like cars.

Control is implemented using gesture recognition (e.g. wave at a computer-vision sensor to turn it off; wave at a light switch to turn the lights up or down).

Control is implemented using movement detection (e.g. approach a room and its lights turn on; approach the sofa and the TV turns on).

Voice-controlled system can be enhanced since voice commands can be dis-ambiguated—e.g. reliably identified as commands and not background noise since a user can be seen to be looking at the microphone or other sensor or object to be controlled when giving the command and also voice controlled system can be set to monitor audio only when user is seen to be looking at the microphone/object to enhance privacy.

System or engine can be localised in a camera or other device including a sensor, or in a hub or gateway connected to that device, or in a remote server, or distributed across any permutation of these.

System or engine is localised in one or more of the following: (a) an edge layer that processes raw sensor data; (b) an aggregation layer that provides high level analytics by aggregating and processing data from the edge layer in the temporal and spatial domains; (c) a service layer that handles all connectivity to one or more system controllers and to the end customers for configuration of their home systems and the collection and analysis of the data produced.

An eight aspect is a software architecture or system for a smart home or smart office, the architecture including
(a) an edge layer that uses GPUs to process sensor data;
(b) an aggregation layer that provides high level analytics by aggregating and processing data from the edge layer in the temporal and spatial domains;
(c) a service layer that handles all connectivity to one or more system controllers and to the end customers for configuration of their home systems and the collection and analysis of the data produced.

Optional features include the following, each of which can be combined with any other optional feature, as well as any of the aspects and optional features listed above.

the edge layer processes raw sensor data or video data at an ASIC embedded in a sensor or at a gateway/hub;

The edge layer includes a computer-vision system or engine that (a) generates from a pixel stream a digital representation of a person or other object and (b) determines attributes or characteristics of the person or object from, or associates those attributes of characteristics with, that digital representation and (c) enables one or more networked devices or sensors to be controlled.

The edge layer can detect multiple people in a scene and continuously track or detect one or more of their: trajectory, pose, gesture, identity.

The edge layer can infer or describe a person's behaviour or intent by analysing one or more of the trajectory, pose, gesture, identity of that person.

The computer vision system is as defined above.

The computer vision system uses stereoscopic cameras or structured light.

The system continuously analyses each person it is sensing and interprets certain behaviours as events.

The edge layer pushes real-time metadata from the raw sensor data to the aggregation layer.

The aggregation layer takes the metadata produced by the edge layer and analyses it further, combining multiple sources of data together to create events as functions of time.

The aggregation layer interprets a set of rules for the creation of events.

The aggregation layer prepares the events for delivery as a service, which includes scheduling algorithms that drive a multi-class of service event switch before passing the event data through to the service layer.

The service layer allows the system to interact with real-time control systems that subscribe for an event service that is packaged, delivered and monitored by the service layer.

All 3 layers of the architecture or system are contained within a gateway or hub device, to which cameras or other sensors are connected, and a portion of the service layer is in the cloud.

The gateway or hub component of the edge layer is used to centralise some management components of the architecture rather than replicate them across all of the cameras/sensors themselves.

Cameras or other sensors include some of the edge layer, and these elements of the edge layer output real-time metadata; all 3 layers of the architecture are contained within a gateway or hub device, to which the cameras or other sensors are connected, and a portion of the service layer is in the cloud.

Cameras or other sensors include some of the edge layer, and these elements of the edge layer output real-time metadata; all 3 layers of the architecture are in the cloud.

Implementations can be deployed in any of the following markets:

Smart Home
Smart Office
Smart City
Healthcare
Environment control
Retail/advertising
Home Security
Insurance
Education A ninth aspect is a GPU-based computer vision engine that (a) generates from a pixel stream a digital representation or virtualisation of a person or other object and (b) determines attributes or characteristics of the person or object from, or associates those attributes of characteristics with, that digital representation.

Optional features include the following, each of which can be combined with any other optional feature:

The engine outputs a real-time stream of metadata from the pixel stream, the metadata describing the instantaneous attributes or characteristics of each object in the scene it has been trained to search for.

The engine directly processes raw image sensor data or video data in the form of RGB, YUV or other encoding formats.

The engine is an ASIC based product embedded in a device.

The engine detects multiple people in a scene and continuously track or detect one or more of their: trajectory, pose, gesture, identity.

The engine can infer or describe a person's behaviour or intent by analysing one or more of the trajectory, pose, gesture, identity of that person.

The engine performs real-time virtualisation of the scene, extracting objects from the scene and grouping their virtualised representations together.

The engine applies feature extraction and classification to find objects of known characteristics in each video frame or applies a convolutional or recurrent neural network or another object detection algorithm to do so.

The engine detects people by extracting independent characteristics including one or more of the following: the head, head & shoulders, hands and full body, each in different orientations, to enable an individual's head orientation, shoulder orientation and full body orientation to be independently evaluated for reliable people tracking.

The engine continuously monitors the motion of individuals in the scene and predicts their next location to enable reliable tracking even when the subject is temporarily lost or passes behind another object.

The engine contextualizes individual local representations to construct a global representation of each person as they move through an environment of multiple sensors in multiple locations.

The engine uses data from multiple sensors, each capturing different parts of an environment, to track and show an object moving through that environment and to form a global representation that is not limited to the object when imaged from a single sensor.

Approximate location of the object in 3D is reconstructed using depth/distance estimation to assist accuracy of tracking and construction of the global representation from multiple sensors.

The digital representation conforms to an API.

The digital representation includes feature vectors that define the appearance of a generalized person.

The digital representation of a person is used to analyse, or enable the analysis of one or more of trajectory, pose, gesture and identity of that person and smart home devices can respond to and predict the person's intent and/or needs based on that analysis.

The digital representation is not an image and does not enable an image of a person to be created from which that person can be recognised.

The engine does not output continuous or streaming video but instead metadata that defines various attributes of individual persons.

The engine outputs continuous or streaming video and also metadata that defines various attributes of individual persons.

The characteristics or attributes include one or more of trajectory, pose, gesture, identity.

The characteristics or attributes include each of trajectory, pose, gesture, and identity.

The engine works with standard images sensors working with chip-level systems that generate real-time data that enables a digital representation of people or other objects to be created.

The engine works with IP cameras to form a real-time metadata stream to accompany the output video stream providing an index of video content frame by frame.

The engine works with smart sensors that use visual information, but never form imagery or video at a hardware level.

System builds a virtualized digital representation of each individual in the home, comprising each individual's: Trajectory around the home, including for example the actions of standing and sitting, Pose, for example in which direction the person is facing, and/or in which direction they are looking, Gesture, for example motions made by the person's hands; and Identity, namely the ability to differentiate between people and assign a unique identity (e.g. name) to each person.

System understands a wide range of behaviours from the set: counting the number of people in the room, understanding people's pose, identifying persons using facial recognition data, determining where people are moving from/to, extracting specific gestures by an identified individual.

Data rate of the data sent from a computer-vision system is throttled up or based on event-triggering.

Digital representation is a 'track record' that uses the reformatting of real-time metadata into a per-object (e.g. per-person) record of their trajectory, pose (and, possibly, identity) of that object.

The Track Records are stored in a MySQL-type database, correlated with a video database.

Digital representation includes an estimate or measurement of depth or distance from the sensor of a person or object or part of the environment.

Depth sensing uses a calibration object of approximately known size.

Depth sensing uses stereoscopic cameras or structured light.

Digital representation includes facial recognition data.

The digital representation relates to other items selected from the list: animals, pets, inanimate objects, dynamic or moving objects like cars.

Control is implemented using gesture recognition (e.g. wave at a computer-vision sensor to turn it off; wave at a light switch to turn the lights up or down).

Control is implemented using movement detection (e.g. approach a room and its lights turn on; approach the sofa and the TV turns on).

Voice-controlled system can be enhanced since voice commands can be dis-ambiguated—e.g. reliably identified as commands and not background noise since a user can be seen to be looking at the microphone or other sensor or object to be controlled when giving the command and also voice controlled system can be set to monitor audio only when user is seen to be looking at the microphone/object to enhance privacy.

Aspects of the invention are implemented in platforms from ArtofUs Limited called (either currently or previously) ART™, ALIVE™ and AWARE™; each of these platforms uses a computational vision engine called SPIRIT™; SPIRIT is a hardware based engine in an ASIC that may be embedded in a sensor.

ART is a platform which creates a digital representation of a person in a home, which can be used to control a network of smart home devices. It typically consists of:

An embedded Spirit engine in an ASIC in one or more sensors

A software application residing in a home hub

A software application residing in the cloud

Complements to the ART Approach

The smartphone remains an important device in the smart home, but it is no longer required as the central remote control for all devices. Instead of "an app for every device", the smartphone becomes a method of configuring an ART-based system and one method of user identification/personalisation used by ART.

Voice recognition alone has limited potential in the smart home, but combined with ART's ability to detect identity and intent (that is, attention directed towards a specific device), voice recognition may become effective as an interface with certain devices within the home.

ALIVE is a platform and possibly a service for delivering new user experiences around video. It consists of one or more of the following:

Spirit engine in a SoC inside a smartphone

Spirit engine in a FPGA inside a server

ALIVE software app on a smartphone

ALIVE software an a server

AWARE is a platform for converting peoples' behaviour into big data. It consists of:

Spirit engine in a SoC inside a camera or sensor

And/or Spirit engine in an FPGA in a router or server

AWARE server containing database(s), business logic, and interfaces to client applications

BRIEF DESCRIPTION OF THE FIGURES

Aspects of the invention will now be described, by way of example(s), with reference to the following, in which:

FIG. 20 shows a diagram of a light switch incorporating an ART sensor.

FIG. 40 shows an example of a screen capture of a Web GUI for smart retail.

FIG. 48 is a diagram of a house model using JSON notation.

FIG. 49 is an example of an event in JSON notation.

FIG. 50 is an example of an event rule in JSON notation.

FIG. 55 is an example of a raw data from sensor.

DETAILED DESCRIPTION

A video-enabled system that may be connected to a home, office or other environment is presented. It is based on advanced computer vision techniques generating data, which enables scene interpretation without the need of video. Instead, visual sensing may be used to create a digital representation of people or other things. The invention has multiple independent aspects and optional implementation features and each will be described in turn. The core technology described may be used to implement any of the aspects of the invention described above.

Figure 1:
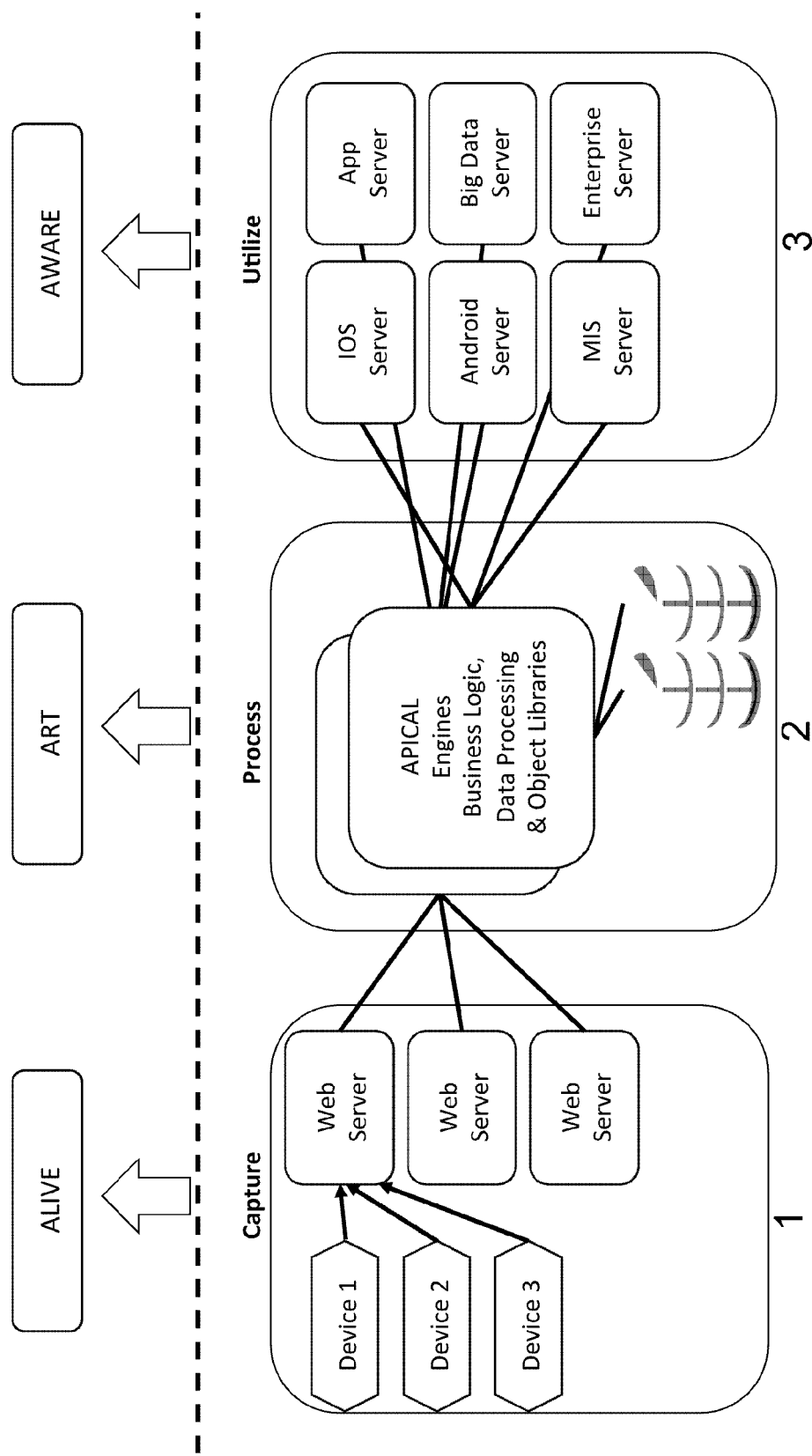
FIG. 1 shows a diagram of the system architecture integrated in the cloud.

FIG. 1 is a diagram with an overview of the overall system architecture for integration in smart home and cloud solutions. The system is based on Spirit, an embedded engine that analyses an input image and virtualised the image into its digital representation enabling a digital understanding of the scene. Spirit comprises dedicated IP blocks with embedded firmware. The system may comprise data receivers and device managers (1), databases and storages (2) and smart-home interfaces (3). Other engines may also be used.

The key features of this invention will be described in one of the following sections:
1. Spirit
2. ALIVE
3. ART
4. AWARE
5. JSON-Based Event Generation and Event Switching
6. Market Research and Application
7. Use Case Examples 1. Spirit Assertive technology and Spirit technology are dual core technology models based on the human visual system. Assertive technology puts human vision into digital devices to create natural, seamless experiences everywhere while saving power while Spirit technology mimics human visual processing, enabling devices to understand what they see.

The performance advantage of the Spirit architecture over alternative software-based approaches, whether measured in speed, power consumption or cost is measured in order of magnitude. The algorithms on which Spirit is based cannot be run in real time on any other existing processor architecture, including processors designed for computer vision applications. Spirit also overturns the conventional process flow of sensor-image processor—video encoder—video decoder—video analysis. With Spirit, there is no need or function for any of the other parts of the system: they are expensive, consume power, actually reduce accuracy, and can be deleted. Spirit takes what was previously only possible on a supercomputer and puts it in a low-cost, low-power sensor.

1.1 Overview of Spirit

Spirit implements state-of-the-art computer vision and machine learning fully at the edge. It takes the most advanced techniques currently used for video analysis on server farms and embeds them inside a connected sensor, operating with unprecedented performance and accuracy at very low power.

Spirit can locate and track any number of people, their poses and gestures, from up close to far away, and in real time. Spirit takes as input the raw data streamed from a standard image sensor.

Because of Spirit's unique architecture, there is no limitation on the number of people and their associated characteristics, which can be simultaneously monitored, nor is there any limitation on the distance from the sensor, provided the sensor is of sufficiently high resolution.

Figure 2:
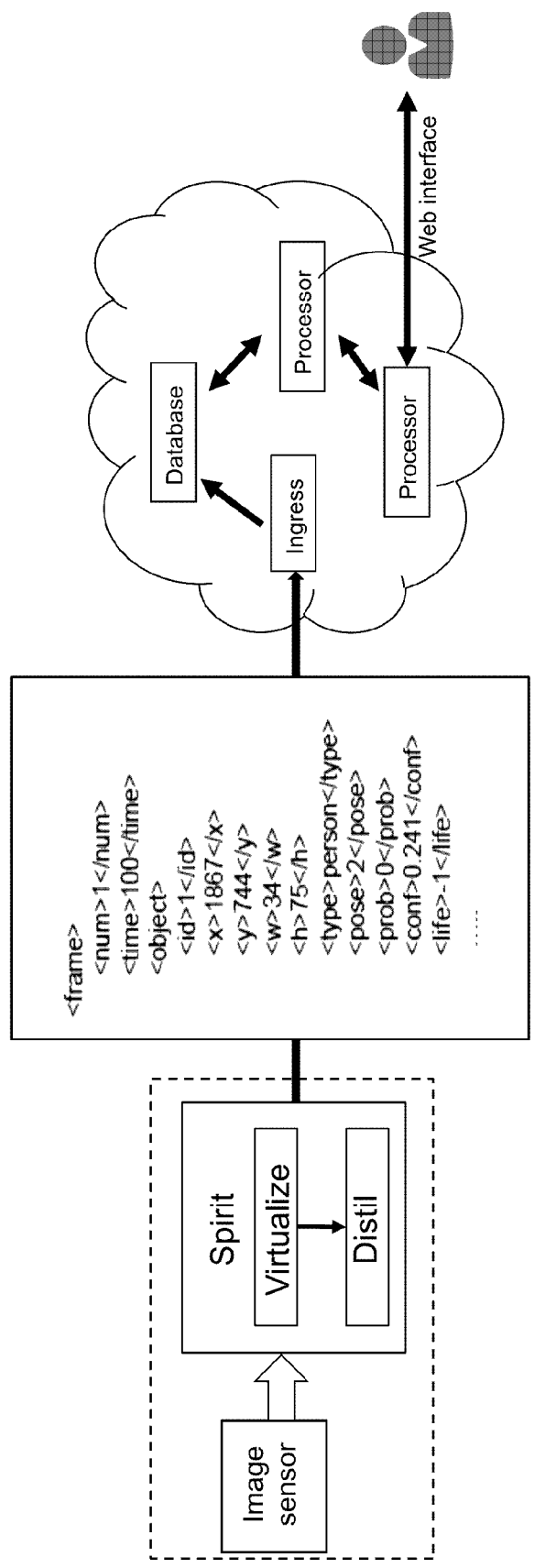
FIG. 2 illustrates a method of capturing a raw image sensor data and converting it into a metadata stream to be further analysed and processed.

Spirit is an embedded engine, which converts a stream of pixel data into metadata describing the objects of interest within the scene, together with their characteristics, as illustrated by FIG. 2. For example, Spirit coupled with a conventional CMOS image sensor can detect any number of people within a scene and continuously track their poses, trajectories and gestures. It does this by a process of virtualization, meaning extracting from the pixel stream all the basic objects for which it has been trained to search, and distilling, meaning grouping these objects, determining characteristics such as pose, analysing their trajectories, and so on.

Spirit's output is a stream of metadata describing the instantaneous characteristics of each object in the scene, in a machine-readable format ideally suited to subsequent data analytics (as shown in FIG. 2). This data is rich but highly compact, and represents a tiny bandwidth compared to the source pixel stream.

Spirit can therefore be considered as a data compression engine capable of achieving a 100,000:1 compression ratio for the salient information within the data stream while at the same time encoding it into a form which admits efficient subsequent analysis.

Figure 3:
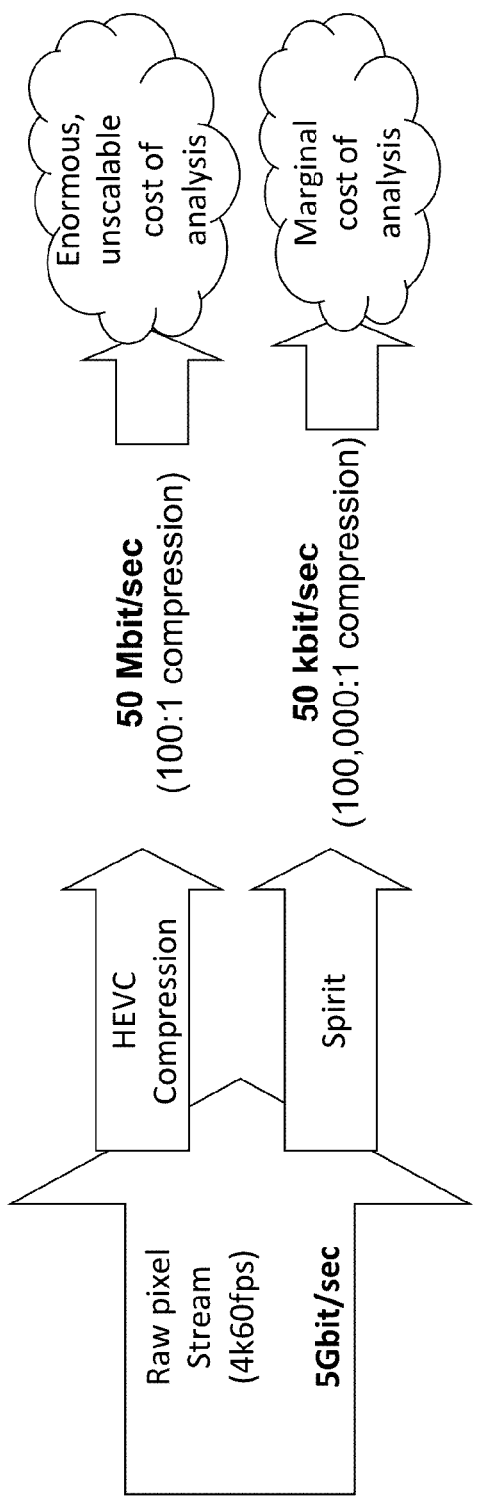
FIG. 3 shows a comparison between the compression from a Spirit engine as compared to standard HEVC for a raw pixel stream of 4K at 60 fps.

FIG. 3 shows a comparison between the compression from a Spirit engine as compared to standard HEVC for a raw pixel stream of 4K at 60 fps. While HEVC compression results in an enormous and unscalable cost of analysis, Spirit provides marginal cost of analysis due to its high compression ratio.

Spirit operates in real time and can directly process raw image sensor data. Why process raw data, when virtually all conventional analytics runs on video? First, because raw data contains the highest amount of information and subsequent image processing may often only degrade it. Second, because this data can be characterized to deliver predictable accuracy, whereas subsequent image processing may make such characterization impossible. Third, it removes the need for the heavy on-chip and off-chip infrastructure for supporting creation, encoding and decoding of video. Fourth, because relying on video means essentially that privacy is impossible.

1.2 Key Technical Characteristics

What is unique about Spirit is its ability to extract all salient information from streaming pixel data in real time without constraints. This is achieved by a combination of the following characteristics:

- Real-time operation (for example up to 4K resolution at 60 fps).
- Unlimited number of objects can be detected in each video frame.
- Objects can be any size; they may vary for example from 50×50 pixels up to the resolution of the frame.
- Complex objects, like people, can be composed by grouping multiple component objects, like body parts.
- Real distances may be estimated from the sensor location using a calibration object of a known size.
- State-of-the-art accuracy and predictability.
- Many different kinds of objects can be searched simultaneously.
- Operates on raw pixel data, or processed data.
- Low power.
- Low silicon cost.

1.3 Spirit for People Analysis

Spirit can be trained to search for a wide range of objects. For ART, these objects may be for example the component parts of a person: different positions of the head, upper body, full body, hands and so on.

Spirit employs a novel method for people analysis. People are detected by a combination of up to 16 independent characteristics comprising the head, head & shoulders and full body in different orientations, together with additional models for hands. This approach yields multiple benefits.

First, it dramatically increases the accuracy of people detection and tracking compared to methods that use single models for the entire person. The method is robust to partial occlusions, where one part of the body is hidden behind another object, and is not dependent on the orientation of the person, who may have their back to the sensor. The method of grouping renders the system robust to errors.

Second, it enables extraction of rich information on pose. For example, an individual's head orientation, shoulder orientation and full body orientation can be independently evaluated.

Because Spirit can operate at high frame rates, people tracking become reliable. Spirit continuously monitors the motion of individuals in the scene and predicts their next location. This analysis combined with other information extracted by the engine makes for reliable tracking even when the subject is temporarily lost or passes behind another object.

Figure 4:
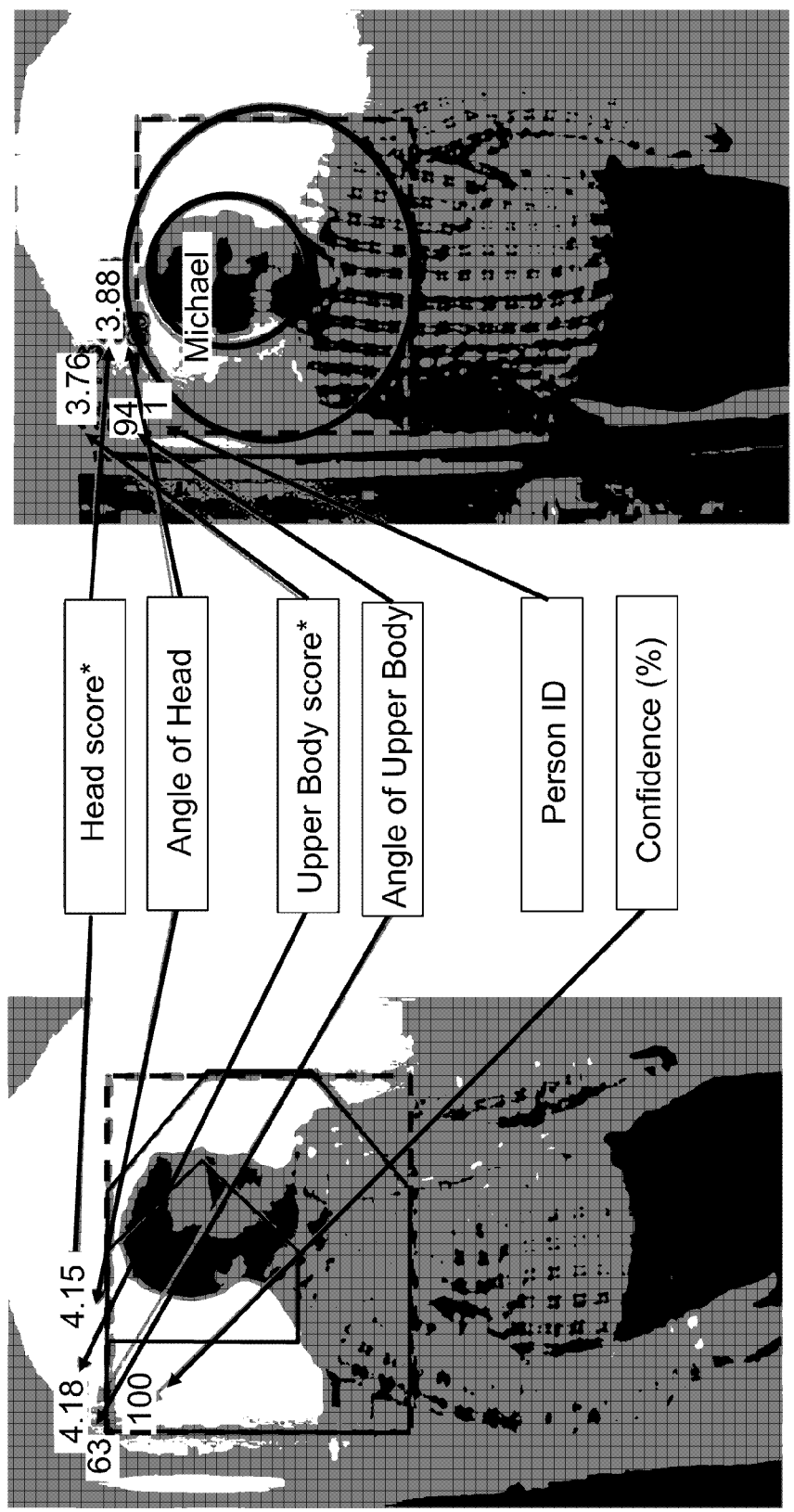
FIG. 4 illustrates an example of analysing a person in real-time frame by frame for two subsequent frames.

FIG. 4 illustrates an example of tracking and analysing a person in real-time frame by frame for a sequence of two frames. A person is detected and the characteristics of the head (head score and angle of head) and upper body (upper body score and angle of upper body) are extracted. The person ID is also shown with its associated confidence level.

Figure 5:
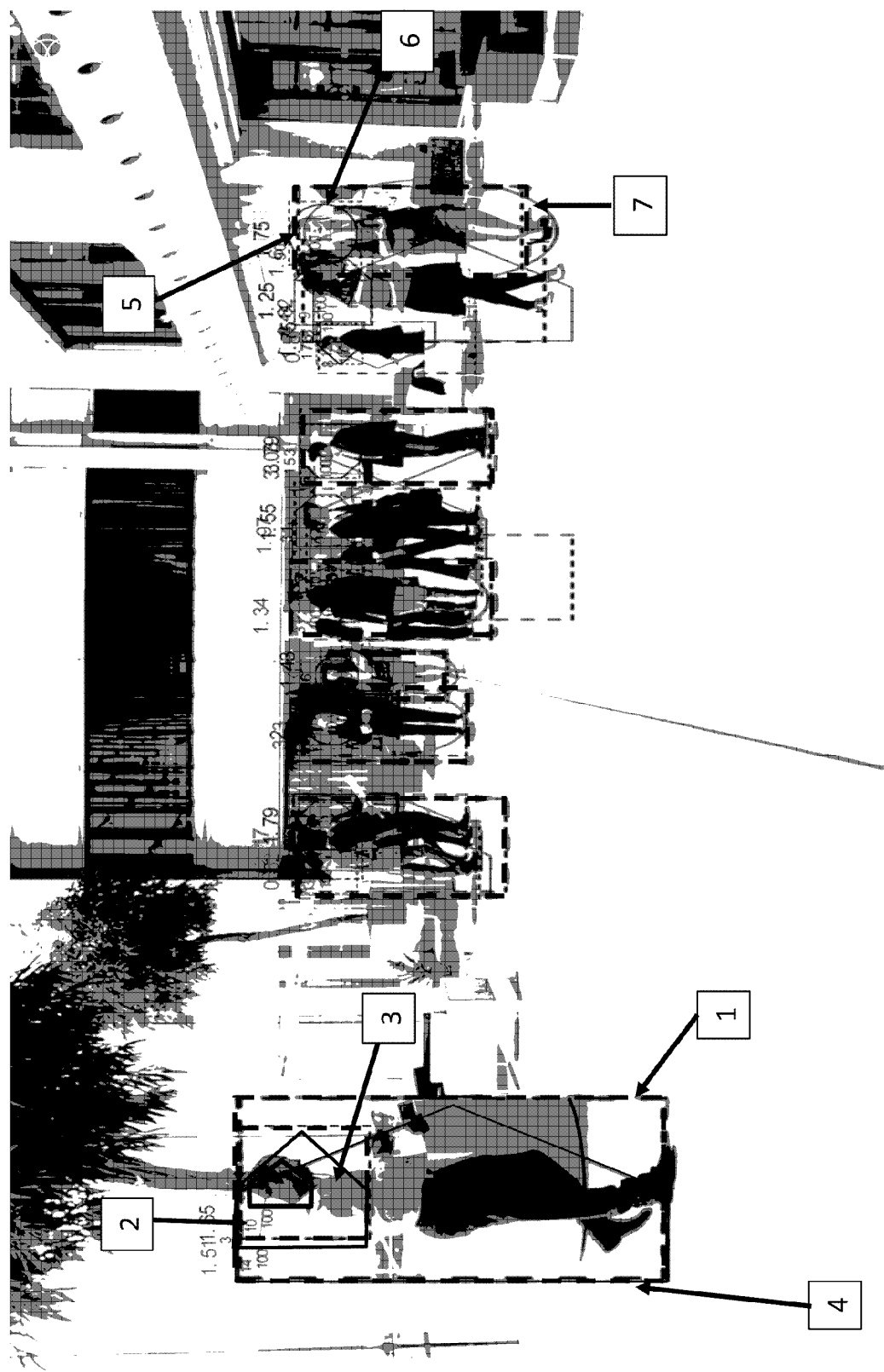
FIG. 5 illustrates an example of analysing more than one person within a video frame in real-time.

FIG. 5 illustrates a further example where more that one person is detected within a single frame. There is no limit to the number of people, which can be simultaneously tracked and analysed. The number of pixels in the frame dictates the smallest body part, which in practice can be detected. Characteristics of the people detected may be extracted in real time, such as for example: person being tracked (1), head facing right (2), upper body facing right (3), full body facing right (4), head facing forwards (5), upper body facing forward (6), full body facing forward (7).

The annotations from FIGS. 4 and 5 are generated using Spirit's metadata in order to give a visual reference.

1.4 Technology

Spirit may use a number of techniques to find objects of known characteristics in each video frame. Most of the existing object detection techniques are based on machine learning systems, which focus on feature extraction and classification. Spirit may also use deep learning techniques such as for example convolutional or recurrent neural network. Spirit may also use a hybrid machine learning technique or a random projection technique or another object detection algorithm.

Spirit may be trained off-line with thousands of examples of the objects for which it is to search. Spirit also has the capability to learn variations of these objects, to a certain degree. Once it finds an object in a given video frame, it looks for other related objects, groups them together, and then tracks them over time using predictive methods.

Spirit is not designed to index all the objects in the world. It's designed to detect, classify, track and predict common objects. The most important object is considered to be self-evidently the person, but animals, cars and other objects can also be accurately detected.

In addition to the core analytical algorithms, Spirit builds in proprietary modules, which control and characterise the image sensor. As a result, the sensor is no longer employed as a conventional imaging device: it becomes a calibrated sensor with predictable influence on the quality of the virtualized data output by Spirit.

1.5 Performance

Spirit achieves unprecedented performance due to its algorithmic design and extensive implementation in dedicated hardware. This design achieves near-100% utilization of computational resources, in contrast to the low levels of utilization typical of processors optimized for computer vision tasks.

Spirit has an equivalent compute performance of over a teraflop, yet achieves this in a very compact and low power silicon core, capable of implementation in almost any device.

In addition, thanks to more than a decade's experience in image sensor data processing, Spirit achieves a critical level of accuracy and predictability in a wide range of usage scenarios.

While Spirit employs dedicated hardware, it remains efficiently programmable through its firmware layer. For example, different object types are pre-trained and loaded as vectors into the engine in real time, enabling objects as diverse as people, animals, cars and so on to be detected, classified and tracked by the same core.

1.6 Implementation

Spirit comprises two components:
- A hardware IP core performing the primary image analysis functions, representing an area of dedicated processing on a semiconductor chip.
- An embedded firmware library executed on the same chip, running on a processor of ARM M4 class or equivalent.

Figure 6:
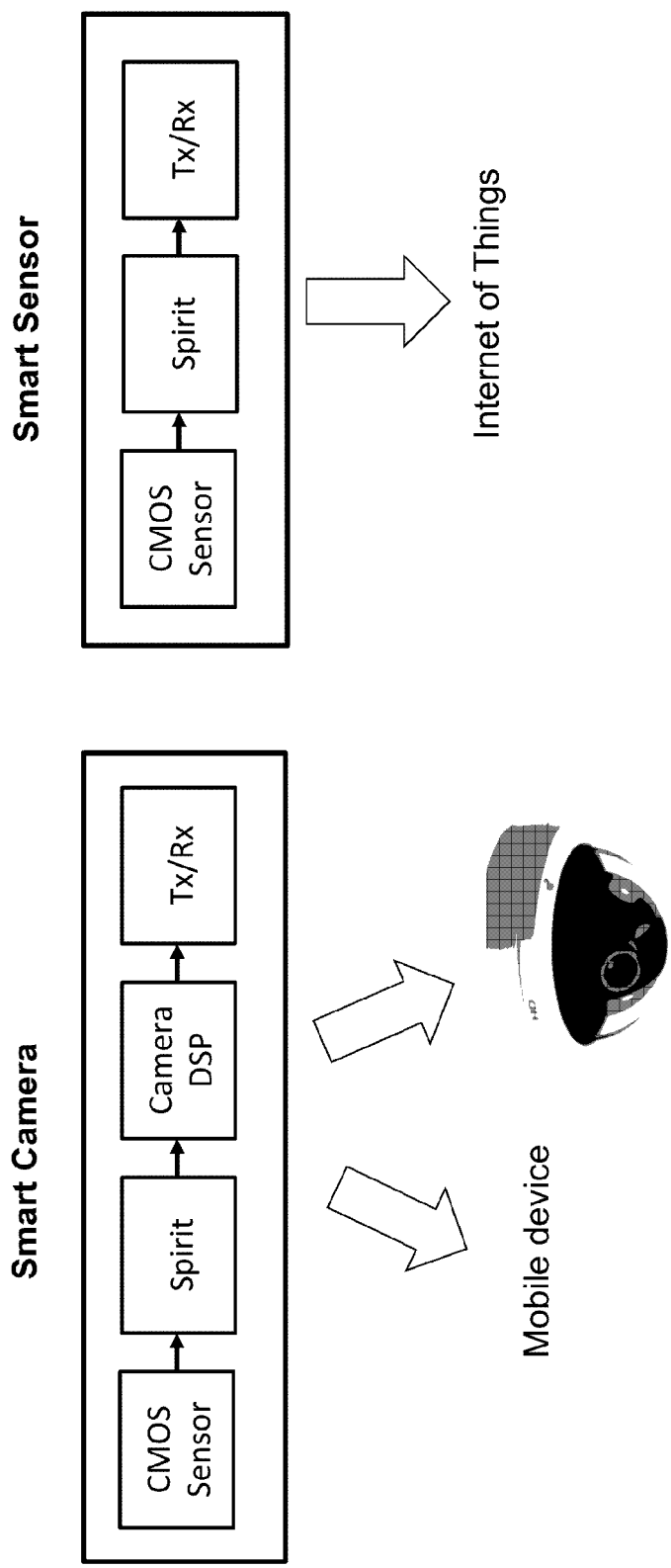
FIG. 6 shows an example of the architecture for implementing Spirit within a Smart Camera and Smart Sensor.

Because Spirit is uniquely able to process pixel streams without any conventional video processing subsystem, it enables two classes of device as shown in a smart camera, where video is virtualized and distilled at the same time as it is captured and encoded; and a smart sensor, which contains no video subsystem but creates the same data from the same sensor. This is illustrated in FIG. 6.

Figure 7:
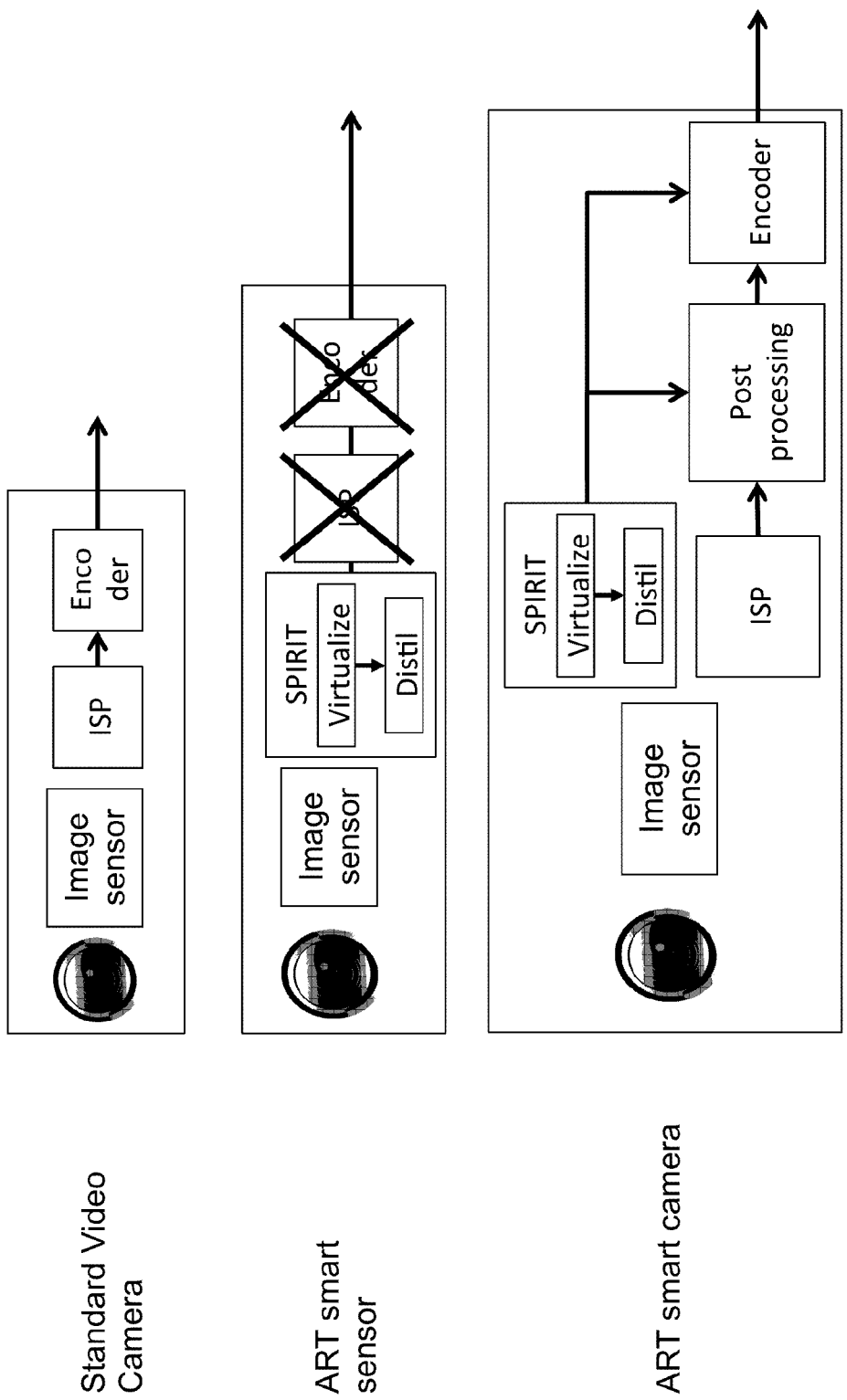
FIG. 7 illustrates block diagram of a standard video camera as compared to the black diagrams of an implementation of Spirit with an ART smart sensor, and an ART smart camera.

In FIG. 7, the block diagrams of a standard video camera, of an ART smart sensor and of an ART smart camera are shown. The block diagram of a standard video camera may comprise a standard ISP (Image Signal Processing) block, which processes the output of an image sensor and an encoder. In comparison, an ART smart sensor may comprise a Spirit engine block without the need of an ISP block and an encoder. An ART smart camera may comprise a Spirit engine block as well as a post processing block and an encoder.

1.7 Spirit in Context

Spirit uses the same kind of object recognition and deep learning algorithms that the world's biggest technology companies are attempting to deploy on supercomputers but implements them fully and without compromise in a tiny piece of silicon inside a connected device. This is possible only because of the highly optimized hardware-based design of Spirit, which achieves 100% utilization of the chip resources. The result is performance, which is orders of magnitude higher than the best of today's alternatives, and at orders of magnitude lower power.

Spirit changes the landscape for intelligent systems. Instead of the need to ship video data from device to the cloud and process it with huge computing resources, with all the associated problems of network traffic, storage and compute costs, as well as privacy, an intelligent network now needs only to transmit, store and process the virtualized and distilled metadata which already provides a baseline description of all objects of interest in the scene.

2. Alive

ALIVE is an intelligent eye embedded in Smartphones and other devices, which allows for video capture, search and publishing. ALIVE automatically remembers the component of a video frame by frame while being able to disregard the information or data that is unimportant.

2.1 Overview

Figure 8:
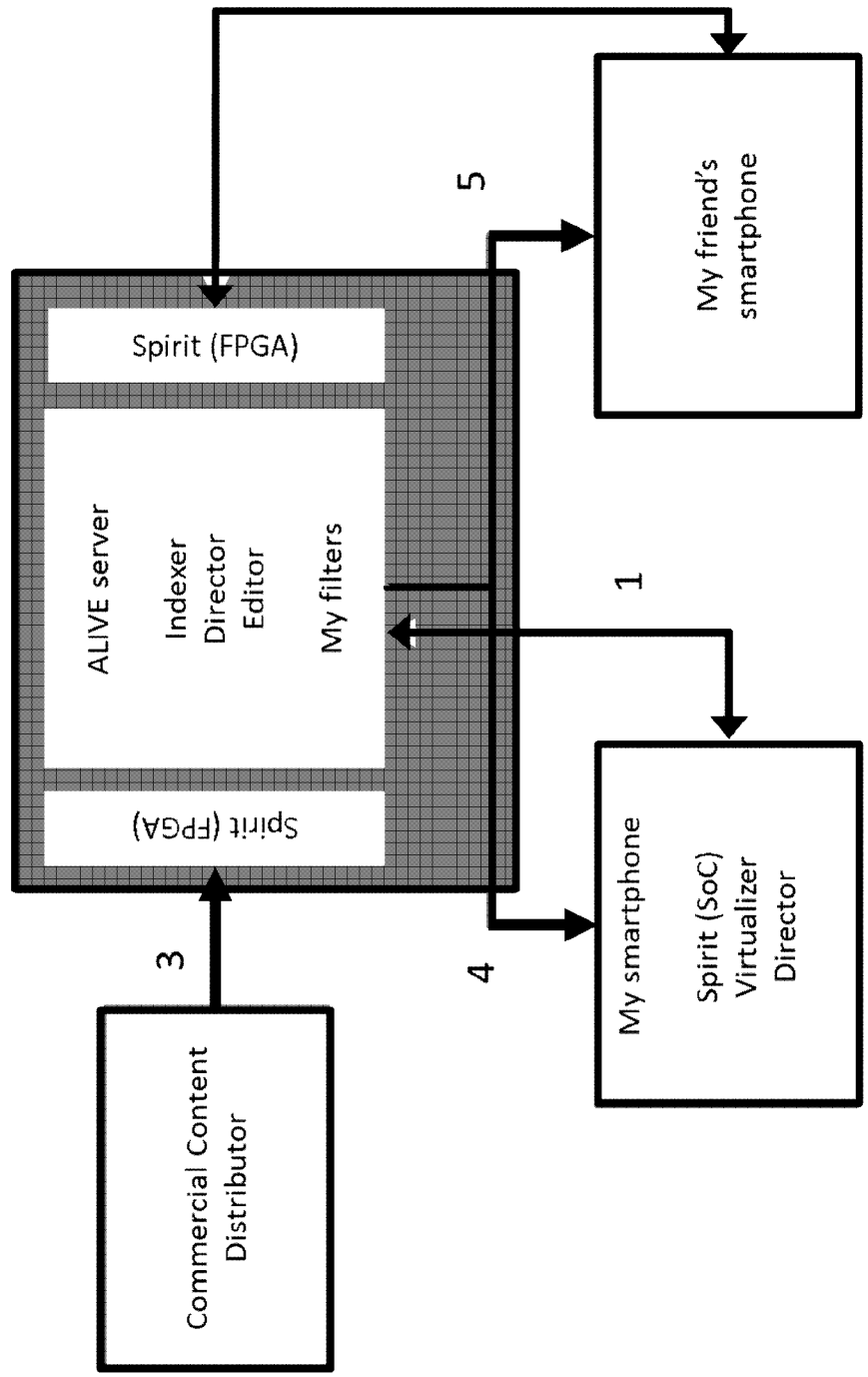
FIG. 8 shows a diagram of the ALIVE platform.

ALIVE is a platform and a service for delivering new user experiences around video. An example of an ALIVE platform is shown in FIG. 8. It consists of one or more of the following:
- Spirit engine in a SoC inside a smartphone or another device such as for example a tablet or a computer.
- Spirit engine in a FPGA inside a server, which may be linked to a Commercial Content Distributer or to a smartphone or another device.
- ALIVE software App on a smartphone or another device such as for example a tablet or a computer.
- ALIVE software in a server.

ALIVE enables device-centric and service-centric business models:
- for a device-centric model, the advantage is in delivering better videos at lower bandwidth,
- for a service-centric model, the advantage is enabling greater usefulness of video, via searchability, and possibly a new kind of way of sharing video.

Examples of key features are, alone or in combination:
- Real-time indexing of video at capture time.
- Capture best shots automatically.
- Focus tracking.
- Optimised encoding.

Figure 9:
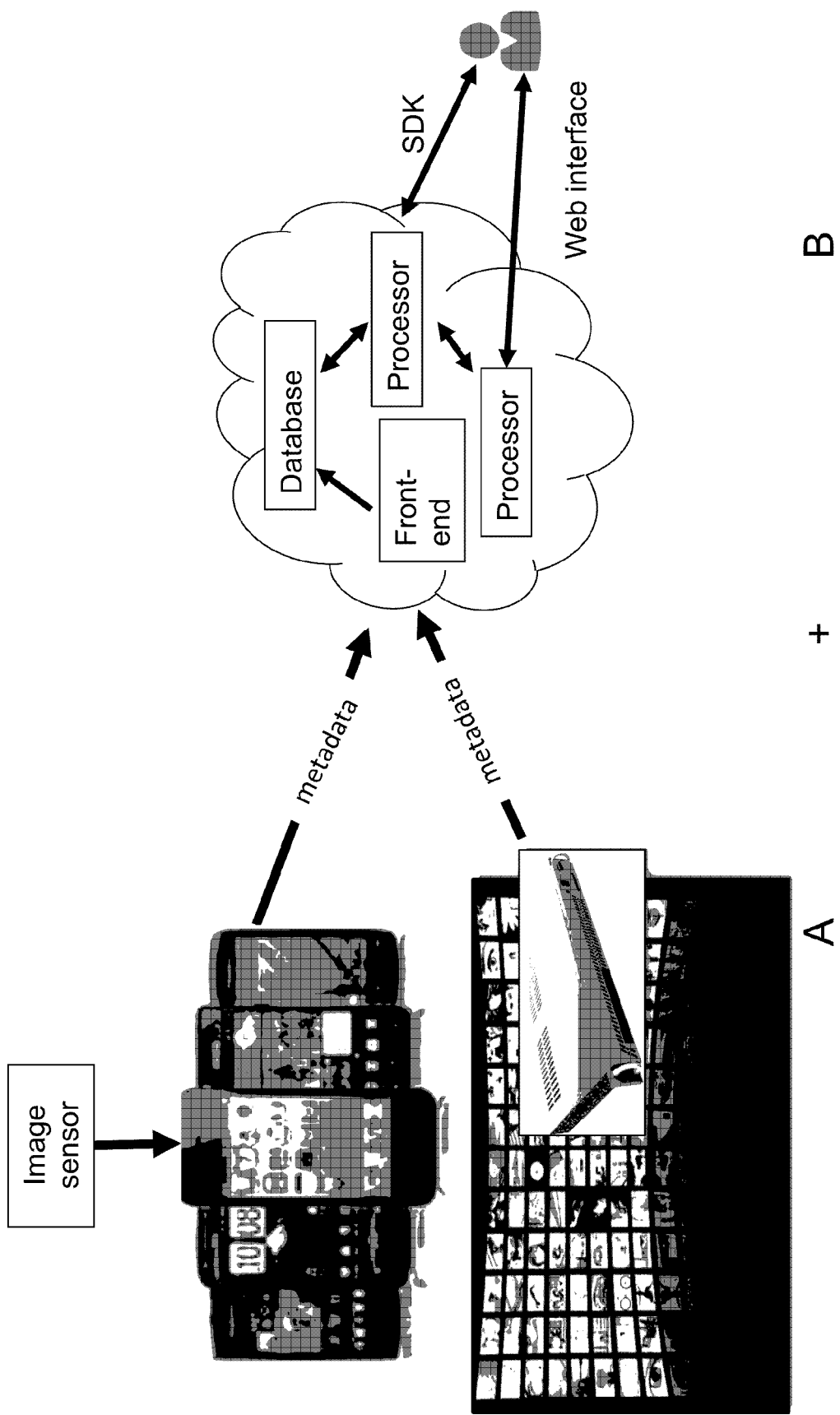
FIG. 9 illustrates the different elements of ALIVE.

FIG. 9 illustrates the different elements of ALIVE, combining a state of the art hardware based object classification and tracking (A) to turn still images and video into metadata, and a micro-cloud (B) consisting of a server based SDK performing behavioural analysis.

2.2 Technique of 'Ghosting'

Figure 10:
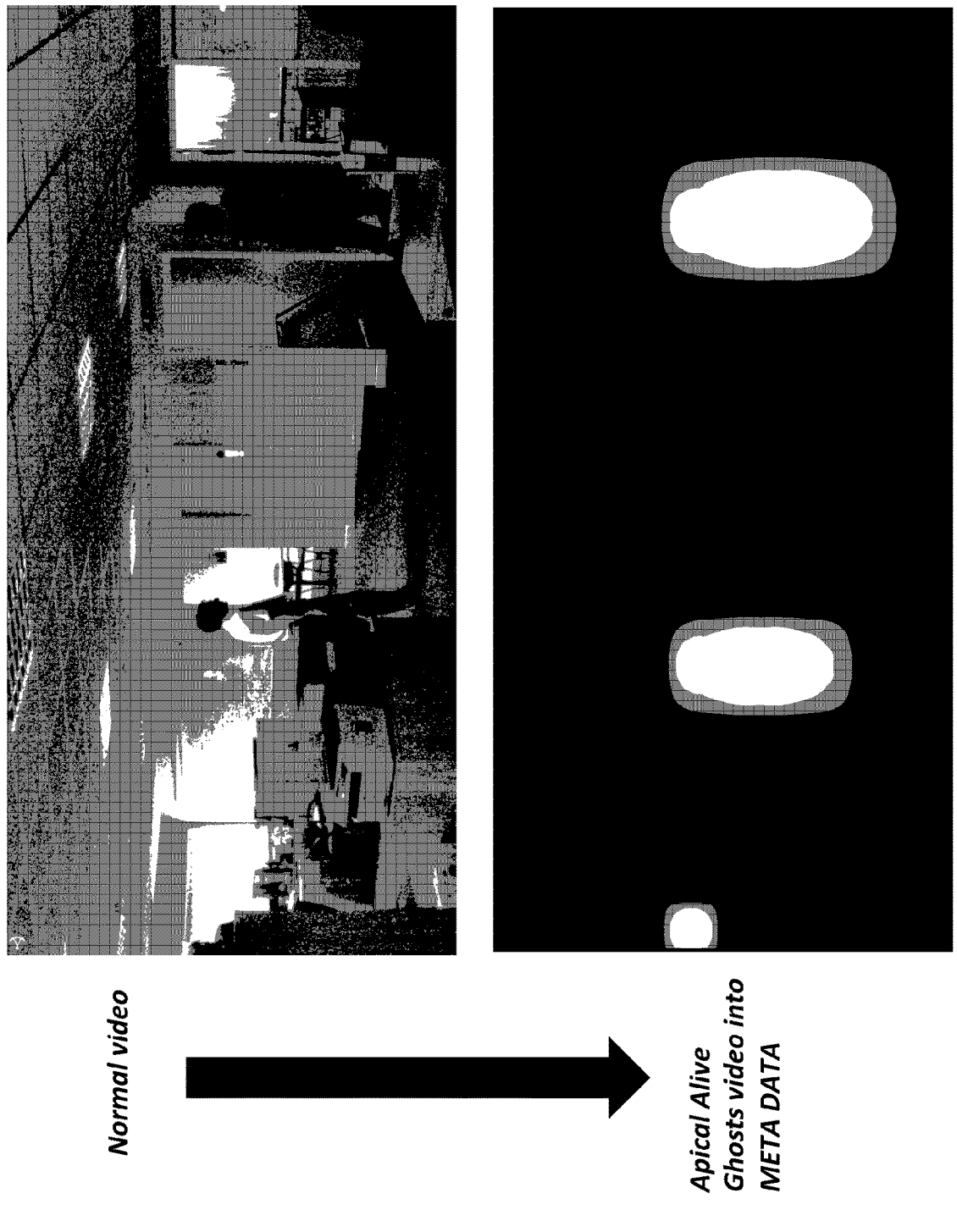
FIG. 10 shows an example of 'Ghosting'.

FIG. 10 shows an example of 'Ghosting', a unique technique that is employed. The system does not need to capture or create photos or videos as it 'Ghosts' the video feed automatically into metadata, enabling a much lighter weight cloud. Metadata retains only the positions and movements of the people in the video clip including their gestures, postures and facing position and can also include further information such as facial recognition and identifiers for example.

The fact that the technique relies on metadata has many privacy implications. For example, the identity of individuals can be determined based on a digital fingerprint (for "face recognition") as set by a user. No video or still images are required, as the Spirit sensor does not capture or create videos but instead just creates metadata from the scene.

As it is also based on Spirit technology, the ALIVE engine performs massive data compression, as more content remains on the device; it strips away the need for massive video file transactions and reduces the cost of video download, video search and online editing.

ALIVE may extract a wide range of metadata for scene interpretation. Examples are shown in FIGS. 11 and 12.

Figure 11:
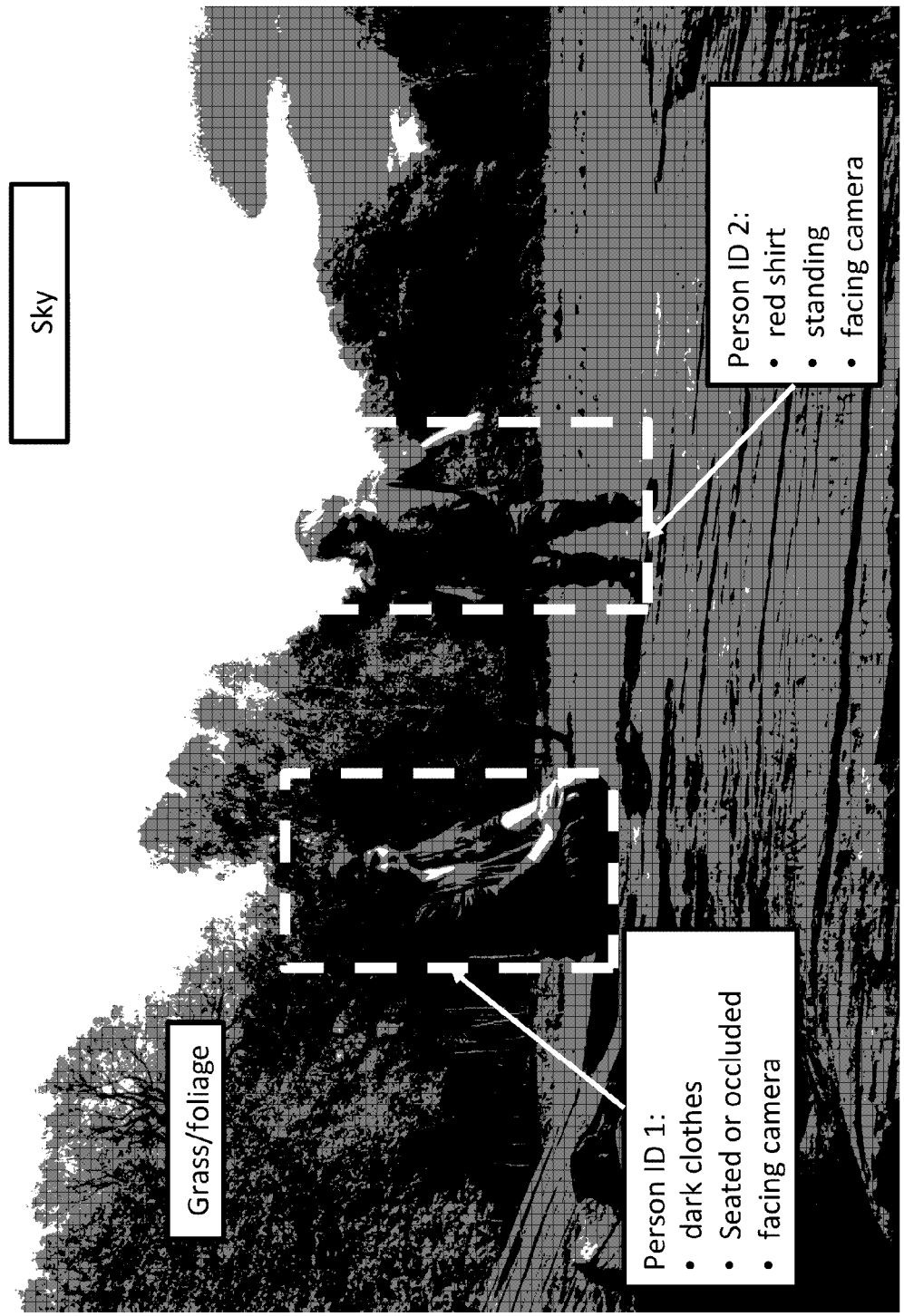
FIG. 11 shows a screen capture of a video where various parameters within the video frames are extracted in real time.

FIG. 11 shows a screen capture of a video where parameters are extracted in real time frame by frame at up to 4 k 60 fps. In this scene, a wide range of information may be extracted, such as a person ID, the person position and characteristics such as clothing information. Information on the scene such as the presence of grass, foliage and sky may also be extracted in real time and may be displayed as annotations directly on the image.

Figure 12:
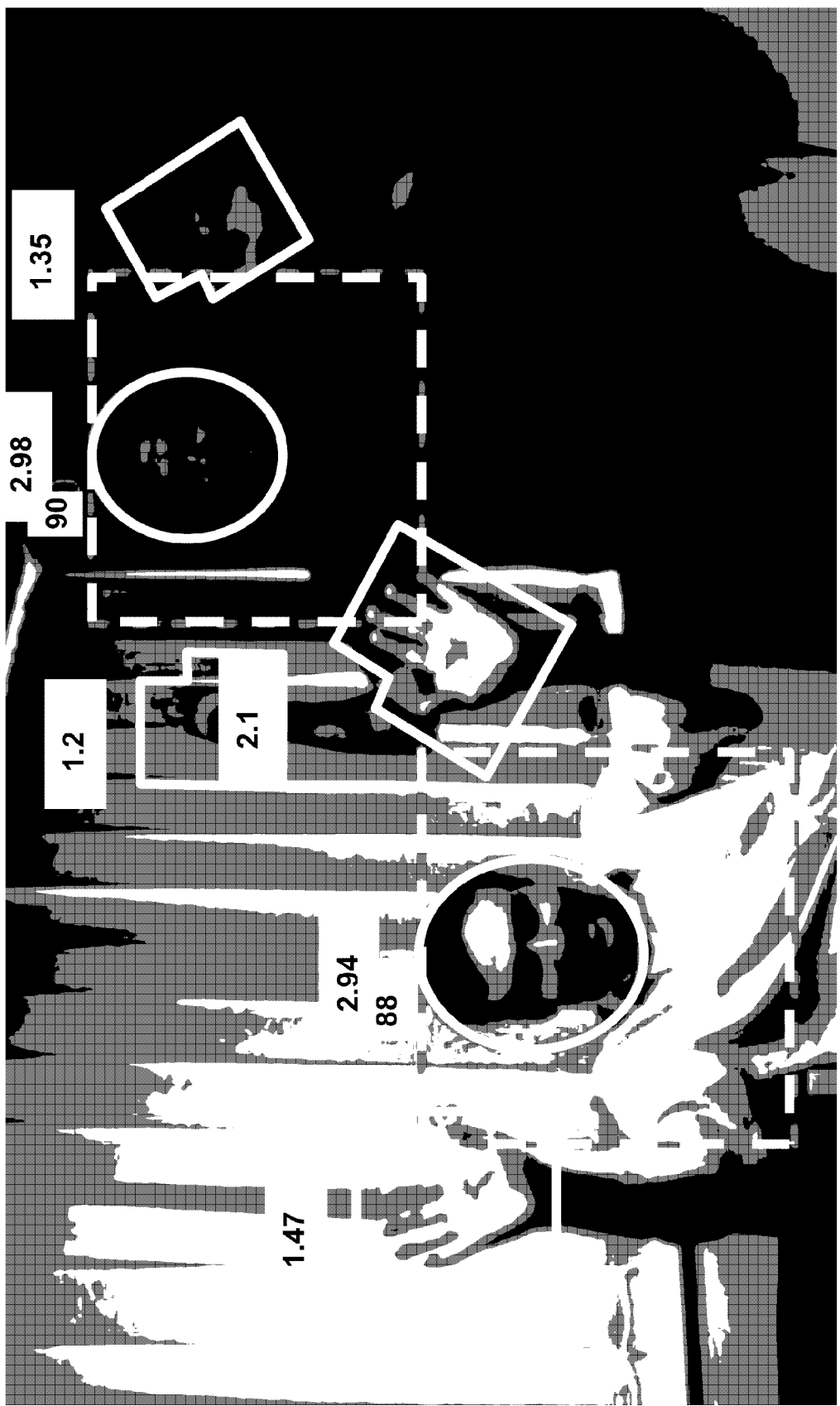
FIG. 12 shows a screen capture of a video where gestures are detected in an unconstrained environment.

FIG. 12 shows another screen capture of a video in an unconstrained environment where parameters are also extracted in real time frame by frame. Any number of people can be tracked accurately along with their poses and trajectories. The engine may be able to extract people's best thumbnails to be used for face recognition. Gestures are also detected and tracked in real-time.

2.3 ALIVE Eco-Systems

Alive eco-systems may fall into the following categories:
Phone apps/personal apps: embedded video index search function for personal real-time video content indexing, search and edit functions.
Hardware acceleration: available as licensed System-On-Chip solution for phones or as a data centre appliance for in-line acceleration of video indexing.
Cloud Video apps: commercial Apps: servers operating with a new type of video file distribution system that continuously anticipates video index search requests.
ALIVE may provide the following functions:
Director: Automatically frames videos based on tracking specific people; captures "best shot" still images.
Editor: Edits videos based on specific people, removing unwanted parts and splicing together videos from different sources to create a montage based on analysing peoples' poses.
Indexer: Adds metadata to video files describing who is present and when.
My filters: when viewing shared videos, only videos or part of videos that have people of interest are displayed.
Encoding: Spirit can produce reduced storage/bandwidth by enabling ROI encoding at source or at transcoding stages.

Example Use Cases

1. I shoot a video on a Spirit-enabled phone. During capture, (i) my video is automatically framed in a chosen "Director" style, (ii) a set of best stills are captured from the video, (iii) metadata enabling indexing is attached. All is uploaded to the ALIVE server.
2. My friend shoots a video on a non-Spirit phone. (i)-(ii) are done by a Spirit FPGA on upload to the ALIVE server.
3. Some third-party content (e.g. football match) is streamed through a Spirit FPGA to create indexing metadata.
4. Indexer allows me to search my video database for people I care about, and go straight to where they appear.

Director may post-process my videos to improve their appearance. Editor looks for similar videos from my friends (based on location and time) and locates people of interest within them. It then cuts several videos together automatically by looking for particular poses of individuals (for example, looking at the camera) to create a single montage which is then shared amongst the friends. When I access the video database 'My Filters' only shows me videos with people I want to see. Friends can access the same content, but with their own filters.

A novel hybrid micro cloud app is built that sits amongst Smartphones and the Internet. ALIVE eliminates the need to parse through a vast amount of videos to find someone or something in the past, thanks to a real time indexing of video while it is being captured. The solution is available on consumer's devices with embedded software combined with the micro cloud app. ALIVE also brings many social aspects where images blend with Internet of People.

The cloud app enables the following features, alone or in combination:
Video content is owned, captured, tagged, and indexed frame by frame in real time.
Video may be indexed by people, names, and activities.
Video content is published in real time.
Digital history of unwanted scenes may be erased (discreetly and in real time).
Control at atomic level with unique digital signatures within frames.
Search for videos across one or more devices (for example on a phone or a tablet).
Search video or clips with very specific people, posture and things (for example I want to be able to find videos of my family easily and jump straight to the best parts).
Search through a personalised filter, such as "my loved ones" for example.
Feasible real video mashing.
Film, Gaming & Animation innovators introduce customer into content applications frame by frame.
Mash up my living world with a virtual world where for example "I become McIlroy or Mickelson in Ryder Cup".
Search for videos of "friends".
Search for content archives.
Novel monetisation and advertising opportunities.
ALIVE reverses the costly cycle of Data Centre overbuilt to meet exponential demand for dumb video e.g. Facebook.
Along with search for personal content, it is also possible to search for online content. Content producers are able to capture and tag videos in real time production for their archives. ALIVE prepares for search by indexing video as they are recorded in real time and metadata is built as video is being produced.

As an example video may be analysed in real-time from the source video stream and metadata may be created through a computer. Metadata may also be built directly from video archives.

3. Art

The conventional concept of the smart home, on which the current product strategies of all notable players are based, has a large hole in the centre: the person.

The smart home debate centres on the competing standards for machine-to-machine communication, and on searching for purpose to connect devices to the network. Most of the debate neglects the need for the person to be part of the system.

There is a need to place the person at the centre of the system. Moreover, unless the system can respond to the person with very high accuracy and predictability, the industry's technology push risks customer rejection.

Conventional technologies, from simple motion detectors to advanced voice recognition systems, are totally unsuited to this problem. They are neither sufficiently accurate and predictable, nor do they provide anything even approaching the richness of data needed to interpret peoples' behaviour and intent in order to provide practical intelligent device responses.

What is needed centrally in the smart home is a system for extracting rich information about peoples' behaviour and intent and delivering this to connected devices in a consistent, contextualized and predictable manner.

3.1 Overview

Truly smart homes must place the person at the heart and in control of his home. The smart home system of the future must be functionally rich, accurate and able to interpret person's behaviour and intent. Privacy control must be ingrained and no imagery should ever be formed. With these goals in mind, ART was designed to meet such needs. It is a new vision for future smart home.

- ART is a revolutionary architecture for the smart home, based on Spirit technology.
- ART uses advanced sensors to create person's own digital avatar, to which devices in smart home network respond.
- ART unifies and enables diverse smart devices in providing seamless, accurate and predictable response to everyone's needs.

ART is a novel architecture for the smart home. ART provides not just a platform and protocol for describing the behaviour of people within the smart home, it provides a unifying scheme enabling diverse devices to provide a consistent, accurate and predictable experience to the user and a basis on which to represent the user to the digital world as the user moves around the home and interacts with different intelligent devices. ART may integrate home appliance sensors interoperating with either single or multi-vendors solutions.

Figure 13:
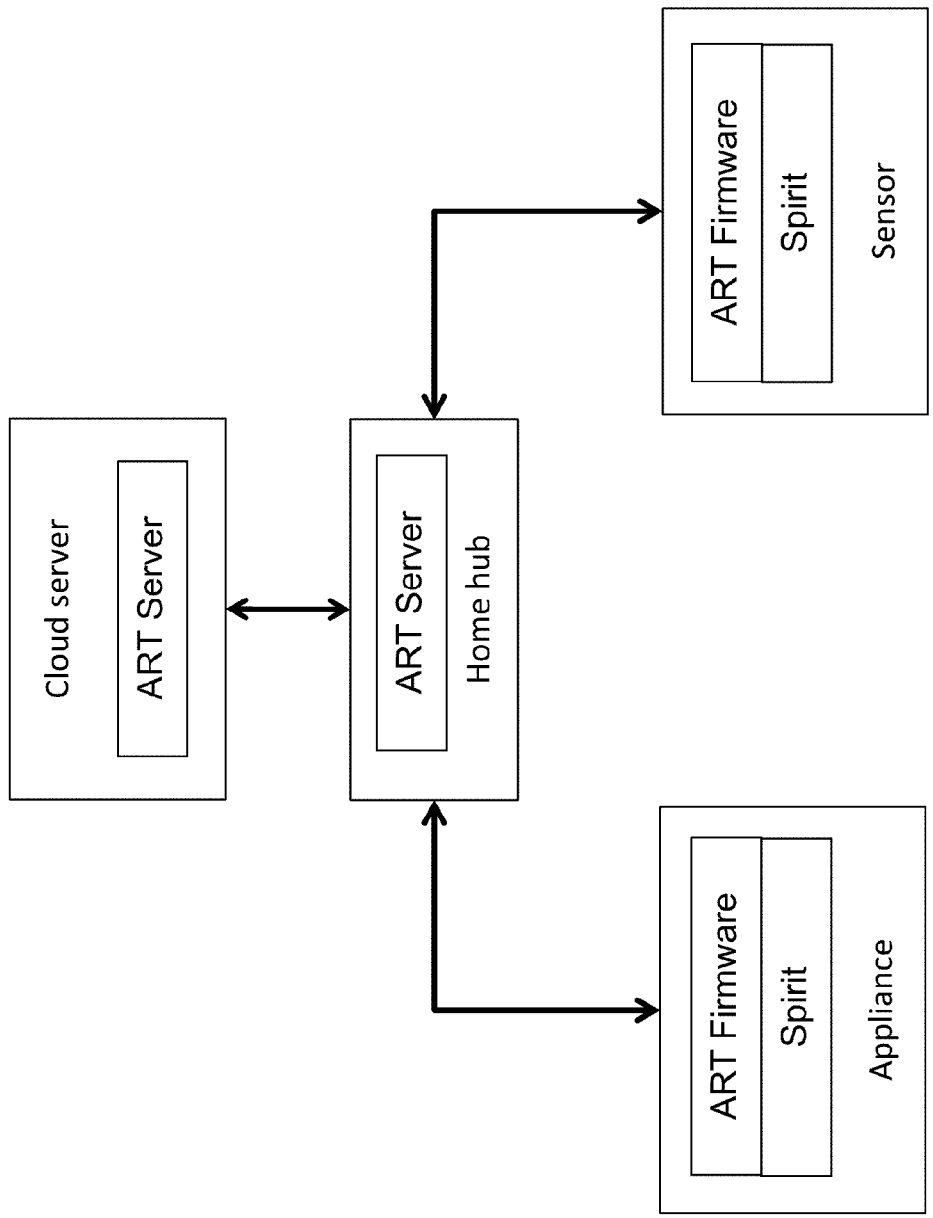
FIG. 13 shows the different components in ART.

FIG. 13 shows a diagram with an example of an ART platform. ART comprises the following components:

- ART Device firmware, which builds a digital representation of each person within the environment, comprising the 4 key descriptors: behaviour, pose, gesture and identity.
- ART Hub firmware, which contextualizes individual ART local representations to construct a global representation of each person as they move through an environment of multiple sensors in multiple locations.
- ART Server software, which implements deep learning technology enabling a particular ART installation to adapt to the particular environment and user activities.
- Spirit engine, a chip-level technology embedded inside a sensor or smart home appliance, generating the primary real-time data on which the people modelling is based.

These components together enable the entire smart home roadmap, from individual devices each of which is able to measure and respond to the user's intent, to the fully integrated smart home supported by a network of ART sensors continuously monitoring the patterns of your daily life within it and driving the response of your environment to your individual needs.

ART is a fully saleable architecture solution for integration in SmartHome & Cloud solutions. ART supports local home solution and cloud service delivery models with rich data analytics to enrich customer service delivery experiences.

Figure 14:
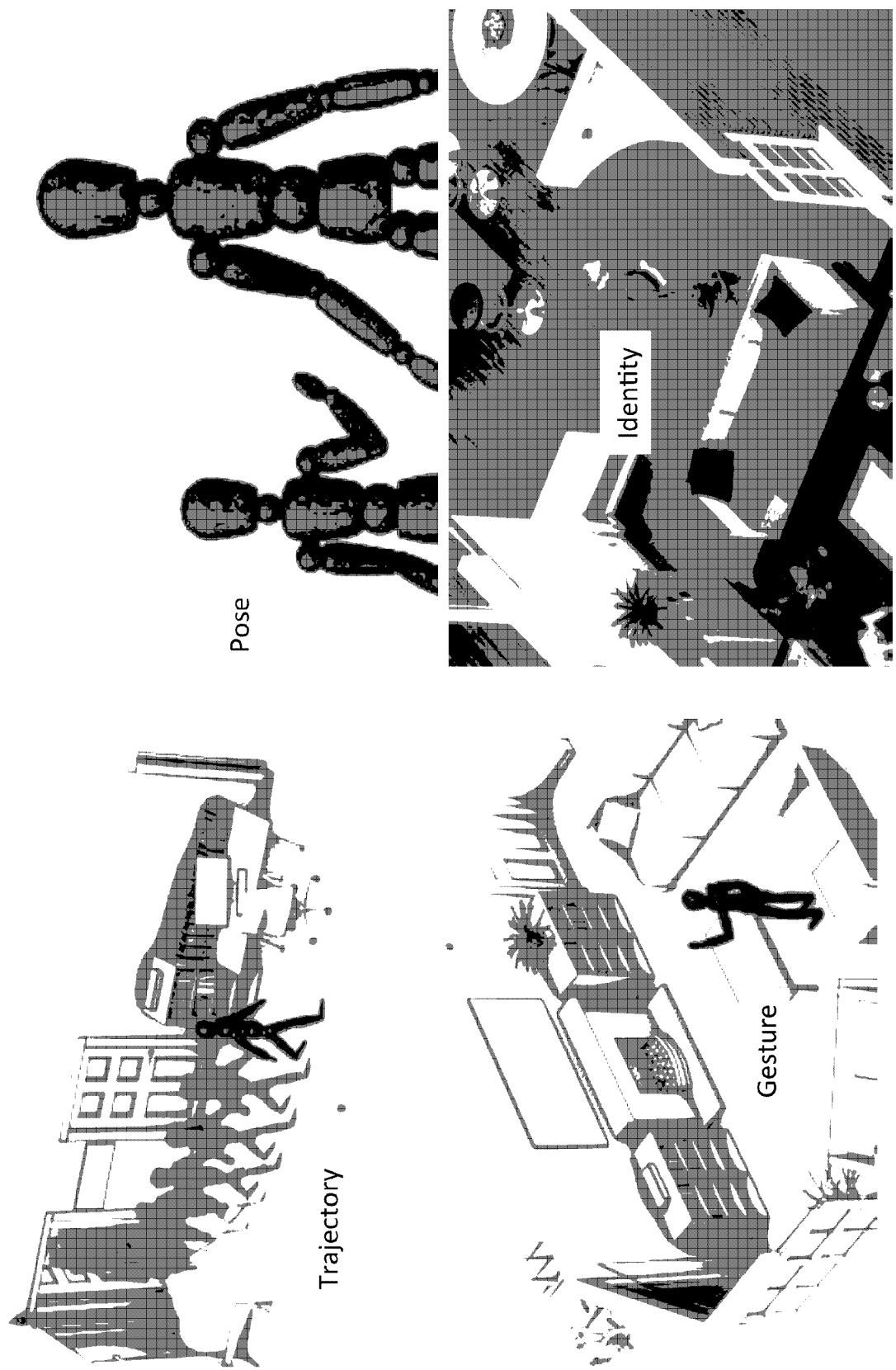
FIG. 14 illustrates examples of the different possible Virtualized Digital Representation (VDR,=BNA) of a person.

A Virtualized Digital Representation (VDR,=BNA) of a person comprises, as illustrated in FIG. 14:
- Trajectory
- Pose
- Gesture
- Identity.

A VDR is created on the hub by grouping and tracking the metadata output from the Spirit engines. For privacy reasons, the identity of individual can be determined based on a digital fingerprint (for "face recognition") set by the user. No video or still images are required, as the Spirit sensor does not capture or create videos but instead just creates Metadata from the scene.

Figure 15:
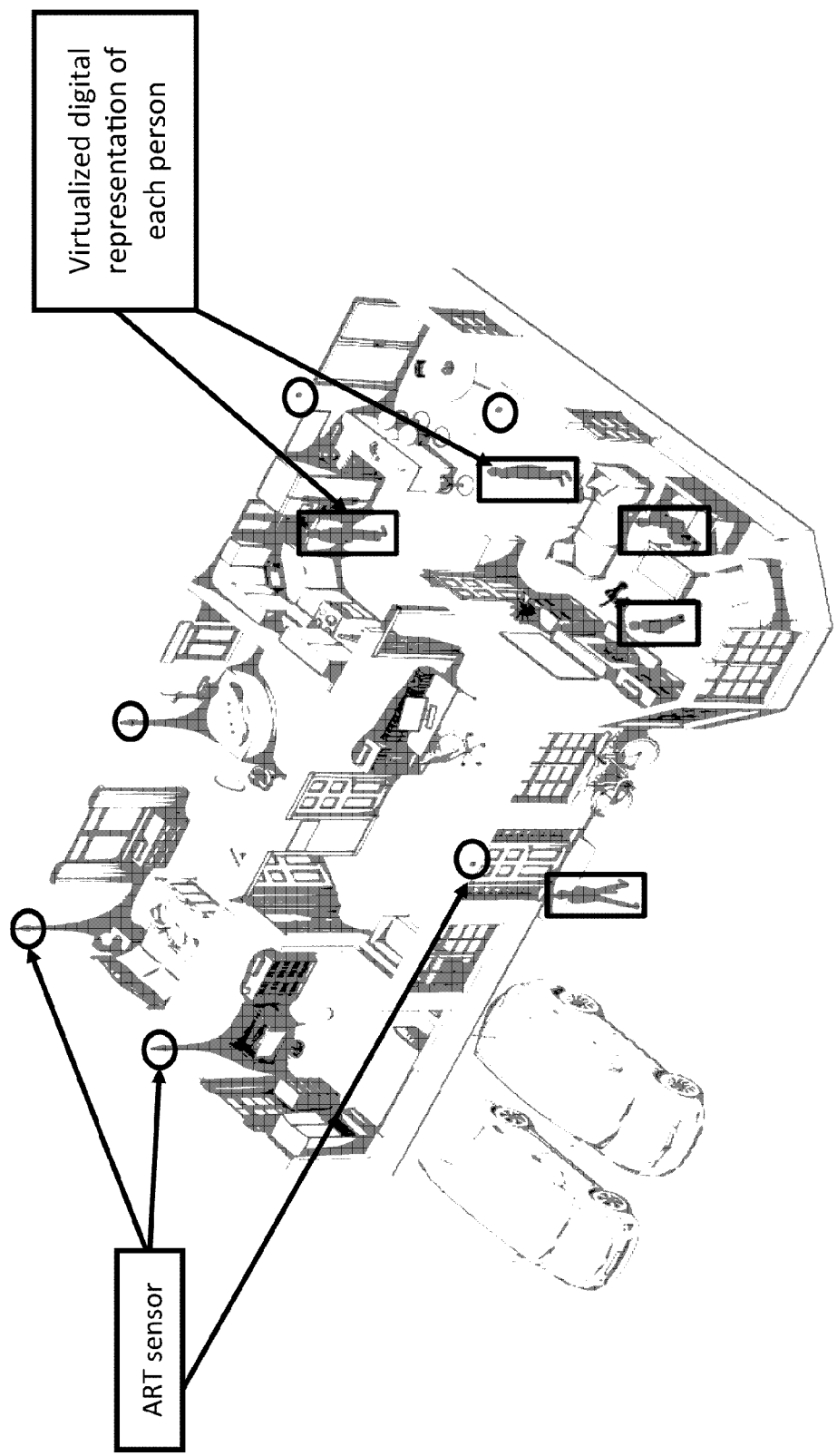
FIG. 15 shows an ART implementation inside a particular home environment.

FIG. 15 illustrates an example of an ART home environment, which comprises one or more ART spirit-enabled sensors. ART creates a digital representation of each person using one or more ART sensors. ART then uses this digital representation to analyse trajectory, pose, gesture and identity and provides a platform upon which smart home devices can respond to and predict the person's intent and needs.

Figure 16:
FIG. 16 shows a home Avatar.

FIG. 16 illustrates that using Spirit, it is also possible to enable a new system avatar for the user-centric smart home. ART can effectively create a visual DNA of the home individuals, and create a working avatar in the home to which devices and smart home network can respond to.

3.2 how does ART Work?

Using the virtualized data Spirit extracts from the raw sensor feed, ART builds a virtualized digital representation of each individual in the home. This representation comprises each individual's:

- Trajectory around the home, including for example the actions of standing and sitting.
- Pose, for example in which direction the person is facing, and (separately) in which direction they are looking.
- Gesture, for example motions made by the person's hands.
- Identity, namely the ability to differentiate between people and assign a unique identity (name) to each person.

Why these 4 descriptors? Because any relevant behaviour may be described in terms of these 4 descriptors. For example, Trajectory+Pose=Intent
  Smart home understanding: My smart device should wake up when I approach and look at it.
Gesture+Pose=Focus
  Smart home understanding: A smart light switch should respond to a hand gesture if I am also looking at it.
Identity+Gesture=Control
  Smart home understanding: I want to turn on/off smoke alarm, but I don't want my kids to do so.
Trajectory=Flow/Occupancy
  Smart home understanding: The home can learn at what time I come downstairs on which day of the week.
Trajectory+identity+(Pose)=Behaviour
  Smart home understanding Do my kids spend too much time sitting in front of (watching) the TV?
Abnormal Trajectory+time=Care
  Smart home understanding: Uncharacteristic behaviours.

Figure 17:
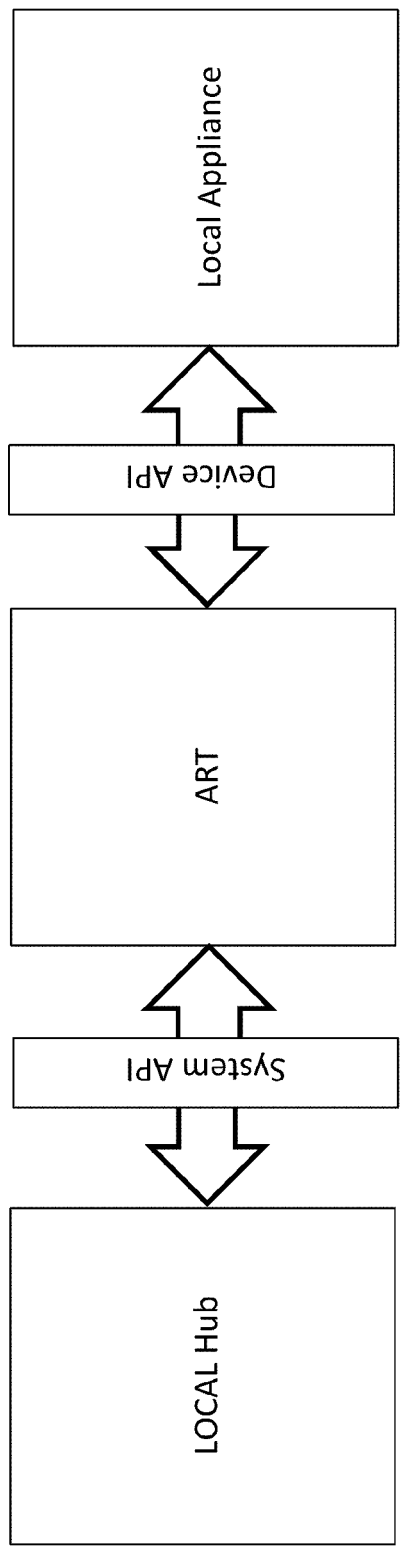
FIG. 17 shows a diagram illustrating the different element present between a local hub and a local appliance.

FIG. 17 illustrates ART's device API from which this representation is made available continuously to any connected device, such as a local appliance. These real-time APIs deliver a standardized description of the person, known as the ART Protocol, upon which different devices can react in a unified and consistent manner.

Predictable accuracy has been stressed repeatedly: without it, a stable and responsive smart home will never be possible and the problems experienced with introduction of technologies, such as voice recognition and gesture detection, in related markets will be magnified to the extent they become showstoppers. ART's construction builds in predictable accuracy at every stage, from the raw data analysis upwards, enabling ArtofUs to validate the performance of a specific appliance individually and as a component of the connected system.

Figure 18:
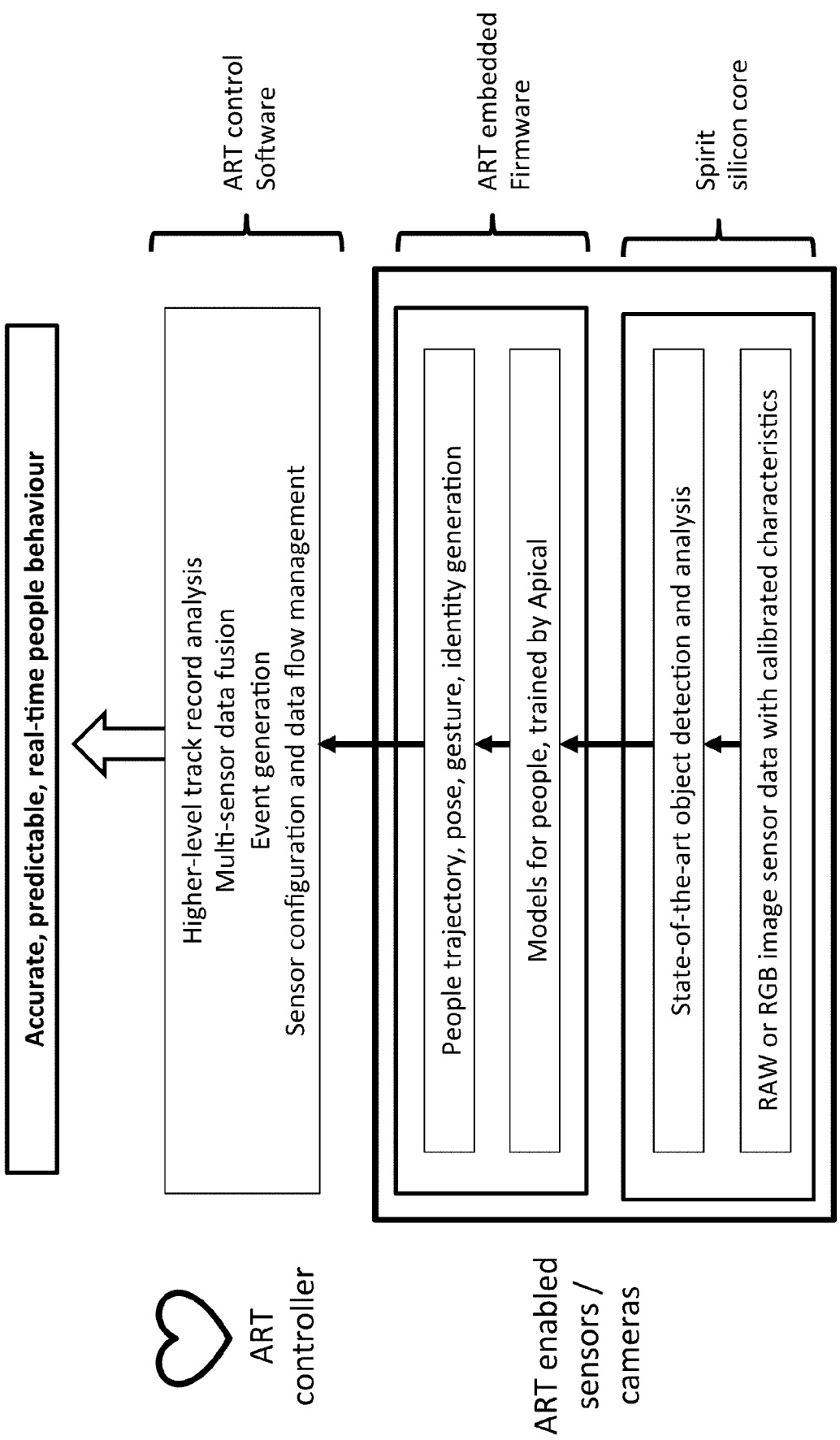
FIG. 18 shows a diagram representing the systematic approach to accuracy and predictability that is deployed in ART in order to process in real time people behaviour.

FIG. 18 shows a diagram representing the systematic approach to accuracy and predictability that is deployed in order to process people behaviour in real time. The ART sensors or cameras incorporate both the Spirit silicon core and the ART embedded firmware, and in essence turns the raw data from the image sensor into individual's descriptor such as trajectory, pose, gesture and identity. At the higher level, the ART control software is embedded into the ART controller, wherein individual's descriptors are being managed further. In summary, all of the sensor metadata are fed onto an ART controller, wherein the ART controller becomes the home's "ART Heart". The ART firmware uses a proprietary protocol to create ART events. ART events are then created with the local network, and the ART firmware is able to locate a number of device options.

ART may use conventional low-cost image sensors as found in smartphones and home monitoring cameras. ART devices may also guarantee that no end-user viewable images or video are extracted from the system—because they are never generated.

ART events are created locally. One of the advantages of the ART control function is that it can be invisible within existing home hubs, such as security panels, sensors, smart TV's, Wifi routers, HEM systems, gaming platforms or light bulbs etc.

Figure 19:
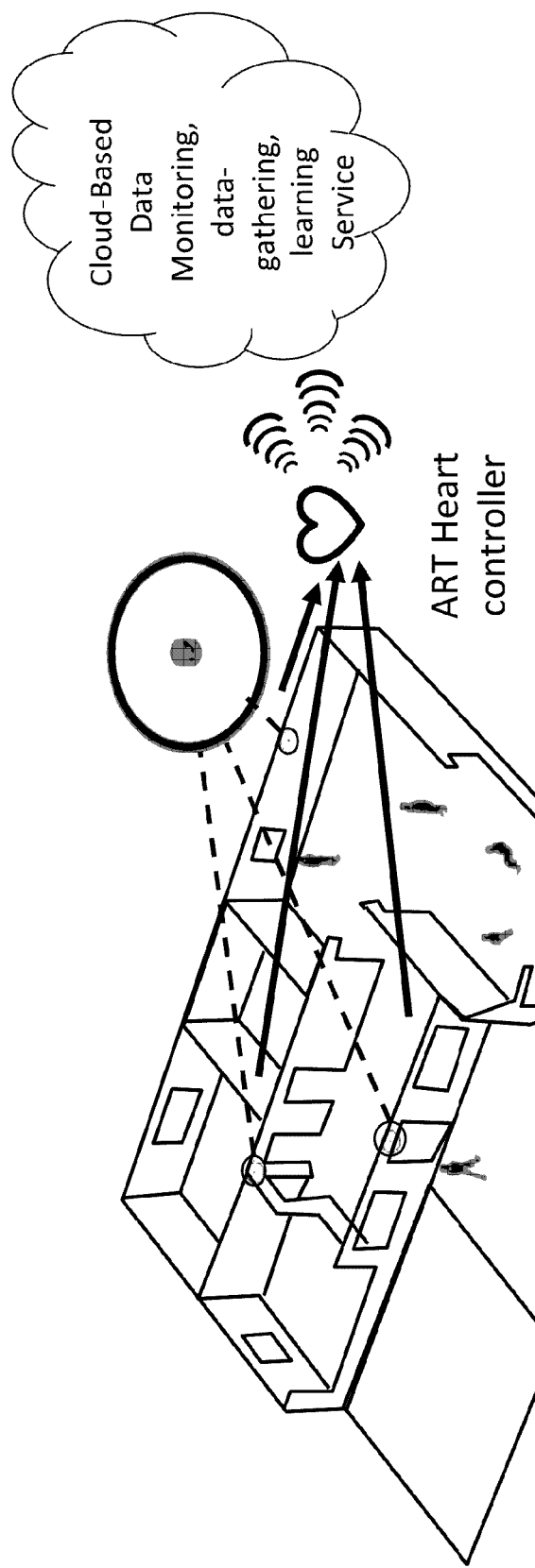
FIG. 19 illustrates the place of the heart ART in the home.

The ART Heart controller pushes ART events to the home's smart devices network as specific commands. The ART event streams can further be sent to cloud analytics apps, such as cloud-based data monitoring, data gathering or learning service. This is illustrated in FIG. 19.

Raw sensor data may be processed and continually streamed to the ArtofUs Hub Software. The ART Hub software processes the data locally and pushes out a heartbeat to the cloud. The Heartbeat may contain several services, such as "presence", "recognition". "movement". "gesture" and "mood". The HeartBeat can be sent in real time to a specific device or device controller. The ART heartbeat may be pushed to the local smart device network as specific commands. ART is then able to control or validate the performance of specific devices or appliances on the home network. This enables a person centric control of smart devices.

3.3 Why ART?

ART enables the injection of the following enhanced intelligence:

ART always knows who you are.
ART powers up when you arrive and down as you leave.
ART intuitively learns adjust to all the things you like.
ART solves all the false positive alerts you send me.

A smart device must understand if a person is paying attention to it, if that person is authorized to interact with it, if a gesture corresponds to that person, and whether it is responding in a way, which pleases or irritates that person. The set of connected devices comprising the smart home must be able to monitor, contextualize and predict the behaviour of people as they move throughout the home. And they must do so with a guarantee of privacy, meaning no imagery is generated and the user is in control of the data that is collected.

The ART sensor may also be programmed to recognise a specific person's gesture but not someone else's. ART continuously analyses each person in the room and interprets their behaviours as events. ART understands a wide range of behaviours, from counting the number of people in the room and determining where they are moving from/to to specific gestures by identified individuals. The sensor can also track the way the person is responding to the sensor, such as if the person is comfortable or not comfortable for example.

However, ART is not just about facilitating the connected home. It offers a new vision of the smart home. This is not about clever devices looking for problems to solve. This is about providing you, the person at the centre of it all, with a faithful companion who can learn about you, respond to your needs, and enrich your daily living experience.

Spirit's use of raw data directly from an image sensor sets it apart from conventional techniques, which rely on post-processing of video. This has a number of benefits. First, use of the raw data enables the highest degree of accuracy and predictability. Second, system cost and power is dramatically reduced, as there is no need to generate, compress and process actual video. Third, because no video is created, there is no possibility for a third party to extract images from a person's private environment.

3.4 Privacy

Just as vision is our primary sense, video contains the richest data currently available for analysing peoples' behaviour. However, the level or granularity of data contained in video is obviously not adjustable: it carries too much information.

For example, you may be comfortable installing a video camera above your front door, but you are probably not so installing one in your bedroom or bathroom. General privacy concerns about who has access to your most intimate data apply strongly here, and recent events such as the hacking of baby cameras highlight the problem. Users are aware that software controls and encryption are inherently vulnerable, especially if they require manual setup and maintenance: many people have no security on their home wifi routers not because they are unaware of security, but because setup is not always reliable. ART does one important thing in this space: it enables the creation of smart sensors using visual information, but crucially which never form imagery or video at a hardware level. It is demonstrably impossible for any third party to access imagery from such a device. Of course, there remains an important debate about how the rich behavioural information extracted by ART impacts on privacy. This is a topic of comparable complexity to web privacy.

However, because ART provides a highly structured, hierarchical description of behaviour it provides an excellent platform on which to build systems where the user is fully in control of their data. First, because all data can be managed locally within the home network. Second, because the granularity of the data can be easily selected appropriately depending on the application, from the most simple "there is a human in the home" to the more rich "Michael is in the living room and interacting with the lighting system".

Since ART also uses the technology that is used in Spirit, it can also employ the technique of 'Ghosting' (as shown in FIG. 10). Hence ART enables the homeowner to be in complete control of functionality and privacy. No imagery is created with Spirit at a hardware level. Spirit, if enabled by the homeowner, takes a selection of facial feature measurements. ART ID is then undertaken by comparing data to a set of facial measurements held locally.

Despite the fact that ART is able to recognize individuals, ART is also able to guarantee privacy because at least of the following:

ART ecosystems do not create any imagery of any kind; no video is used within the ART system.

ART generates rich data on individuals, and if enabled by the user, their identities. However, the critical point is that, unlike a video camera, the user is able to control how much data is captured. For example, whether individual identities are captured, granularity of detection ("there is someone in the room", "someone is walking towards the kitchen", "Michael is walking towards the kitchen")

A good analogy is the iPhone's fingerprint sensor. You don't need to use Touch ID to unlock your iPhone, and, if you do, it doesn't store/transmit your fingerprint into the cloud.

In effect ART offers the homeowner a control solution that has "self encrypted privacy".

3.5 ART Sensor Locations

There are a large number of possible locations inside a home or office environment to place the smart ART sensors. It is important that the sensors are placed in the most convenient possible place, such that the sensors are easy to install and that they provide the best possible accuracy.

Examples of locations where sensors can be incorporated are for example on or in relation to a light bulb or a light switch.

Light switch may present a very convenient location where a Spirit sensor can be incorporated due mainly to the following reasons:
power is already available,
location is ideal for performance and accuracy.

FIG. 20 shows a diagram of a light switch incorporating the following elements:
a lens and sensor assembly (1),
a chip (2) capable of detecting objects from the sensor data, wherein the chip outputs a data stream describing people, their locations, trajectories, identities and poses,
a means of delivering the data (3), such as a wireless transmitter, which may be integrated into the chip,
one or more IR LEDs (4),
a lighting control (5),
and an indicator LED (6) showing a different colour when the detection chip is operational and not operational (privacy indicator).

In addition, the light switch could also incorporate a physical shutter in order to cover either a portion or the entire ART sensor. This could be implemented for privacy reasons as an additional security that the video is not being recorded or analysed.

In particular, a home automation system incorporates the following:
one or more light switches as above connected to a local network,
a software application resident on another device connected to the local network, capable of parsing the data from one or more sensors and generating information about the people in the environment,
a software application resident on the cloud accomplishing same,
where the information consists of a time series of events based on the data, such as "a person entered the room".

The sensor may be an image sensor, such as a conventional Bayer CMOS image sensor. The lens may preferably be wide angle (up to 180 degrees). The lighting control may be for example a physical switch, rheostat, capacitive sensor etc. The IR LEDs provide scene illumination in darkness.

3.6 Configuration

The ART platform places the homeowner at the centre and in control of his smart home. An ART home setup may consist of a network of sensors throughout the home with a combination of simple sensors and ID sensors [people recognition sensors]. An ART hub would also be incorporated in a $3^{rd}$ party Hub that is able to communicate with the Cloud (as appropriate) and other smart devices.

Set up procedure: setting up the ART system may consist of three steps using the ART app—all undertaken on a computer, smart phone or smart tablet. The ART app is setup to guide the homeowner through a simple setup procedure, as follows:

a) Configuring the Homeowner Home

The homeowner will need to download the ART app onto for example a smartphone or tablet, they will be prompted to follow the procedure:
1) pair the sensor with the smartphone,
2) the ART app will direct the owner to walk to each corner of the room in question, and relevant doors, windows and other areas of interest,
3) once one room has been configured, the ART app will prompt the homeowner to move onto the next room to be configure,
4) adjacent configured rooms are linked (again through prompting from the ART app),
5) install the smart door bell and follow the ART app prompts on the entry and exit points.

The homeowner will then be prompted to provide his or her name and family names as well as house chums names. Next, the 'who lives here' button would need to be selected, with the option to take a full front image and to enter a name for the image. Select 'who lives here' button on the ART app, and take a full front picture and then name the image.

b) Connect and Configure SMART Devices with ART

The ART system is compatible with many of the smart home devices on the market today and ART can be used to control and manage the complete smart home, place the homeowner at the heart of the home and fully in control.

Within the ART app, select 'configure compatible devices'—the ART app will list the compatible devices.

The following steps may configure a device within the ART app:
1) select the device from the list,
2) select the nature of the ART control wanted for the device,
3) the ART app will confirm configuration has been successful.

Examples of devices that can be configured to the ART app include, but are not limited to:
Smart lighting systems (individual lights).
HEMS.
Alerts.
Kitchen appliances.
Danger zones.
Garage doors.
Smart door bells/entrance doors.
Baby/elderly alarms.
Security cameras.
Pet monitoring products.
AV/media.

c) Switch Your ART System from Configure to Live

Once devices have been configured, the last step is to select 'Go Live' on the ART app. The ART system will now be live.

3.7 Sensor Fusion

In order to provide an even richer set of information, it is also possible to use information provided by multiple sensors.

An ART sensor may be configured alone for room occupancy and light efficiency data for example. It may also be configured in conjunction with a temperature sensor in order to perform various functions such as room/home thermal rating, heating efficiency or manual guidance on room heating control. Additionally, it may also be integrated with smart TRV or with power room usage.

As another example, a wearable device could also be used and linked with video.

A trivial example is given:
person enters room, wearing smart watch;
face sensor, make gesture (e.g. wave);
Spirit correlates motion detected by smart watch with image data, and "pairs" person (i.e. the ID we give them).

The method developed is equivalent of "pairing" (as per WiFi and Bluetooth), but in the context of a scene coming from Spirit. This could be an important part of all systems trying to fuse visual data (and sensors based on Spirit) with other types.

Re-pairing may be done when a connection is dropped. Other classes of devices may also be used, for example, a car driving past could be ID'd between the image data and its own motion data.

ART may also be fused with voice control in order to enhance user experience of voice actuated control systems.

An example of enhancing a user experience with the existing Amazon Echo device is given:
Glowing light indicates Echo is 'awake':
  Only listens with person intent,
  Avoids the need to say "OK, Alexa".
Face recognition:
  Alexa able to address individuals,
  Automatic logging into person's amazon account,
  Tailored up-sell offers,
  Personalization—Echo can play your playlists.
Control:
  Echo ignoring childrens' requests.
Gesture:
  Control Echo volume or turn Echo on/off.

In essence, ART provides "focus" in the sense of mouse focus on a desktop, while voice recognition like Siri provides the equivalent text input. This solves the problem of differentiating voices and figuring out if a spoken word is directed at the device.

3.8 ART CCTV Security

Figure 21:
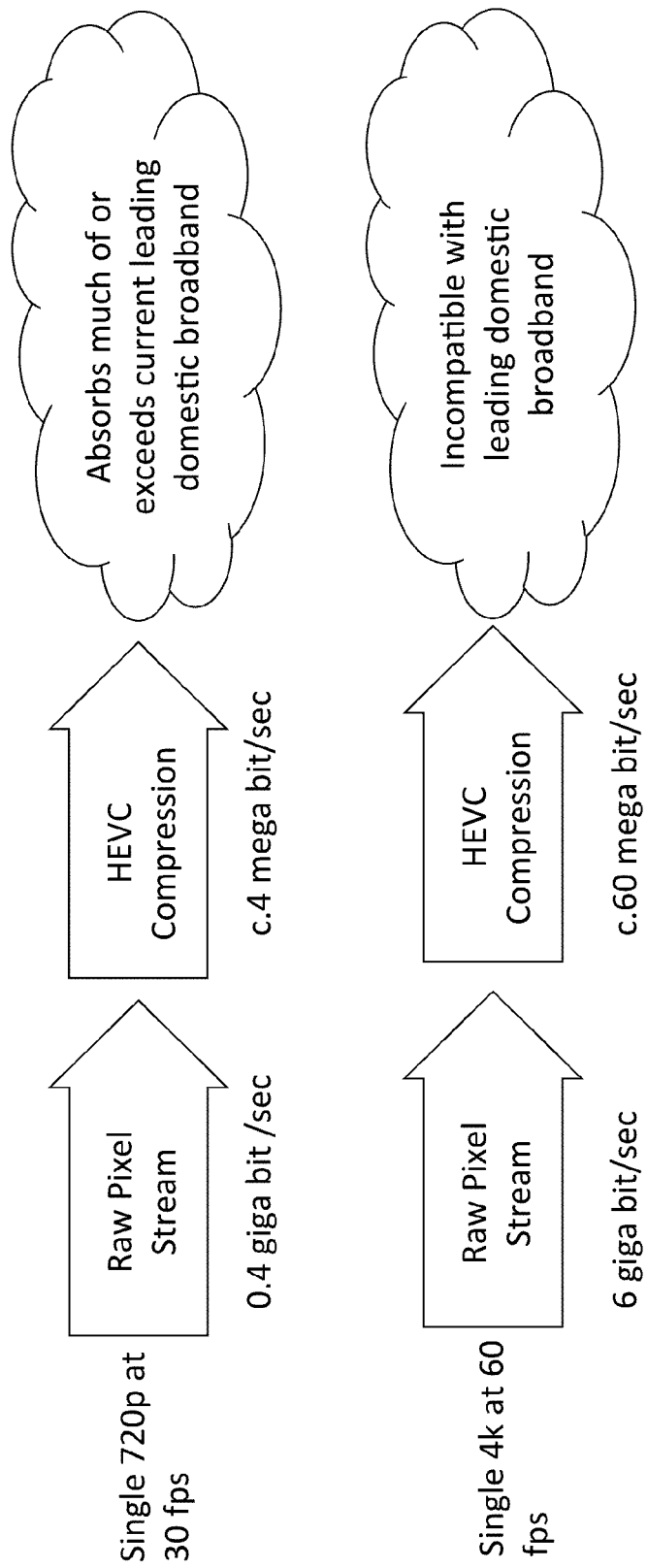
FIG. 21 illustrates the technical details of current IP cameras as applied to a scalable domestic CCTV proposition.
Figure 22:
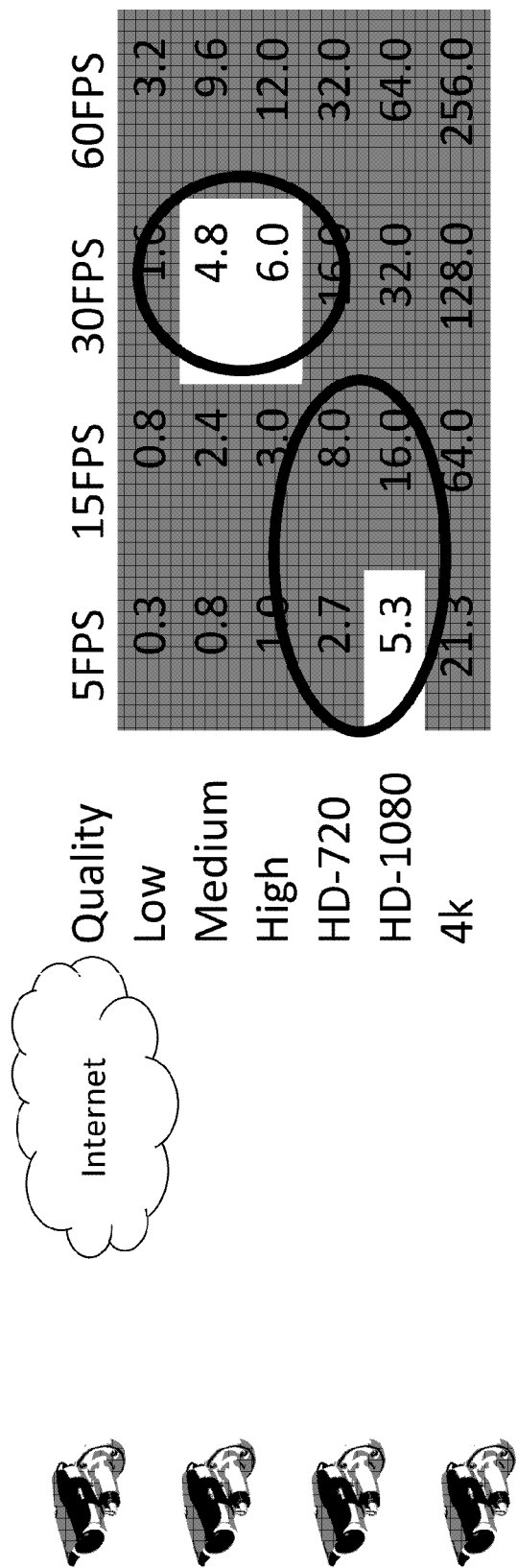
FIG. 22 shows the possible resolution and frame rates for a CCTV option.

Current available IP cameras are not compatible with a scalable domestic CCTV proposition as illustrated in FIG. 21. Current CCTV options therefore have to sacrifice with resolution and frame rates that are at suboptimal levels as illustrated in FIG. 22. This is in part due to the upload bandwidth restriction of standard CCTV systems.

ART proposes a unique solution to enable smart security CCTV cameras to have significant benefit. ART offers the following advantages enabling CCTV security to enter the Cloud product:

ART reduces bandwidth load requirements. Hence Cloud CCTV storage becomes a reality.
ART enables automatic crop and zoom.
ART enables ID and thumbnail capture.
ART enables car model and #plate capture.

An ART enabled CCTV system enables significant consumer functionality as listed in Table 1 leading to rapid product adoption.

TABLE 1

Functionality comparison between traditional and ART CCTV system

|  | Traditional Domestic DVR CCTV System | ART enabled CCTV, with cloud functionality |
|---|---|---|
| Camera Resolution | Disk size restricted | High definition |
| Bandwidth Requirement | Too restrictive | Ultra low requirement |
| Storage | Local | Cloud |
| Indexation | Motion | Event |
| Alert Functionality | Simple | Complex |
| Compatibility | Limited | High |
| ID | No ID | ID, #plate, unknown |

Figure 23:
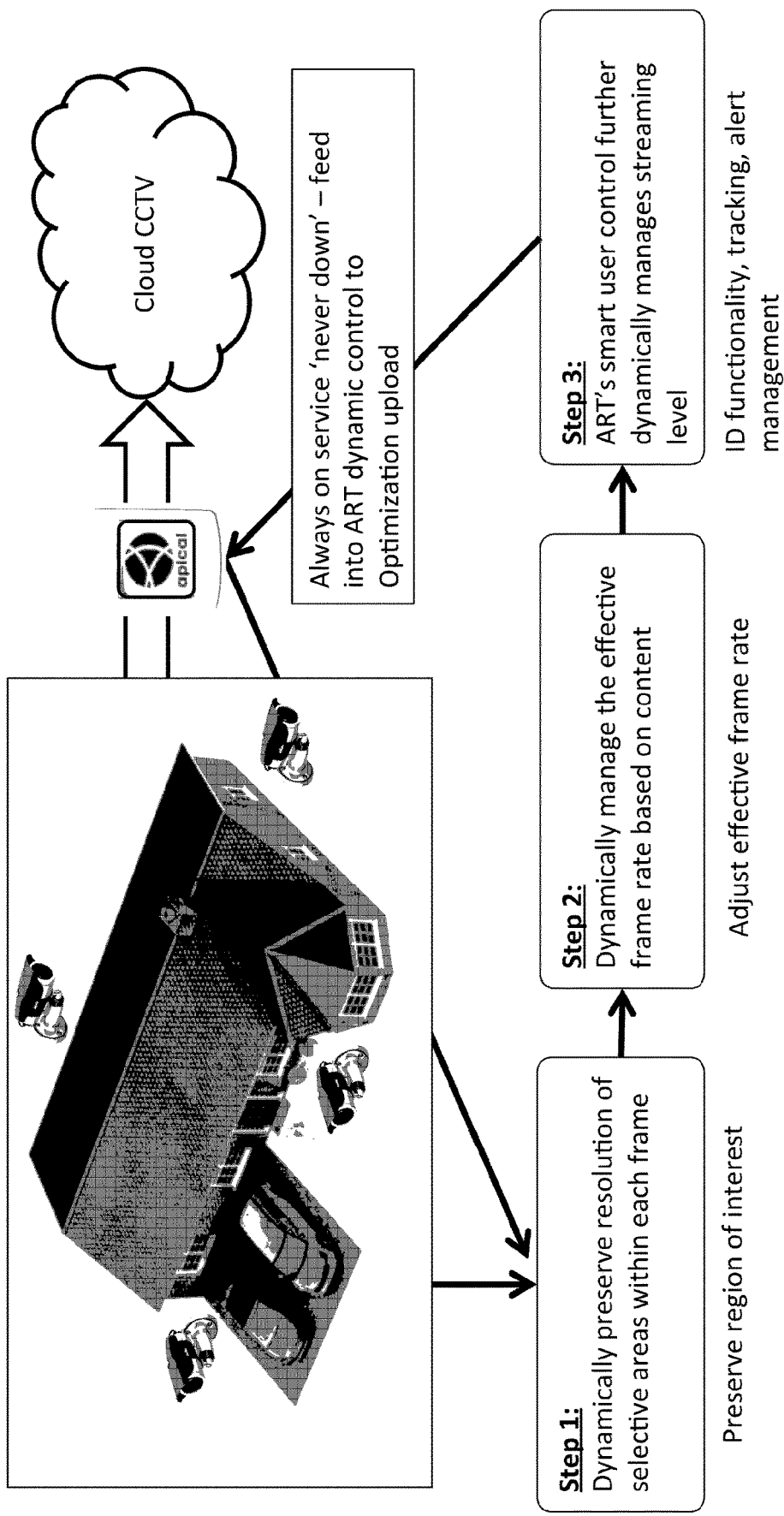
FIG. 23 shows the different steps that are followed by an ART security system.

FIG. 23 illustrates an example of the different steps in which an ART security system is enabled. First, ART CCTV solution dynamically preserves resolution of selective areas (or region of interest) within each frame. ART then dynamically adjusts the effective frame rate based on content and manages streaming level based on user control. The output stream is then fed into ART dynamic control for further optimization and can be analysed in the cloud.

The upload bandwidth restriction previously illustrated in FIG. 22 can therefore be removed entirely.

Along with ART CCTV solution, ART can also provide services for a wide range of products as fisted in Table 2.

TABLE 2

List of services and products that ART can provide.

| Product Offer | Product Details | ART intelligence | Revenue Options |
|---|---|---|---|
| Smart ART CCTV | ART embedded range of domestic smart external CCTV cameras. Cloud based storage of triggered footage Cloud based analytics of stored images Intelligence undertaken by ART Heart Control | Presence detection reducing bandwidth requirement Indexation of video capture; ID and #plate Advance alert functionality | Base package plus Tiered pricing structure: X cameras Period/volume storage opts ID/# plate capture Pet notification Advanced alerts |

TABLE 2-continued

List of services and products that ART can provide.

| Product Offer | Product Details | ART intelligence | Revenue Options |
| --- | --- | --- | --- |
| Smart ART Entrance | ART enabled smart door bell system ART enabled garage door control ART Heart Control | Active presence detection ID/#plate capture/indexation Alert functionality | Base package plus Tiered pricing: ID/#plate Alerts Unknown callers notification Connectivity with intelligent CCTV |
| Smart ART Energy | 6 smart ART occupancy sensors (no camera functionality) ART Heart Control | Advanced HEMS Entry platform for advanced Smart Home control | Share of potential property energy saving Tiered pricing: Device control; OTT (e.g. music) |
| Smart Care Platform | Smart ART sensors ART Heart Control Optional Smart internal Camera | Monitor the health and wellbeing the home occupants | Care package, covering Activity level/movement monitoring Trip alerts |

Within the home, applications can range from Security around the home, HEMS, to Care and Control. And ART security CCTV can further bring the advantage to eliminate false positives, to provide workable streaming speeds, and to advance functionality and finally to transform consumer experience. An ART enabled CCTV system enables significant consumer functionality, leading to rapid adoption.

A market leading proposition to place the consumer at the heart of their connected environment is now possible.
Intelligent Security:
  Real time data,
  Identification and notification,
  Rich functionality (ID and #plate capture).
Existing Service Enhancement:
  Smart HEMS,
  Care Family alert service,
  Video functionality—dynamic encode,
  3$^{rd}$ partnership models.
Third Party OTT Service for Companies to Benefit (with Service Provider Customer's Permission), the Event Data Stream from the ART Sensor Networks, for Example:
  Smart Thermostats (e.g. Nest),
  Music streaming (e.g. Sonos),
  Google,
  HUE,
  Xbox.

3.9 ART Smart Application

The number one customer issue with IP security cameras remains false alarms. As an example, false alarm messages from a single IP security UI camera proposition from a major US service provider resulted in the detection of more than 120 false alarms in a 3-hour period, equating to more than 1,000 false alarms in a 24 hour period.

ART smart application is developed to minimize the number of false alarms. ART smart sensors transform the consumer experience by placing the 'person' at the Heart of the home, and the smartphone app is simply a communication tool.

Figure 24:
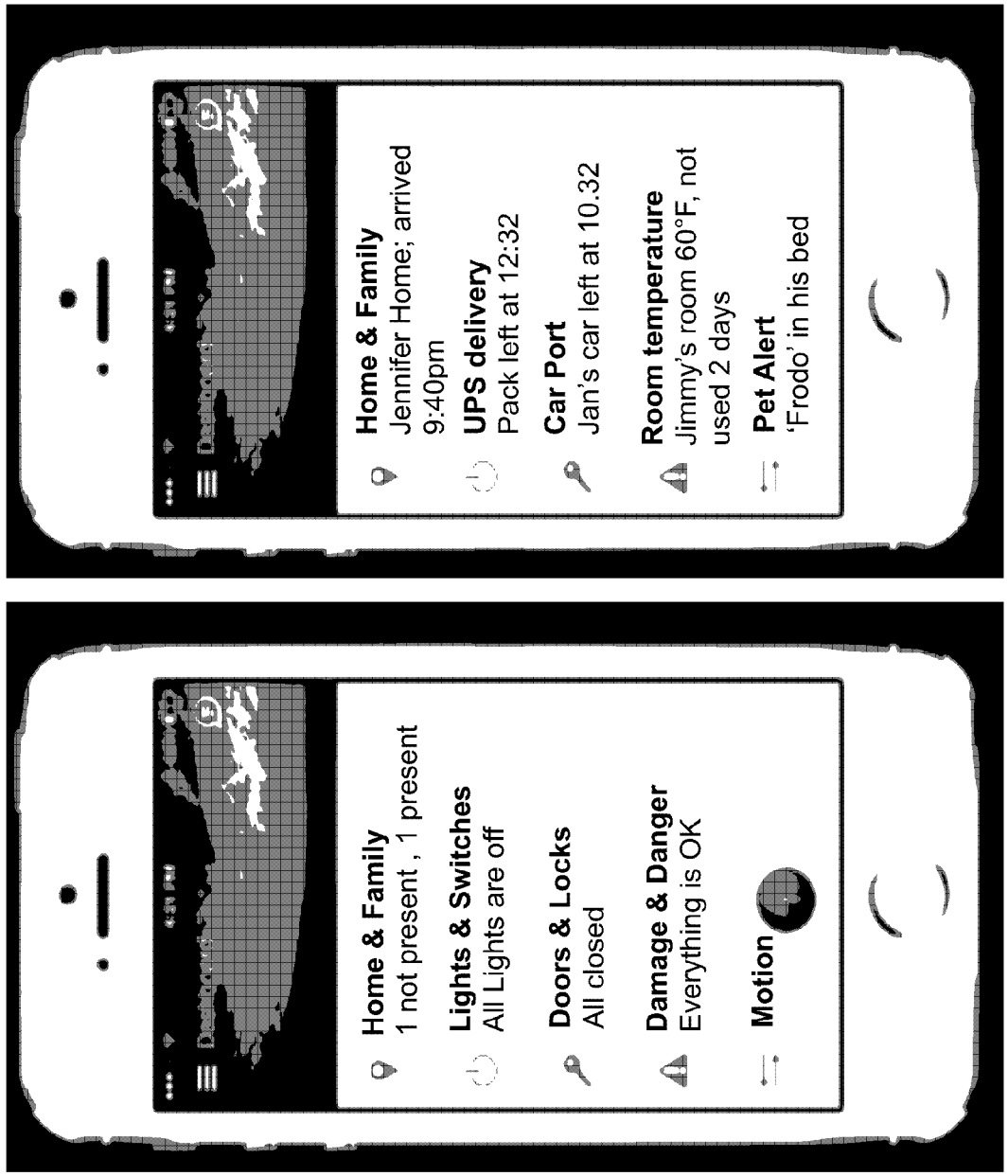
FIG. 24 shows an example of a screen shot of the smart ART application.

FIG. 24 shows an example of a screen shot of an ART smart application, in which a dashboard let's individuals see what is happening inside a home environment when they are away. Multiple functions may be available such as, for example, but not limited to:

Monitor: see what's happening at home now and what's happened recently by looking at different category groups.

Control: easily control your lights, locks, electronics, appliances and other connected devices in your home from anywhere.

Customize: set your connected devices to work in new ways when your needs change.

Features Available Through the ART Application Include:
1. Identity
   Phone App (PA) captures face using front camera as target for face recognition (FR),
   PA tells user to look at camera and press button to capture face,
   During setup, user looks at camera and makes a gesture to trigger face capture.
2. Field of View
   PA indicates to user their approximate location as they walk around a room within the field of view (FOV) of the camera.
3. Orientation
   Establish orientation of the camera through (a) accelerometer or (b) relative orientation of a detected person, typically within 90 degree rotation.
4. Multi-Camera Calibration
   Establish spatial relationship between different views of the same person,
   Person may stand within FOV of two cameras, press a button on PA, instructing system to locate the same person within both FOVs.
5. Approx. 3D Reconstruction
   Could edge detection be used to detect wall edges/corners and establish approximate cuboid of room?
   Then coupled with object size, perform an approx. 3D reconstruction?

3.10 Natural Interactions with the Sensors

Another important aspect of the system is the ability to know when things are not understood. This may be implemented through a natural way of interacting with the sensors.

For example, there is no need to walk towards the ART sensor to activate it, instead the activation of the ART sensor may be done automatically when an authorised person enters a room and quickly glances at the sensor in order to activate and access it. This may be implemented by tracking automatically and in real-time as soon as the person enters a room. From the real-time tracking, the position of the face is calculated or estimated. Real distances, which may then be used to know the position of the face and location of the person, may be estimated from the camera position. As the face appears within range of the sensor that needs to be activated, the face recognition engine is activated. This can be done using one or multiple sensors.

Sensors may also be de-activated from a seamless interaction with an authorised person. The API provides a descriptor of each individual in the environment. On top of that, it provides prediction abilities, not just reformatting frame-by-frame data.

The interactions with the sensors and the interface of the sensors are simple enough to be used by a homeowner, with no necessary calibration needed.

3.11 Software Architecture

Figure 25:
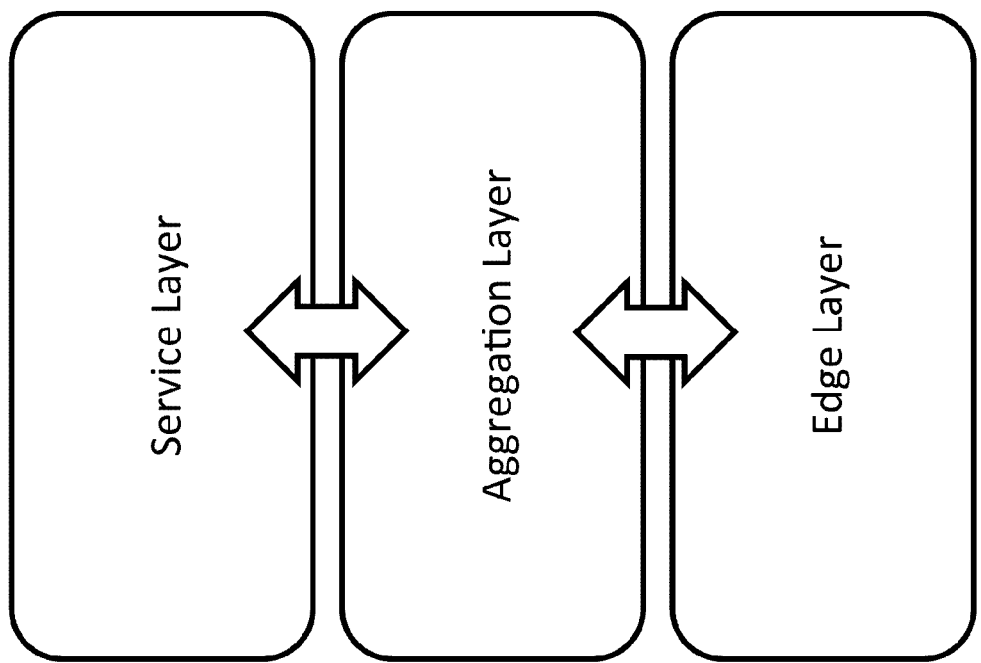
FIG. 25 is a diagram of ART 3-Layer software architecture.

FIG. 25 shows a diagram of ART 3-Layer Software architecture. The software architecture that underpins the ART system models closely the deployment of multiple sensors in a Smart Home in 3 layers:

- The Edge Layer processes raw sensor data at the sensor itself and is the core engine of the system. The Edge Layer creates and manages all services, handles external interfaces and includes cloud applications.
- The Aggregation Layer provides high level analytics by aggregating and processing data in temporal and spatial (including multiple sensors) domains. The Aggregation Layer collects multi-sensor data, delivers class of service switching, and manages Edges.
- The Service Layer handles all connectivity to both the Smart Home controllers and to the end customers for configuration of their home systems and the collection and analysis of the data produced. The Service Layer collects single-sensor data, produces sensor meta-data and controls device mode of operation.

The Edge Layer

The Edge Layer consists of a layer of embedded software that sits at the edge of the Smart Home network of sensors—that is right at the sensor itself. It also contains Spirit. As stated previously, Spirit is at-the-edge technology, which virtualizes video or raw sensor data from a scene directly into a digital representation of all its important features. This virtualized data is then distilled into a digital understanding of the scene.

A Spirit-based system, for instance, can monitor the behaviour of all people within the scene based on pose, movement and identity in real time, at up to 4K resolution. Spirit comprises dedicated silicon IP blocks with embedded firmware.

The remaining parts of the Edge Layer perform the necessary management and control functions that allow the system provider to monitor the system for faults or change the behaviour of the data processing in the sensor. All of this happens in real-time and the output is a set of sensor Meta-Data that is pushed up into the Aggregation Layer.

The Aggregation Layer

The Aggregation Layer takes the metadata produced by the Edge Layer and analyses it further, often combining multiple sources of data together to create events as functions of time.

This layer is even more sophisticated, because it can also interpret a set of rules for the creation of events—rules that have been injected into the system through a suite of applications for the user of the system.

Finally this layer prepares the events for delivery as a service, which includes scheduling algorithms that drive a multi-class of service event switch before passing the event data through to the Service Layer.

The Service Layer

The Service Layer allows the system to interact with the outside world. The outside world in this case could be an Energy Controller within the home or an Entertainment system. It could also be a Home Security system or a Fire and Safety system. These real-time control systems subscribe for an event service that is packaged, delivered and monitored by the Service Layer.

The end user or homeowner can also use the applications within the Service Layer to input data and parameters about their home setup. They can use the applications to provide the system with a personal model of their environment for example, or to specify behaviours and rules for the combination of the sensor data with other systems in the home. There are also applications that aid the homeowner in setting up the system and walking them through the various steps involved, prompting them to enter data as required.

Finally, the Service Layer also contains data analytic tools that can "pass-through" data from the home and store it in the cloud. From there, it can be analysed through a set of web services Application Programming Interfaces (APIs) remotely.

3.12 Flexible Architecture Multiple Deployment Options

It is important that the ART architecture is flexible enough to be deployed in a variety of physically distributed platforms. For example, not every home will have the same devices and gateways that connect it to the internet. Certainly every home will have a different configuration of sensors and controllable systems.

Therefore the architecture was designed so that the modularity and internal interface designs allow a variety of distributions to happen. In particular, there are 3 main options for the distribution of the software across platforms as described individually below.

Option 1: Hub Device & Cloud

Figure 26:
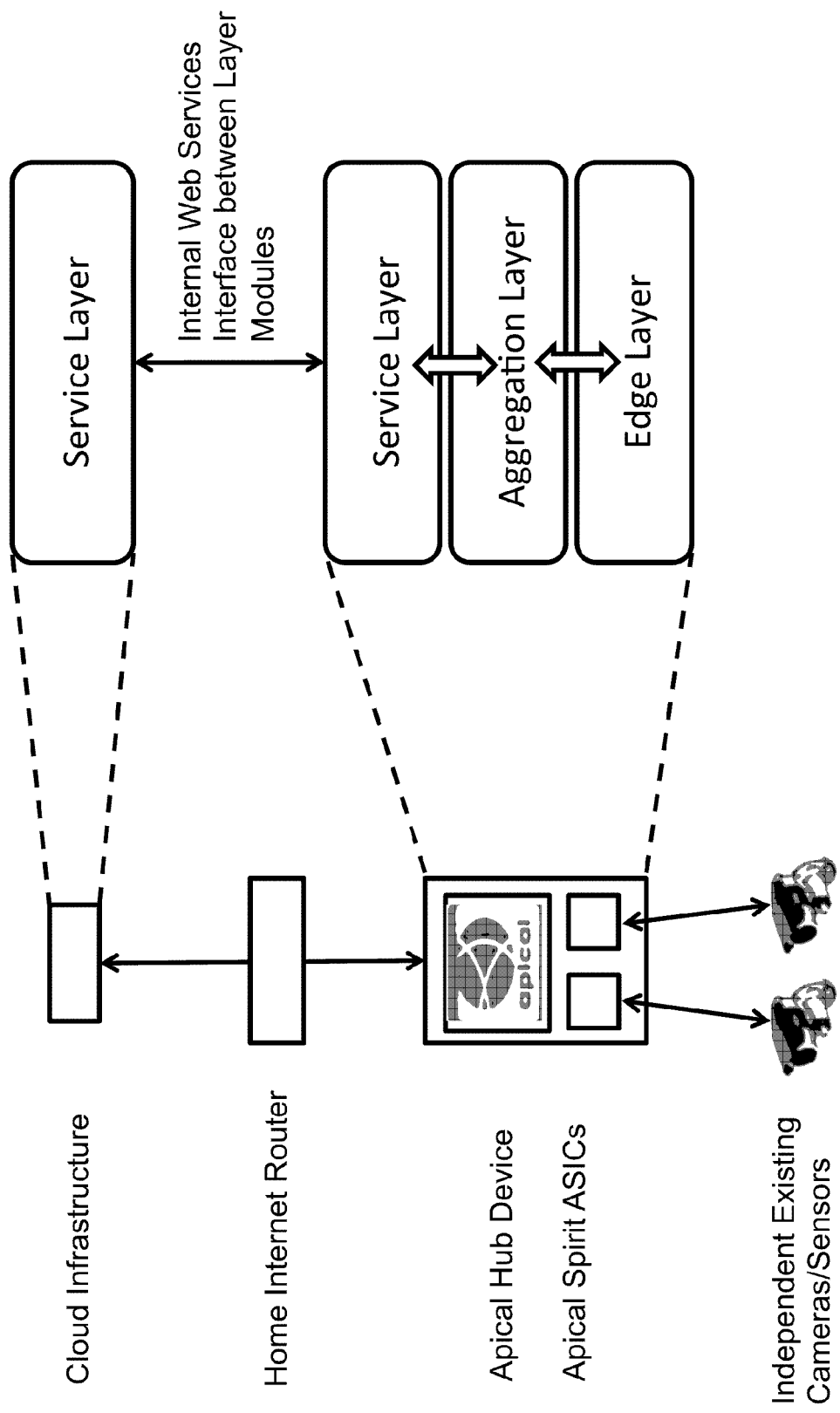
FIG. 26 is a diagram of the flexible architecture option 1: Hub Device & Cloud.

The first option is illustrated in FIG. 26, and it shows how a large component of the overall system is self-contained in a single ArtofUs Hub Device. This is particularly useful in the situation where sensors or cameras are already installed and the user simply wants to make those cameras work in a smarter way, and feed into a next generation of Smart Home controllers.

With this option, all 3 layers of the architecture are contained within the ArtofUs Hub Device, with a portion of the Service Layer still remaining in the cloud. Note how the internal interfaces in the Service Layer readily prepare the software for deployment in this scenario as the interface is defined as a Web Services interface, effectively interlinking internal software modules in the mode of a "micro-services" architectural approach.

Option 2: Sensor, Home Gateway & Cloud

Figure 27:
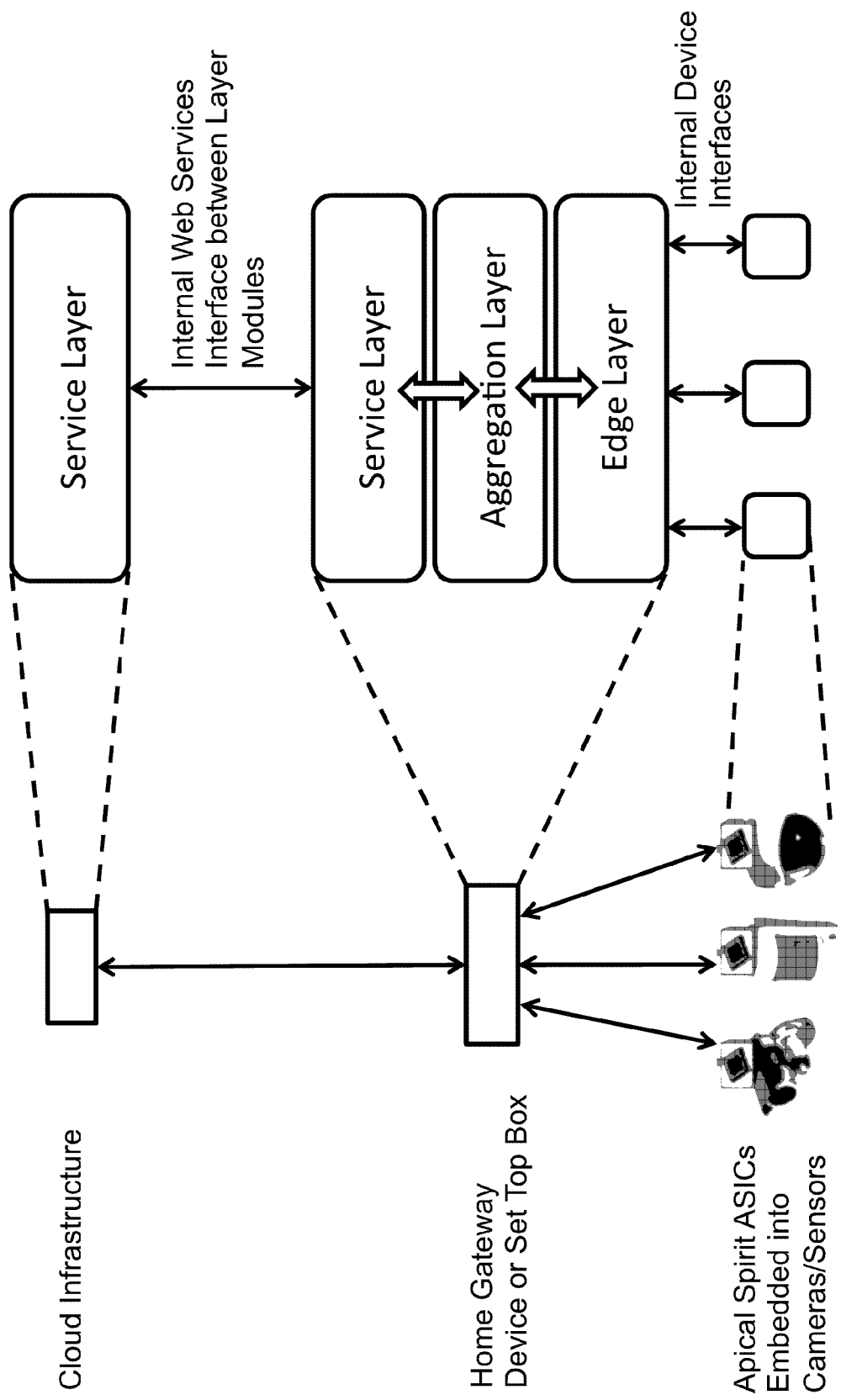
FIG. 27 is a diagram the flexible architecture Option 2: Sensor, Gateway Device & Cloud.

A second option is illustrated in FIG. 27. Here, the Spirit component is now physically embedded into the sensor/camera device itself within an ASIC (Application Specific Integrated Circuit). A silicon device contains the edge layer functionality and processes the sensor data into metadata in real-time at the sensor itself.

The second component of the Edge Layer then sits in a home gateway device. This device could belong to a third party such as an entertainment company or an energy company. This component would be deployed through a partnership and co-development whereby the ART software resides on a virtual machine running a small server within the existing software system of the device.

The gateway or hub component of the Edge Layer is used to centralise some management components of the architecture rather than replicate them across all of the sensors themselves. It aggregates fault and management data and does some analysis before pushing it up to the Aggregation Layer.

The Aggregation Layer sits fully in the Home Gateway Device, taking metadata from the Edge Layer and analysing and synthesising events that could be used as part of the various services offered out. There is also a part of the Service Layer residing in that device, so that events can be sent directly to Smart Home controllers within the home rather than up through the internet connection.

The final Service Layer piece is similar to that described in Option 1 above, and resides in the cloud. Note that raw sensor data and metadata can be optionally "passed through" the Aggregation Layer and into the cloud Service Layer for storage and non-real time analysis and usage. This functionality provides the means for end users and partners to validate and audit service data, or simply record the data in a secure location.

Option 3: Sensor & Cloud Only

Figure 28:
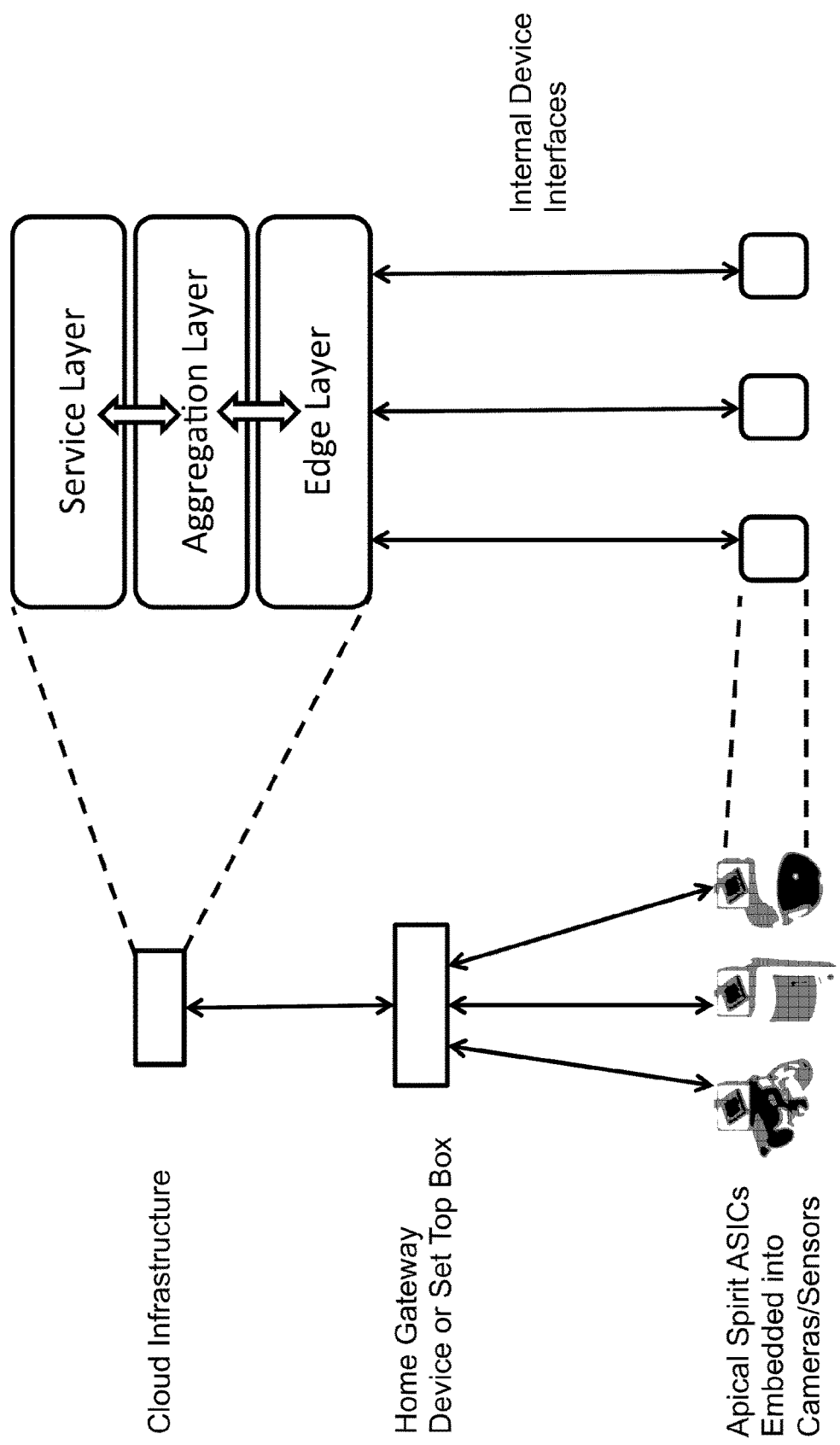
FIG. 28 is a diagram of the flexible architecture Option 3: Sensor & Cloud.

There may be situations where there is no home gateway or hub device locally available from a partner to host the ArtofUs software. In this instance, the entire 3-layer architecture can reside in the cloud as shown in Option 3 as illustrated in FIG. 28.

Note that there is still some embedded silicon and firmware in the sensor which acts as the main portion of the Edge Layer, but the Edge Layer management and control functions are now in the cloud.

In this scenario, the operation of a 3rd party controller will be dependent on the internet connection for it to operate successfully and receive any pushed service events from the Service Layer.

With the 3 options provided, most deployment scenarios are covered and the software architecture has an in-built mechanism to scale and to cover a wide variety of market use cases. This architectural approach also enables multiple partners to avail of a core piece of sensor IPR, which is designed, developed and supported centrally by ArtofUs. For example, Energy, Security, Safety and Entertainment providers can all avail of similar service events and thereby share the cost of supporting that technology base over the expected lifetime of the Smart Home industry, which should extend for 10+ years in its first generation of products.

3.13 ART Detailed Software Architecture

Orthogonal 3-Plane Design

Figure 29:
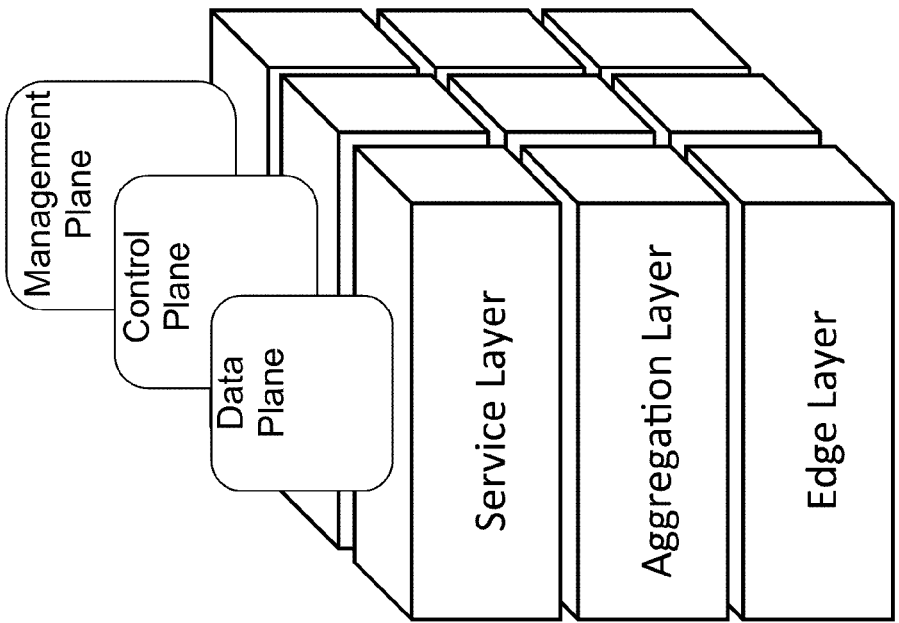
FIG. 29 is a diagram illustrating the separation of Data Plane, Control Plane & Management Plane.

The internal structure of the architecture is primarily designed to be modular and in particular, to separate out orthogonally the data plane, control plane and management plane. These planes cut through the 3-Layer architecture as shown in FIG. 29. Effectively they represent a grouping of similar types of functions in each layer so that independent development roadmaps for each plane can be supported. However the primary reason for this aspect of the architecture is robustness.

The data plane is the set of functions that receive raw sensor data, process it into metadata, and produce service event data to push out to various controllers. The control plane represents a means to parameterise the performance of the system in real-time, for example adapting the type of metadata being requested, or the performance of the system.

If a 3rd party control system requires a high level of robustness from the event production, then should a problem arise in the control plane, it should not affect or degrade the performance of the data plane. This is what is meant by orthogonality—an attempt for complete independence of operation to ensure that there are no hard crashes of the system should one component degrade for whatever reason.

The management plane is recording and analysing performance monitoring points within the system, fault detection and error masking and reporting. It is also responsible for recording and persisting the management data for support, auditing and billing functions. It is designed to operate independently to the other 2 planes so that if a problem arises in the management function, the controllers that are dependent on the data will still receive that data without a hard system crash.

Reliability and robustness across multiple hardware platforms is a challenging task, particularly when multiple vendors are involved. These architectural choices have been made to specifically reduce the risk of hard crashes in feeding important security, fire, safety and health-critical functions in the Smart Home.

Modular System with Well-Defined Interfaces

Figure 30:
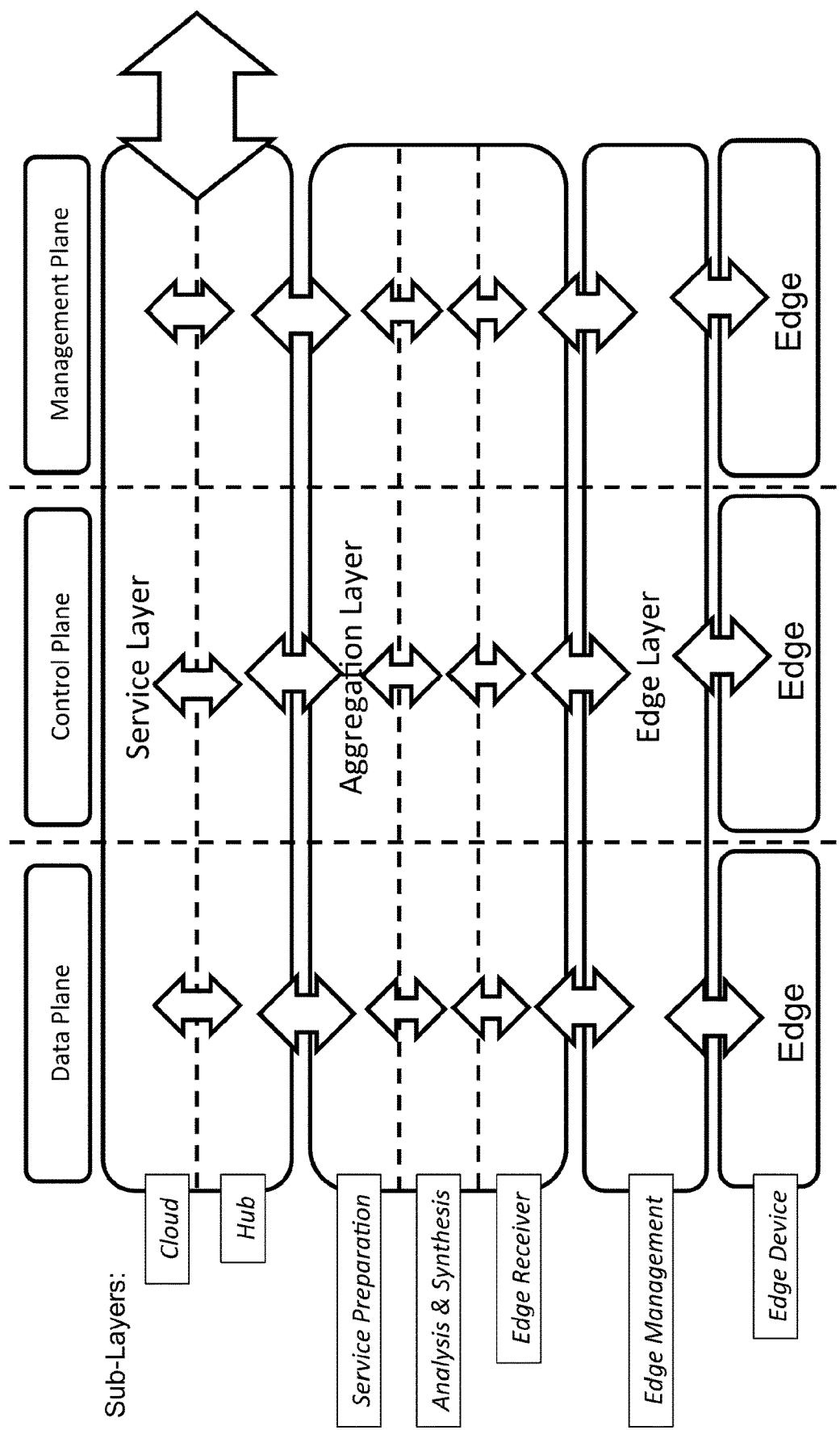
FIG. 30 is a diagram showing Internal & External Interfaces across three planes of operation.

Each of the 3 Layers of the system is divided into sub-layers. This breaks down the entire architecture in the components shown in FIG. 30 in which external interfaces and internal interfaces across the three planes of operation are also shown. The components are created by a combination of the various layers, sub-layers and planes in the system.

The Edge Layer has 2 Sub-layers:
The Edge Management Sub-Layer which houses the control and management functions of that layer.
The Edge Device Sub-Layer, which resides on a sensor device.

The Aggregation Layer has 3 Sub-Layers:
The Edge Receiver Sub-Layer that communicates with the Edge Layer and manages that interface and its performance, while also performing some analysis of metadata received.
The Analysis & Synthesis Sub-Layer combines and analyses metadata and environmental information on one or more sensors over time to synthesise events which are then passed upwards through the system.
The Service Preparation Sub-Layer combines event data received from the Analysis & Synthesis Sub-Layer with metadata, Service Rules and customer-centric environmental data to produce, switch and deliver service events.

The Service Layer has 2 Sub-Layers:
The Hub Sub-Layer is the part of the Service Layer that is located in the home itself, residing on a home gateway or hub device either supplied by ArtofUs or by a third party, or a device that is already performing an existing function such as router, set-top box or similar device.
The Cloud Sub-Layer is the part of the Service Layer that is located in a datacentre cloud environment connected to the home through the Internet.

Finally, there are a series of well-defined interfaces interconnecting the various modules so that each module can be implemented using methods hidden from the other modules. This ensures that a complex system can have roadmaps for the development of individual components with as little coupling as possible in order to ensure fast reaction time to market conditions and new ideas in the Smart Home industry—particularly important given the fact that the Smart Home is an emerging market.

Many of these interfaces are designed as web services interfaces so that the components do not necessarily have to reside on the same physical platform, so long as there is a standard IP network available to connect them e.g. a home wireless network or the Internet.

Detailed Architectural Components

Each layer and plane describing the architecture may comprise several selected functions. Some key examples of functions are presented in FIG. 31.

Examples of functions present in the service layer within the data plane are: database management system (D1), query, search and retrieve API (D2), off-line analysis application and big data tools (D3), event service delivery external controllers (D4), data upload (D5).

Examples of functions present in the aggregation layer within the data plane are: event generation for services (D6), event queuing and switching (D7), source fusion (D8), scene analysis and synthesis (D9), API for third party plugins (i.e. face recognition) (D20), meta-data pre-processing (D11).

Examples of functions present in the edge layer within the data plane are: meta-data extraction and analysis (D12), external sensor interface (D13), data upload (D14), metadata extraction and analysis (D15), data upload (D16).

Examples of functions present in the service layer within the control plane are: control and configuration API and apps (C1), control and configuration API (C2), service delivery and data upload configuration (C3).

Examples of functions present in the aggregation layer within the control plane are: scheduler control (C4), control and configuration API (C5). Data processing parameters and configuration (C6), environmental model control parameters (C7), edge interface configuration (C8), edge layer control (C9).

Examples of functions present in the edge layer within the control plane are: control and configuration API (C10), data processing parameters and configuration (C11), data processing parameters and configuration (C12).

Examples of functions present in the service layer within the management plane are: management API and applications (M1), management aggregation and edge layer (M2), service interface monitoring (M3).

Examples of functions present in the aggregation layer within the management plane are: service preparation monitoring (M4), management API (M5), analysis and synthesis monitoring (M6), edge layer management (M7), edge interface monitoring (M8).

Examples of functions present in the edge layer within the management plane are: management API (M9), update manager (M10), self-test and performance monitoring (M11).

Note that this diagram does not represent a complete set of the functions involved, further examples of functions are for example, but not limited to: data persistence, database storage and lower level drivers.

Where functions could potentially straddle two or more components of the architecture, a deliberate choice is made to refactor that module so that it no longer straddles multiple components. In this way, architectural integrity can be maintained as the priority over the replication of some data or lower level functions or libraries.

Figure 31:
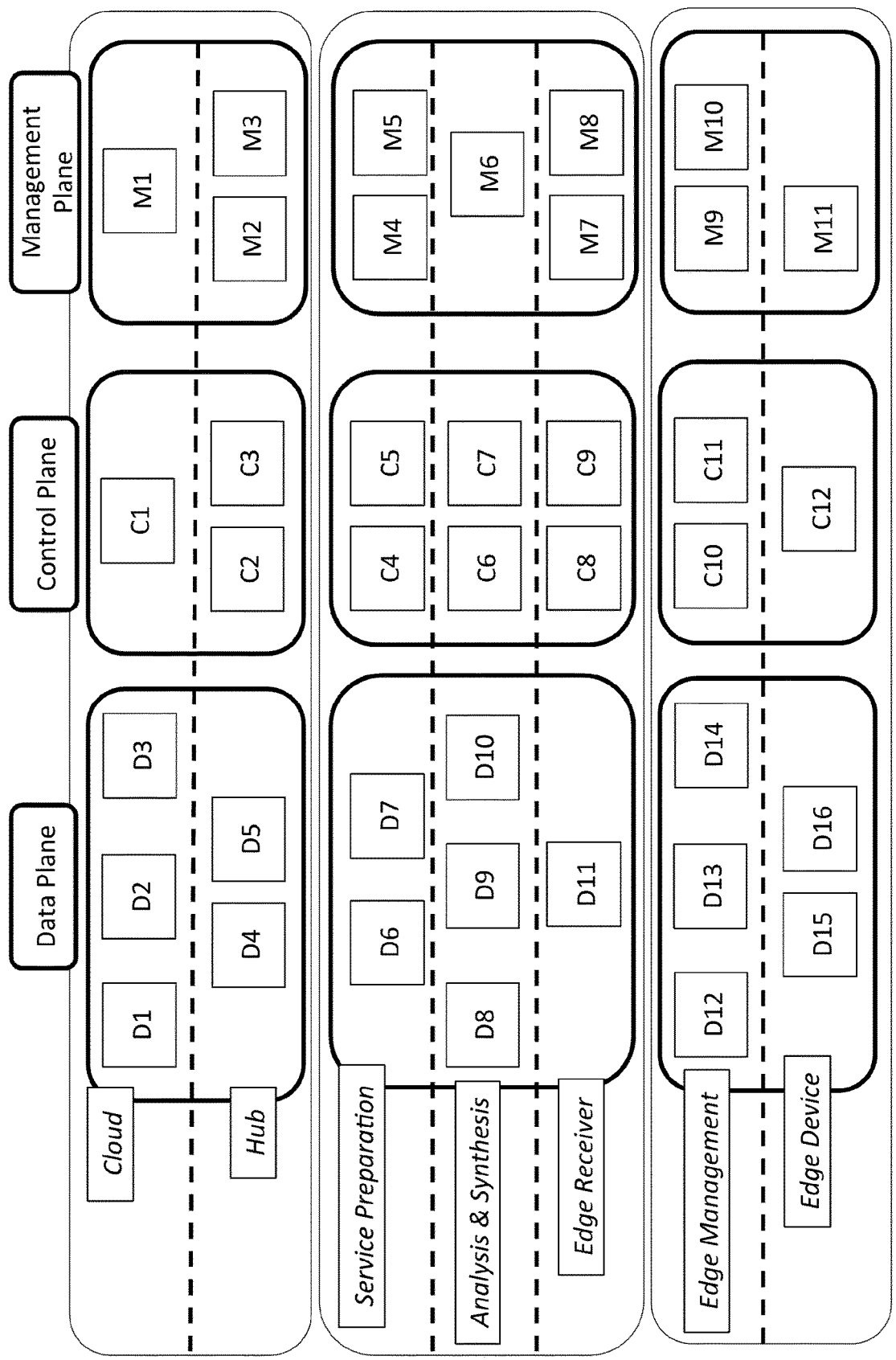
FIG. 31 is a further example of a diagram for the Flexible architecture option 3: Sensor & Cloud.

FIG. 31 is presented here to illustrate the next layer down of the architecture definition. It should be clear from this diagram that building a robust, reliable and multi-vendor event service for the Smart Home is considerably complex and made even more so because of the multiple possible options for physical deployment and underlying platform variability. However with strong architectural features and choices, the ART software architecture is built for the long-term future of the Smart Home industry.

3.14 ART Deployment

Figure 32:
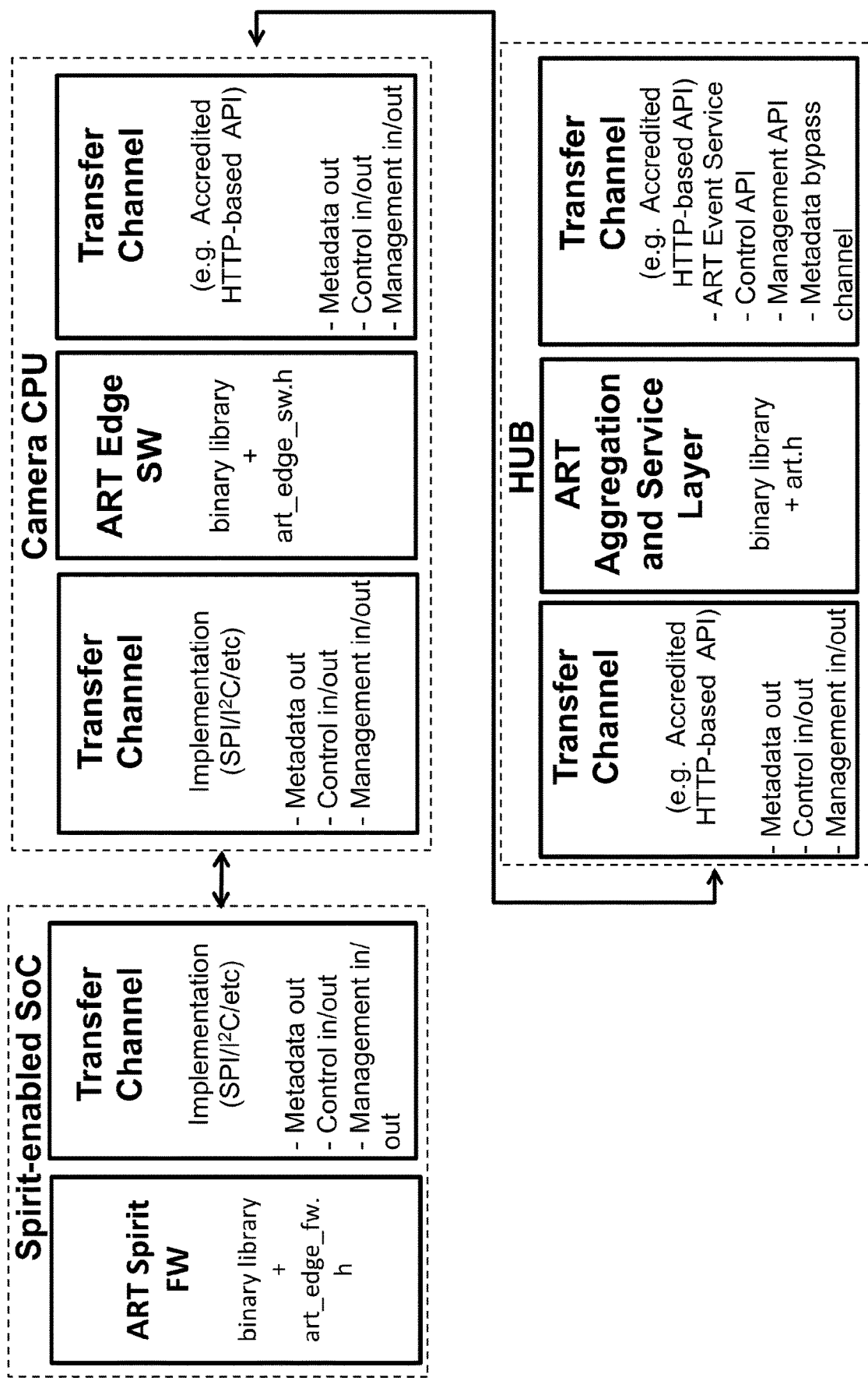
FIG. 32 illustrates ART deployment via a Spirit-enable SoC, a camera CPU and a hub.

FIG. 32 shows a diagram with an example of an ART deployment via a Spirit-enable SoC, a camera CPU and a hub.

4. Aware 4.1 Overview

AWARE is a platform for converting peoples' behaviour into big data. It consists of:
  Spirit engine in a SoC inside a camera or sensor,
  And/or Spirit engine in an FPGA in a router or server,
  AWARE server containing database(s), business logic, and interfaces to client applications.

Figure 33:
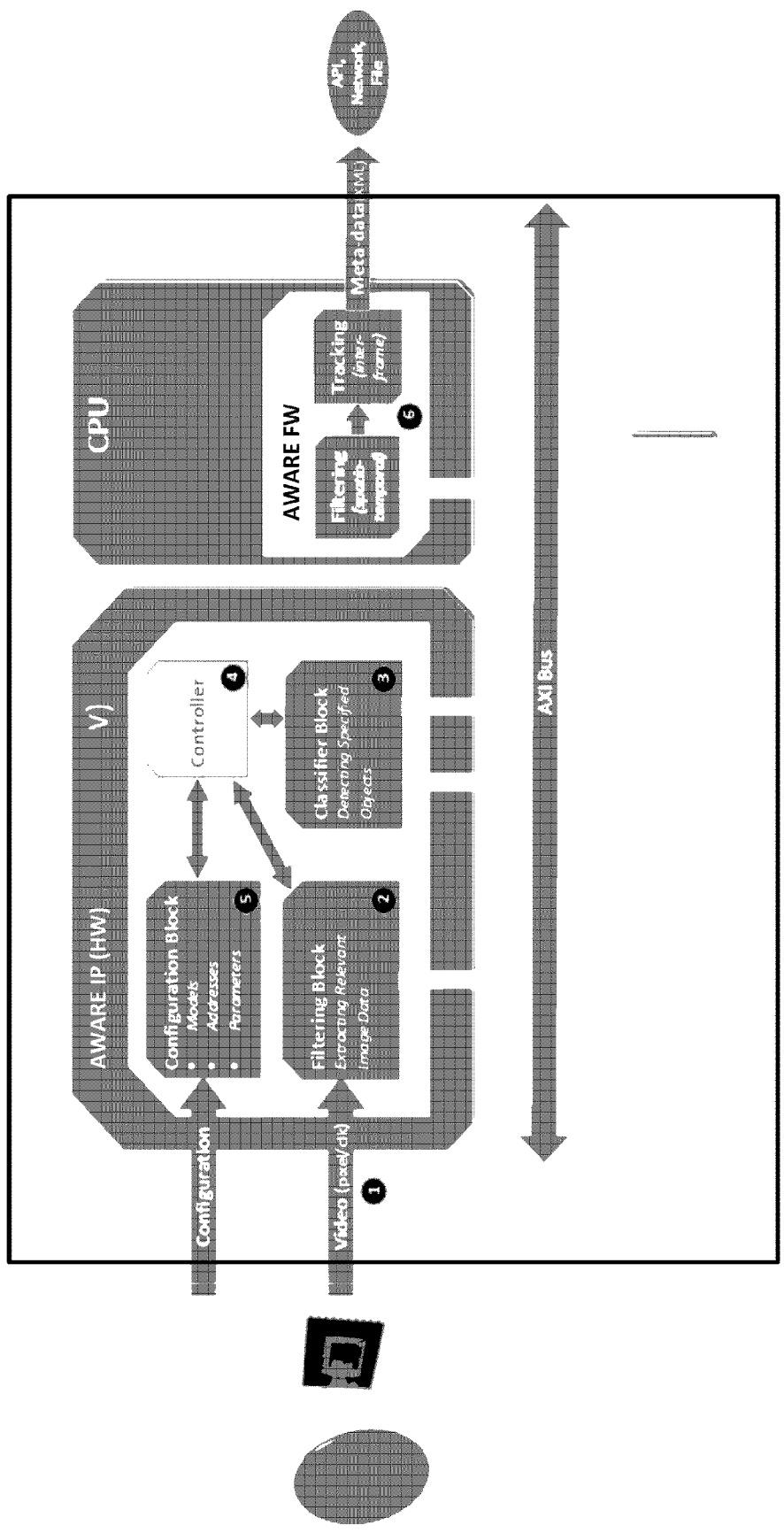
FIG. 33 shows an example of the Spirit embedded architecture as implemented in the AWARE platform.

FIG. 33 shows a diagram of a Spirit embedded architecture as implemented in an AWARE platform. AWARE image processing hardware block comprises a configuration block, controller, filtering block and classifier block. Both the filtering and classifier block subscribe to an AXI bus connected to the DRAM and a CPU, which contains the AWARE firmware. The firmware extracts and transmits metadata to an API, network, file or a database.

Figure 34:
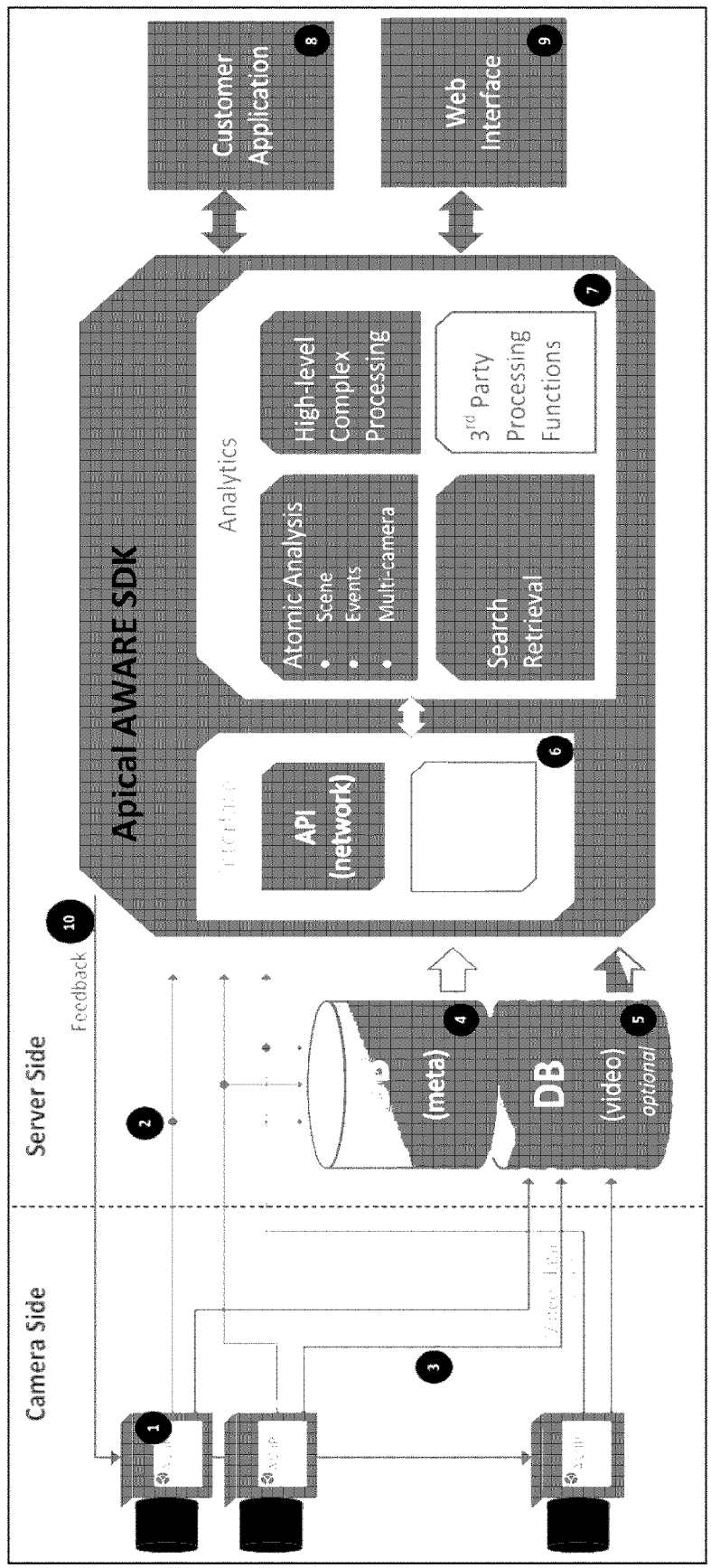
FIG. 34 shows an example of the architecture of the AWARE cloud SDK platform.

FIG. 34 shows a diagram of the architecture of an AWARE cloud SDK platform. ART devices may send video or metadata to a metadata database or video database located on a server. They may also send directly metadata to the AWARE SDK platform where analytics are performed (for example scene, event or multi-camera analysis). Search retrieval may also be performed as well as other high-level complex or $3^{rd}$ party processing. The AWARE cloud SDK platform may also communicate with a customer application or web interface.

An aspect of the system is the creation of a Track Record, which is the reformatting of real-time metadata into a per-object (per-person) record of their trajectory; pose (and, possibly, identity). The Track Records are stored in a MySQL-type database, optionally correlated with a video database.

The AWARE server performs the following pseudo real-time functions:
  Population of a database of Track Records,
  Post-processing of Track Records to correct for lost/swapped objects and multi-camera tracking,
  Provision of higher-level tracking information to third party applications,
  Adaptive learning.
  Privacy: Video database is optional. Some applications, like security applications, require it; others, like retail applications, do not.
  Example functionality:
  Count people, measure people flow,
  Measure gaze time,
  Set event-based alerts.

4.2 Application

Deploying AWARE in retail advertising will enable new business models to emerge, such as but not limited to:

New customer revenue models.
Actual views/dwell metrics.
Location, campaign, day—part time metrics.

As an example, the interaction of a customer with a digital signage may be analysed through a Spirit-enabled sensor. It may be possible to analyse the image from the sensor and monitor for example the following:
Measure customer reaction in real time.
Rich pose/gaze/attention information.
Track customer from window to checkout.
Test different campaigns in real time.
Modify advertising in real time in response to gaze time.

Measuring gaze time may require more than just face detection. It may also require at least the following:
Tracking the position and pose of every person.
Monitoring their head position continuously.
Tracking peoples' behaviour both before and after the gaze.

Figure 35:
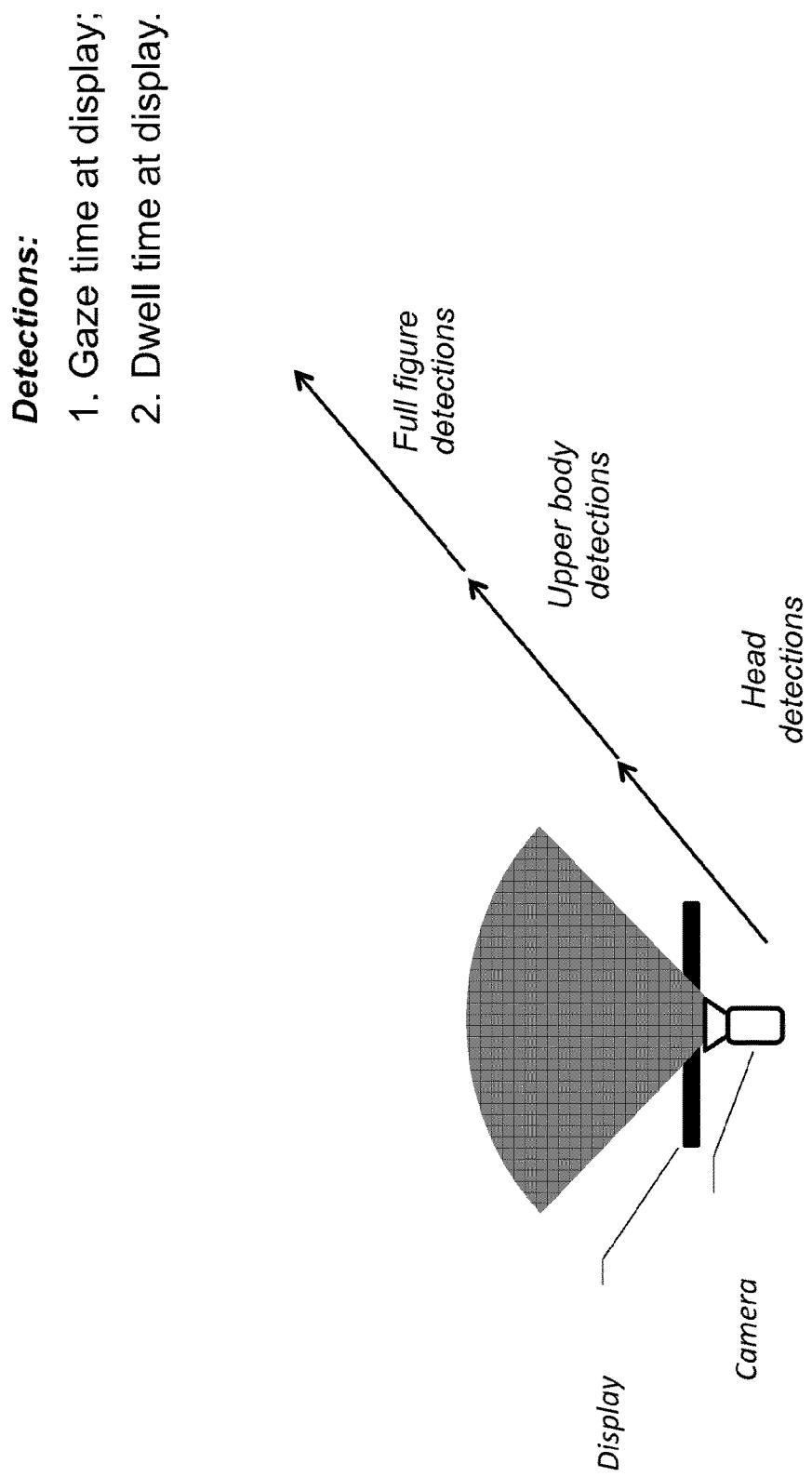
FIG. 35 shows the different levels of pose at varying distances that can be assessed by AWARE.

AWARE is able to assess different levels of pose at varying distances as illustrated in FIG. 35. At short distance from the camera, AWARE may detect head whereas at longer distance it may be able to detect full figure. It may also detect and measure the gaze time as well as the dwell time at display.

Figure 36:
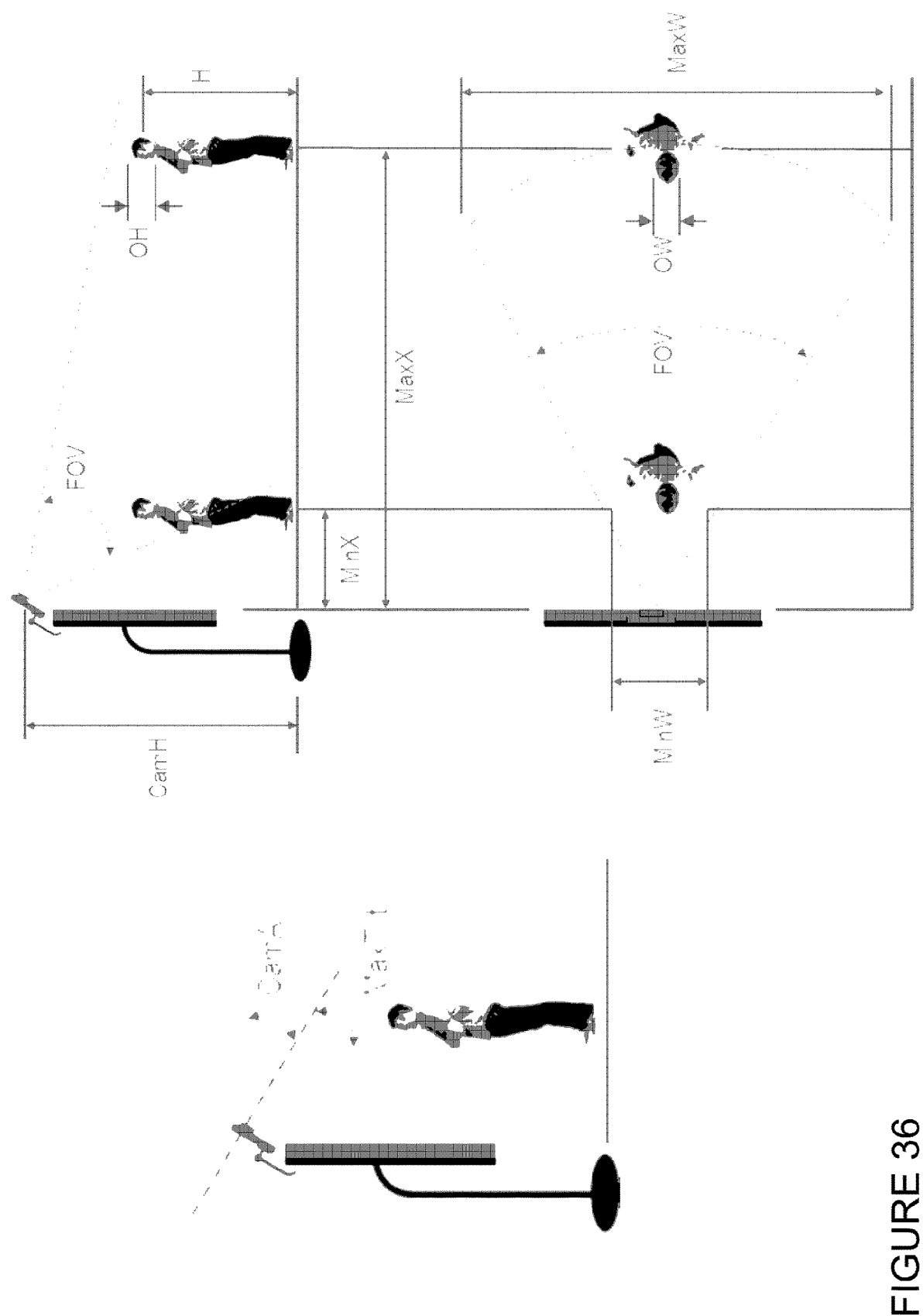
FIG. 36 shows an example of a proposed camera setup and associated region of interest in which a camera has been mounted above the display.

A proposed camera setup and associated region of interest is shown in FIG. 36 in which a camera has been mounted above the display. For this particular setup, the possible distances of detection areas for the different poses are given:
Camera setup:
    1920×1080 resolution
    90° FoV
    Mounted 2.5 m from ground, tilted down at 20° below horizontal
Detection areas:
    "Head" detection:
        X max, min 5.5 m 1.0 m
        W max, min 8.0 m 1.4 m
    "Upper body" detection:
        X max, min 9.5 m 1.0 m
        W max, min 13.5 m 1.5 m
    "Full figure detection"
        X max, min 17.5 m 1.5 m
        W max, min 24.5 m 2.5 m The detection areas are based on the assumed setup and choice of camera models. Actual results will also be influenced by the quality and type of camera, lens and lighting conditions and may also be subject to occlusions.

Figure 37:
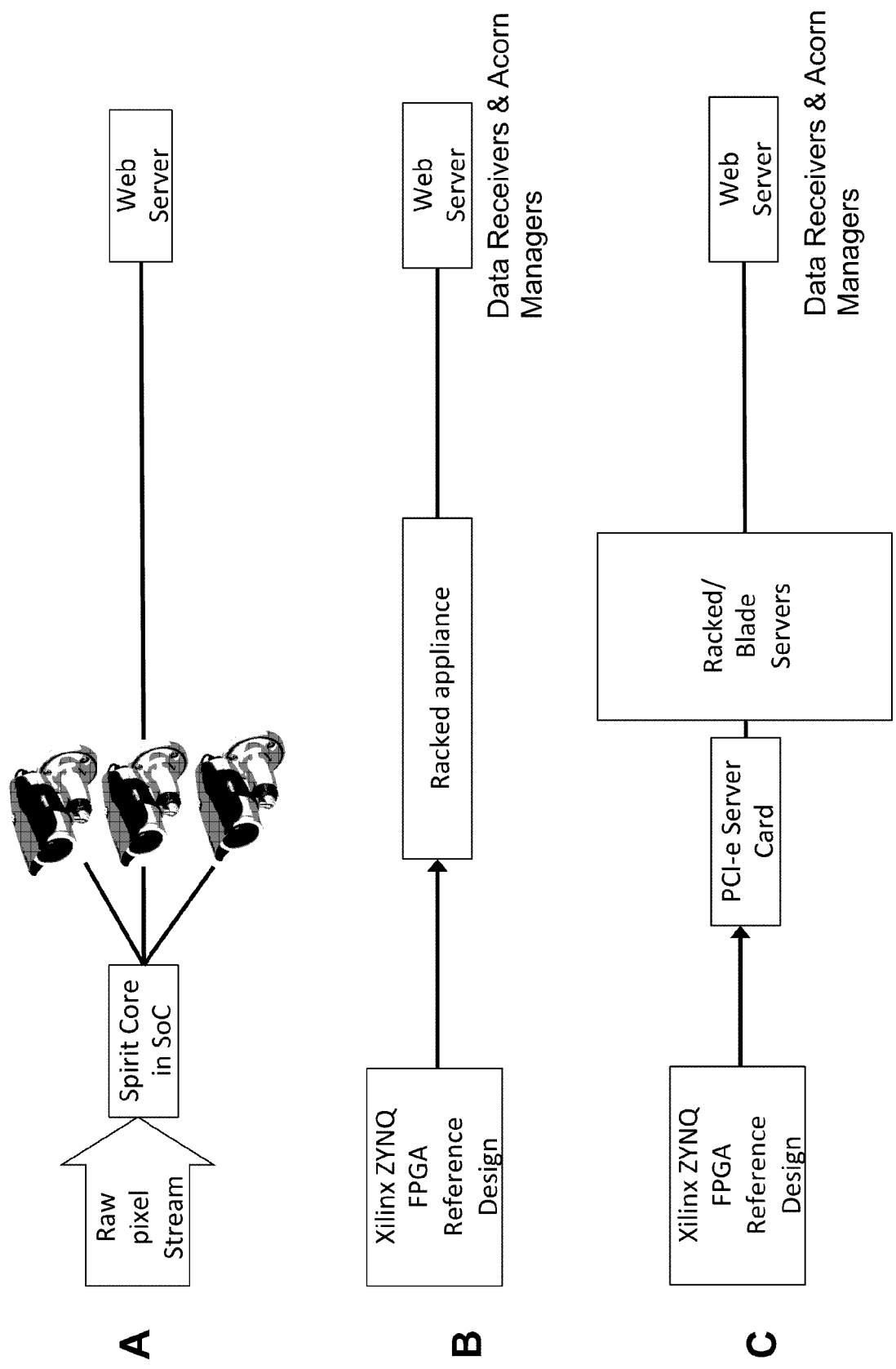
FIG. 37 shows examples of possible AWARE implementations.

Several implementations of AWARE are possible as shown in FIG. 37, such as, embedded in IP camera (A), racked appliance (B) or PCI-server Card (C).

As explained earlier in Section 3.8, the limitations of security cameras can be overcome with ART and AWARE.

4.3 AWARE Analytics

Today, a small number of expensive cameras are usually installed in non-ideal location. They often provide data that is of low quality and not very useful. Today's systems also lack from scalability.

One of the advantages of AWARE is that it is delivering a paradigm shift in retail thanks to a network of smart sensors offering high quality data such that it makes it possible to capture shopper behaviour. This is mainly due to the fact that AWARE uses low-cost sensors, which are convenient, and unobtrusive. They also require low bandwidth connectivity, are simple to install and are fully scalable.

Figure 38:
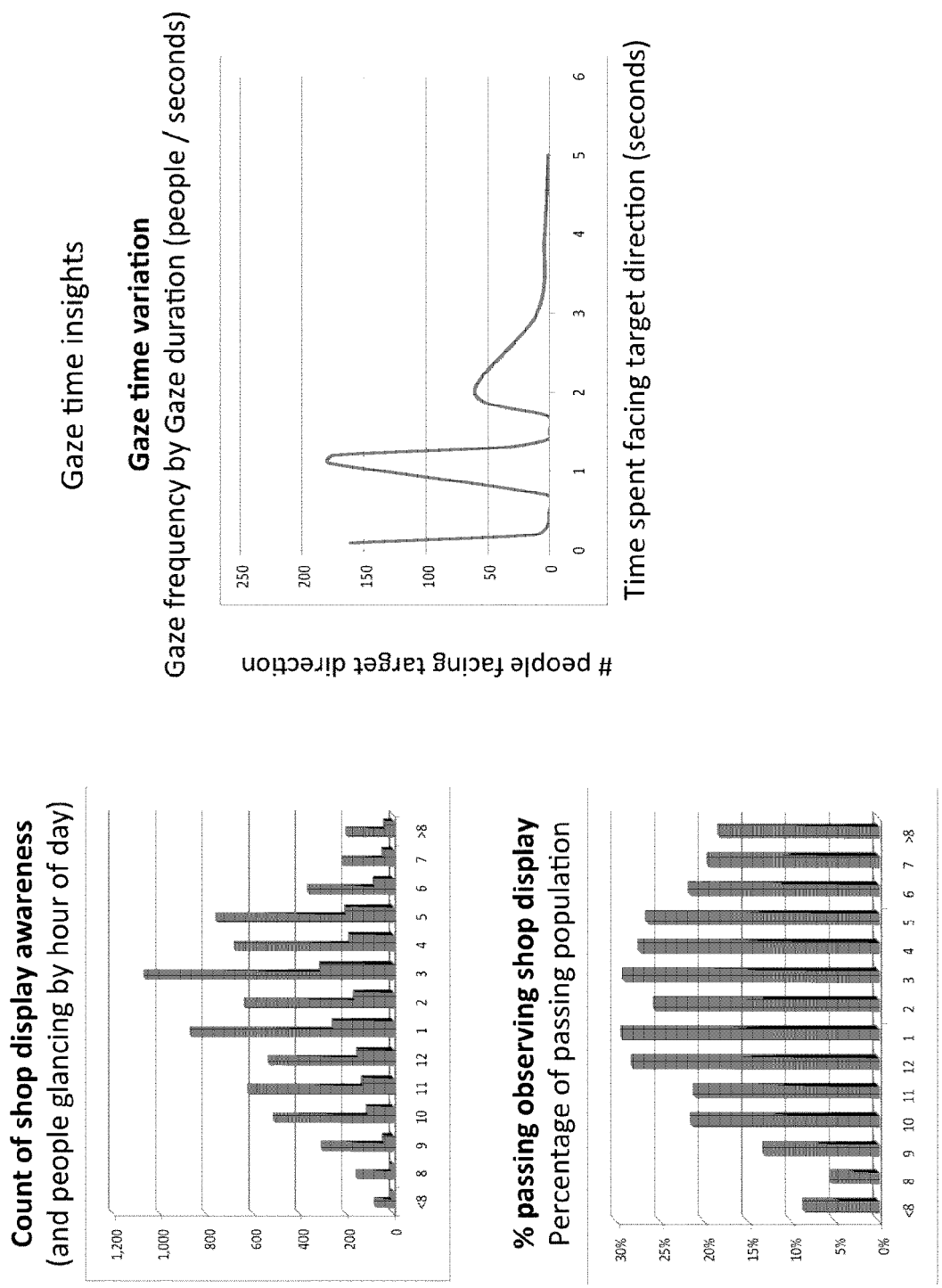
FIG. 38 shows analytics graphs calculated from gaze time insights.

AWARE also provides real-time analytics on the behaviour of the detected and tracked people. Some of the insights include for example, as illustrated in FIG. 38:
Keeping track of display awareness by measuring the number of persons glancing by hour of day.
Tracking the percentage of passing population that observe a shop display.
Measuring gaze time variation by analysing the gaze frequency by gaze duration (people/seconds).

Figure 39:
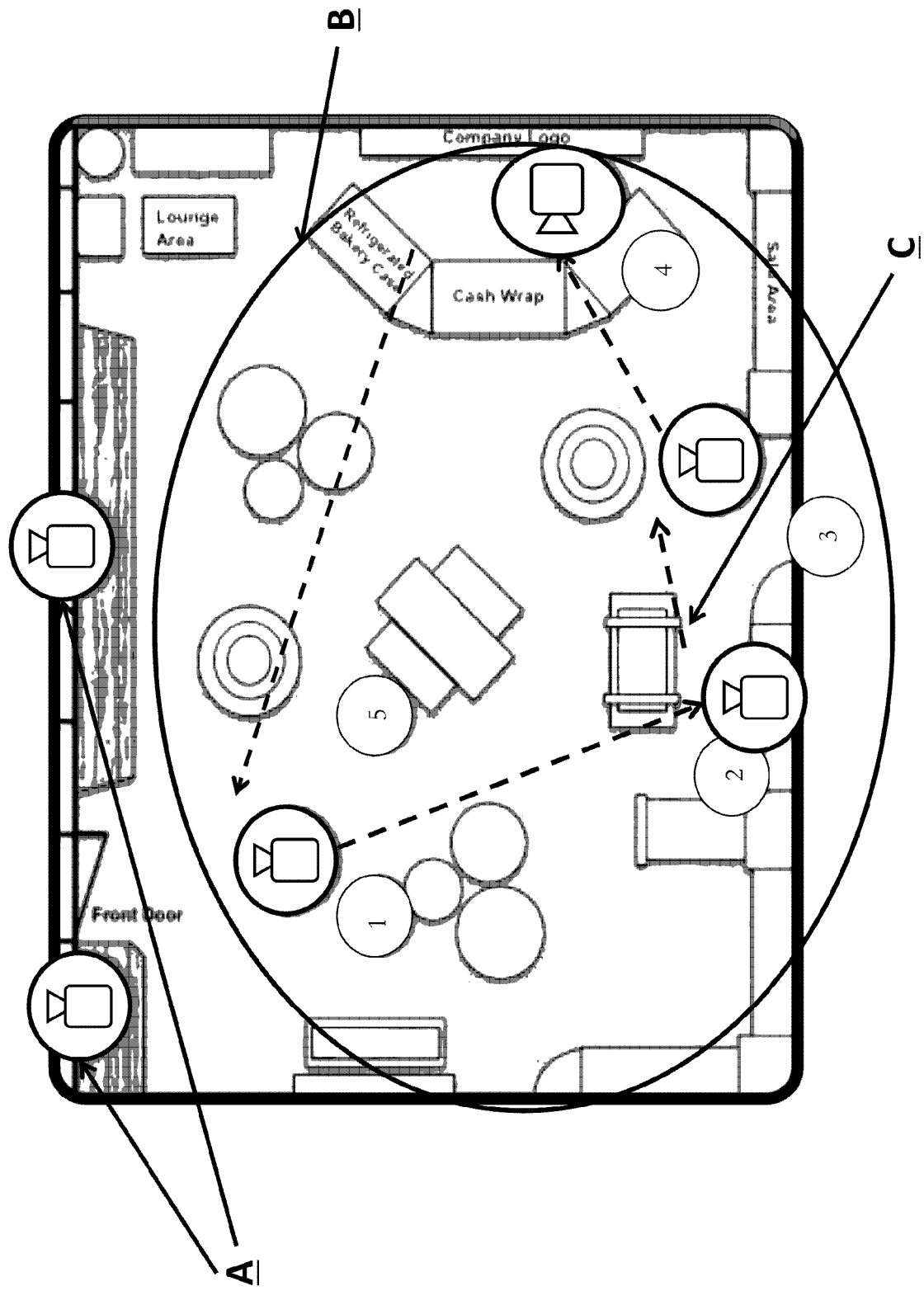
FIG. 39 shows an example of deep analysis of customer behaviour within a shop environment

Within a shop environment, a deep analysis of customer behaviour is possible as shown in FIG. 39. From the sensors located outside the shop (A), a vast amount of information may be extracted from measuring gaze time such as: Window display's efficiency in capturing consumers' interest, average gaze time of passing traffic, optimal time/day for capturing consumer interest. From the sensors located inside the shop consumer pathway (B) may be analysed, such as customers' real-time pathway through store 'Entrance to Exit'. Hence in-store promotions may be optimized in real-time, and the store regions' returns may be analysed. In particular dwell time may be analysed in specific zones (C).

FIG. 40 gives an example of a Web GUI for smart retail. The people count for the day and the current people count are displayed along with the day average gaze time. Charts on the average gaze time may also be displayed as well as statistics on the total people who returned to look a specific digital display. Plots of the average gaze time as a function of time of day and of a count of people walking past as a function of time of day are also shown.

The intelligent sensors enable real-time insight from consumer behaviour by detecting, tracking and analysing consumer behaviour. This can then enable a tailored interaction in which enhanced services are presented in real time and it is therefore possible to develop a high rated personalised customer experience.

A marketing proposition is provided with sustainable personalised product interaction, driving unassailable market leadership in digital showrooms. Premium service can be maintained for enhanced returns, driving high market growth and delivering high levels of consumer value and premium service.

5. JSON-Based Event Generation and Event Switching Feature

Method and device for JSON-based event generation and event switching for Smart Home, Smart Building and Smart City camera and sensor networks.

5.1 Background

The smart home industry consists of selling sensor devices for deployment in the home and controllers for using the data from those sensors to control appliances or devices within the home. The controllers can be software based and reside either inside a device or hub device within the home such as a cable provider hub box; or the software can reside in a server in a datacentre connected through the Internet, a cloud-based controller.

There are three major problems with the practical integration of such smart home systems. The first problem is a commercial problem, which is how to define the commercial boundary between the vendors of the sensors and the vendors of the controllers and the vendors of the appliances. This becomes a particularly acute problem when there is more than one vendor in each of the 3 categories of vendor. For example, the homeowner buys an energy monitoring system in the first year, then adds a security system in the second year. However, both systems should preferably work off the same camera sensors that the homeowner has already paid for. To make this work, the vendors have to agree a commercial boundary that can be audited for transactions between the various systems to ensure that value is shared and responsibility for value is clear.

In some instances, a single vendor will try to supply all 3 categories of product: the sensor, the controller and the appliance. However it is highly unlikely that the same vendor will supply an energy, safety, security and entertainment home system all fully integrated.

Added to the above issue is the fact that some sensors are more fundamental than others. For example, a sensor that tells you who is in the room is of value to many different controllers and appliances for the smart home. These fundamental sensors should only be deployed once in the home and the homeowner should not have to purchase new sets of sensors for every different controllable system they require.

This section addresses how the commercial interface problem would be solved where the interface is between a set of fundamental sensor products supplied by one vendor and a variety of system controllers such as energy, safety, security and entertainment systems all supplied by different vendors. The solution is to create an event subscription service to which the system controllers would subscribe and therefore receive event notifications and data from the sensor system.

The second problem facing the industry is the technical interface between the various vendors. While standards are emerging slowly, there is a huge range of products available in each category: sensors, controllers, and appliances. If the industry waits until every vendor agrees on every interface between every device it is highly unlikely that a solution will be reached.

In the example given above with one vendor selling fundamental sensors (camera based) and four other vendors supplying control systems (energy, safety, security, entertainment), there could be multiple sensors each talking to every one of the 4 categories of systems. The amount of communication chatter that would need to exist in an IP packet based system would require a significant upgrade in the bandwidth capabilities of the home Wi-Fi network before it could support such a set up.

This section centralises the output from the sensors into a hub, but differentiates the events created on a per service basis. This allows each service to receive different data that is relevant to their service from the group of sensors as a single intelligent sensor. This solves the technical interface problem as there is only one standards based interface into the hub but it is designed to be flexible enough to represent a large variety of event types to cover the requirements of many different control systems.

For example, an energy control system might only be interested in room occupation in the home, whereas an entertainment system might be interested in gesture based control of individual occupants. This section describes how we solve the problem of how to create a single technical interface to push events to both controller systems with significantly different requirements.

The most common user interface between homeowner and smart home systems is via the web and using a web browser either on a mobile phone or a computer. Therefore this implementation chooses to use Javascript Object Notation (JSON) to represent the events being created. This is a standards based notation specific to the programming language Javascript and will allow a rapid development time of graphical user interfaces based in browsers because the event data will be natively represented in the programming language of all browsers: Javascript.

Finally, the remaining problem is to be able to provide a quality of service guarantee associated with each service provided. For example, a safety service might be considered higher priority than an entertainment service. Therefore in the instance where the bandwidth on the home Wi-Fi and IP networks are reduced due to excess traffic or a fault developing, it is important that the home solution can differentiate the events being pushed to the control system by a class of service marker. This implementation solves this final problem by creating a virtual output queued event switch.

While all three issues described above are illustrated in relation to the application of the solution within a single home, there are further applications that extend beyond a single home. For example, a large enterprise building such as a multi-storey office, or a factory building could also utilise such a solution because in either case there would be multiple systems that need to operate in parallel such as security, safety, fire safety, energy supply and ventilation. The described solution is inherently scalable to larger scale buildings than the home.

Beyond single buildings, the described solution is inherently extendable to multiple buildings, such as within a campus or city, provided the event generator and event switch location is placed at a centralised connection point. This point must be sufficiently close to the buildings in question to avoid any delay issues for the control systems in responding to events.

In both the larger building case and the city case, the solution solves the three problems described above, while also solving two further scaling issues. Firstly, as the number of control systems using the events increases, the described solution can scale up while retaining sufficient level of performance to ensure that these systems work within known delay and quality of service boundary conditions. This solution thereby supports any commercial arrangements in place with guarantees related to operational uptime.

Secondly, as the number of sensors and events increases with the increased scale of the deployment area, the network utilisation can be optimised by the prioritisation of events and event responses. This is because a multi-level class of service regime can be practically deployed on events to mask out events of lower importance and thereby reducing the bandwidth usage of contested network resources in those key and important instances where a response is required by security or emergency services.

Also, the event generator can significantly help in weeding out false positives, which are events that the sensor network initially flags as an important event worth noting, but that the event generator can use a higher level of knowledge to recognise as a false alarm.

5.2 Summary of the Feature

The feature consists of a method to generate event objects from a collection of individual sensor inputs in which each event object also contains subscriber information and class of service. The sensors are typically spread around a home, around a building, or around a city and are connected to the event generator using an IP wired or wireless network. The event objects are coded in JSON format so that they can be directly used in Javascript-based software on Browser User Interfaces (BUIs) and web servers, or easily interpreted by standard server side programming languages or server Application Programming Interfaces (APIs).

The feature also consists of a device that queues the generated events and switches them into an output channel based on destination and class of service using a virtual output queueing system.

The combined method and device together enable controllers to subscribe to 3$^{rd}$ party event generating systems in order to make their controllers more reliable and have greater functionality. This is turn gives the end customer greater control and flexibility over many areas: how they run their smart control systems, which vendors they use, the ability to change vendors over time, and it provides them with a more efficient use of sensors that they've already purchased. It will ultimately reduce the cost of each system through re-use of assets and optimisation of energy usage when multiple different smart systems are in operation, which is also a benefit for the vendor.

5.3 Advantages of the Feature

The feature describes a clearly defined interface between the vendor of a control system such as an alarm system and the vendor of the sensor network feeding the control system such as a security camera vendor. The interface is based on a set of services that the sensor network publishes and the control system can subscribe to. The advantage of such an approach is that the services can be monetised and audited by both parties in a contractual arrangement in a pay-as-you-go manner or in a more traditional annual contract. Financial transactions can be based on service subscriptions with a fully traceable audit trail and a clear billing mechanism. The feature therefore enables commercial relationships between multiple vendors to work in a practical manner.

Another advantage to the feature is the ability for the end user to swap out any vendor in a particular deployment scenario. The vendor stops their subscription to the service and the commercial billing system will respond immediately, even though the decommissioning of the physical system may yet take some time. As soon as the service subscription is removed, the switching system will no longer queue the events for that specific vendor, allowing a graceful degradation of the overall system while a particular vendors equipment is removed or replaced.

This also then provides an advantage to the end user who is not tied into any one vendor at either the sensor side or the control system side of the overall architecture.

Another advantage to the feature is the speed with which a new service can be turned up. A new service can easily be added into the queueing system and event generation system and published to the control systems for utilisation. This will reduce the often lengthy time-to-market issue for a completely automated sensor and control automated system, where often the integration work and setting up of billing can take significant project time in completing.

The approach of using an event switch to queue and differentiate service has a significant scaling advantage in that a quality of service can be retained as the system scales. The number of ports in the switch can be increased without degradation of throughput or quality of service by trading off latency provided the compute platform is powerful enough. The design can also be implemented in hardware, as it is a variation on a packet switch typically used within large Internet Routers.

By using a web services interface to the sensor and control network devices, the central event generator and switch can be housed in any location connected through the Internet to the sensor systems or control systems. The advantage of such an approach is that the event generator and switch can be deployed on a Content Distribution Network spreading the work across multiple servers.

The internal interfaces within the event generator and switch system are defined sufficiently to split the internal processes and deploy them with internal web services interfaces between multiple servers. This provides an advantage in terms of scaling beyond a single server or physical device to a set of racked servers where each server concentrates its workload on one aspect of the overall system.

Another advantage of the feature is the modular approach and design in the separation of sensor output, rule generation for events, event generation itself, service publication, billing and subscription, and event priority queueing into individual systems. This is an advantage because the system is the meeting point of many different systems, vendors and end users in the scenarios described above and when one of these parts needs to change or be upgraded, it should not involve a disruption to the entire system which could have real-time requirements for a high degree of "up-time". This will be a particularly acute requirement for security and health monitoring systems, emergency and fire safety systems and other applications such as traffic control where any disruption may cause accidents and health threats to people in the vicinity.

The use of JSON as the core unit of event generation and event queueing has several advantages over existing systems. Normally the event generation is achieved in a proprietary manner in a single vendor's closed system, however by using a standard data interchange format such as JSON, it allows multiple vendors to participate in the event generation and usage. While XML could also achieve similar results, XML can often be lengthier in output data size, and as the number of events scales up, it would be a less efficient usage of compute and network resources than JSON. JSON is also a native data interchange format for web programming such as Javascript on the client side and Node.js on the server side, but can also be easily interpreted and exchanged between any server side programming language and distributed over an IP network in a standard manner.

Switching would normally be achieved using an IP packet based switch or an Ethernet frame based switch which would switch packets at the transport layer (layer 4 or below in the OSI network model). The feature has the advantage of switching at the application layer making it applicable no matter what the underlying transport switch technology is deployed. This means that the guarantees around the behaviour of quality of service and the deployment of the services do not rely on how a particular switch vendor has implemented their switch. While the lower level packet switches are still required, they are not involved in the switching of the application layer directly. This allows the performance of the application level switch to be changed, improved, developed, evolved and designed independently to the packet level switches, removing a potentially complex interdependency on performance levels. Ultimately, this advantage will enable a more widely deployable system while retaining a similar level of performance across multiple network designs and implementation scenarios.

The feature uses a rule-based system to generate events that utilises a set of models of the physical buildings and individual rooms involved as well as a set of rules that are both time based and multi-sensor based. These rules are communicated between a centralised web server and the various deployments using JSON formatting also and a web services interface to control the exchange. The advantage of this approach is to allow the models and rules to evolve over time independently to the evolution of the sensor layout.

There is an advantage to using an open model and a rule-based system for triggering events and relating them to the environment. The sensor deployment is published and the physical location of the sensors can be overlaid on the physical model using JSON format so that rapid creation of web-based user interfaces can be created on-the-fly to communicate the meaning of an event to the end user.

For example, the first vendor to deploy sensors can build a model of the physical environment and publish it on the system. Subsequent vendors can use this available model or combine previous sensor data with their own to offer a new set of event rules that overlay on the same physical model.

Equally this has the advantage of giving control to the end user of the rules for event generation and the ability to control the details provided in the physical model, while still allowing developers to test a potential new addition using the web-base published rules for that deployment before installation.

5.4 Description of the Drawings

The first sets of drawings [FIGS. 41-44] illustrate the feature in the context of a smart home environment. The second sets of drawings [FIGS. 45-47] illustrate detailed implementation architecture of the feature. The next sets of drawings [FIGS. 48-50] illustrate examples of the various JSON data formats that the system uses. The next sets of drawings [FIGS. 51-54] illustrate the application of the feature to larger scale scenarios beyond the scale of a single home environment. The next sets of drawings [FIGS. 55-59] illustrate the detailed implementation of the feature with examples of data formats, algorithms, real environment data and explanations of how a deployed system would operate.

Figure 41:
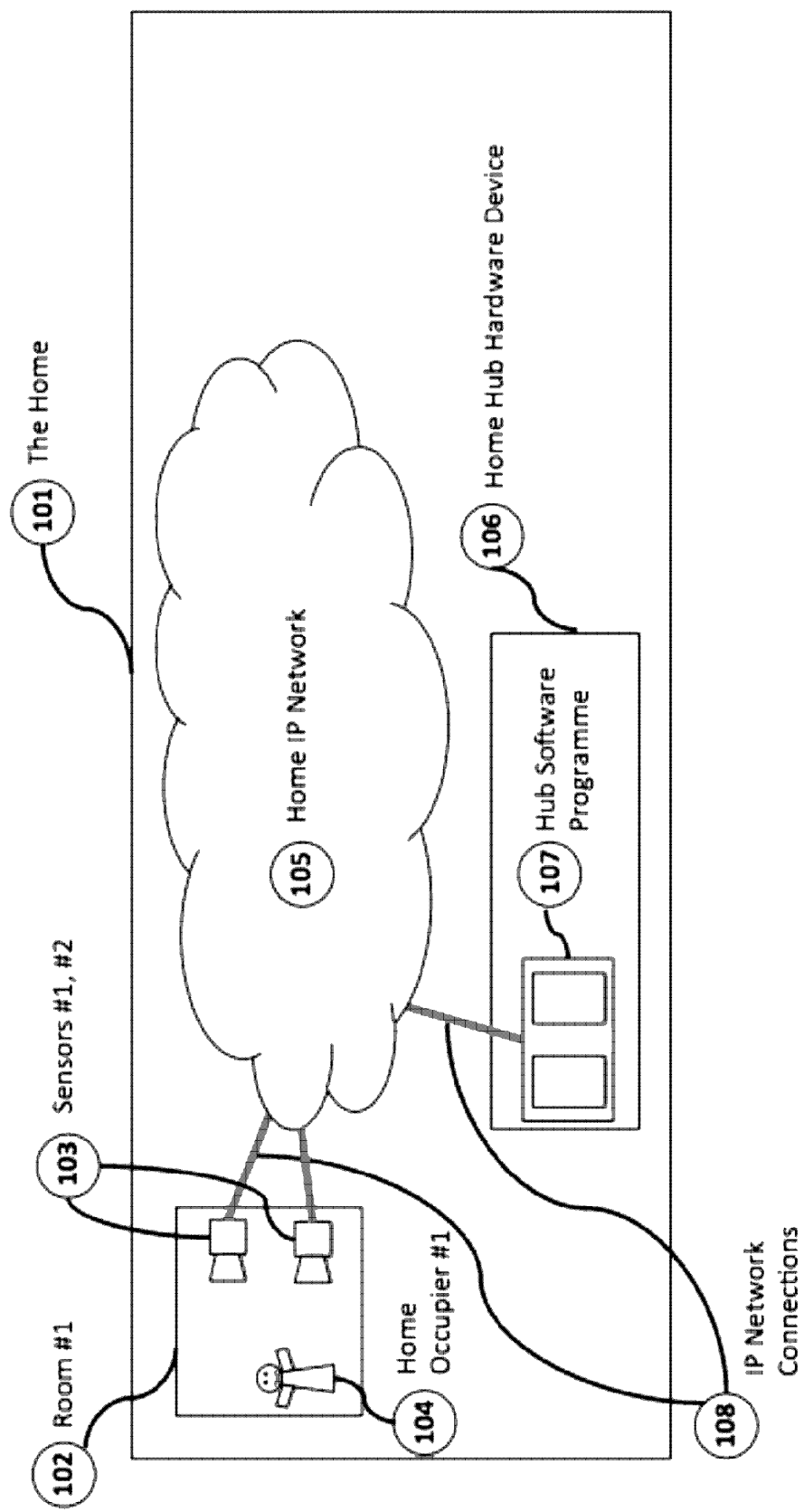
FIG. 41 is a diagram of a Smart home architecture with hub software.

FIG. 41: Smart home architecture with hub software—this is a diagram of a home [101] with a single room illustrated [102] that contains 2 sensors [103] and an occupier [104]. The 2 sensors are connected either wirelessly or by cable to the home IP networks [105], which is a standard IP network hubbed around a single IP router that is used to connect the home to the Internet. There is a device called a Home Hub Hardware Device [106] connected to the hub, again either wirelessly or by cable and this could be a standalone device, or could represent a set-top box for cable TV, or a gaming device such as the Microsoft X-Box, or other similar home device such as a computer connected the home IP network. Inside this hardware device is the "Hub Software Programme" which is the embodiment of the feature [107].

Figure 42:
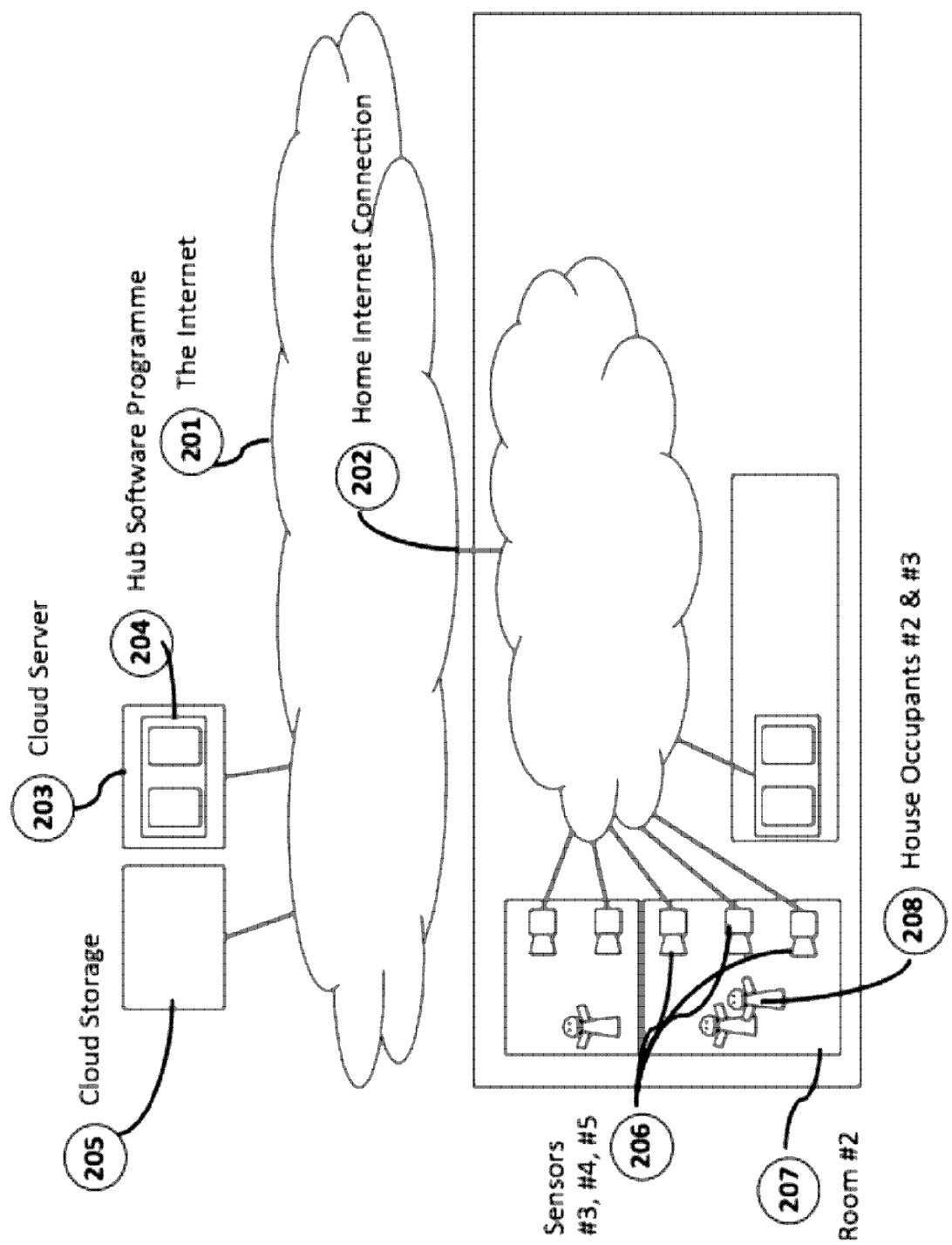
FIG. 42 is a diagram of an Internet connected smart home with more rooms and occupants shown.

FIG. 42: Internet connected smart home with more rooms and occupants shown—this is an extension of FIG. 42 with similar components that are not described again, such as the home, room 1 and occupant, the home IP network and the home hub hardware and software. This diagram illustrates that the home is connected to the internet [201, 202] which provides an alternative location for the "Hub Software Programme" which is the subject of this feature. In this diagram, the Hub Software Programme [204] is located on a server running as a cloud server connected to the Internet [201] such as a server located within an Amazon data centre. There is also some network attached storage [205] also located somewhere in the cloud infrastructure that can be used to store sensor data for audit or review in the future. For illustration purposes of an embodiment of the feature, a second room is added to the home [207] that contains 3 more sensors [206] marked numbers 3, 4 & 5.

In both FIGS. 41 and 42, the sensors in the rooms are feeding raw sensor data back to the Hub Software Programme continuously where it is being processed as described herein.

Figure 43:
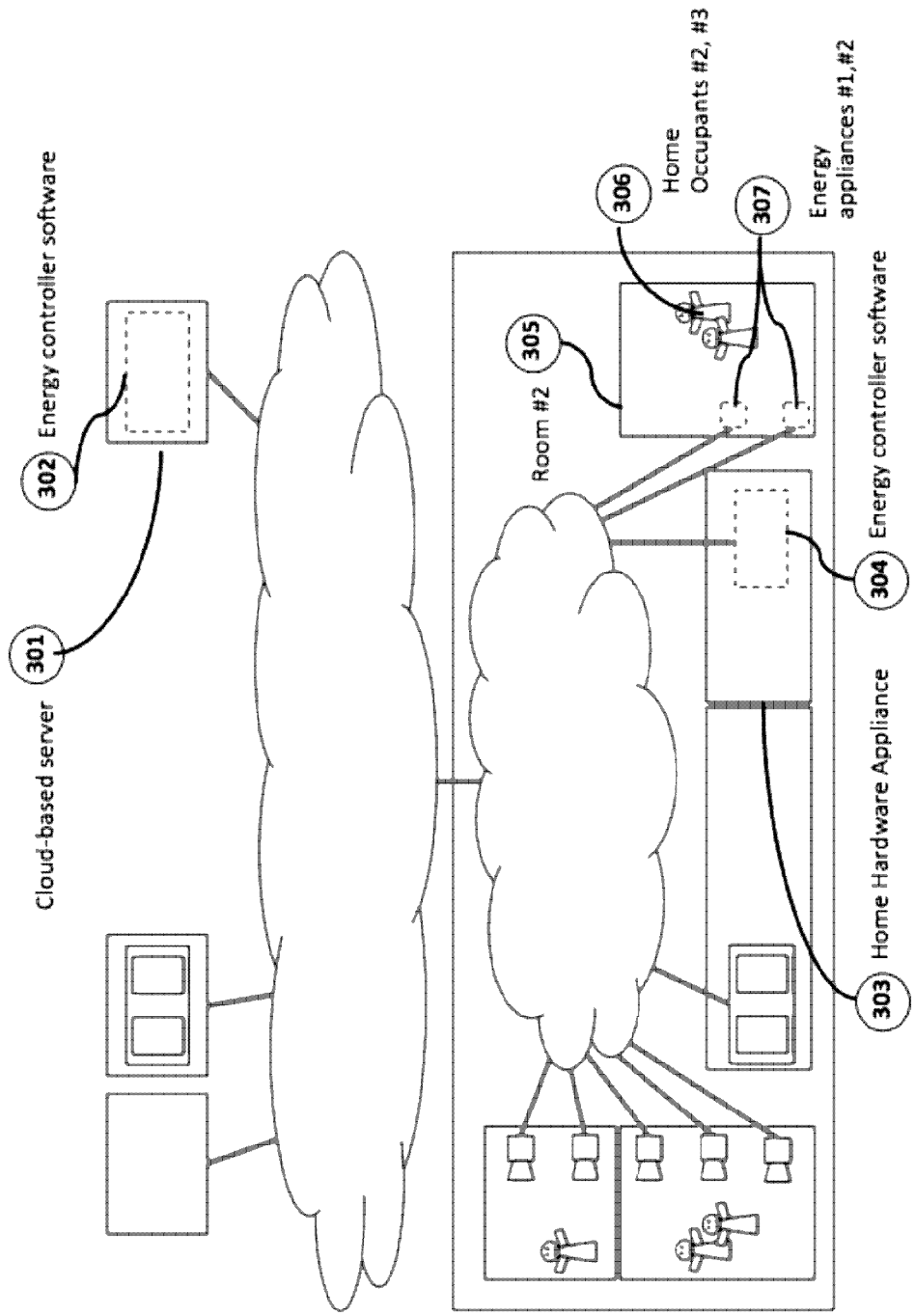
FIG. 43 is a diagram of a smart home with energy control system.

FIG. 43: Smart home with energy control system—this diagram is an extension of FIGS. 41 and 42 and for illustration purposes only, it shows Room 2 in another context on the right hand side of the diagram [305]. Note that this is not a $3^{rd}$ room in the house, rather it illustrates the other side of the smart home equation, which is the use to which the processed sensor data is being put. In the scenario illustrated here, the home occupants marked #2 and #3 [306] are in room 2, which has some energy appliances marked #2 and #3. There is now an energy controller, which could be both a hardware device and software or any combination therefor [304]. It could be located as shown in the same hardware device as the Hub Software Programme or it could be located in a different hardware device inside the home. The diagram also shows the possibility of the energy controller being located on a cloud server attached to the Internet. The sensors send raw data to the Hub Software Programme where it is processed and events are created. These events are pushed across the network to the energy controller that has direct control over the energy appliances shown in room 2. This system allows the energy controller to recognise that occupants #2 and #3 are in the room and therefore adjust the energy system to provide a desired temperature for those occupants as per their own personal settings, while also optimising other parameters such as the overall energy bill of the household. The workings of the energy controller, preferences of the occupiers in this regard and the energy appliances are for illustration purposes and this feature does not relate to the technology contained in those devices or methods. There is a clear interface between the feature disclosed and such systems, which is the pushing of an event in the form of a JSON-based data interchange between the Hub Software Programme and the energy controller through an IP network.

Figure 44:
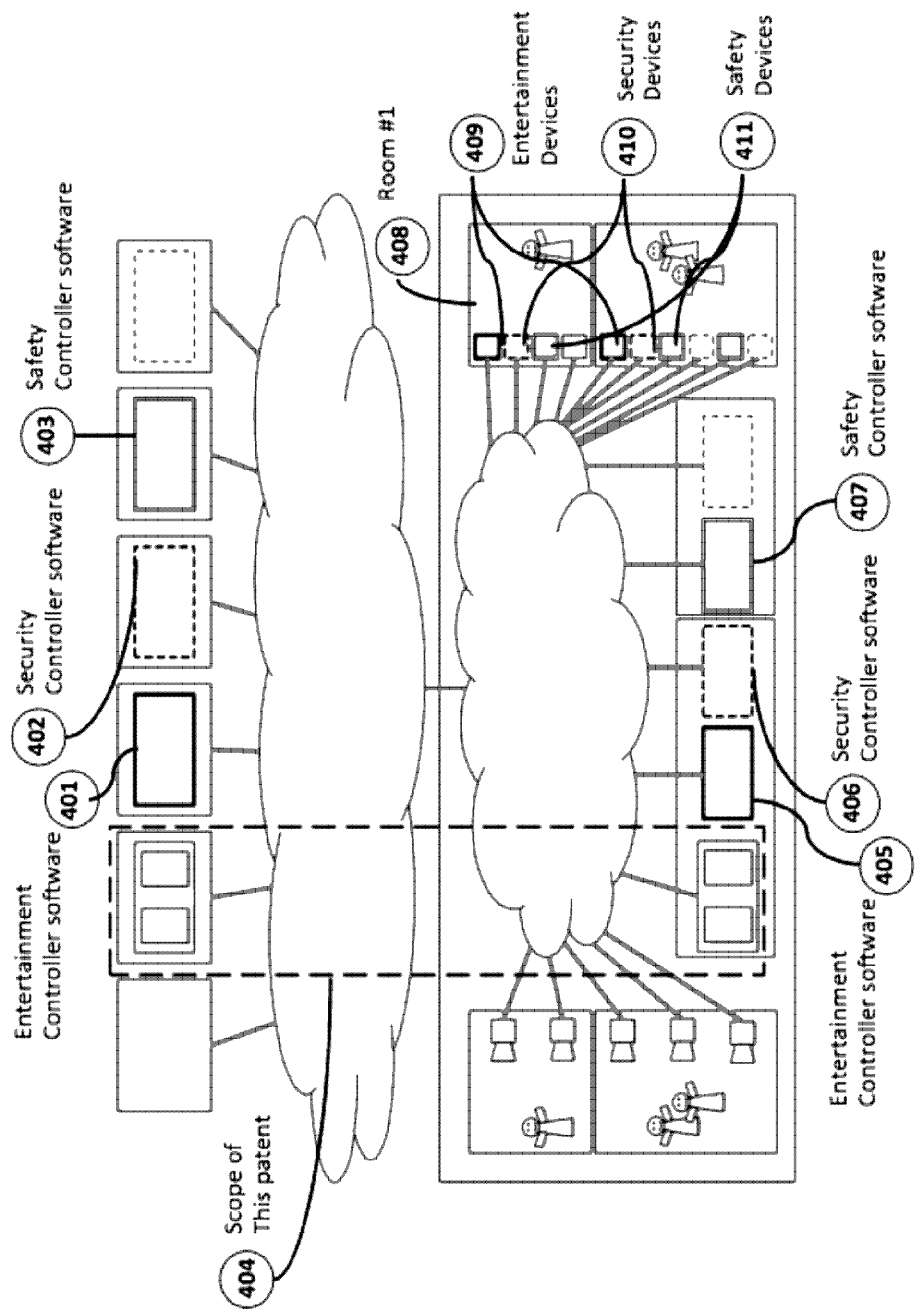
FIG. 44 is a diagram of a smart home with 4 controller systems: energy, safety, security and entertainment.

FIG. 44: Smart home with 4 controller systems: energy, safety, security and entertainment—this diagram is an extension of FIG. 43, whereby several other system controllers are illustrated such as an Entertainment controller [401], a Security controller [402] and a home Safety controller[403] located in cloud servers connected to the home via the internet. Each of these controllers behaves in the same way as the energy controller described in FIG. 43 above. They all belong to $3^{rd}$ party service providers and they each receive a set of events pushed to them from the Hub Software Programme. Each individual system may have its own controllers located within the home also such as shown [405, 406, 407]. Each of the controllers, whether in the cloud or in the home itself may have devices that they can control as illustrated by [409, 410, 411] shown in Room #1 [408]. Overall note that the scope of this implementation is limited to the Hub Software Programme [404] located either in the home on a suitable hardware device or in the cloud on a suitable server connected via the internet to the home IP network.

Figure 45:
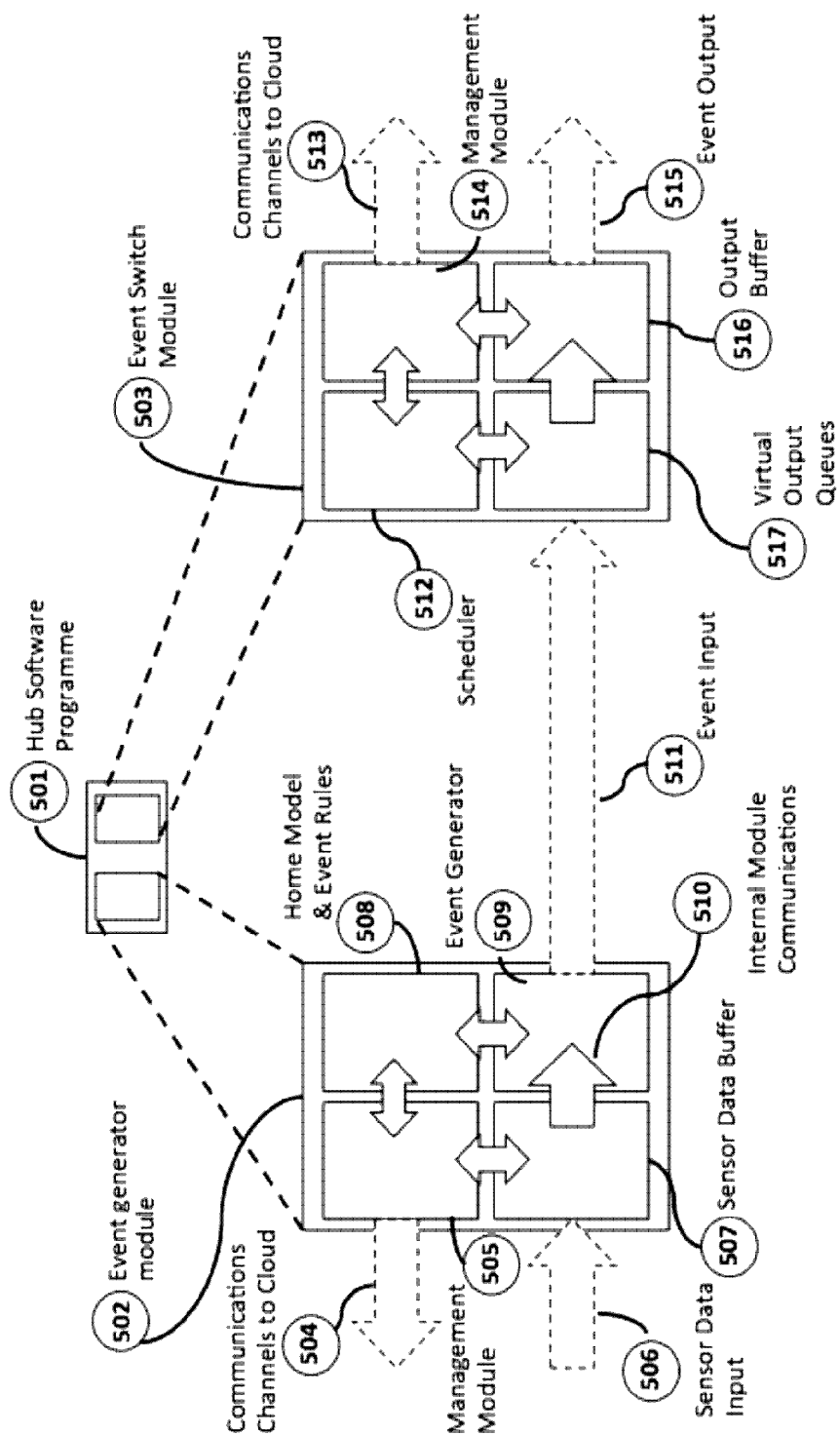
FIG. 45 is a diagram of a Hub Software Programme architecture and components.

FIG. 45: Hub Software Programme architecture and components—This diagram illustrates the main architectural components of the Hub Software Programme [501]. There are 2 major parts to the Hub Software which are the Event Generator module [502] and the Event Switch module [503].

The Event Generator module shown on the left hand side then has 4 components to it, which are (counter clockwise from top left) a Management Module [505], A Sensor Data Buffer [507], an Event Generator module [509] and a Home Model & Event Rules module [508]. These components are dealt with separately in FIG. 46 below, but in general they combine to produce individual events which are human recognisable actions such as leaving a room and entering another room, built up from the combination of multiple sensor outputs (shown as Sensor Data Input [506]) combined over specific time periods. Each event generated by the Event Generator module [502] has a unique rule associated with it that is used to calculate the event and all events relate to one or more services that provide the events to the user via a web services connection model.

The Event Switch module shown on the right hand side then also has 4 components to it, which are (counter clockwise from top left) a Scheduler Module [512], a Virtual Output Queue module [517], an Output Buffer module [516], and a Management Module [514]. Events are passed to the Event Switch from the Event Generator module [511], where they are queued according to their subscriber and their class of service. This means that a subscriber such as a provider of home Energy solutions, can subscribe or ask for certain events to be sent to it [515]. Each event type will be given a class of service so that more important events can be given priority in the event of multiple events existing in the queues that are competing for limited output resources on the IP network. For example, a safety related service may be given higher priority than an entertainment related service. Each class of service shall have a known latency and guaranteed level of service (e.g. reserved bandwidth capability) in order to create a commercially sound interface between service provider and service subscriber, one on which $3^{rd}$ party engineering systems may be built to sufficient robustness to charge the homeowner for a level of guaranteed service.

Note that the management modules [505][514] communicate with a management server located in the cloud and connected via the Internet to the Hub Software Programme host hardware [504][513]. These are separate communications channels logically separated from the dataflow through a separate web services interface. These channels are used to pass updated sets of rules, updated subscriber information and updated models of the house to the Hub Software Programme from the management system based in a data centre cloud operating system.

Figure 46:
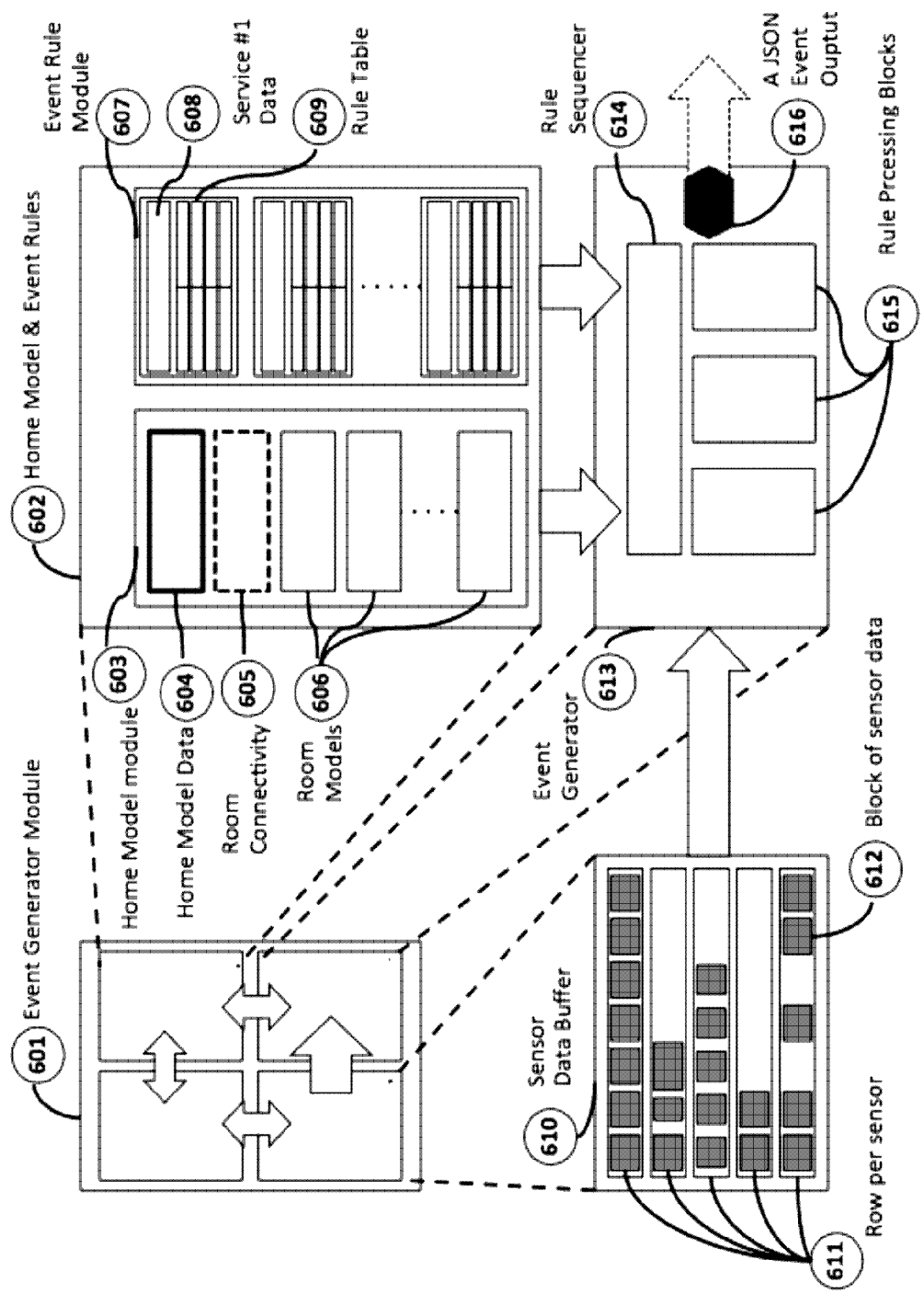
FIG. 46 is a diagram of an event generator module architecture and components.

FIG. 46: Event Generator Module architecture and components—this is a more detailed view of the Event Generator Module on the left hand side of the overall Hub Software Programme illustrated above in FIG. 45. The Event Generator Module [601] has 4 component modules, 3 of which are described in this diagram. The $4^{th}$ module, the management module is not described in more detail as it consists mainly of a means to communicate persistent data to a management server and receive updates of the various operational configurations required for the other 3 modules.

Starting at the top right and moving around clockwise, the first module is the Home Model and Events Rule module [602]. This contains two sets of data, the Home Model set of data [603] and the Event Rule set of data [607]. The Home Model set of data is a simplified model of the home [604], of the room connectivity [605] and of each individual room [606], which contains information about the size, shape, content and make up of each room in the home in a format that the rules for event creation can use to determine desired event occurrences such as movement of occupants between rooms. Each Service such as Service #1 shown here [608] contains a set of rules for event calculation. These rules take the sensor data from multiple sensors and combine them in an algorithmic fashion over a defined time period to ascertain patterns and create events from those patterns, such as the movement of an occupant from one room to another may be an event service that an energy controller system could subscribe to. The rules are stored in a Rule Table [609], and there is a Rule Table per Service.

On the bottom right is the Event Generator [613]. This comprises of a Rule Sequencer [614] and a set of Rule Processing Blocks [615]. The Rule Sequencer creates an ordered list of when each rule is to be calculated so that it can meet its particular service performance levels. The Rule Processing Blocks take each rule and break it down into a series of calculations that are performed in sequence. There are multiple blocks to allow a "manufacturing line" sequencing of rule calculations in order to optimise processing time. The output [616] is an Event formatted in Javascript Object Notation (JSON), which is then sent to the Event Switch described further above.

On the bottom left is a Sensor Data Buffer [610] which receives blocks of sensor data [612], e.g. in the form of XML files, and queues them based on the sensor they came from. This queue is essentially a 2-D matrix of data for each sensor [611] over a time period equal to the length of the available memory buffer. The buffer should be long enough to hold a sufficient amount of incoming sensor data required to calculate the various service rules, given their expected timeframe, e.g. moving from one room to another is an event that could take up to 20 seconds, so the buffer should be capable of holding 20 seconds worth of data.

Figure 47:
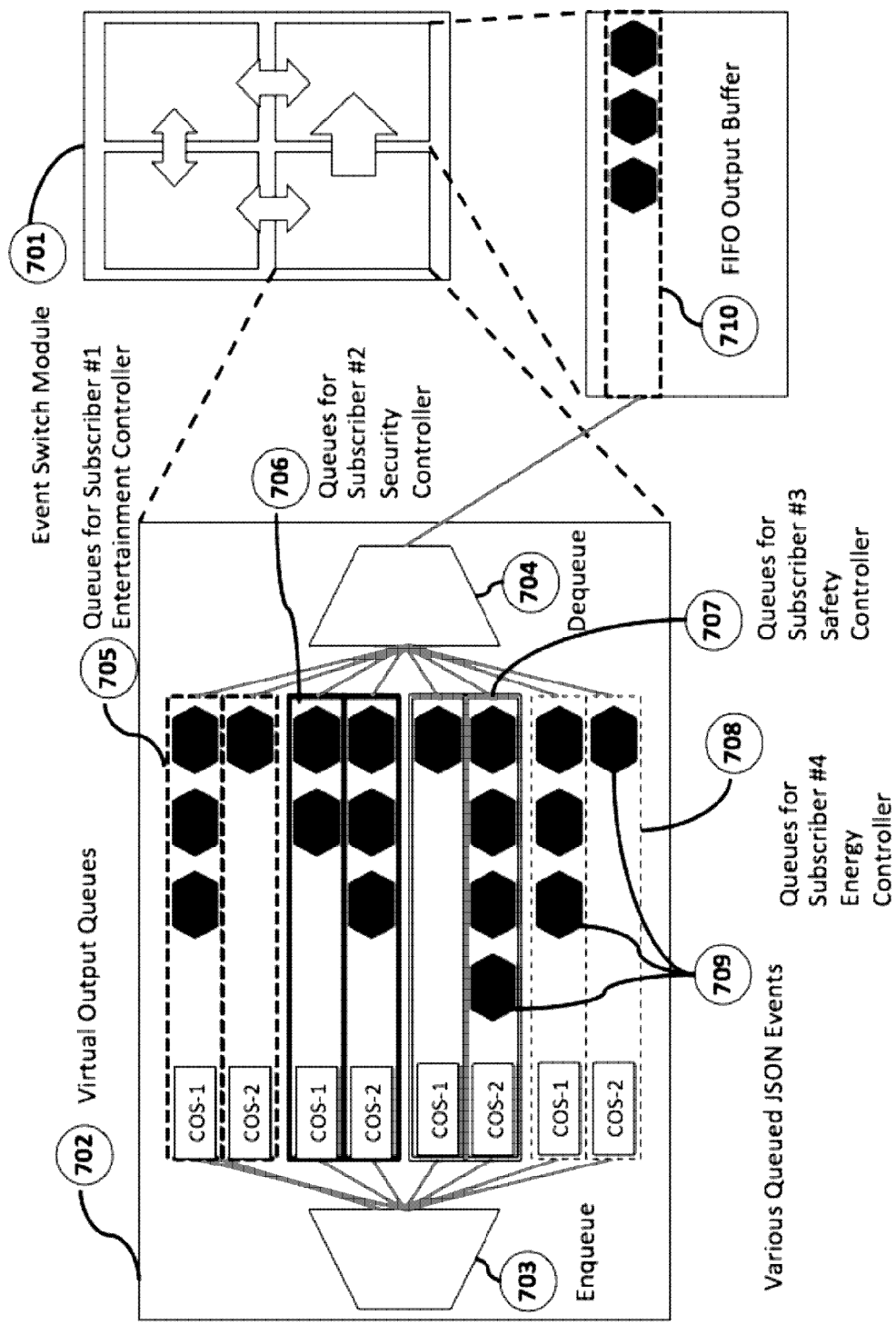
FIG. 47 is a diagram of an event switch module architecture and components.

FIG. 47: Event switch module architecture and components—this is a detailed view of the second major component of the Hub Software Programme which is the Event Switch Module [701]. As mentioned when describing the first major component, there is a management module indicated by the top right segment of the component [701] which performs data persistence functions and Operations, Admin and Maintenance (OAM) functions that are not detailed here. It also allows scheduling algorithms within this block to be updated or modified. The top left segment is the scheduler indicated in a previous diagram and more detail is given in a diagram further below.

This diagram then focuses on the bottom left and bottom right segments of the component [701]. The bottom left is the set of Virtual Output Queues [702], which receives Events in JSON format from the Event Generator and enqueues them [703][709] into a Virtual Output Queued buffer in preparation for scheduling and switching the Events to an Output FIFO buffer [710]. It achieves this by using class of service to dequeue the events [704] in a particular order determined by the scheduler. In this diagram, there are 4 sets of queues, one for each of 4 current services [705][706][707][708]. Within each of these service sets the events are then queued based on their class of service. So effectively events are queued based on their destination which is the subscriber who has subscribed to an event service, and within that destination the sequence of events being sent is determined by the class of service. Given that there may be many subscribers and only one or two network output channels to transmit the events, this must necessarily switch the queued events into those output channels based on the scheduler rules applied and the resources e.g. bandwidth available.

Figure 48:
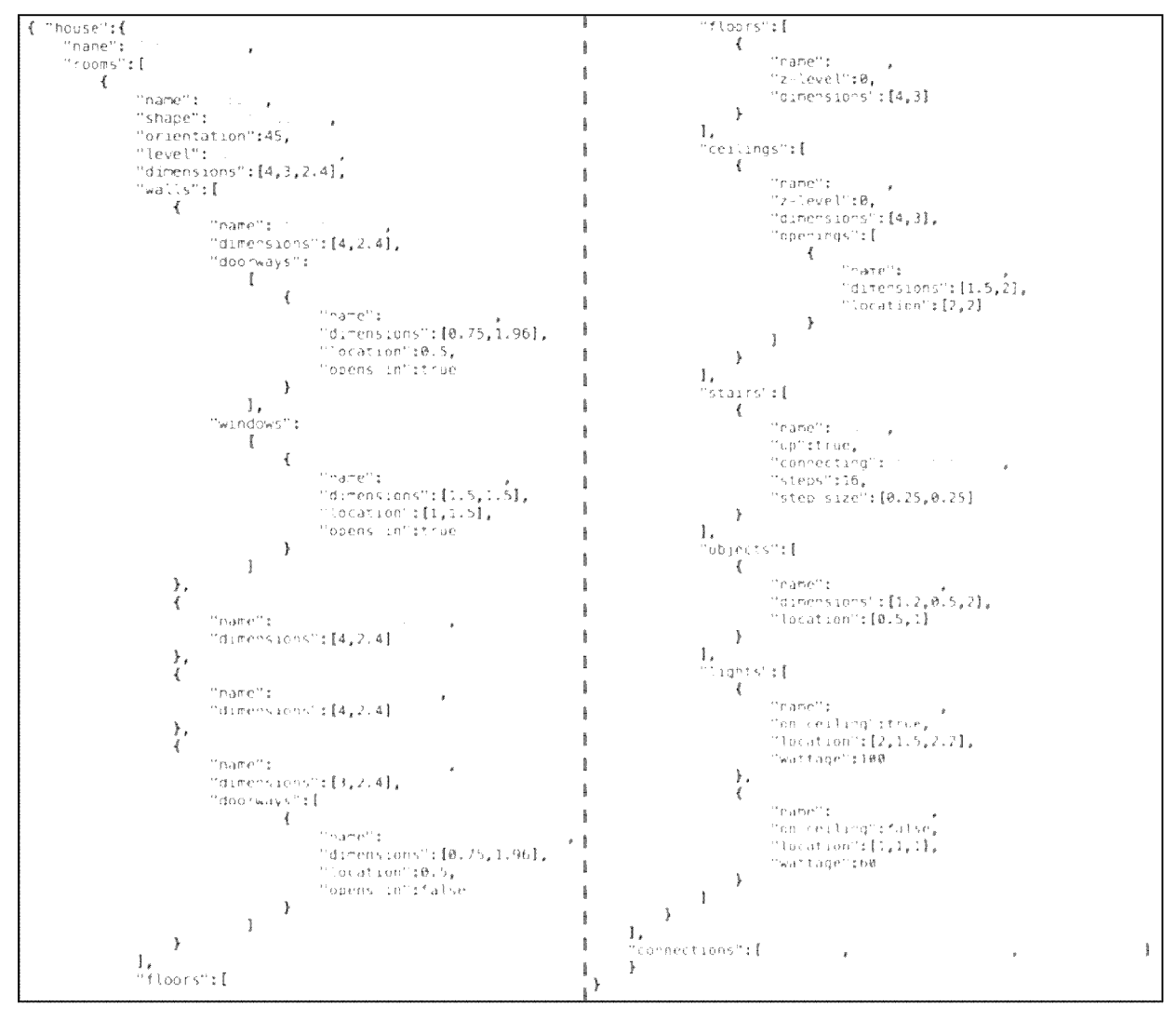

FIG. 48: A house model using JSON notation—this diagram is a coding example of a JSON-based data model for the smart home. The home is given a name first, and then there is an array of room objects with various parameters described. Each room is given a name, a shape, an orientation. Then the walls, floors and ceilings are given single or multiple levels and their dimensions are described which also then provides the overall dimensions and volume of the room implicitly. Doorways, windows, objects and lights are also provided in this example, but the model is inherently extensible to many other parameters that may be required to produce intelligent events related to the physical home itself. Finally, an array of connections for each room provides the model with the ability to map out how each room connects to each other room in the home. This model is sent using JSON directly to the management module of the Event Generation module and can be updated as the home changes at any time using an online management interface hosted in a cloud based server accessed through the internet. Dimensions shown as either integers or decimal numbers are all given in meters in this example. Specific header information may be included that states the units of measurement.

FIG. 49: An Event in JSON Notation—this figure is a code snippet illustrating a JSON-based data format for an event in the home. In this case the event is an occupant changing room and the service is called "Presence-A". This event generation service has class of service 2 as it is not considered a safety or security hazard as it is based on the normal day-to-day movement of a recognised occupant within the home. In this instance, the people that this event reports on are "homeowner" and "child1". Note that the people do not have to be named for privacy reasons for the system to operate successfully. In fact the system never needs to know the occupants names. Although in this instance, the occupants are given relevant titles to distinguish them from each other. The recognition would typically be done using a snapshot of a suitable angle of the face which is then sent to $3^{rd}$ party facial recognition software.

The event also lists the subscribers to that event, information which allows it to be queued correctly in the virtual output queue within the event switch module. In this instance, 5 subscribers are shown with their brand name and their service type that they provide to the occupants of the smart home. The event shows the start and end times and the start and end positions of two occupants moving from the hall to the kitchen. Note how the event is readable and contains very little technical detail so that it can be easily interpreted by many different service designers and user interface designers.

FIG. 50: An Event Rule in JSON Notation—this diagram shows a code snippet of a JSON-based data rule for generating events. Each service can have many different rules and as services and added or removed, the list of event rules can be updated through the management module of the Event Generation module using a web based management interface. In this instance, the rule is described as a "Room Change Rule" which simply generates an event when specific occupants move between rooms.

Initially the rule is given a unique ID, the name of the service it pertains to and a class of service level (2). Then the subscribers to the service are listed. This helps the Event Generator to schedule the rule calculations so that the correct rules are calculated for the correct time slots. It is also how an Event that is generated is given its subscriber list so that it can be queued later in the output process.

There is an include and an ignore people list, so that certain occupants movements are either included in the rule calculation or note. The sensors involved are listed, and finally a time window is given. Of course many more sophisticated rules can be generated in this manner. A human readable description of the rule is provided at the end for user interface purposes when the event is pushed to the subscribing systems and they involve user interfaces, such as an energy control panel, or the TV screen of an entertainment system.

Figure 51:
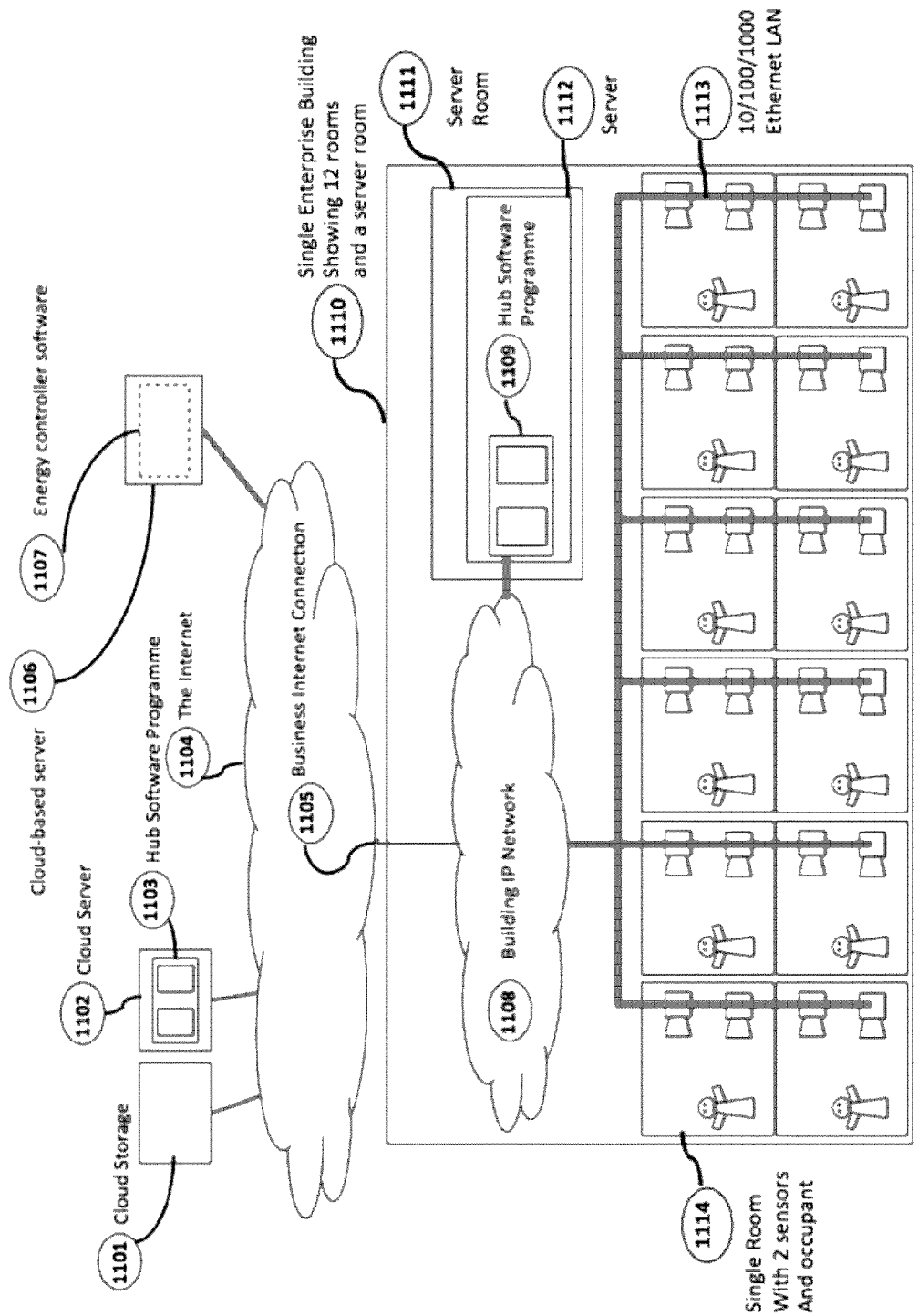
FIG. 51 is a diagram with an example of an application to an enterprise single building.

FIG. 51: Application to an Enterprise Single Building—the feature can also be applied to larger scale buildings beyond the size of a single home. In this diagram, the solution is illustrated for an Enterprise Building [1110] with 12 offices [1114] and a server room [1111]. The building has its own internal IP network [1108], which is connected to the Internet [1104] via a business Internet connection [1105]. There are 2 sensors shown per room and 1 occupant [1114], and all sensors are connected to the internal IP network [1108] via a 10/100/1000 Ethernet LAN [1113].

In this scenario, the Hub Software Programme [1109], is located either on a server [1112] in the server room within the building [1111], or in a cloud server with networked storage connected to the building via the Internet [1101] [1102][1103].

A single subscribed service is illustrated as an Energy Controller [1106][1107] located in the cloud which receives events via the internet and can control the energy systems in the building remotely. Note that the Energy Controller could of course reside somewhere in the building too if required. The feature works exactly the same way no matter where the Hub Software Programme is located or where the Energy Controller subscribing to the service is located as long as they are connected via an IP network to each other and to the sensors involved.

Figure 52:
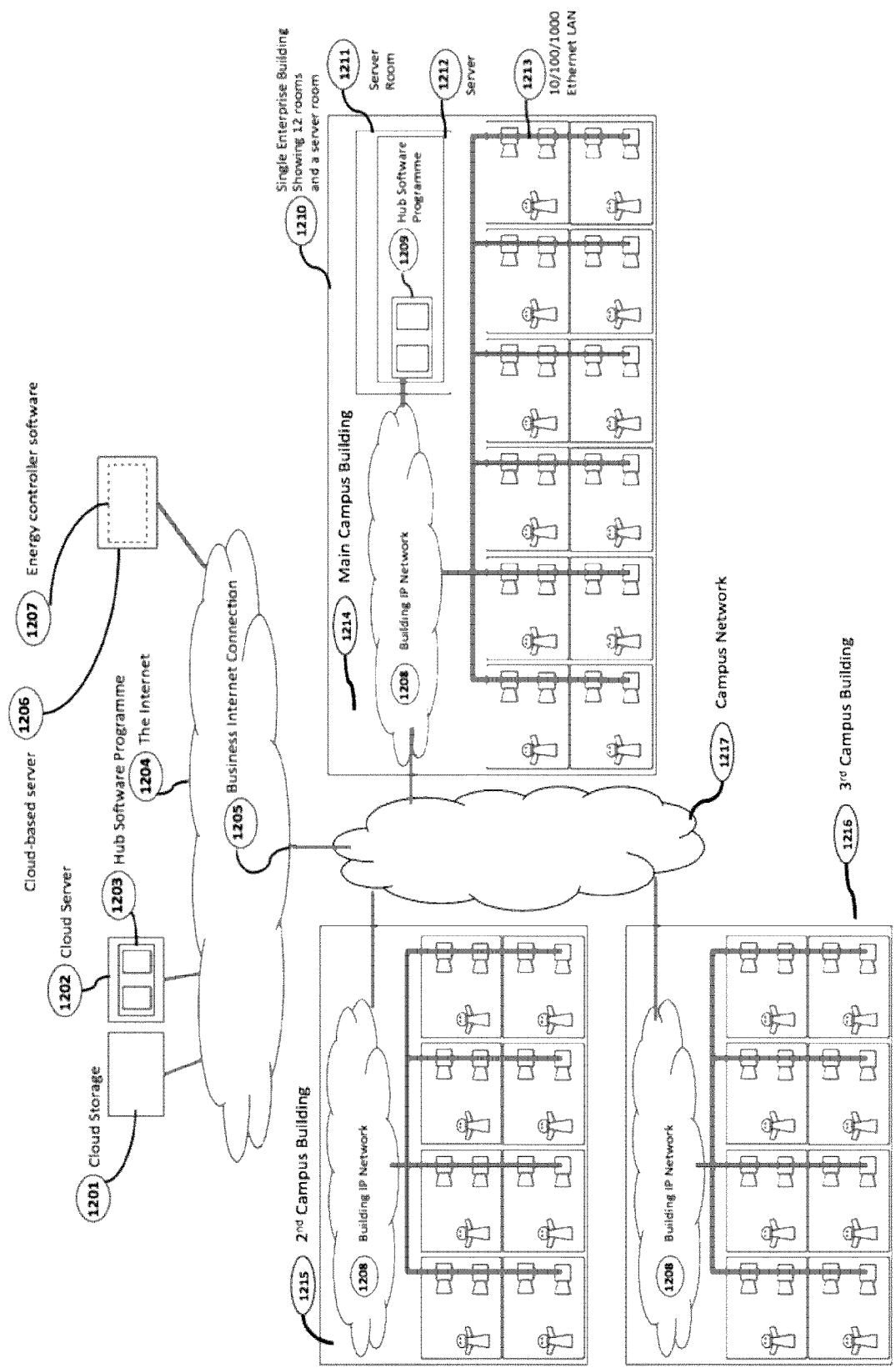
FIG. 52 is a diagram with an example of an application to an enterprise campus of buildings.

FIG. 52: Application to an Enterprise Campus of Buildings—this diagram illustrates the application of the feature to an Enterprise Campus of Buildings which consists here of a Main Campus Building [1214], and a $2^{nd}$ smaller campus building [1215] and a $3^{rd}$ small campus building [1216]. Each building has various rooms with sensors and occupants in similar fashion to the smart home and smart building mentioned above. Each building also has its own Building IP Networks [1208], and all 3 buildings are then interconnected with an IP Campus Networks [1217]. There is a business internet connection [1205] connecting all buildings to the internet [1204] via the campus wide network [1217].

The Hub Programme Software is either located in one of the buildings which is large enough to have its own server room [1209][1211][1212], or it is located in the cloud [1201][1202][1203]. A campus energy controller also located in the cloud is shown [1206][1207], but as before both the Hub Programme Software and Energy Controller can be situated in either the cloud or somewhere on the campus as long as they are connected together via the IP network or the Internet, and connected to the sensors [1213].

Figure 53:
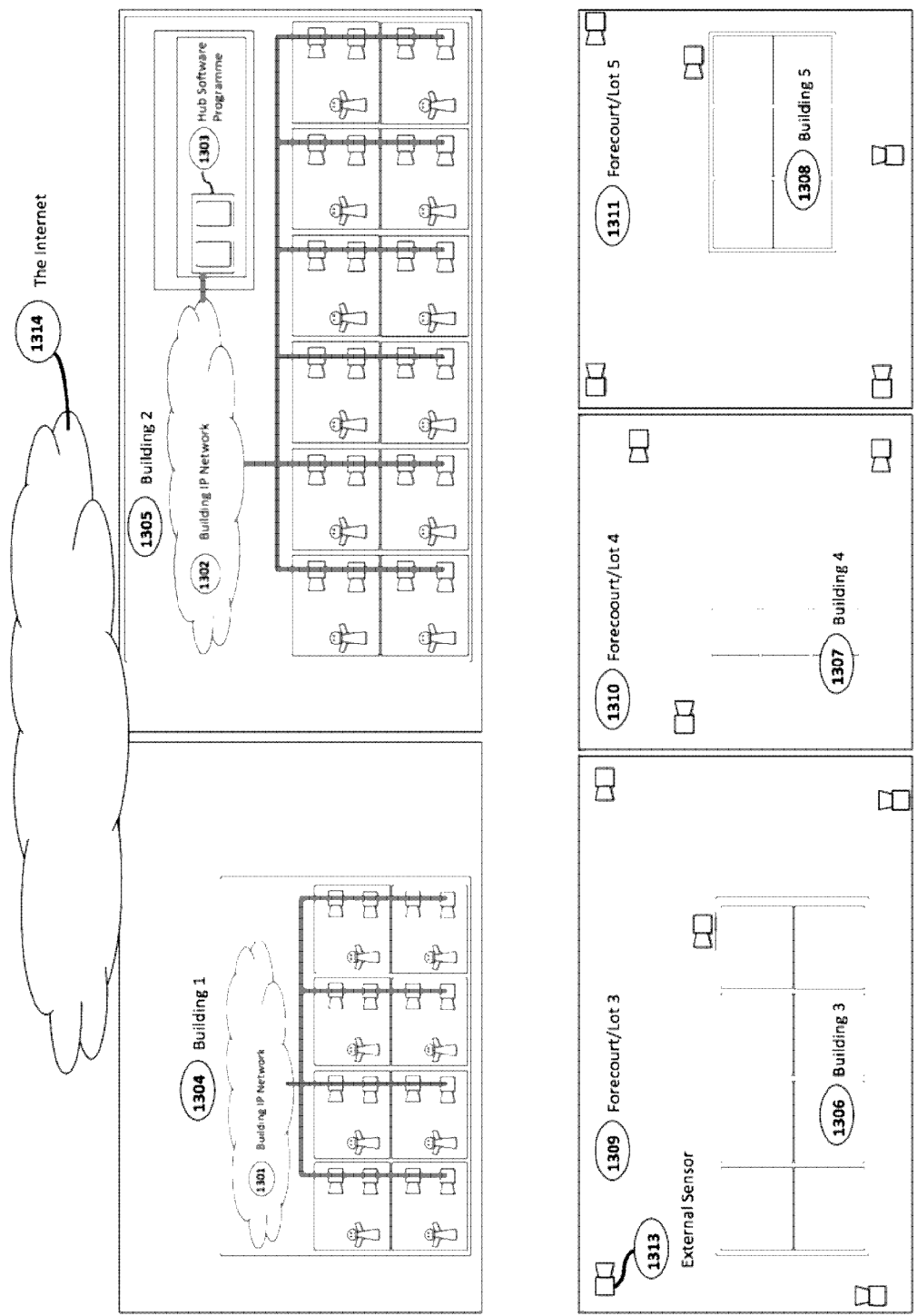
FIG. 53 is a diagram with an example of an application to a city block.

FIG. 53: Application to a City Block—this diagram illustrates the application of this approach to a City Block (or street) with 5 buildings [1304][1305][1306][1307][1308]. The last 3 buildings also have Forecourt areas or Lots which also have external sensors or cameras [1313] distributed throughout [1309][1310][1311].

All of the same application ideas apply to this street scenario as with the other scenarios described above as long as all the components are networked together. For external cameras/sensors this may in fact involve a mobile (wireless) network connection through to the Internet and cloud based servers involved.

Figure 54:
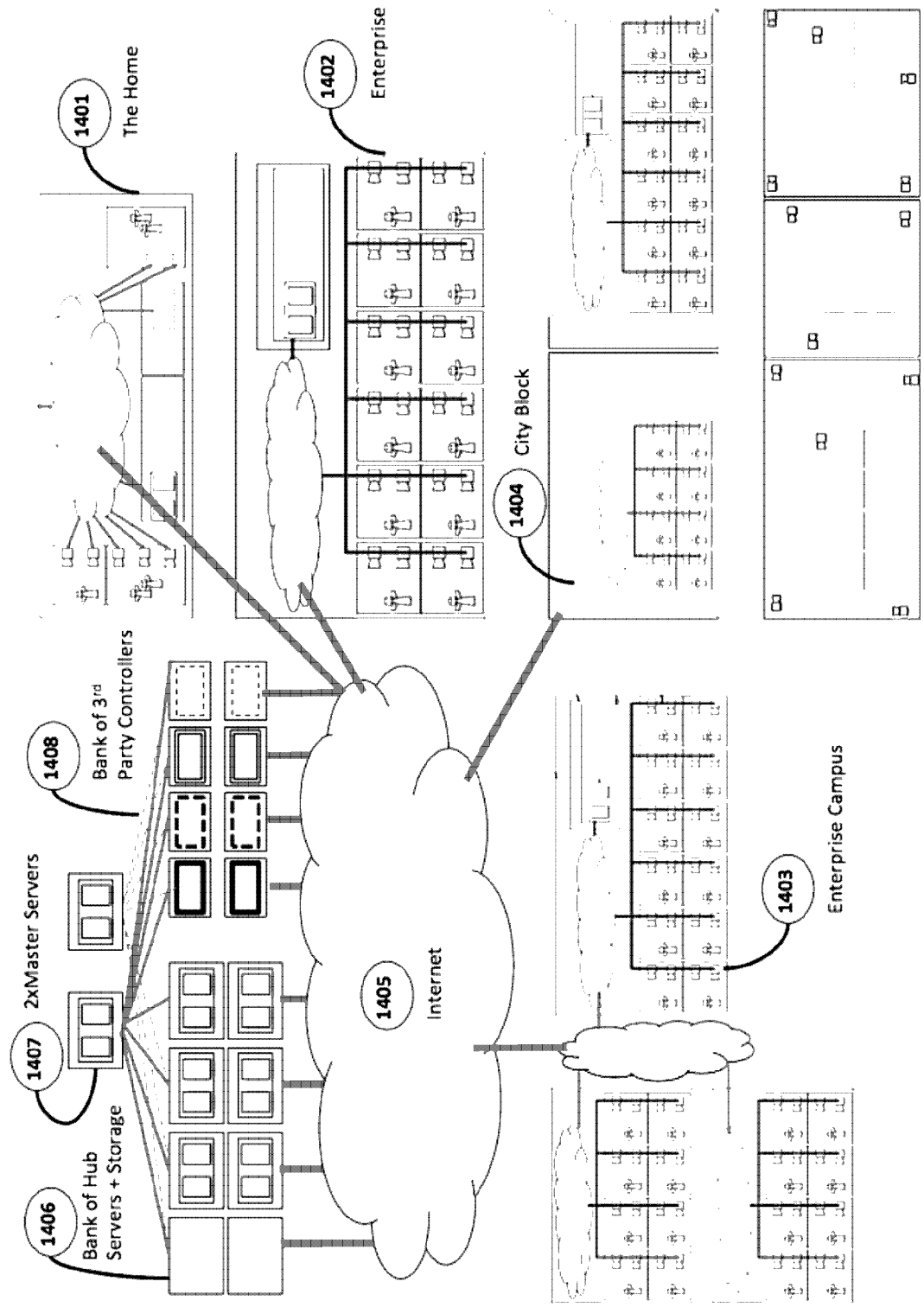
FIG. 54 is a diagram an example of a simultaneous application to a smart home, enterprise campus and city block.

FIG. 54: Simultaneous Application to a Smart Home, Enterprise Campus and City Block—this final application diagram illustrates how the same feature can be applied to all of the above scenarios simultaneously by banking together multiple instances of the Hub Software Programme in the cloud [1406]. The diagram show a smart home, smart enterprise building, smart enterprise campus of buildings and a street or city block scenario [1401][1402][1403][1404] all connected back through the internet to a bank of servers hosting the Hub Software Programmes for each, and also then connected to a bank of suitable controllers [1408].

Note that it is possible to add a Master Server which can act as a hub for the multiple hubs and controllers, and there is a second such Master Server shown for redundancy [1407]. These Master Servers may do little more than aggregate the events from each Event Generator and create a single Event Switch, or they may also act as a second tier of multiple Event Generators and Event Switches that sits above the initial bank and provides a set of global events from all the attached locations into the subscriber services and controllers.

FIG. 55: Raw Data From Sensor—this diagram gives an example of the raw data that is produced by a smart camera sensor for tracking people and object movement and position in the various scenarios described. On the left hand side is a structured standardised XML document architecture [1501] describing how the raw data from each sensor can be packaged up for transmission back to the Hub Software Programme. When it arrives there, it can be parsed and then used for calculations in the Event Generation module.

There is a header first with configuration information, followed by a list of sensor identifiers in case there is more than 1 sensor involved at that location and all sensors can add their data into the same XML file for efficient transmission back the Hub Software Programme. Next in the XML file is a list of objects that have been discovered, some of which are placed into intelligent groups (e.g. body, head and shoulders detections might be combined to form a group representing a person). Finally the groups can be connected in time from one frame to the next via the Track grouping method.

On the right hand side is an example of a real XML sensor data file taken from a deployment at an electronics store. This example illustrates how the information for each grouping is bundled into a <set> element, and there is detailed information about each object such as the attributes of its size, parameters used during detection, its coordinates, its angle (pitch, roll and yawl) various identifiers.

While XML is well suited to the engineering level data produced by each sensors due to its structure and extensibility, the events generated have to end up with human readable form and be used in client-server architectures with the smallest size possible, and so the events are then generated in JSON format as described above rather than XML.

Figure 56:
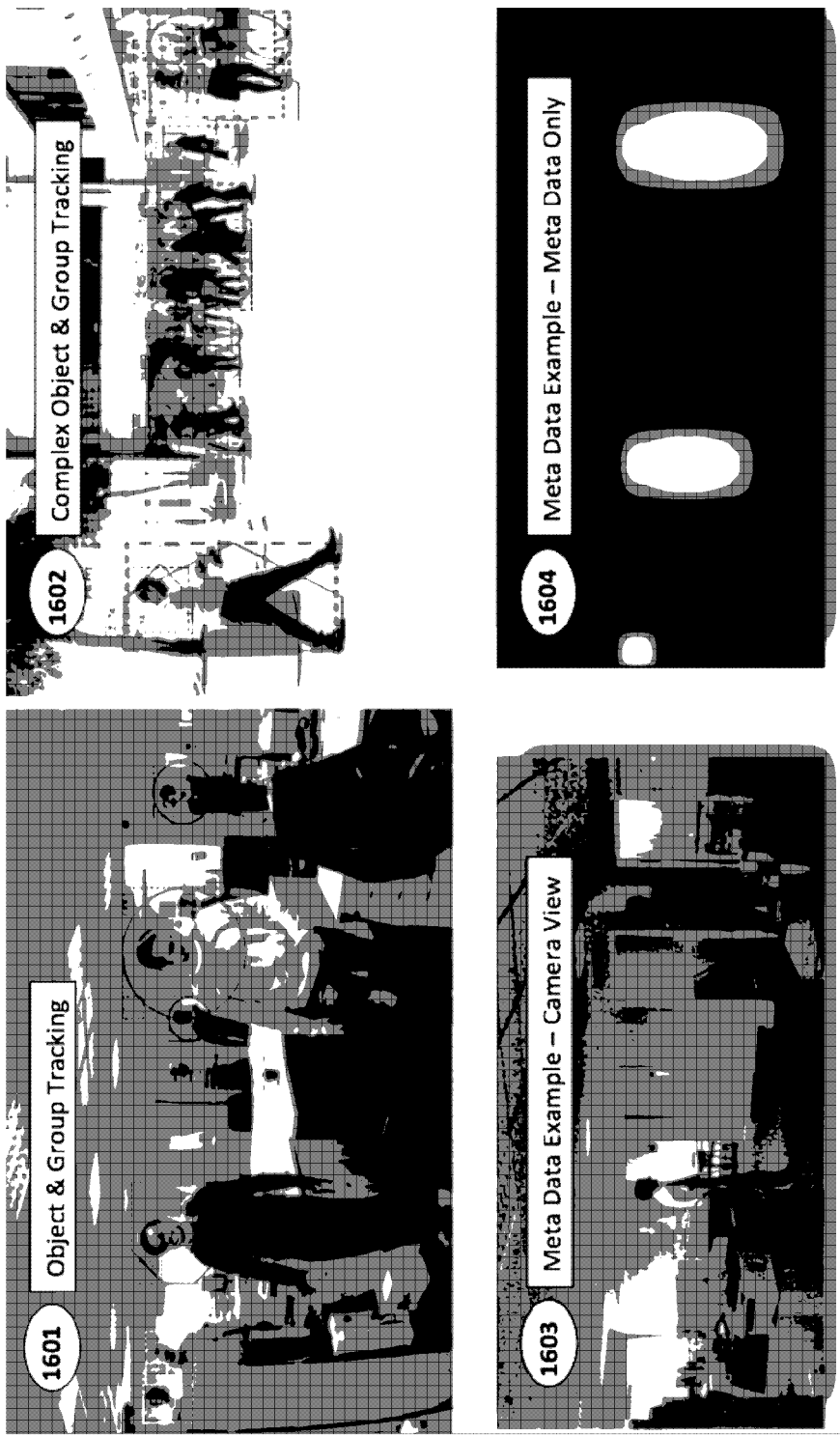
FIG. 56 shows examples of sensor object, group and track.

FIG. 56: Sensor Object, Group and Track Examples—this diagram illustrates the real world tracking data that a smart sensor produces and which will feed into the Hub Software Programme. The examples are taken from smart camera sensors produced by ArtofUs using machine vision techniques to identify people [1601][1602][1603] and then representing them as "ghost" forms with metadata [1604], thus retaining the privacy of the individual while allowing real world information to be passed to the Event Generator for the Hub Software Programme to build a useful service.

Figure 57:
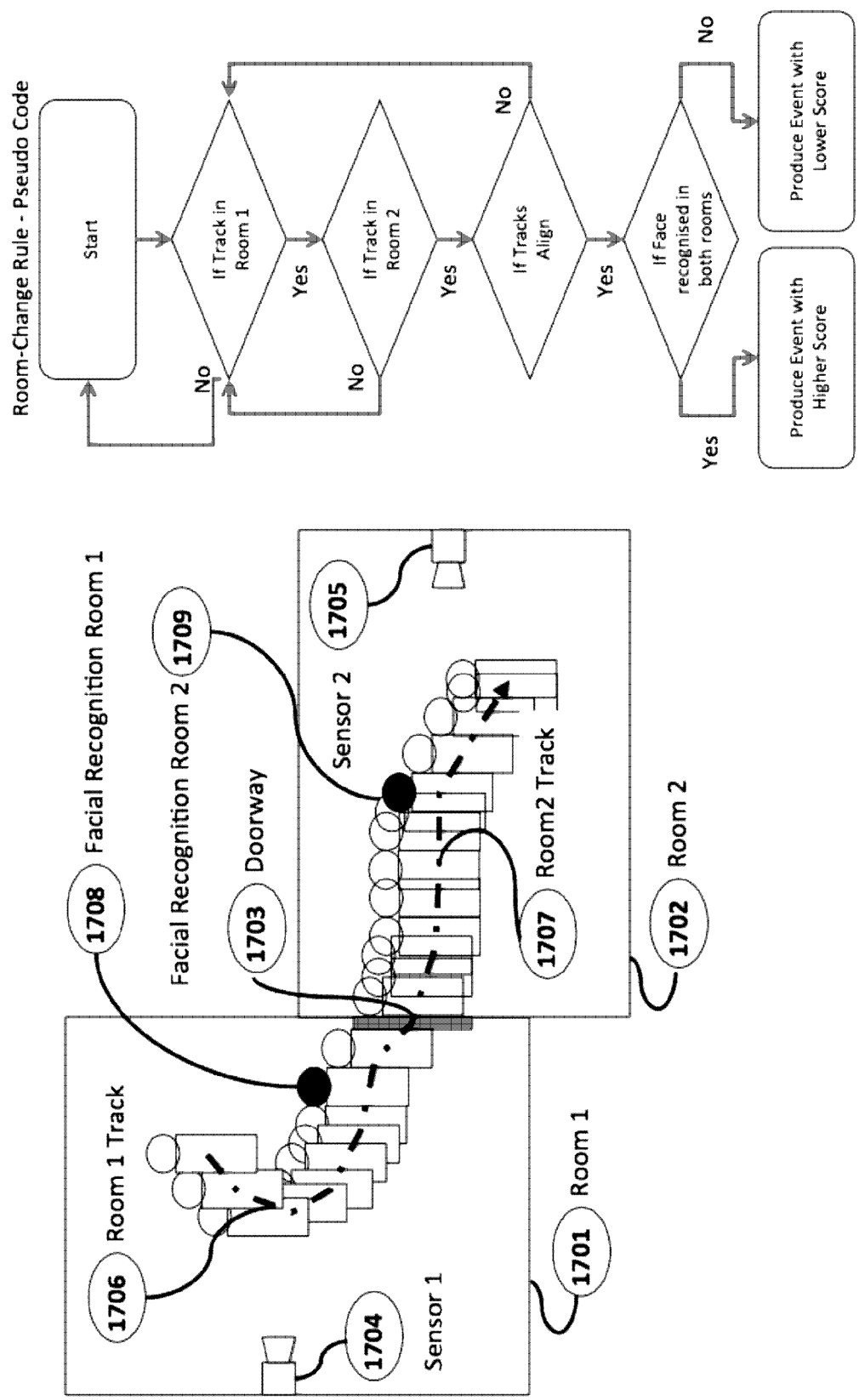
FIG. 57 is a diagram of a rule implementation.

FIG. 57: Rule Implementation—this diagram gives and example of how a simple rule can be implemented for using the raw sensor data from two sensors in adjoining rooms and working out if an occupant has moved between the rooms. On the left hand side are the 2 rooms [1701][1702], both with a camera sensor [1704][1705] and the rooms are connected via one doorway [1703]. Initially the occupant is in Room 1 but is tracked moving towards the door [1706]. A new track is created in Room 2 [1707] when the occupant enters that room and comes into view of the camera inside.

The right hand side of the diagram shows a Pseudo-Code illustration of a rule using a flow diagram for the Pseudo-Code logic. This simple Room-Change Rule tries to match the tracks in both rooms over a time period to see if indeed an occupant in one room has moved to another room. There is a confidence level then associated with the result which is increased if facial recognition algorithms have matched the occupant in Room 1 to the occupant in Room 2 and assessed that they are indeed the same person who has changed rooms.

Figure 58:
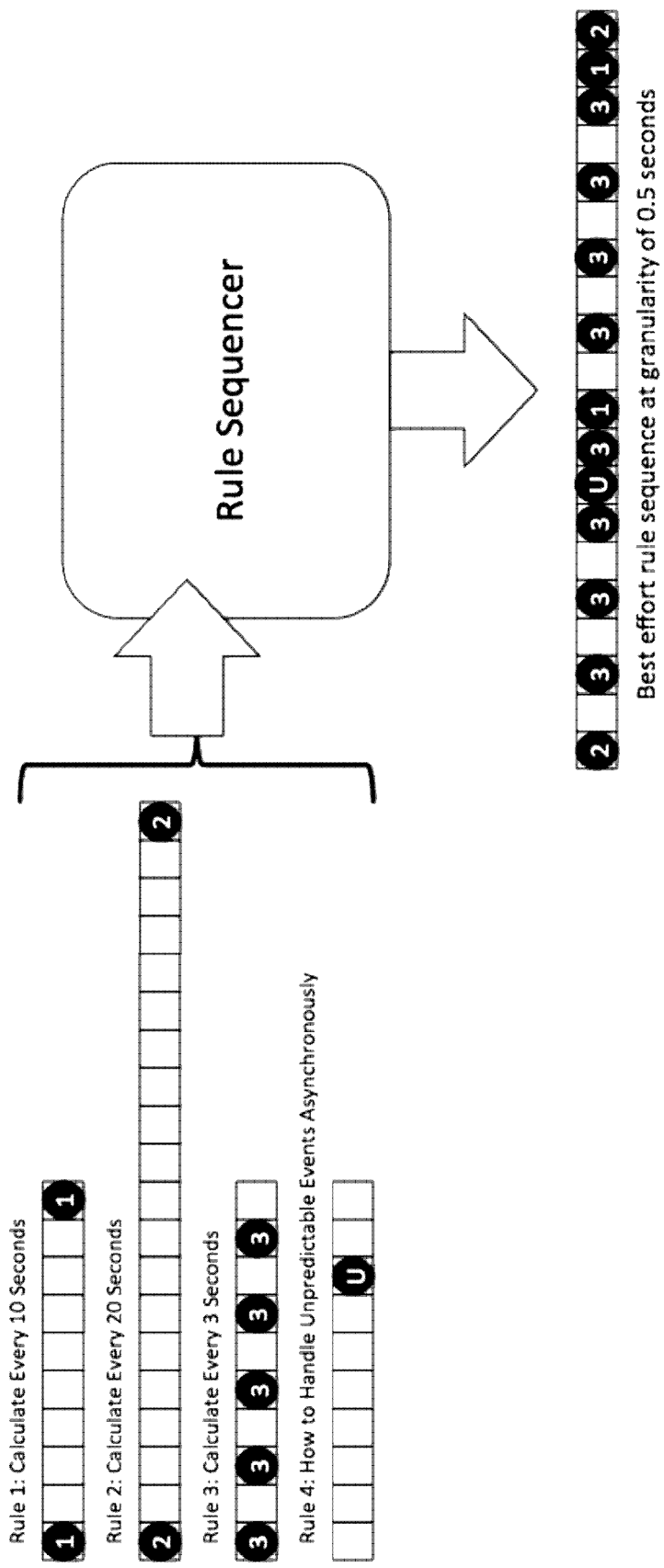
FIG. 58 is a diagram of rule sequencing.

FIG. 58: Rule Sequencing—this diagram illustrates an important part of the method of the feature which is the Rule Sequencer. There will be a collection of rules related to each individual event service provided and even some rules specifically implemented for individual subscriber solutions that are not available to other subscribers. There is a finite compute resource available within the host system for the Hub Software Programme which should be optimised, as it may reside on an existing home hardware device that does not have a lot of available memory or compute power to offer. Therefore a Rule Sequencer, examines the rules and the resources available to compute them, and creates a sequence for calculating the rule for optimised performance. The Rule Sequencer is designed to make sure that the rules are calculated in time to create events that meet the service level agreement with the subscriber. For example, an event might need to be produced every 3 seconds as shown above. The Rule sequencer merges rule calculations with other rules in sufficient regularity in order to meet this service requirement. Note that the granularity of the rule calculation sequence in terms of time periods should be much shorter than the granularity with which the service events and corresponding rules are required to be computed. This will allow room for the Rule Sequencer to manoeuver rule calculations into a sequence that can meet all service demands on time. For example, the events could require a granularity of 1 second each. The rule sequencer would use a granularity of 0.1 seconds for each rule calculation in sequence.

Figure 59:
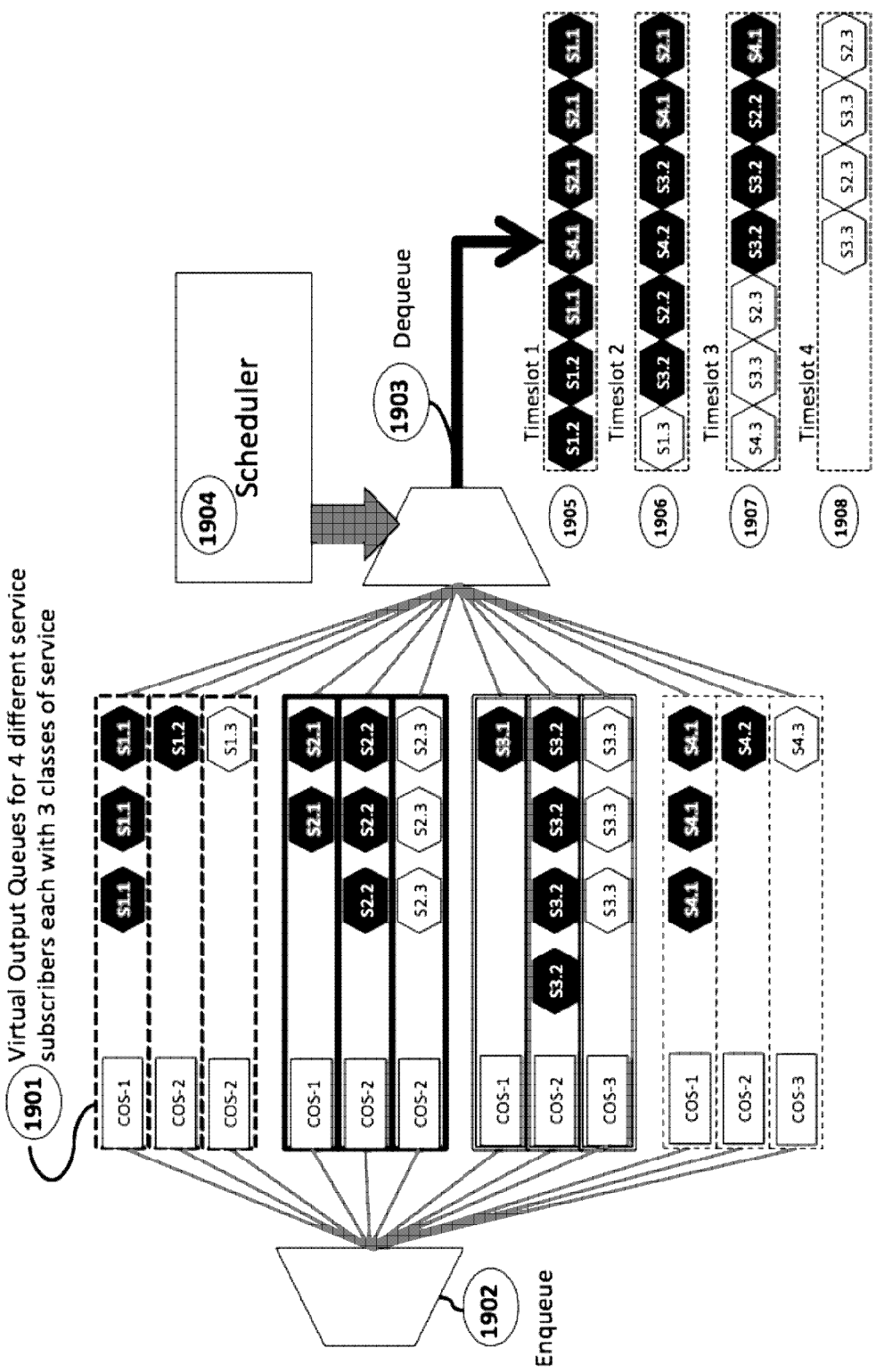
FIG. 59 is a diagram with an example of scheduling.

FIG. 59: Scheduling—this diagram illustrates how the scheduler works with the Virtual Output Queueing system of JSON-based events [1901] in order to schedule transmission time slots filled with suitable events to meet the service level agreements with the subscribing systems. The events are queued up [1902] before the scheduler and switch to output ports, this is therefore known as an "input-queued switch" architecture. Events are queued first by destination—which in this case is the subscriber system, then within that by class of service of the various events that that subscriber has requested. For illustration, 3 classes of service are shown [1901]. Each queue is populated with a small number of events to demonstrate how the scheduling system operates.

In this scenario, there is only one output port, but the scheduler could equally handle multiple output ports and schedule time slots for each port. The scheduler's task is to fill a time slot with events such that the service level agreement around a class of service is fulfilled. For example, each timeslot will use up 75% of available resources for class of service 1, then the remainder will be given to the other two classes of service based on the level of the event. A class of service level 2 will always be given the 25% resource remaining ahead of class of service level 3 for example.

The scheduler can look across several events within each queue in order to make a decision, e.g. using a window of 2 events in this example. Timeslots [1905][1906][1907] [1908] are then created one after each other and filled by the scheduler with events for transmission. The timeslot is there to help the scheduler meet its requirements but the events are then transmitted one at a time starting with the first event in each timeslot, when transmission bandwidth on the IP network becomes available. Here, the first time slot is 75% filled with COS1 events, then the remaining 25% is filled with COS2 events, both taken from the first 2 events in each of the queues. The second timeslot starts to fill up with COS1, but then there are no more COS1 events to fill it. So it then moves to COS2 events until they too are used up. At this point the scheduler is only looking at events 2-deep in each queue, and so it uses up all available COS2 events. It therefore moves to COS3 to fill the remainder of timeslot 2. In timeslot 3, the scheduler now looks deeper into the queue and finds more COS2 events to start filling the timeslot. Note that there are is only one more COS1 in any of the queues, so the COS1 event is placed first then the scheduler moves to COS2 events. Finally timeslot 4 mops up the remaining COS3 events in the queue.

Note that more events would be then joining the queueing system and the scheduler would continue to work, but this example is bounded in time in order to show a complete emptying process for the queueing system. There are many ways to build such scheduling algorithms and this is one example of a simple resource allocation algorithm based on a round-robin of each queue per class of service.

5.5 Detailed Description

Assuming that the context of the feature, the problems it solves and its advantages are described above, this is a detailed description of how the Hub Software Programme first illustrated in FIG. 41 operates. This is the embodiment of the feature and consists of a method and a device combined. The method is a means to generate events and supply them as a subscribed service, the device is a means to switch the events for distribution to meet a quality of service guarantee.

The method to generate events and supply them as a subscribed service is embodied in an Event Generation module shown in FIG. 46. The operation of this module begins with the arrival of raw sensor metadata that is transmitted over the home IP network from the camera or sensor to the device that houses the event generation software. This raw sensor data is queued in a buffer which is typically created as a 2-D array of data, with one dimension representing time and a second dimension representing each individual sensors that has transmitted data to the hub.

Note that often the individual sensor metadata may be out of synchronisation with the metadata from other sensors and therefore there may be a block of processing required to normalise the metadata within the buffer. This could be implemented as a second buffer that replicates the structure of the initial buffer, and the normalised metadata would appear in the second buffer. The normalised data is now ready to have rules applied to it in order to create events.

The event generator module also contains a block of software functions to manage the collection of home models and rules from some centralised server based in the cloud and connected to the hub via the home Internet connection. These models and rules are quasi-static in nature and are occasionally synchronised with the cloud server to ensure consistency. The home model contains data about the structure and content of the rooms of the home, and the event rules contain calculation instructions for how to produce an event.

The rule sequencer is a block of software that reads in the home model and event rules and creates a sequenced implementation of their use in calculating events. The calculations are applied to raw sensor metadata stored in the buffer and the output is an event which is a small block of data containing information about the occupant(s) of the areas of the home that the rules are applied to. Examples of events are presence, movement, unusual behaviour, gestures etc.

Each event calculation is inherently part of a service that the software offers, such as a presence service. Therefore each event is marked with the appropriate service reference, which could be simply a service name. It is also marked with a user ID, which represents the customer or control system that is going to utilised the constructed event.

Likewise, each event is being calculated for a customer who has applied for that service, and the customer has signed up to a Service Level Agreement which translates into a quality of service for that supply of event data. Therefore the quality of service value is also attached to the outgoing event data from this module.

So now the event generation module is outputting blocks of data called events which contain pertinent information about a particular event. Each event is marked with a service identification number and a customer ID, and also with a quality of service. This event is then passed onto the second major block of the feature: the device that can switch flows of events in order to handle network resource conflicts and ensure that each service adheres to its prescribed quality of service level as agreed with the end customer.

The switch device is illustrated in FIG. 47. It is a virtual output queued switch, which means that it forms queues at the input side of the switch that represent the destination of the data on the output side, or a virtual representation of the output queues that would exist. Given the event data queued in such a manner it is possible to build a switch scheduler that controls the switch fabric resources sufficiently to ensure that each event gets switched through the fabric and into the output buffer in time to meet its Service Level Agreement.

Each event that arrives is therefore queued based on the end user destination which is the entity ID that subscribed for the event, and then within that queue there is a series of internal queues for each class of service. So for example if there were 3 customers and 3 classes of service, there would be 9 queues in the Virtual Output Queue.

The dequeue function works from a set of rules contained in the scheduler block which is shown in FIG. 45. This scheduler is making the decision on which of the Virtual Output Queues to empty next and in what proportion of time and filtering the dequeued elements into a Output Buffer [516]. The Output Buffer is a FIFO (First-in-first-out) single queue which then sends each event in the sequence it was queued in to the address of the subscribing customer contained as a data element within each event. This Output Buffer does not need to understand anything else about the data other than to send the next event in the queue to the address by which it is labelled.

Both the Event Generator and Event Switch modules have their own management functions that help report errors and warnings up to a centralised management system that would sit on a server in the cloud, and communicate with the hub software via the home Internet connection. Updates to either module can then occur separately, including potential software updates to enhance the performance of the system etc., without interfering with an existing version of the module that is not being updated. These management functions are shown in FIG. 45[514].

The management functions also monitor the communications channels for potential errors and they gather statistics on the performance of the modules for use in auditing for billing issues for example. The management modules may also be used for performing internal monitoring functions such as the direct transmission of raw sensor metadata up to a non-customer cloud server, by-passing all of the main functionality of the event generation or event switching. This data would then be used to help further develop the research and development programmes for the product to improve performance, reduce power consumption, feedback into new scheduling designs or improve any aspect of the technical implementation or algorithms of the system.

The above description of the operation of the event generation and event switching modules also applies directly to the application areas illustrated in FIGS. 51, 52, 53 and 54. There would be no change to the operation of the modules other than the amount of data that each module would need to process. However the architectures described are inherently scalable as for example the scheduling algorithms of a virtual output queued switch are generally scalable to hundreds of ports as proved by their usage in the switching fabrics of large scale Internet Routers such as Cisco CRS1.

Examples of the data structures and algorithms used are given in FIGS. 48, 49, 50, 55, 57, 58 and 59. These illustrate one possible implementation of each of the important data components of the system or data processing algorithms of the system. In particular, the JSON examples illustrate how the data can be organised into logical blocks as associated arrays ready for conversion directly into coded objects for use within Javascript based browser user interfaces. This should make the combination of the metadata of an event with a visual image or video much more straightforward for a $3^{rd}$ party web programmer who has to rapidly and continually adapt the user interface based on the home model and users involved in each specific deployment. This degree of freedom will be facilitated by having the data ready packaged in JSON notation for the javascript animations or HTML5 modern elements of browser based user applications.

The examples of algorithms are basic scheduling algorithms such as the creation of time slots shown in FIG. 59. This example could be replaced by any of a large collection of known methods to implement a scheduling algorithm for queue selection such as a round robin, random, pseudo-random selection etc.

The JSON-based models of the home and the rooms for example are designed so that a browser user interface or any web application could be quickly and easily adapted to allow the end user to build their specific home model. A range of rapidly changing user interfaces may need to be created to facilitate different methods of extracting the pertinent information about the users' home and creating a suitable model for use in the event generation. Note that by formalising the models, it also allows for machine-to-machine communication of known or previously generated models so that the user could simply select a model that is close to their own, which could have been generated by a neighbour for example.

5.6 Protocol Example

This section outlines and walks through an architecture and approach for ART that will allow ArtofUs to engage commercially with partners with a well defined technology and commercial interface.

a) Lower Level Sensor System & ArtofUs Hub Software

Every camera or sensor that contains an ArtofUs engine (e.g. implemented in a FPGA) sends a constant stream of XML formatted raw data to the home hub.

In the home hub is an ArtofUs software application. The ArtofUs software application takes the raw sensor data from multiple sensors and automatically creates various events as follows:

Example with 3 Events:
Event type 1 takes a single input and immediately outputs a presence event with a 70% accuracy.
Event type 2 takes in multiple inputs and uses a window of 2 seconds to output a presence event with a 95% accuracy.
Event type 3 takes in multiple inputs and uses a window of 10 seconds to output a motion event with a 99% accuracy.

The software computes these events automatically and queues the different events into their own queues.
There is one queue per event type.
An event type may be defined by 4 criteria:
The event type
The number of sensors it uses
The window or history length is operates on
The confidence level
Events are queued as they occur in a FIFO queueing system, which time stamps the events upon entry, and keeps a stack of time spent in queue for the events in each queue.

b) Higher Level ArtofUs Hub and ArtofUs Cloud Software

All of the above is happening constantly in the background.

The ArtofUs cloud software can talk to the ArtofUs hub software and set a regular time interval after which all of the data gathered is formatted into a file and sent using FTP to the ArtofUs cloud software. This data is for ArtofUs to use for legal reasons and for maintenance, debugging and development reasons.

Note the ArtofUs cloud software can also request the ArtofUs hub to concatenate the raw data XML streams into this file and send both the raw data and the event data up to the cloud software for analysis.

This could be very useful for debugging problems or issues. Meanwhile, there are several higher level smart home management systems in existence. For example, a system for home entertainment, and another system for home energy management. Each of these higher level systems can subscribe to an ArtofUs service by using the ArtofUs API based on a Restful Web Services interface. This subscription process is handled in the ArtofUs cloud software. The management system server retains a record of all subscriptions for billing purposes. The ArtofUs cloud software tells the ArtofUs hub software which higher level systems have subscribed to which services. The ArtofUs cloud software provides the local IP address of the hub of the higher level management system that has subscribed to the service. The ArtofUs hub software negotiates an IP unicast stream to that IP address.

A unique set of queues is set up that contains all of the events that the higher level system has subscribed to.

c) Class of Service

There is one queue for premium services and one queue for best effort services.

The premium queue takes precedence when there is a queueing conflict for transmission, effectively offering a premium level of service.

There is a known latency associated with the queueing system, which is essentially a length of time beyond which no guarantees that an event, which has been queued for that length of time, will actually be transmitted.

The best effort queue has a fixed length (e.g. 2 seconds worth of data) and events arriving later are dropped from the queueing system if the buffer is full.

The ArtofUs hub software can report to the subscriber that they have currently subscribed to too many services and must either drop a service or promote a service to premium level if it is to be serviced correctly.

The ArtofUs hub software should be aware of the approximate bandwidth available on the home wireless network being used.

The underlying protocol or type of home network is irrelevant, so long as an TCP/IP connection or a UDP connection can be established and maintained.

This may work on IEEE 802.11xxx, or on any new type of home wireless network provided they can support devices with IP protocol stacks running. This will almost certainly be the case.

d) Higher Level Services (ArtofUs Partners)

Each higher level system that subscribes to the ArtofUs service is billed monthly or annually for the service.

Note there are 3 reasons for the use of a constant stream where data is pushed to the hub and then pushed from the hub to a higher level system (such as a home energy management system):

1. It will be necessary to size the system (bandwidth, switching throughput etc.) for the subscribed services anyhow, the optimum engineering solution is to send the event object when available and let the higher level systems put aside or get rid of the ones they don't use. The reason is that you are in effect running a continuous check that the link is up and running and therefore your management system and your partners ecosystem has a pulse that tells it that everything is ok. If you stop a pulse being sent through, you have no way of knowing that the system is live—it acts as a cross check.
2. A secondary advantage of a push system versus a pull system, is that the level of 2-way communication that must occur to request a "pull" of data off the sensors or off the ArtofUs hub is far more complex (and therefore prone to errors) than a simple push model. The data is pushed and then the receiving system can queue it, dump it or use it, ArtofUs won't care and shouldn't try to engineer that part.
3. Finally, the hub should record all data being received from sensors at all times initially. You will want to know that everything is working in the first deployed systems. In particular, you can continue to bill for a live service even if the subscribed (e.g. Google Nest) is not using every event object you send. If they subscribe for a 24-7 service, then you must provide it. Meanwhile, the data can be stripped off the hub in files and posted back to your cloud server. This will be invaluable to debug and cross check your initial deployed systems, particularly if there is a billing interface involved somewhere.

You will have a recorded "audit trail" proving that your event objects were continuously produced and were accurate—this will be key to sustaining the value chain.

This might useful for a higher level service that does need to be working all of the time, or all year round.

For example, a winter only service is an on-demand service that is switched on only when the external temperature drops below a certain level.

At that time, the service is added into the queueing system.

Each event while having a time stamp, and while being generated on a regular enough basis, will be sent asynchronously to the subscribing device.

Therefore the best engineering and commercial solution is to provide differentiation of service level, with some guarantees on maximum latency that will be experienced. This maximum latency is engineered by dropping events from the best effort queue.

e) ArtofUs's Software Defined Network Solution: An Event Object Switch

The ArtofUs hub software effectively becomes an event switch with predictable behaviour, implemented purely in software.

Vendors implementing software defined network switches for the home hub market could therefore take ArtofUs's design and implement the queueing system in hardware.

f) Layering A Control Plane Service on Top of Event Services

A further level of service can be provided by ArtofUs to layer on top of the services described above.

The above services are envisaged to be based on browser based user interfaces, which accept the events as JSON formatted objects.

The browsers or apps can use the event objects to help communicate effectively with the user by superimposing event data onto real video streams for example.

Another effective use might be to indicate the event inside a model of the home environment that the higher level service has somehow generated.

ArtofUs do not need to know what the event is used for.

ArtofUs simply guarantees a certain service level based on subscription.

A new class of service can be provided for events that will be used in real-time control systems.

In this class of systems, the events are not being used to drive user interfaces or communications systems.

Instead this class of systems uses the events to control other machines to do something.

This class of events can be given its own class of service with more synchronous type behaviour.

For example ArtofUs might offer a regular heartbeat type delivery, which is achieved by using a scheduler to guarantee a regular delivery of those events that are used in control systems.

The ArtofUs hub software would add events from this queue to the outbound stream at regular intervals, trading off the best effort queue in order to do this.

All of the ArtofUs hub software switching system can be designed based on packet switch technology with the difference that the packet is now a JSON object queued in a FIFO manner.

g) A JSON Event Object Switch

Effectively ArtofUs will have a service aware, JSON event switch—the world's first JSON event based queueing system with a proprietary JSON event object.

With an engineered synchronous type output of JSON event objects, other engineering teams could convincingly construct closed loop control systems for the home.

For example, a heating system will have certain inertia to change the house temperature and will require regular inputs to drive a PID based control loop for temperature control.

It will require a synchronous pulse of events in order to engineer a reliable control loop.

This is the control plane service level that ArtofUs hub software might offer for subscription.

The subscriber must specify the pulse rate and pays for a higher pulse rate depending on what is on offer from the ArtofUs queueing system.

The control plane service offering has its own queue but splits the reserved bandwidth between itself and premium services. Both do this at the expense of the best effort services.

In a scenario where the switching bandwidth of the ArtofUs hub software is reaching say 50% of its maximum, it might be advisable to instantiate either a second instance of the ArtofUs hub software if the channel bandwidth can handle it.

Alternatively, the local area wireless network bandwidth will have to be increased.

Even if the channel bandwidth is increased, the ArtofUs hub software switch may still reach a processing limit and may need to be duplicated.

In this instance, subscribers are simply allocated one of many ArtofUs hub software switches from which their service will be supplied.

This could be a great way to scale the system in the future by allowing a virtual division of services and ArtofUs can decide inside its management system which soft switches will handle which groups of services.

This would be transparent to the user of the service, but would have to be flagged to the manager of the hub hardware device that is hosting the ArtofUs hub software switch.

h) The JSON Event Object Definition

The JSON event objects could contain the following values:

Event stats array:[unique event id, time event generated, number of sensors based on, array of timestamps of raw data generated per sensor, time spent in queue, window length used for calculation, class of service value, number of subscriptions, array of subscription ids]

Event type 2D array: [presence, position, gesture, posture, movement, mood]×[different people unique ids]—values are placed in each element of the array which in turn could be objects or arrays themselves.

For example, the position element of the array could be co-ordinates, unique room ids, or relative positions to specially chosen objects such as a cooker, a fridge, a remote control for the TV etc.

Personal avatar information 2D array: [estimated unique id, height, weight, sex]×[different people in the home]

Note: the unique person ID can be generated by ArtofUs with no need to know who they are, their name etc—that can be done elsewhere in a secure higher level system if required, e.g. ArtofUs pass on the best face view and a unique id is returned.

This unique id is then added to the event generated and the higher level system uses it to attach a name or a face to it in order to build a more personal user interface on a browser for example.

i) HTML5 Ready Interface Using JSON

If each event is created as such a JSON object, it can be used directly in building a HTML5 browser interface directly using Javascript.

This will allow a faster time to market, more rapid prototyping, as it will be natively recognisable in the browser without any intermediate translation layer.

It is also a more practical and broader way to present the user interface across both mobile, home and computer devices in adherence to browser standards rather than closed ecosystems such as purely an iPhone app.

j) ArtofUs ART Management System

On top of all of the above, the ArtofUs system must also have its own management and diagnostics plane of activity going on.

This will require a small reserved bandwidth channel, which can be implemented in the ArtofUs hub software as a small reserved bandwidth with a unique class of service recognisable in the scheduling system.

This channel is used for a wide variety of management functions.

The first function is to send subscriber information to the hub software in order to create a new set of queues for that subscription.

k) Billing & Subscription Model

The subscription will have to inform the ArtofUs hub software of a variety of elements of information and so another JSON object might be the right choice again.

For example, the JSON object could contain the unique id of the service required, the id of the subscriber, the level of service subscribed for, the rate at which events will be expected to arrive or be updated and perhaps a confidence level threshold for events.

Another interesting model is to have the subscriber indicate or state which sensors the subscriber has permission to access.

Imagine a situation whereby certain higher level services rely on a multitude of sensors types from different manufacturers.

Each sensor purchase and each higher level service purchase has an associated license for use of particular sensors.

The ArtofUs hub software could be smart enough to differentiate sensor inputs to the event calculator based on licenses indicated under a new subscriber JSON object.

l) Data Audit Trail

The next management function is to regularly pull off a file of complete data to clear the internal buffers.

For example, every 5 minutes a file is sent to the ArtofUs cloud to store backup data for legal and billing reconciliation at some future time.

This clears the local buffers making it manageable in terms of memory requirements and storage.

m) In-Field Upgrades

The next management function is to do software upgrades live to the system.

This could also be the method for upgrading the software on the sensors themselves, by passing through messages to the sensor network using the management communications channel reserved in the queueing system.

n) Error & Warning Monitoring and Masking

The next function is to pass monitoring point statistics to a management module either situated in the cloud software or the hub software.

These monitoring points are then passed through a mask to select the most important warnings and errors and pass those back up to the cloud system.

Warnings and errors may also require the generation of a warning or flag to the surrounding higher level systems in place.

Finally, billing information must have confirmation that the subscriber is actively receiving the service they asked for and at the right service level.

The lower down in the system, e.g. the closer to the sensors that this is performed, the more manageable it will be at larger and larger scales of homes and sensors within the home.

The last thing you want is to have to continuously go up an down to the cloud to perform all error and warning masking and interpretation for the various management functions.

There should also be a secondary backup management interface into the software using a local console, a command line interface or similar so that diagnostics can be done locally or through a homeowner's mobile phone network should the WiFi and internet connection be down.

Also support engineers will need a way to get into the software in certain support scenarios where debugging is necessary but cannot be performed due to a lack of internet connectivity,

6. Market Research and Applications

A smart network may allow Smart Devices with Spirit to be controlled through the ecosystem.
Market Research Various market research are possible, such as which TV programs are being watched, what food is being eaten. In addition, the system may include sound and voice recognition. One approach is to analyse simple things in a camera, and analyse complex things in the hub.

For the data structure, there is an interface to the outside world. The interface can be an API, or a query-able database. As an example, an interface may generate an alert that someone has gazed at an air conditioner for more than two seconds. Other devices may respond to this alert. A tracking record may only be sent from a camera if a criterion or criteria is met.
Medical Application ArtofUs's system captures the person's movement in real time and that is then used by medical analytics software, programmed for example with medical information on muscle, bone and tissue structures, to give feedback to the patient's doctor so that the doctor can rapidly and objectively understand how the patient moves; this is important for new drug trials that may affect motor performance (e.g. arthritis drugs) or for patients in physiotherapy and also to personalise the patient's recovery experience.

7. Use Case Examples

ART can enable multiple propositions and has been segmented in the domestic arena into the following areas:
  ART within the home:
    ART Control
    ART HEMS
    ART Care
  ART Security around the home.

ART is setup to anticipate and respond to personal requirements depending on the homeowner specific needs. ART will quickly become the indispensible faithful companion, which places the home individuals in control of the environment and knows the information required to make life run smoothly. ART fully personalises the SmartHome through a network of smart device. ART is a scalable platform for the user-centric SmartHome, built on high-performance Spirit computer vision at the edge.

By using the metadata extracted from the Spirit engine, ART builds a virtualized digital representation of each individual in the home and is able to understand a wide range of behaviours, such as, but not limited too:
  counting the number of people in the room,
  understanding people's pose,
  identifying persons using facial recognition data,
  determining where people are moving from/to,
  extracting specific gestures by an identified individual.

Some examples of benefit of ART are listed, with use case examples:
  ART will anticipate needs as you move around the home:
  The future ART smart home will self learn to anticipate your needs. As you move around the house, ART will anticipate before you enter rooms; the lighting will adjust to preferred levels, your desired audio visual settings will be awaiting, the room will already be at the required temperature. Other smart devices in the room will have been aware of your imminent arrival and will have prepared accordingly, whether this be the coffee machine having warmed up, the room's blinds adjusted or your favourite TV channel running.

ART's network of smART sensors around your home, anticipate your needs (and are controlled ultimately by and through you) and interact with the plethora of smart devices around your home, ensures that your future home is as smart and automated as you would like it to be.

"Your alarm goes of and you start your day, a typical mid week work-day. ART has recognized that you have started your day as planned (ART knew this was the intention, the alarm was set the night before). ART has programmed your bedroom's/bathroom's beating around your alarm call and now anticipates that it will be 15 mins until you arrive in the kitchen, and prepares for your imminent arrival by switching on your coffee. Other smart devices TV (for CNN), lights, blinds, XXX, XXX are not turned on until ART knows you are going to enter the room—ART can adapt to even the smallest of changes in your routine, for example, helping change your youngest son's diaper, hence delaying your usual breakfast time by 10 mins."

"All this automation not on provides significant ease of living (all adjusted in real time), but through the most optimum energy usage with save material costs in running your home".

ART will be a helpful and invaluable virtual assistant, anticipating your needs and responding to them. ART's level of assistance is controlled by you, it will help you as much as you wish it to do.

ART will help you remain independent for longer:
The future ART smart home will provide increased independence for the aging population. ART will enable you to control your adapted property's smart devices and ensure that they are all work in concert with each other through you. ART will understand your normal daily routines, your behaviour and your physical wellbeing. ART can be customized to your specific requirements whether that be gesture control, automated functionality for you (but not your partner or carer) or that you use ART to know simply that you are OK and following your typical daily routine and to ask ART to keep your friends and family informed of this. All this is done without intrusive video capture that has the outside world looking in on your daily life in the current Goldfish 'esque' way of many current technical solutions.

The ART ecosystem will interact with all Smart Devices, including person fitness and health devices, where these devices will complement the knowledge of your physical wellbeing to enable a full uncompromised understanding of your current situation.

"On waking up ART will sense that you are 'up and about', going about your typical daily routine. Your Smart Home will respond the your whereabouts; your wheel chair friendly doors open ahead of time (ART anticipates your typical home movements) and your kitchen appliances, whether this be the oven or coffee machine will already be cooking your meal or brewing your daily cup of coffee. ART will also know whether you are alone at home 24/7, and be able to inform anyone at home or nearby of any issues. ART will be able to incorporate the additional vitals you measure, whether this is blood pressure, respiratory rate. ART will be able to inform you of the most accurate summary of your physical wellbeing; your vitals, as well as accurate physical movement; the number of steps you have taken without the aid of your walker, and whether this is an improvement on the previous days . . . it is, well done. At the end of the day, after you hate retired, ART can inform your nearest and dearest that all is fine—no problems."

ART's ability to control your smart home, and to keep you, your friends and family informed of your health and Wellbeing is entirely controlled by you.

ART's network of smART sensors around your home are able to recognize and anticipate your requirements and understand specific variations daily routines, which includes your physical and mental wellbeing, ART incorporates your other Smart data points into its understanding. ART can understand when you might have fallen, when you are confused, when you might need to have assistance, ART also understands when all is OK, how your day has been and can share with your family and more importantly you this information.

ART will help you keep your children safe:

The future ART smart home will help provide you with the piece of mind of the safety of your family.

ART's network of smART sensors around your home enables you to have 24/7 comfort on ensuring the safety and wellbeing for your family. ART's ecosystem is controlled ultimately by and through you and ensures the plethora of smart devices around your home given you the degree of comfort you seek as your family grows up.

In these examples, ART could be considered a guardian angel, keeping a watchful eye over your shoulder and helping to keep your loved ones safe, of course not removing the responsibility as a parent, but helping you in the time of need.

There are a large number of use case examples. For example, ART may also help you keep look after your property when you are away or may also enable your kids to learn and have fun through social interaction.

Figure 60:
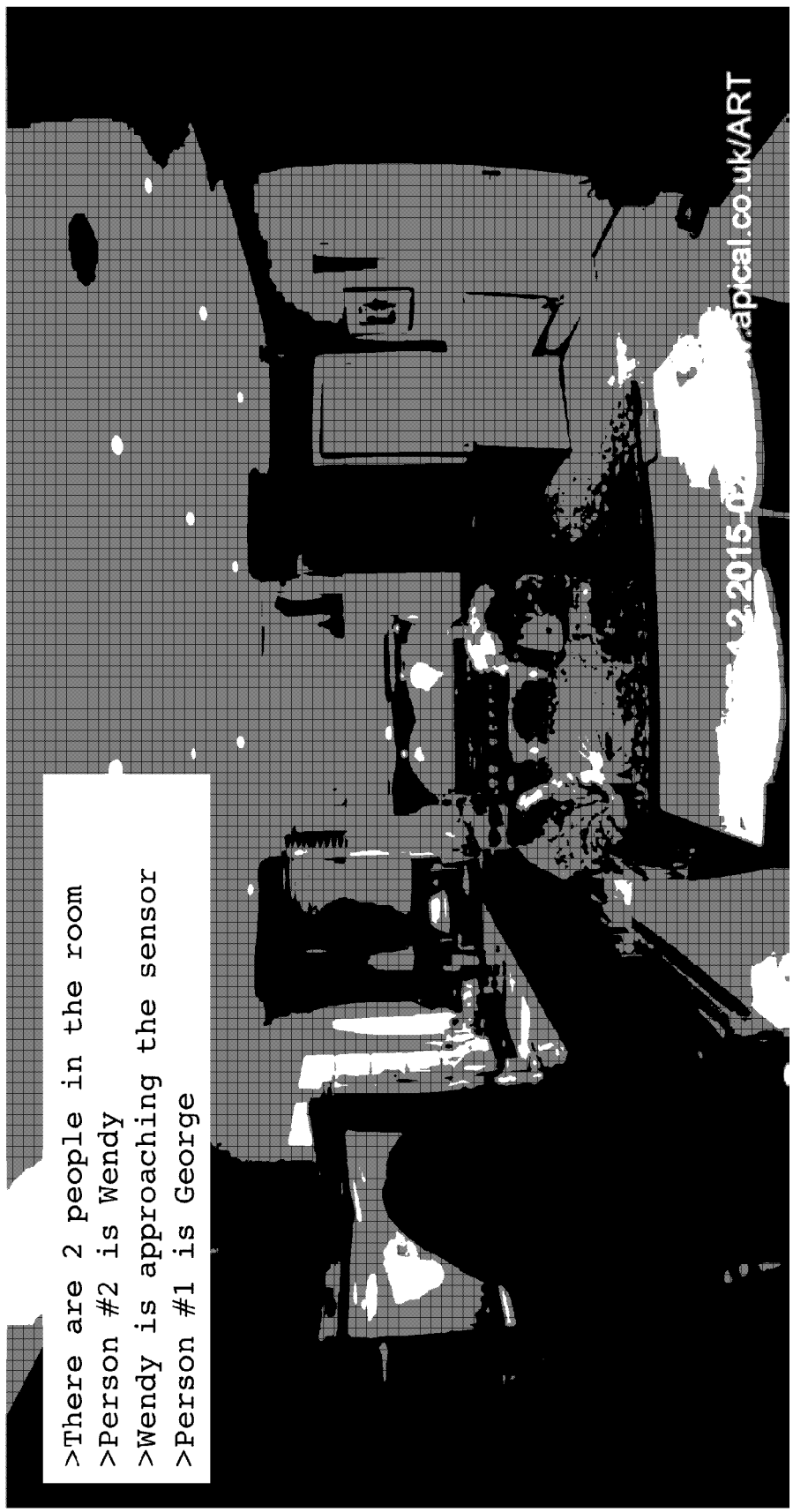
FIG. 60 shows an image capture of a kitchen environment in which an ART sensor has been implemented.
Figure 61:
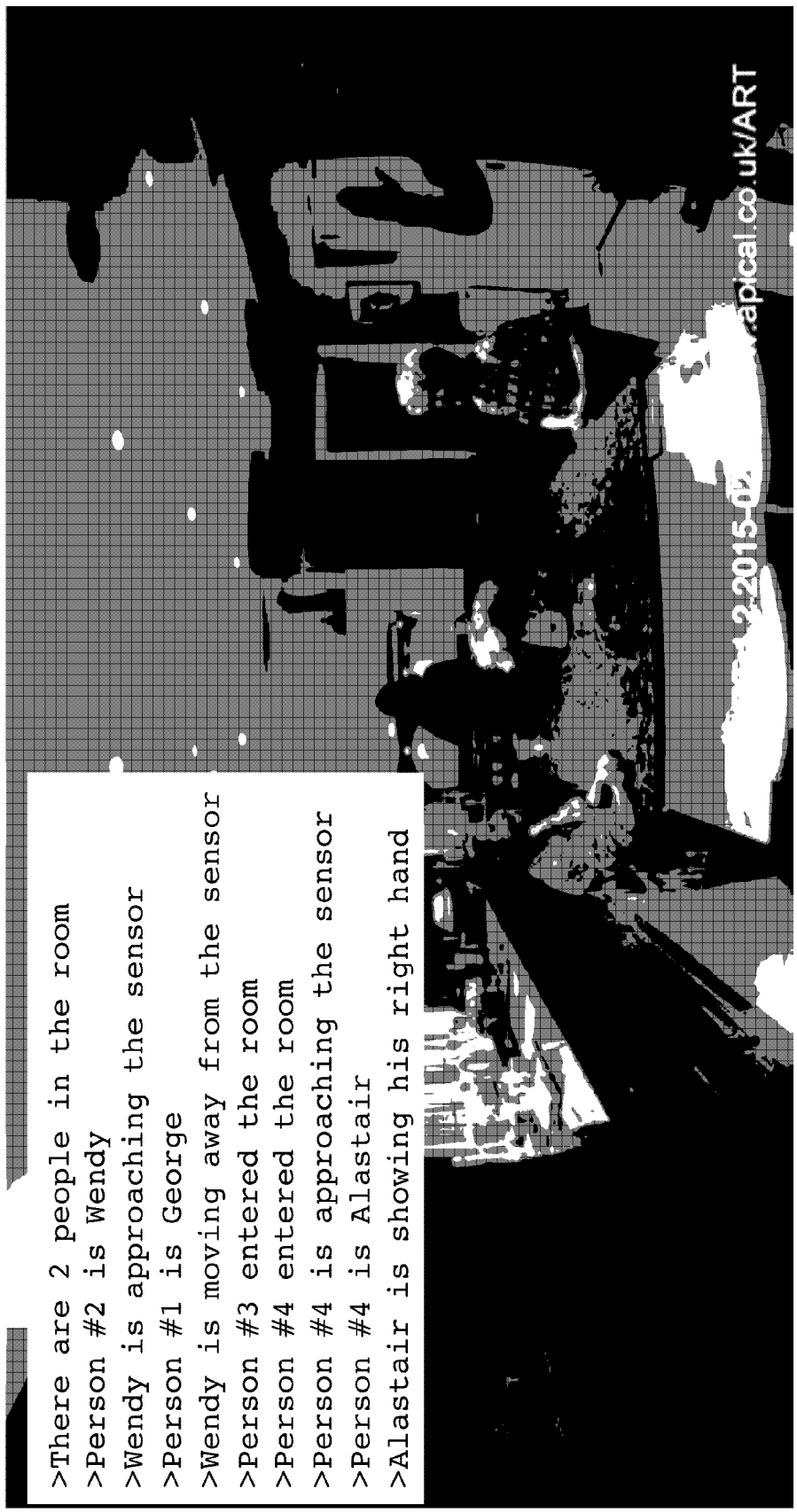
FIG. 61 shows an image capture of a kitchen environment in which an ART sensor has been implemented.

FIGS. 60 and 61 show examples of image captures of a kitchen environment in which one or more ART sensor has been placed. A sequence of video frames generated by the sensor is analysed and a stream of information is generated continuously and in real-time.

The digital representations of people may be extracted on an event-triggered basis. For example, two people are first detected inside the kitchen. The second person is identified as Wendy and her trajectory is extracted as 'approaching the sensor', the first person is identified as being George. Wendy is then recorded as moving away from the sensor. A third person and a fourth one are then detected as entering the room. Finally, the fourth person is identified as Alastair, and the following gesture: 'Alastair is showing his right hand' is extracted.

Figure 62:
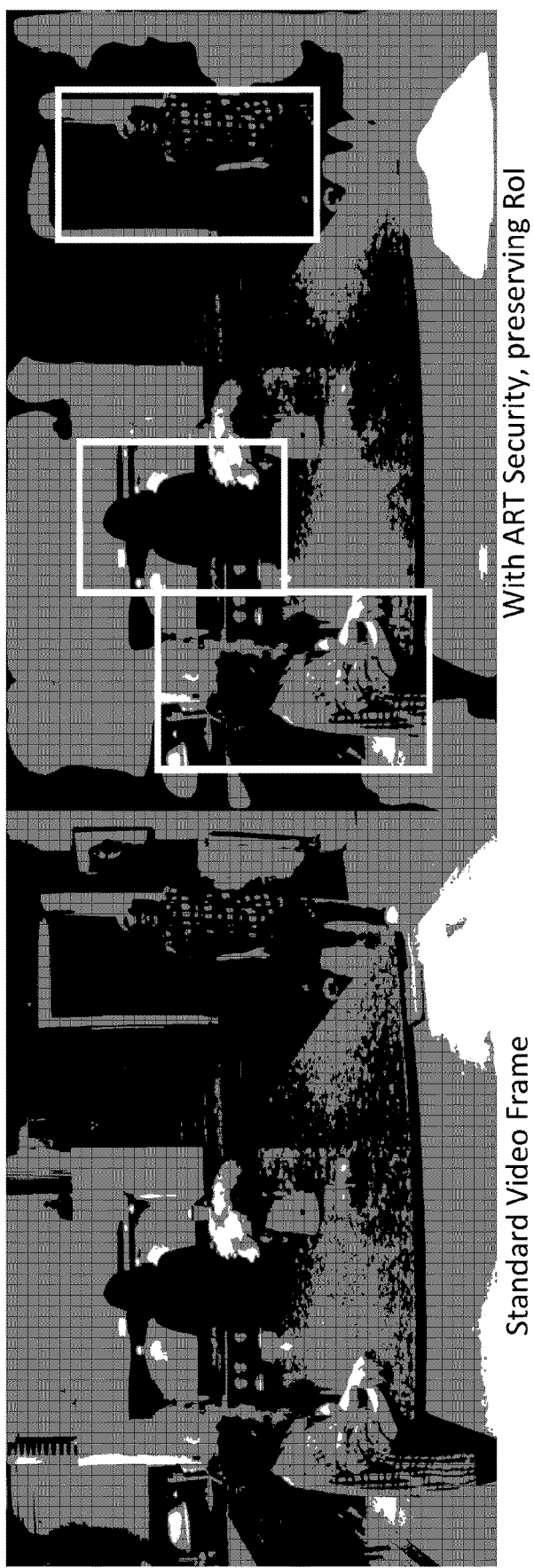
FIG. 62 illustrates a comparison of the typical information preserved between a standard video frame and an ART video frame.

FIG. 62 illustrates a comparison of the typical information preserved between a standard video frame and an ART video frame. With the ART system, only selected region of interests (RoI) have been preserved dynamically within each frame, whereas the less useful information such as the background has been de-pixelated. The upload capability can be managed dynamically by varying how far the rest of the image is de-pixelated. In this example, rectangles around each individual have been preserved while the rest has been de-pixelated.

Figure 63:
FIG. 63 shows an example of a use case with a smart door bell.
Figure 64:
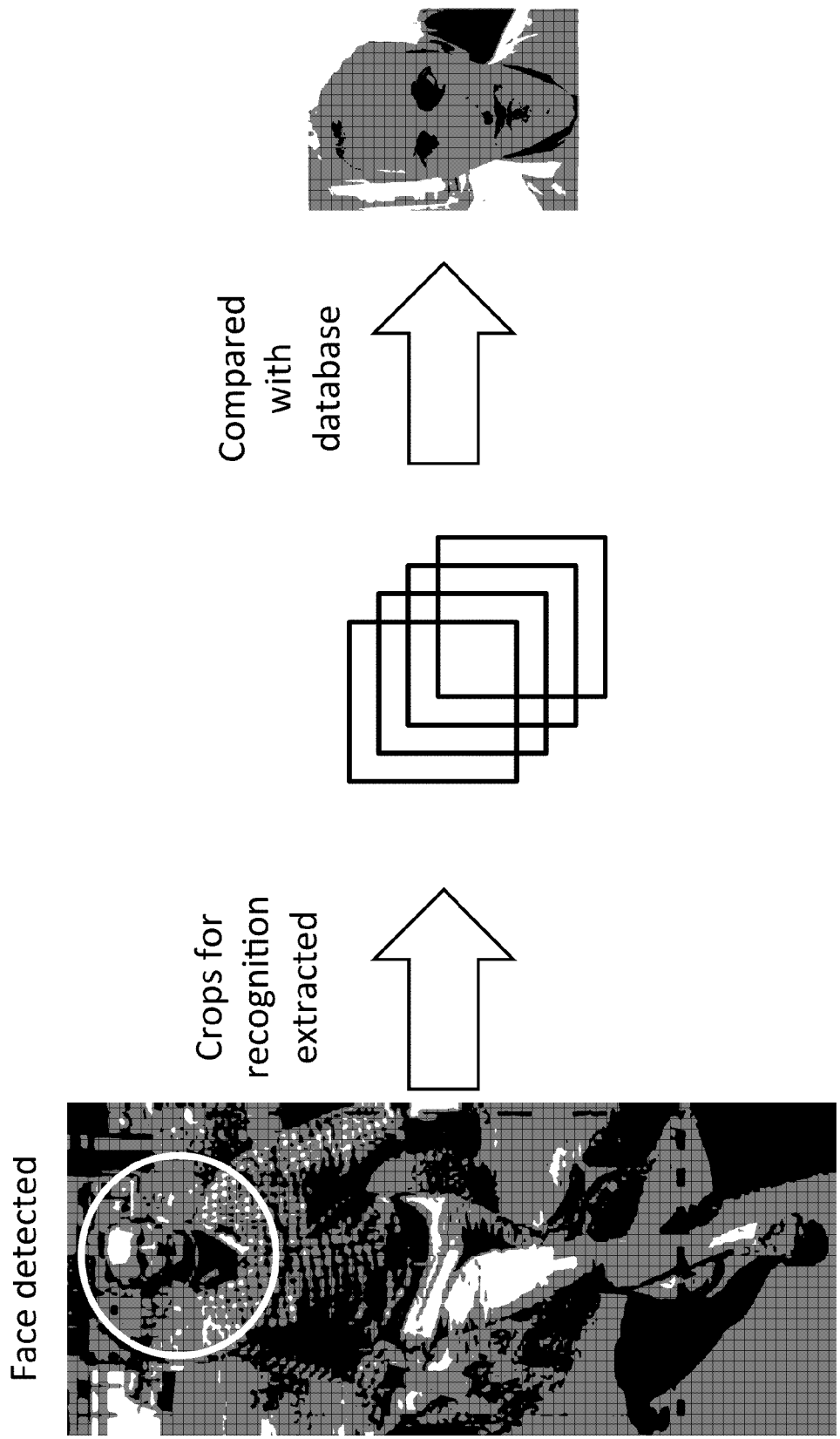
FIG. 64 shows the steps when a detected face is compared with a known library database.

FIG. 63 shows a smart doorbell system enabled by ART in which an ART enabled sensor is placed on or near an entrance door of a home. The system is able to detect an object approaching in real-time. The system is self-learning and therefore does not require an initial calibration setup. Hence, the system is able to learn for example about background traffic without supervision. Unimportant information such as background traffic or ambient motion may not be reported and may be ignored. Regular behaviour, such as passing people and cars, is learnt and then identified as background. Any approach to the door is detected and flagged. Each visitor is identified and a push-notification is sent to the user's mobile device. FIG. 64 shows that as someone is approaching the home, the system may detect the face of the person, and crop the captured frame to extract a thumbnail of the detected face. The system can take a series of thumbnails and compare it to its known database library.

Figure 65:
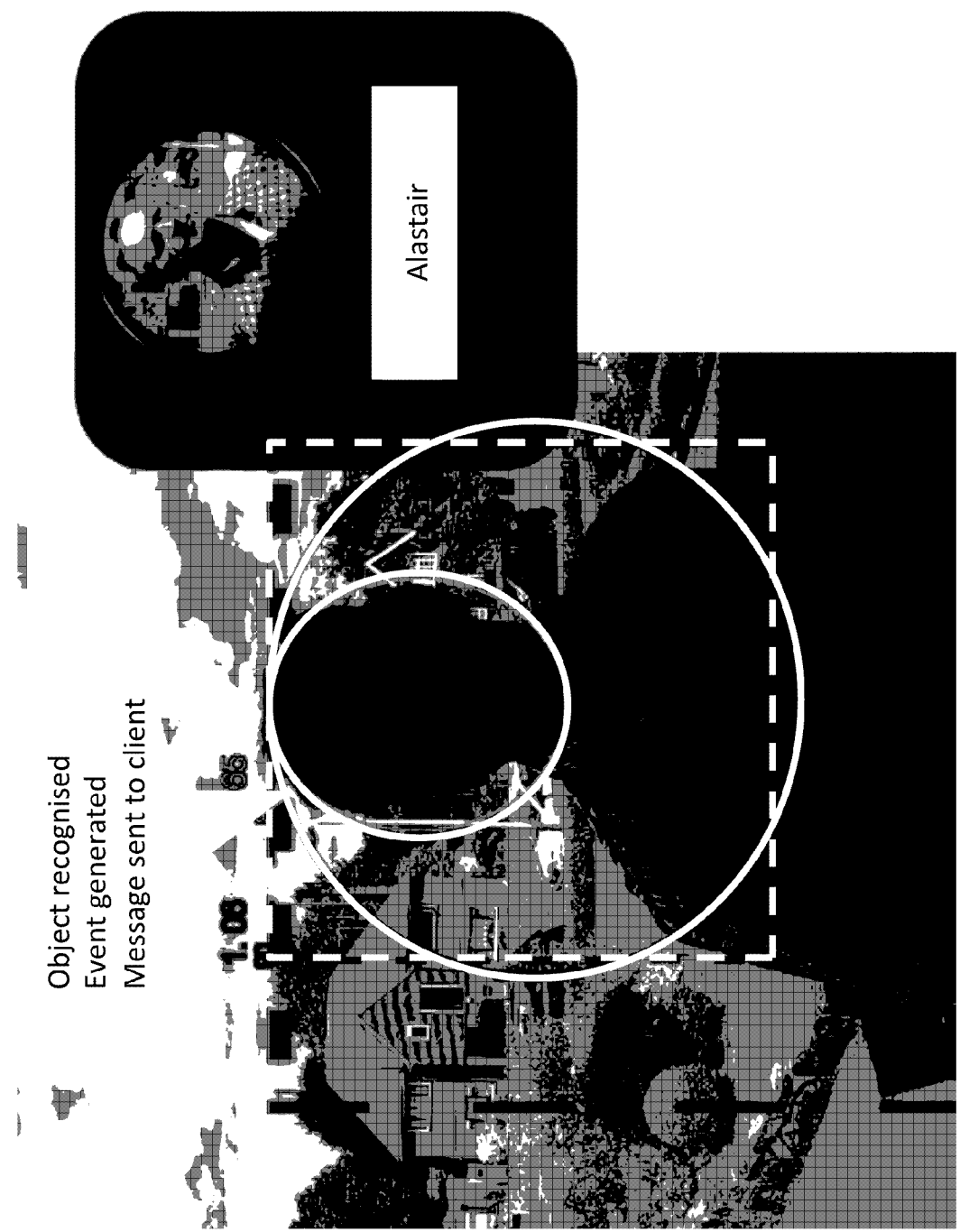
FIG. 65 illustrates an even triggered by an object recognised for the smart door bell use case.

FIG. 65 shows an example of an even generated once the system has recognised the person approaching. The system may alert the owner via text with an attached thumbnail. It may also for example send a message that a postman has arrived and delivered a package.

Figure 66:
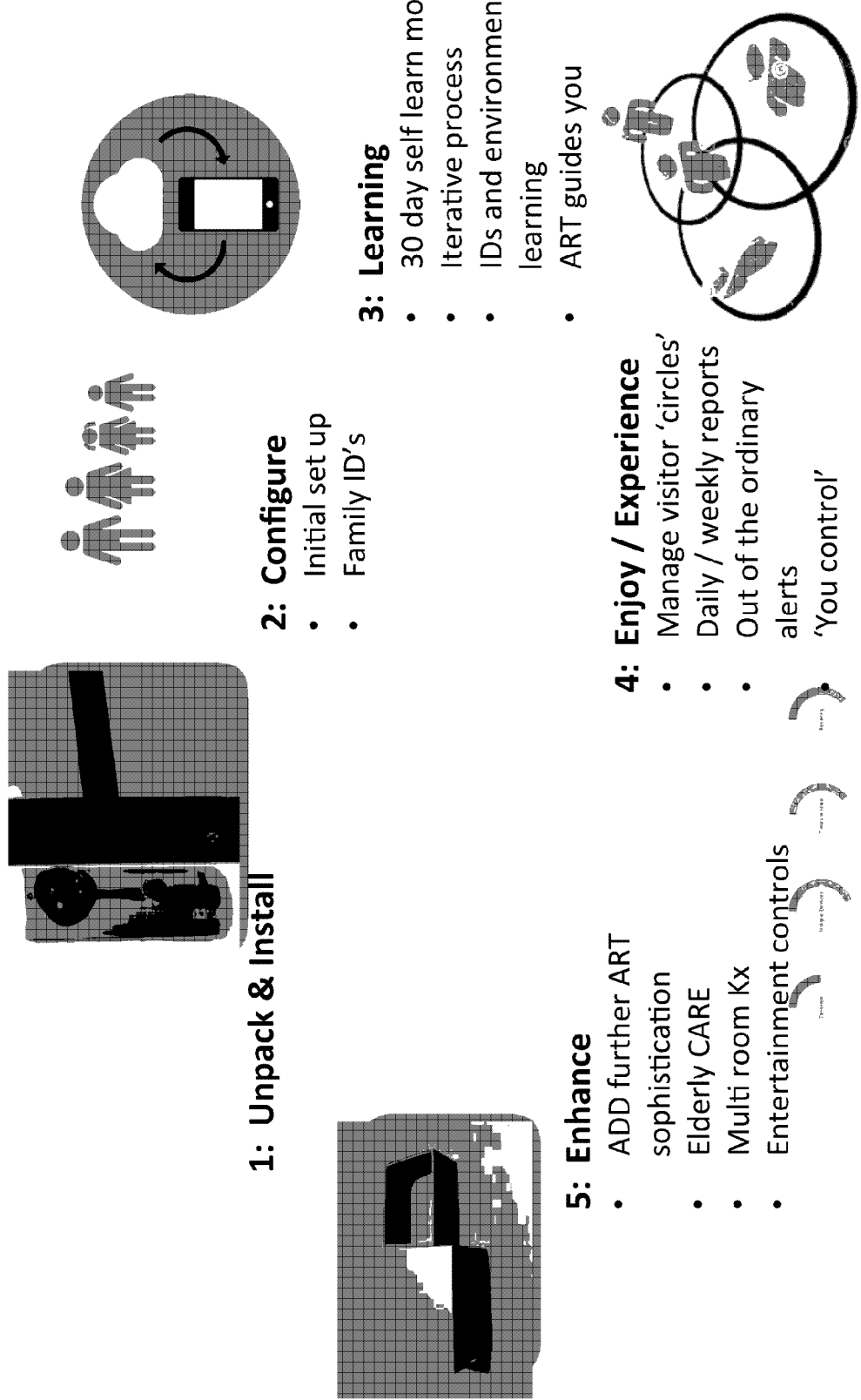
FIG. 66 shows the different steps involved in the setup of a ART door bell system.

FIG. 66 shows an example of the different steps of setting up an ART doorbell system. After installation, the system is configured with the family IDs. A 30-day self-learning mode follows in which the system learns the IDs and the environment. The system is then setup and may be controlled by the homeowner (manage visitor 'circles', daily/weekly reports, out of the ordinary alerts). The system may also be further enhanced depending on the services that are needed for a particular home usage (add further ART sophistication, elderly care, multi-room Kx, entertainment controls).

The load can also be further reduced using the ART system by only preserving critical details, such as only the areas of the person's face. ART is able to associate a region of interest with a particular ID. Thus ART can also learn that a particular homeowner does not need to preserve certain information. For example, a picture of a dog might not need to be preserved and taken everyday. ART is therefore able to offer a large array of dynamic management, which further reduces the load of the service provider local network. This will be crucial as the number of homes that the service provider is managing increases.

ART is able to count people, identify them and also differentiate them between known and unknowns. Only certain people are able to control the sensor with preprogrammed specific gesture(s).

In summary, ART places the homeowner at the heart of the SmartHome and plays the role of the "faithful friend" that thinks of everything. It also implements unique methods of introducing Avatars in the home.

Examples of features available are, but not limited to:
ART recognizes you and greets you.
ART knows your family.
ART warns you of danger.
ART recognizes a fall, stall or a crawl.
ART knows when you are happy.
ART responds to your gestures.
ART spots strangers.
ART recalls and responds to your habits.
ART builds useful data for analysis.
ART watches over your pets.

ART also provides the means to optimize energy management, act as an intelligent security control and be the activation interest for all smart home devices. Some of the benefits or advantages for different players may include, but not limited to:

Utility provider:
  brand enhancement,
  proactive guidance,
  transition to value added relationship service provision—ART Landlord.
Green deal-up sell:
  accredited CAP rating,
  expanded landlord services,
  optimised energy efficient homes.
Residential landlords:
  absent periods: adherence,
  monitoring pet policy,
  understanding number of people living at property,
  confirmation of areas off-limits (balconies, swimming pool),
  specific tenant behaviour—electricity usage, water usage (with smart meter),
  green tenant 'awards',
  EPC accreditation.
Commercial landlords:
  liability management—number of people with the premises,
  fire drills H & S—confirmation on evacuation,
  lift systems—adherence to max persons.

Figure 67:
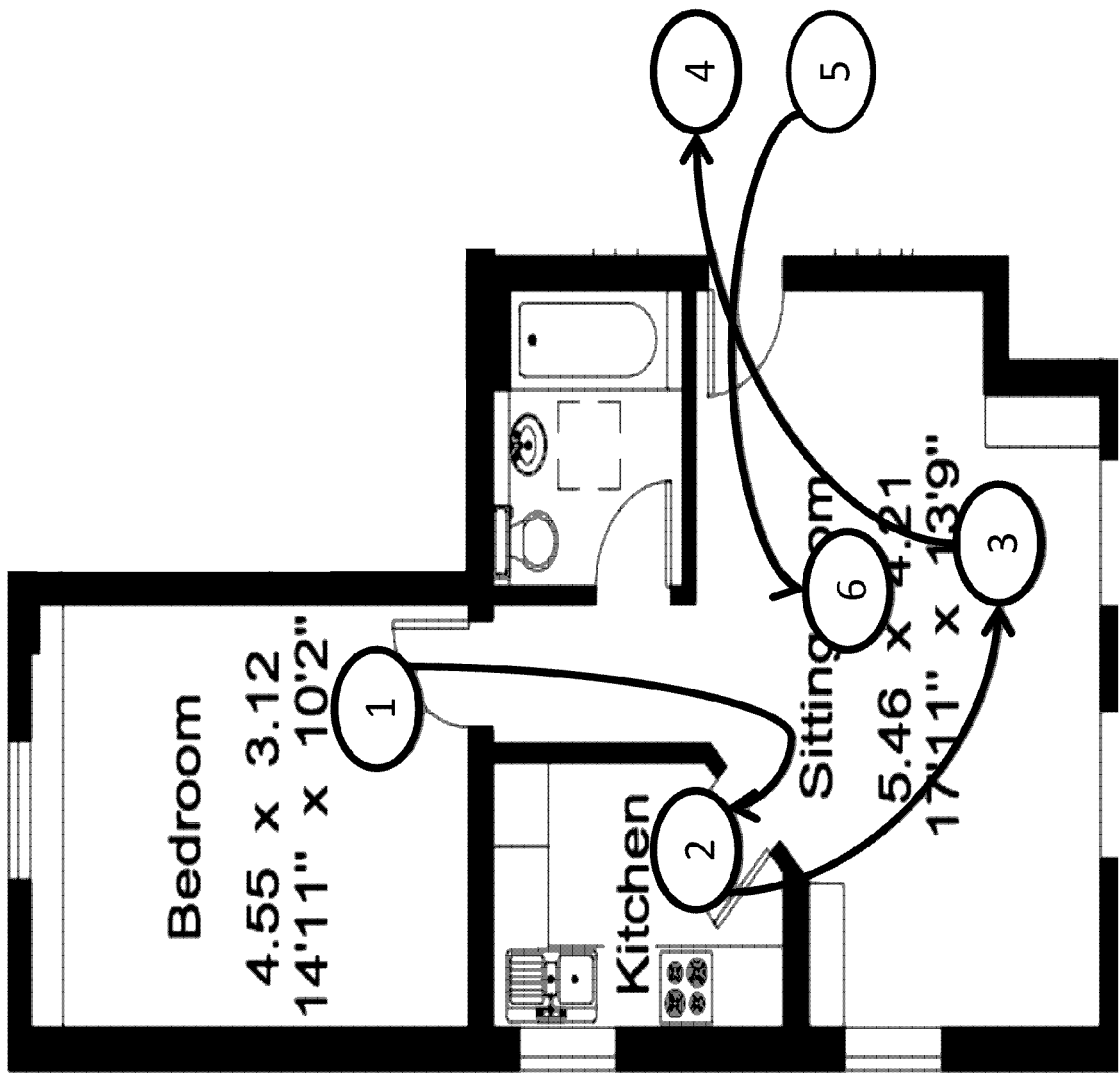
FIG. 67 shows a use case example of daily activity monitoring.

FIG. 67 shows an example of care monitoring supported by ART. ART Care enables an understanding of daily movements, such as 'Gail gets up around 8 am' (1), 'Gail has her carer visit at 10 am—stays for 15 mins' (2 and 3), 'Gail leaves the house with her carer' (4), 'Gail returns at 2 pm' (5), 'Gail watches TV for 3 hours in the afternoon' (6). Alerts can be setup and arranged to ensure that specific movement or information are known, such as 'Gail not left bedroom by 9:30 am', 'Carer doesn't visit', 'Carer only stays 3 mins', 'Gail does return home' or 'Gail leaves the house at 11:08 pm'.

Figure 68:
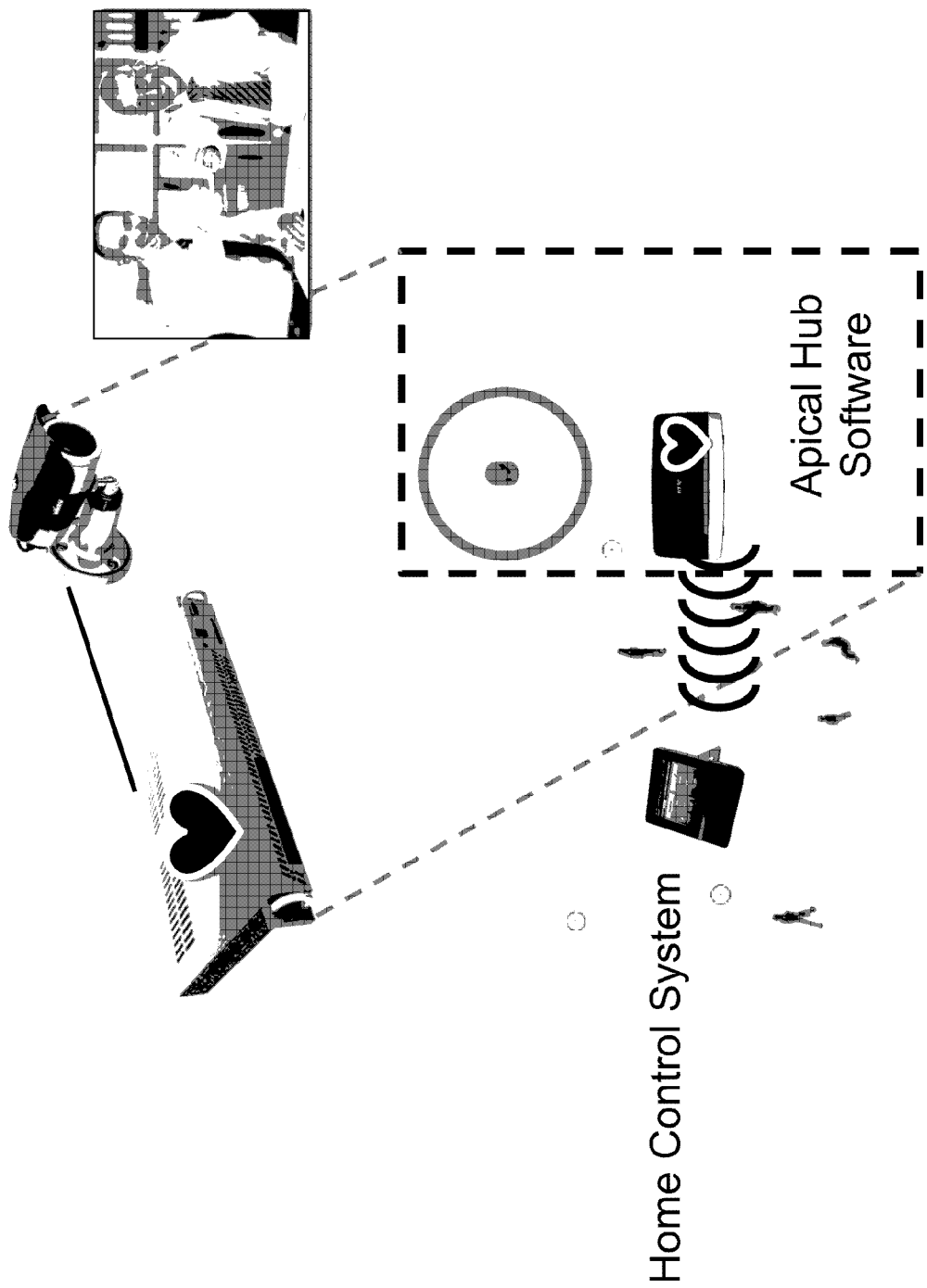
FIG. 68 shows an ART system demonstration of a real time scenario taking place inside the home.

FIG. 68 shows an ART system demonstration of a real time scenario taking place inside the home. The demonstration setup does not use any cloud based systems. Therefore all of the component parts for the demonstration can be brought into a briefing room with no reliance on Internet access or external server software to enable the demonstration to take place. The basic components are an ArtofUs enabled camera sensor, the ArtofUs Hub "Heart" software and a controllable electrical device such as a light switch. The existing ArtofUs server may be used to host the ArtofUs Hub Heart software. A camera with direct feed into the server can be used as the sensor for the home. The output of the ArtofUs Hub Heard software is transmitted to the demo device controller. This controller may not physically be located in the ArtofUs Server, and it may be located anywhere as long as it is connected to the ArtofUs Hub Heart software over a local network of some description. ArtofUs Hub Heart software is thus capable of sitting in any $3^{rd}$ party device in the home which provides implementation flexibility for the customer. However it does not have to reside in the controllable device or in its controller software. This ensures that multiple $3^{rd}$ party control systems can use the ArtofUs Hub Heartbeat that the software produces.

Demonstration walkthrough in real-time: first, the mobile device such as smart phone may take a picture of the two executives inside the room. The purpose of this photo shot is to enable the ArtofUs system to recognise both executives and to assign control capability to only one of the executives for the purposes of demonstrating "ID" control combined with "Gesture". The control settings on the demo device controller are adjusted to reflect the permissions granted to one executive and not to the other. The camera is then pointed at the executives and they are asked to make a gesture in turn, one after the other. This is fed into the ArtofUs Hub Heart software, which creates two events. The first event is the executive without permission to control the device as they make their gesture. The second event is the executive who has permission to control the device as they make their gesture. The stream of raw sensor data from the camera is converted inside the server into an XML stream using the ArtofUs FPGA and embedded code. This XML is sent to the ArtofUs Hub Heart software—a separate application that may be running on the same server. This software could be running on any device in the home. The ArtofUs Hub Heart software creates an event from the XML data for the "Gesture" and "ID" services and pushes them out as JSON objects to the smart device (phone, tablet or laptop) that is controlling the home device (e.g. a light or a fan etc.). The Heartbeat Events are sent to the device controller, which can cross check the ID of each event that it receives. It then checks its local rules that were setup at the start of the demo, and only turns on the device when an event is received from the correct executive to do so. The result is that the light or device is only turned on when one of the customer executives in the room makes a gesture and it is not turned on when the other customer executive makes the same gesture. This clearly demonstrates the ID and Gesture event generation working in tandem to allow smart home control.

There are three main components to the demo in terms of devices and software that need to be created/assembled:
1. The existing ArtofUs server with a camera attached, functioning to be able to perform gesture recognition and which may also use $3^{rd}$ party software for facial recognition all in real time.
2. The ArtofUs Hub Heartbeat software that can receive the XML stream from the FPGA and convert that into events in JSON format, pushing them out on a network port to the final device.
3. A smart phone, tablet or laptop device which is networked to the above server. It contains some control software that controls a physical electrical device that is attached to it using a Digital-to-Analog Convertor card, a power source, a switch and a light bulb for example. The controller app must be able to read the event's gesture and ID arriving in JSON format, and hold a set of rules to allow or disallow the gesture depending on the ID. The controller must then act on the gesture control and turn the light on or off depending on the current state of the switch. A combination of a laptop and a smart phone might work here with a DAC card attached to the laptop using the USB port. Note the DAC could be a Raspberry Pi control board for example for demonstration purposes.

This setup may be any off-the-shelf lighting control kit that uses a smartphone or laptop based control app. The Software to receive the JSON event and interface into the controller may be created. This may also be implemented using a laptop, a DAC card controlling a power switch—a lamp or any electrical device could be attached. The server must communicate over a wired Ethernet cable or Wi-Fi to the lighting controller—it sends a JSON Event object containing the gesture control information. The current server in this demonstration comprises a camera attached feeding into a FPGA analysis.

Figure 69:
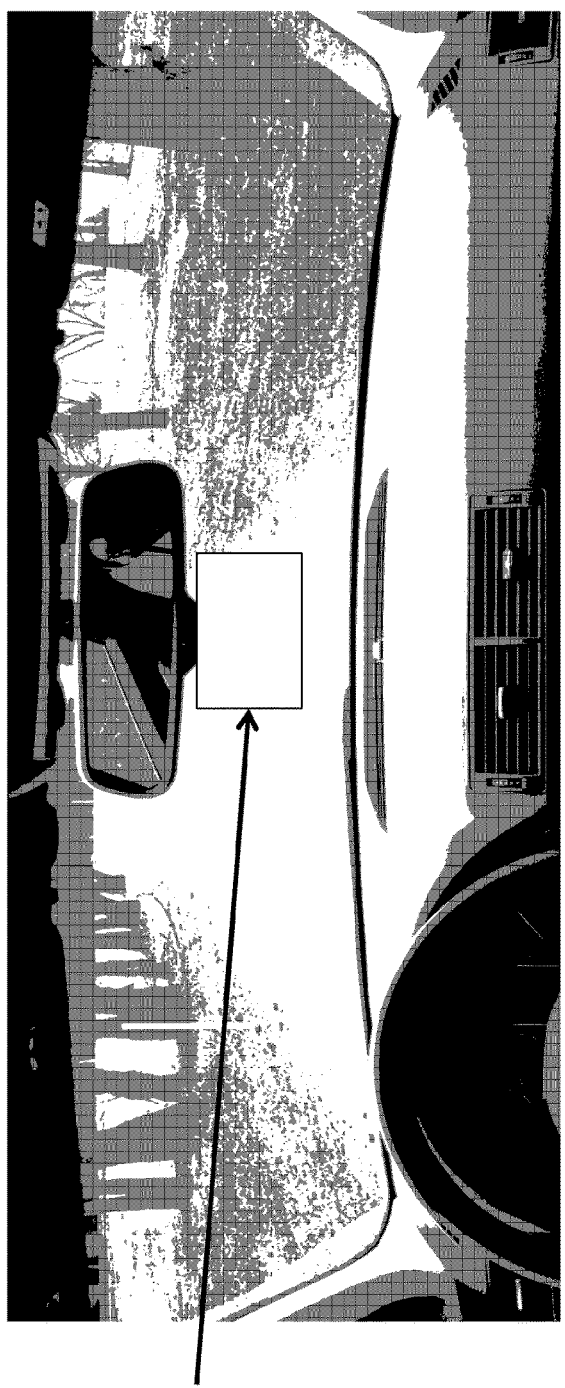
FIG. 69 illustrates an implementation of ART inside a vehicle.

FIG. 69 illustrates an implementation of ART inside a vehicle. A rear-facing camera may be positioned on or in relation to the vehicle rear view mirror such that it captures passengers and the driver. The ART system may monitor the inside of the vehicle in real time providing care and protection of all the passengers (including the driver).

The setup as shown in FIG. 69 may also be used in a transportation vehicle for hire such as a taxi. The ART system may then provide a wide range of useful information about the taxi driver as well as the taxi passengers.

Figure 70:
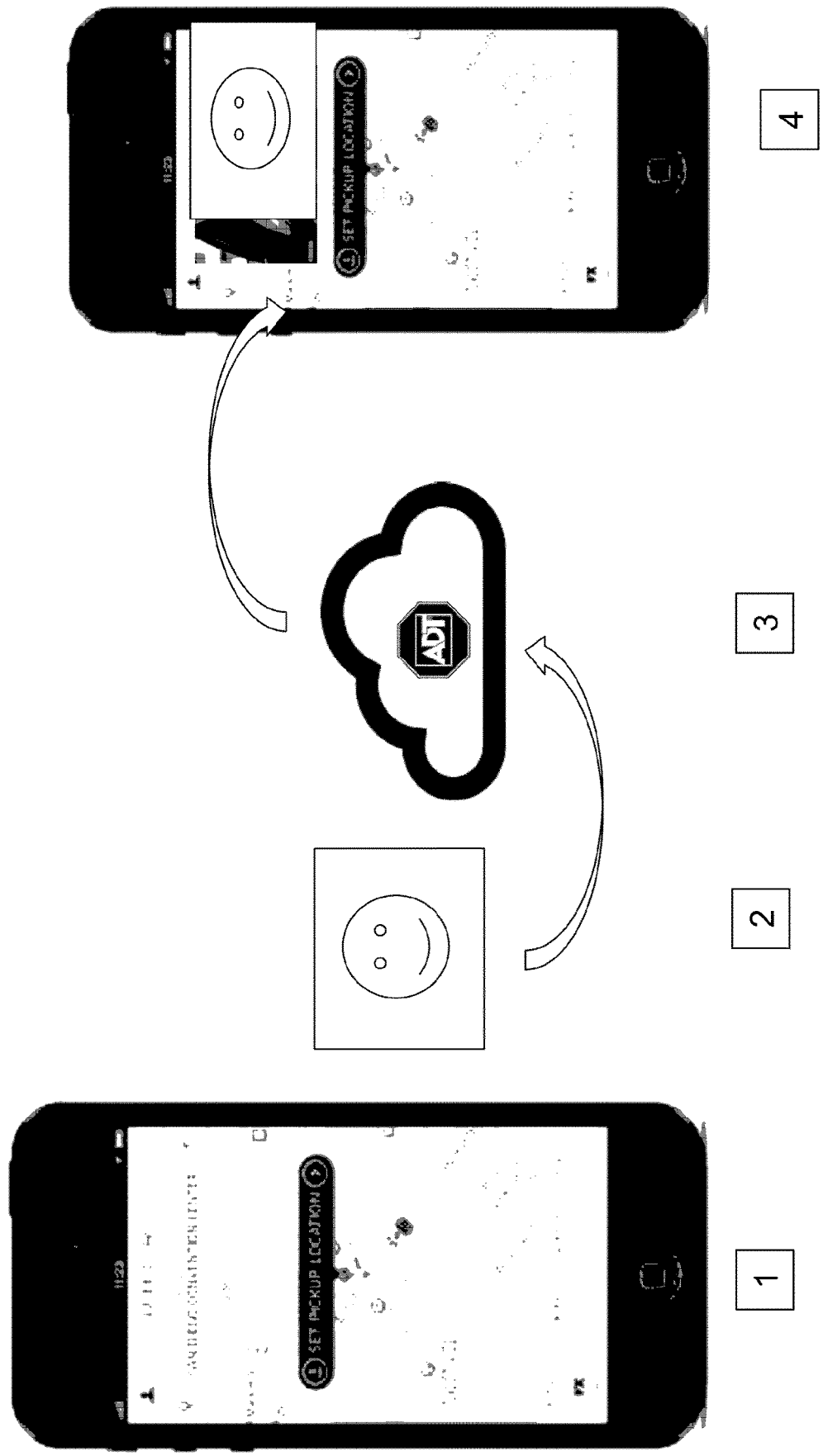
FIG. 70 illustrates an ART system integrated directly with a taxi company mobile or web application.

The data extracted by the ART system may be integrated directly with the taxi company existing mobile or web application. This is illustrated in FIG. 70, a customer may hail a taxi via a mobile application (1), and the camera placed around the rear view mirror may capture a video, an image or thumbnail of the passenger (2). The image/video or thumbnail and/or additional data may be stored remotely from the system, such as in a secure cloud (3). It may be stored for a limited time (for example 30 days). An enhanced mobile user experience may be provided (4) wherein the mobile application is updated with an image captured previously. The image may also be refreshed on the mobile application automatically or at specific time intervals. Hence, the taxi company 'knows' the passenger is on board. In addition, the customer also knows that the taxi company knows and that the ART system knows.

The image or video upload to a remote location such as in a secure cloud is managed through Spirit, in which 3G and 4G uploads are supported (frame by frame). All passengers (including the driver) may be monitored in real-time, and the number of people inside a vehicle may be known at all times.

The customer may opt in the facial identification and may therefore register in real time.

The journey's time, images and ride information may also be shared with others, such as a parent or guardian who wishes to access the well being of the passenger. A parent may therefore get notified for example when the passenger is safely on board and of the estimated time of arrival.

Detailed knowledge of driver behaviour may be gathered, such as location, how long the driver has been driving, how rapid or measured the car's acceleration is, how harsh or smooth the car's braking is, how hard or gentle the car's cornering. From this data, detailed profile of driver's behaviour may be built, making it possible to, for example:

Rate the driver,
Include acceptable behaviour in T&Cs,
Develop star club—points for best drivers,
Wear your 'star with pride'.

This application has several benefits for the rider, such as peace of mind, detailed drivers history available, retail record of journey or backup history if needed. The driver may also benefit from for example, enhanced history, lower insurance costs, satisfied riders and fewer declined riders.

In addition, a forward facing camera may be utilised that understands the road conditions and environment such as proximity of other cars and pedestrians and other vital information in case of a collision.

Further examples of use cases for ART, AWARE and ALIVE are provided in the following tables.

ART Use Case Examples

TABLE 3

| Security around the home (FIGS. 63-65) | |
|---|---|
| Use Case Title | Description |
| Smart door bell: Self learning system | An important aspect of the system it is that it is self-learning. Hence ART does not need a calibration at setup. In time, it will be able to identify normal pathways, and the accurate location of a footpath leading to an entrance of a door. The system is also able to recognise that people are walking up and down a footpath. The system is able to detect when someone is approaching a particular home in real time. The system is also able to learn what is unimportant information and learns to ignore it. For example, the system learns that ambient movement is unimportant by identifying that movement never comes up to a door. The system also learns that flapping leaves in the background are not important, by identifying it as not being human activity. The engine is also trained around cars and is able to learn that cars are moving up and down the road. |
| Smart door bell: Best capture thumbnail from a live video footage and compare it in real-time | The system is able to compare a known to a known and a known to a unknown. It can take a series of thumbnails and compare them to its known library, and do a number of interactions depending on whether there is a known or unknown individual outside the house. For example, it can alert the owner via text with an attached thumbnail if there is someone strange outside, or send a message that a postman has arrived and delivered a package. |
| Detecting unusual events: understand robberies | ArtofUs is currently working on being able to understand robberies. For example, the system understands the fact that it is a human taking something from a car, despite the human being an atypical shape by: having a hoody and hat on, skulking across an unknown pathway crunched over. |
| SmART Delivery | When a delivery is expected from a postman, the delivery service sends a thumbnail of the employee delivering the package to the system. The thumbnail is linked to the library, which is linked to the smartdoor. The system is able to extend the "known" inside the library temporarily, next the system compares what is visible on camera to its library, and if there is a match, the delivery box is opened. |
| Room occupancy | ART can detect room occupancy and detect abnormal conditions such as unsafe ones. For example: how many people are inside a car, or inside a lift, or inside a night club? Is the safe limit exceeded? |

TABLE 4

| | Control |
|---|---|
| Use Case Title | Description |
| Self learning system | Once you have a network of sensors around the home, there is no need to tell the system "that's a doorway", as it will learn known pathways through the house, and it will identify people and for example will learn how they typically move, allowing a lot of predictability. The system is able to build up distances, furniture position, window position, and room connectivity on its own with no user inputs. The system can obtain an accurate depth of field map, based for example on a known human average height. The system is able to know/learn the size of a room. The system is able to quickly learn doorway(s) and footpath(s). It also learns typical behaviours, such as when children are coming back from school for example. |
| Understanding of room occupancy and anticipating individual needs | ART smart home will self learn to anticipate your needs. It is based on a network of sensors around the home, which understand room occupancy, and numbers of individuals, allowing individual temperature preferences (ex: He/She prefers the room to be 18 as opposed to 22-sensors connected to thermometer). ART's network of sensors interacts with the plethora of smart devices around the home. ART anticipates needs as people move around the home and responds to them. For example, ART anticipates before a person enters a room and adjusts lighting to preferred levels while the desired audio visual settings awaits and the room is already at the required temperature. Other smart devices in the room are aware of imminent arrival and have prepared accordingly, whether this be the coffee machine having warmed up, the room's blinds adjusted or a favourite TV channel running. ART system understands preferences for a weekday morning (which may vary depending on the day/time) and the smART home responds accordingly. For example: "Your alarm goes off, and you start your day, a typical mid week work-day. ART has recognized that you have started your day as planned (ART knew this was the intention, the alarm was set the night before). ART has programmed your bedroom's/bathroom's heating around your alarm call and now anticipates that it will be 15 mins until you arrive in the kitchen, and prepares for your imminent arrival by switching on your coffee. Other smart devices TV (for CNN), lights, blinds, XXX, XXX are not turned on until ART knows you are going to enter the room-ART can adapt to even the smallest of changes in your routine, for example, helping change your youngest son's diaper, hence delaying your usual breakfast time by 10 minutes. All this automation not only provides significant ease of living (all adjusted in real time), but also provides the most optimum energy usage. |
| Smart Lighting | An ART enabled sensor will recognize a person has entered a room [avoiding your family dog triggering a response]. Art ID [optional functionality] will set the smart lighting to your personal preference. ART enabled sensor will recognize pre-set gesture/identity combinations to allow you to control your smart lighting (different tones, on/off, auto switching all lights off when no one is home). |
| When individuals are away | ART is able to help you to look after your property when you are away (Party-Facebook . . . avoid the house trash). |
| ART links with each individual's schedule | ART links with schedule and outlines any necessary information pertinent to one's day's schedule (and that of one's family). ART may remind that one of the children has a dentist appointment, and whether a child has awoken yet. The ART system is able to recognize individuals within a home setup before they walk into the kitchen first thing in the morning, ART (in connection with smart speakers) informs of the weather and commute update for the day and provide options if there are changes to the usual route. If individuals within a home setup drive to work and parked their car on the street, ART is able to remind anyone where the car was left the night before. |

TABLE 5

| | HEMS |
|---|---|
| Use Case Title | Description |
| Energy monitoring | Measurement of the temperature as a function of time when people enter/leaves. Calculation of individual carbon footprint contributions-leaving lights and other devices on, heating mis-use etc. |
| Energy saving/climate control | Children (and other family members!) continually leave lights, heating and A/C, TVs, play-stations et al on throughout the house-devices and appliances automatically turned off (and anticipated when need to be on) when they are required. ART enabled temperature/occupancy sensors provide real time data, 24/7 to allow you to optimize your home's heating and energy controls, hence maximizing your energy savings. |

TABLE 5-continued

HEMS

| Use Case Title | Description |
| --- | --- |
| "Heating friend" | ART will optimize based on actual real-life requirements the energy needs of the home [rather than a pre-programmed, manually influenced inputs]. If the system is connected to your heating system, it can quickly understand the energy efficiency of the room. For example, if heating is off inside a room and noone is occupying the room, it is possible to understand how quickly the room loses temperature. This can change the relationship between the product and the consumer, becoming almost like a "heating friend", giving advice on how money can be saved by changing energy consumption. The government could use it to manage climate control. This also changes the game for a utility provider. (Example: you can offer an install of the latest double glazing because you know how much it is going to save and afford it at no cost because you understand the savings). |
| Real time EPC rating | As of 2018, a new regulation in England and Wales will require that properties rented out have a minimum performance rating of E on an Energy Performance Certificate (EPC). The system measures real time EPC rating that could be automatically validated to the current EPC rules. |

TABLE 6

Education

| Use Case Title | Description |
| --- | --- |
| Education tool | ART enables kids to learn and have fun through social interaction. |

TABLE 7

Care

| Use Case Title | Description |
| --- | --- |
| Understand normal behaviour from unusual behaviour | ART is able to learn normal behaviour. Understand if a family member has gotten up and if they are going to the kitchen according to their normal routine for the day. ART understands if someone does something and keeps doing it again a few instants later (Alzheimer's case). For example, do they spend an unusual amount of time staring at the window? Are they constantly going back to the window? Are they doing something, and 5 minutes later are they doing it again? |
| Maintaining independence without the need for smartphones and wearables./Detect falls | ART family alert gives your family and friends piece of mind, 24/7 that you are OK. ART family alert recognizes your daily routines, that all is normal. Importantly, ART family knows immediately if there is a problem. ART Care can help the elderly by knowing if an individual has fallen, if they remain on the ground, or if they got up again, if they are still for an unusual period of time and if they are following their regular routine using sensors. ART Care can further alert a carer or family member in close proximity. |
| Care + Smart door bell | ART's doorbell can make sure the correct carer has visited and whether they are on time. |
| Mood assessment | From captured thumbnails, it is possible to extract and/or assess the mood of a person. Baby monitoring and wellbeing: the system may extract accurate facial capture for emotion monitoring. |
| NHS | Monitoring of individuals (i.e elderly) and metabolism calculations |
| "Guardian angel" | The ART smart home help provides you with the piece of mind of the safety of your family. ART's network of smART sensors around your home enables you to have 24/7 comfort on ensuring the safety and wellbeing for your family. ART's ecosystem is controlled ultimately by and through you and ensures the plethora of smart devices around your home given you the degree of comfort you seek as you family grows up ART identifies/warns of children at risk. When a child comes home, tracking might be enabled (ROI encoding)-for example a child is approaching the hot oven, when Parent or Child-minder inadvertently distracted elsewhere. For example, "ART's sensors would be able identify whether your toddler, George, is crawling towards the stairs and your stair-gate has inadvertently been left open. ART would give a verbal warning over your home's connected speakers, in the actual room you (or others) are in, as ART would know where you are in the home at that time." "In a similar way, ART's kitchen sensor will be able to |

TABLE 7-continued

Care

| Use Case Title | Description |
| --- | --- |
| | sense if your eldest, a 4year old called Philip, was walking towards the cooker whilst it was on with pans of boiling water, you might be at the other end of the dinning area and not in the immediate vicinity. ART would again give you a verbal warning over your home's connected speakers". |

TABLE 8

AWARE, Retail

| Use Case Title | Description |
| --- | --- |
| Understanding of people behaviour | Spirit engine in the retail context will enable to understand how shoppers behave in a retail environment. Information extracted in real-time include: people count, dwelling time, gaze time. |
| Interaction with the customer by responding to their behaviour, and by trying to change their behaviour. | Example of an Interactive display with a shop advertising. AWARE understands in real-time if a person's attention has been grabbed and for how long. AWARE is able to change or respond to a person's behaviour in real-time through the ability to interact with them. As an example, if someone is excited about a particular ad with a specific product, AWARE can track them as they go towards the product (or start going away from it), and learns how to enhance their shopping experience. |
| Store management | Shoppers flow can be analysed in order to understand the effectiveness of a shop layout. AWARE is also able to understand and monitor the effectiveness of the shop management/workers. |
| Heat maps | AWARE is able to produce heatmaps describing where people have been and for how long. The heatmaps can be overlaid with a scene of the space and create a 3D map of how the space has been used by people during periods of time. This enables to maximise profit per square foot by, for example learning on how to direct people to right areas with the right products. |
| One to one real-time marketing | AWARE provides the ability to interact on a one to one basis with individuals. For example, a known shopper that has signed up and gave the ability to use their facial feature, walks past a window display and spends a certain amount of time interacting there. Depending on how long they have spent looking at the advert, they might be given a discount for purchasing the product on that particular day. One to one real-time marketing can be directed towards short-life product in order to maximise the obtainable value for the stock on that day, such that products are not thrown away. |
| One to one real-time marketing + License plate recognition | One to one marketing is achieved by detecting a customer from tracking number plates and by learning of the customers buying habits, and sending them the most appealing deal possible by text for example as they wait for their car to fill up. AWARE may detect a plate number and may also learn who the person/shopper is driving the car associated to the detected plate number. AWARE may learn which individual within a household is the most susceptible to drive the car for this particular day and time. For example, AWARE may have learnt that Mrs M. on Monday drives the family car and that she usually spends 10 minute to fuel the car. Thus, it may be possible to decide to give her a time-limited coupon to a nearby shop for that day. |
| Real time digital public advertising space | This use case relates to advertising spaces located in bus stops, tube, highways or any public spaces. AWARE can provide real time advertising through digital space based on the number of eyes looking and people identified that regularly walk through or near the advertisement. |
| Real time analysis of people flow | Heat maps are generated to track and analyse people flow and their responses to the change in advertisement. Therefore a huge amount of information can be extracted in order to learn for example which advertisements are successful. This can have effects all the way back to the advert designers, hereby completely changing how the market is currently being operated. |

TABLE 9

Other use cases

| Use Case Title | Description |
| --- | --- |
| Extreme work environment | A system that always knows people presence and understands individual presence. The system knows where people are 24/7, and can track shift changeovers. It knows where people should be at any point in time and checks whether the operational protocol has been followed correctly or not. |
| Emergency services | In case of an emergency, emergency services can go directly to where people are and where they are trapped. |

TABLE 9-continued

Other use cases

| Use Case Title | Description |
| --- | --- |
| Data Validation | A system to provide big data validation for existence of people, buildings, furniture, movement of crowds to back up auditable data trails and validate other calculations for governments, institutions and businesses. |

ATTN. CWU: Shading has been verified to be removed
Use of the ART Data as an Input into a Second Analysis/Decision Making Engine The data generated by the system described above, which may be for example any of the Spirit metadata, the ART data or the AWARE data, is used as an input into a separate pattern analysis or decision making engine. This engine may itself be based on a convolutional or recurrent neural network, or may be a manually crafted set of rules or trajectories against which the data is analysed. This decision engine may be hosted on the cloud, via a software program running on a CPU or GPU on a server, or it may be embedded an ASIC on the edge device.

For example, the ART system described above provides a real-time data stream of the pose, trajectory, identity and gesture of a set of individuals. It is desirable to generate from that datastream meaningful application-specific outcomes or decisions on which further actions can be based.

Figure 71:
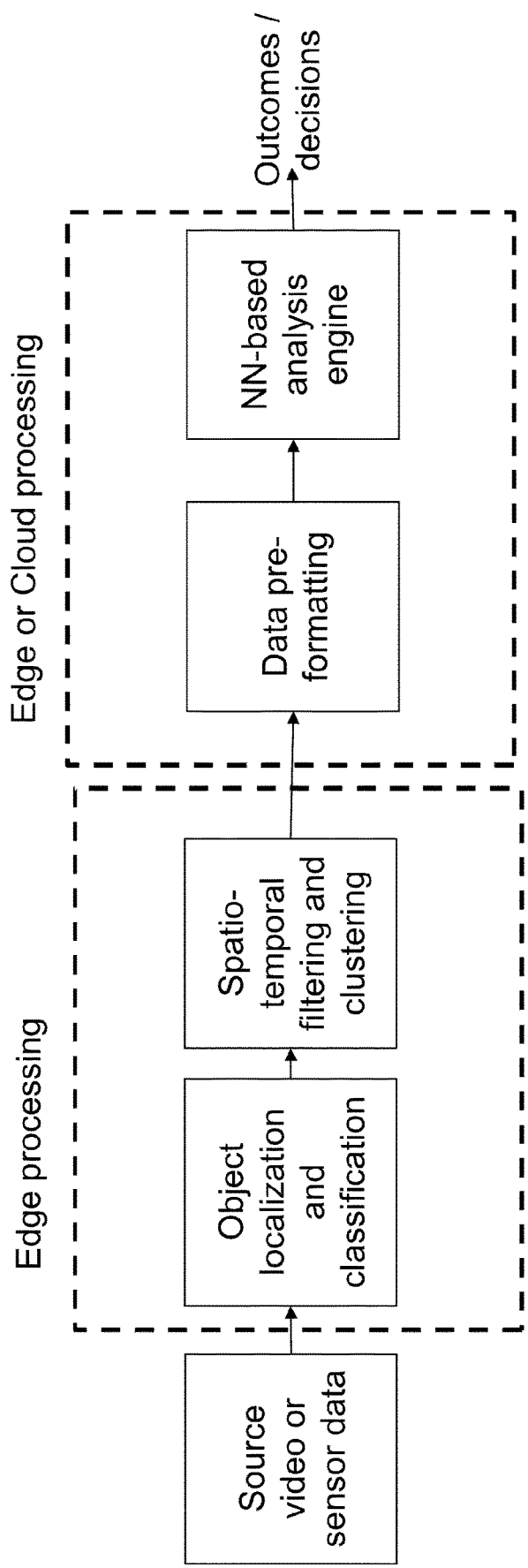
FIG. 71 shows an overall system architecture diagram showing ART as in input to a neural network.
Figure 72:
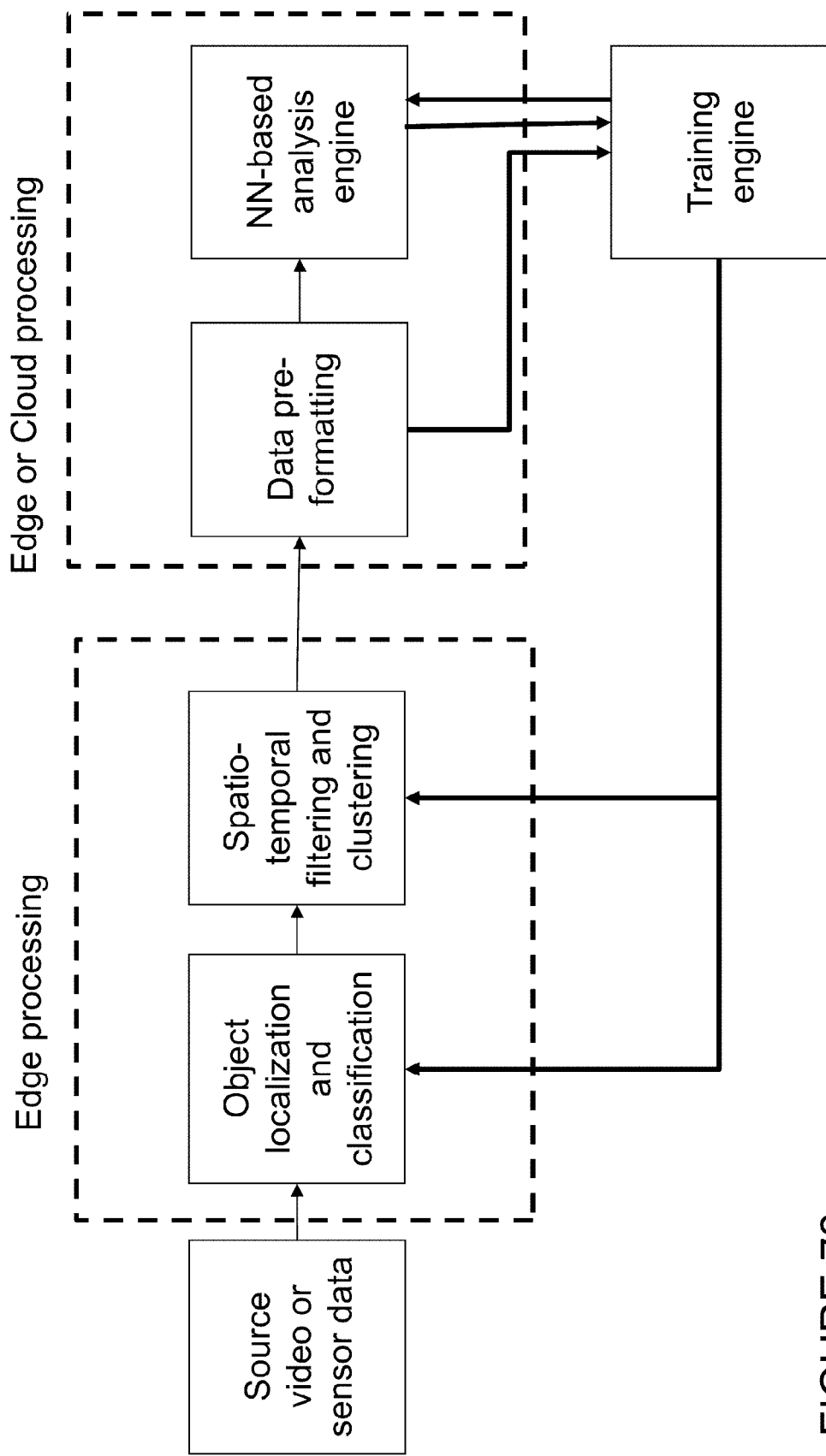
FIG. 72 shows an overall system architecture diagram showing ART as in input to a neural network.

The overall system architecture in training and operating modes is shown in FIGS. 71 and 72. Objects are detected and classified by a front-end engine, typically CNN-based. Spatio-temporal filtering and clustering is applied to group multiple detections of the same object at slightly different offsets and scales, and to improve tracking stability. This data may be further pre-formatted into pose, identity, trajectory and gesture. Then this data is fed as input data into a second engine, also typically an NN, both for training and for operation. This engine outputs application-specific information used to drive other functions based on the analysed behaviour.

An example is the monitoring of people flow within a building or a street. Operating in training mode, a neural network analysis engine can be trained, using the real-time data stream (as opposed to the original pixel data) to differentiate between normal flow and abnormal flow. Normal flow may be the highly correlated velocities of the people objects. Abnormal flow may be uncorrelated velocities, or specific patterns indicating events of interest, for example velocities tending to zero, one more individuals with velocities or trajectories highly uncorrelated with the majority, and so on.

Another example is the monitoring of an elderly person in their home, in order to derive an early signature of an illness such as dementia or Parkinson's disease, which may be obtained by detailed real-time analysis of pose and trajectory. Set into in training mode, the analysis engine may be trained with examples of normal and disease-related data streams. In operating mode, real-time data on the individual is analyses by the same neural network which provides a classification between abnormal and abnormal behaviour.

Another example is the detection of abnormal behaviour of people in the vicinity of a house, for a home security application. Normal trajectories, such as direct approach to the front door followed by direct recession, and provided as part of the training set. Abnormal behaviour, for example a person loitering outside the house, is automatically distinguished as a relevant event. Other examples of abnormal behaviours may be a person(s) approaching the house from an unusual trajectory, or just appearing at the rear of the property without having existed the property first Another example is the monitoring of passengers and the driver in a rideshare taxi, for example Didi, Uber, Ola Cabs. The network can be trained using a large dataset of normal passenger or diver behaviour, and used to flag conditions where abnormal behaviour or passenger numbers, which may put either passenger(s) or driver at risk, is occurring. The data is available in real-time, and the data able to be transmitted over low bandwidth to the Rideshare cloud database and apps. The real-time generated dataset can be incorporated into the rideshare company's customer proposition to enhance customer experiences in addition to the safety examples. Examples of the enhanced experiences could include real-time alerts that Passenger 'A' is on board, emotional state is OK, and then present the passengers face thumb nail real-time capture to notify desired recipients The neural network architecture may be similar to that used for the front-end object localization and classification, except that the input to the network is not pixel data by the metadata formed by the edge-based localization/classification engine.

In some specific use cases, the analysis engine may be a rule-based rather than NN-based engine. In the first example above, a rule can be set up to alert the system if the group velocity of people in the scene falls below a specified threshold.

Provision of a User Interface

The pose, trajectory, identity and gesture data provided by the system described above can be combined with voice recognition in the following combination to provide a generalized user interface which can operate in a seamless and natural manner for the end user.

- Voice recognition provides a means for the user to enter text into the system, as a keyboard alternative
- Pose and trajectory provides focus: voice recognition is only activated if the user's head is directed to a particular device, and their trajectory suggests attention on the device, such as close approach and low velocity
- Gesture may used to provide shortcut alternative to voice recognition, for example "thumb down" may be used to instruct the system to go back to the previous state
- Identity through face or iris recognition can be used to authenticate the user, such that for example an alarm or online shopping orders may be activated only by authorized account holders
- Identity through body shape, i.e. the relative proportions of children under 10 compared to adults, may be used to generically differentiate adults from children for the purpose of authentication An example of a Use Case Interface enhancement for a voice-enabled wireless speaker to be used as an internet access device (Echo by Amazon.com for example). Identity gained through face or iris recognition enables real-time 1-2-1 interaction, suggesting personally targeted promotions—learning interactive responses. Enabling a form of enhanced 2-factor interaction control.

A further example of ART sensor applied to a white goods appliance—a hob perhaps. ART is able to limit the use of the Hub (through establishing identity through face or iris recognition to authenticate the user), thus restricting hob use to the household's adult family members only.

Emotional State Recognition by a Robot or Other Device

For a successful interaction between a machine and a person, the machine needs to measure the emotional state and attention of the user. This is provided by the ART system described above.

- Face crops generated by the front-end localization and classification engine can be compared to known expression types to determine whether the user is happy, angry etc
- Pose data is used to determine if the user is looking at the device
- Trajectory data is used to determine if the user is passing by the device, approaching the device, standing still near to it and so on
- Face crops may be further analysed for example to determine heart rate via color ratio analysis, as is well known from the work by MIT Media Lab
- Gesture analysis can be used to determine e.g. if the user is getting irritated by the response of the device, for example the shaking of a fist Further Examples of Specific Use Cases where the ART Data Fed into a Decision Making Engine Enables Meaningful Application Specific Outcomes/Decisions as the Foundation for a Commercially Marketable Service or Product

- In-car secure (or Intransit secure)—applicable to private & commercial vehicles (to include taxis and new classes of service like rideshare) ART can establish the identity of the driver through face or iris recognition in real time, which can then be for example compared to/fused with the rideshare company's smartphone based app data. ART would be able to identify whether the driver is correctly positioned in the driver's seat or abnormal behaviour getting into the rear passenger seats with a passenger present. A further example of an application derived from ART monitoring, would be establishing in real-time the number of passengers within a car and whether this exceeds the regulations for the specific car/country. When ART identifies abnormal behaviour (overcapacity, changes in driver location) the appropriateness alert is triggered the option switch the camera/sensor in vehicle to video streaming mode exists to determine the emotional/factual status of the persons with a vehicle. When ART is fused with other vehicle movement datasets additional functionality can be achieved, vehicle telemetric (or GPS movement from a smartphone) and no ART sensor data would trigger an alert on a possible sensor malfunction or tampering.
- General intransit secure—the above example can be extended to monitoring persons presence/behaviours for other forms of public transportation including trains, buses and planes. The network of ART sensors can be trained to develop a large dataset of normal passenger behaviour; person trajectory flows, heat maps, dwell times with the ability of the dataset to identify and flag abnormal behaviour, whether this unusual patterns of behaviour/movement/trajectories, hidden faces, grouping of persons. A further example ART can provide the basis (when fused with other datasets) upon which service monitors understand aberrant people based considerations "a person stationary in one spot in excess of the normal time to movement direction calculation (abnormal behaviour)", when ID'd of this person has been a is a regular visitor in the previous 'x' period of that is not an ID'd staff member and that has not used a transportation vehicle although has traversed through a ticketing gate or other.
- Drone delivery—ART application resident on the drone and co-ordinated through the ART network enables a low latency cloud app can determine at take-off—intransit and at point of delivery if humans are present, where and in what numbers for both consumer and commercial goods delivery. Through the real-time identity through face or iris recognition can be used to authenticate the desired recipient or capture the alternative recipient. In principle, with the functionality of training through a neural network analysis engine the same applies to understanding other objects—buildings, Cars and other classes of objects like pets, furniture etc. The application is equally applicable to general health & safety being operated privately.
- Next generation smart door bells—an example that underpins arrival/departure services—to include delivery, medical, cleaning, maintenance—accurate real-time real-time identity through face or iris recognition and other associated object associated to confirm ID or sense of presence externally to a premises or within a premises (e.g. cleaner)—the system will be able to understand a known visitor verses a suspicious loiterer. In the commercial mode is the pool cleaner a register engineer, Is the gardener the right person—how long was the Gardener present and where did they spend their time through heat maps of trajectory/presence? Has the care professional spent no time with the patient/elderly person through absence of co-located presence, has the cleaner being in every room for approximately the right duration or conversely has not budged from in front of TV. Networking smart door bells across a neighbourhood or community enables unknown, nuisance/cold calls to be identified and shared with neighbours/community enabling alerts to be generated on known 'unknowns' or unwanted neighbourhood guests
- Retail instore—ART application for both consumers and staff establishes ID on an opt in or contractual basis determine where people are in the store—what they are proximate to and where queues and/or congestions are occurring from a customer satisfaction perspective or even emergency response safety considerations. People counting at varying physical instore location scales and volumes is a core feature of the application. People counting at varying physical instore location scales and volumes is a core feature of the application
- Retail—social media—ART enables the development of tailored 1-2-1 marketing/real-time promotional customer experiences where the pose, trajectory, identity and gesture data can be combined with a retailers' existing customer database or a $3^{rd}$ party company's dataset (eg Facebook™) to development innovative and enhance experiences. Known customer behaviour (learnt from Training modes) can be understood in real-time and atypical behaviour understood also in real-time. The retailer can then utilise the knowledge of typical and atypical shopper behaviour to influence consumer behaviour through digital signage and advertising to maximise the revenue potential from the known (or indeed unknown customer). A consumer signed up for example to be a member of a Ralph Lauren subscription customer platform and enabling access to a social media platform e.g. Facebook™ where their thumb nail photo can be used in a Ralph Lauren database. The customer has an app from retailer and/or consumer brands where they turn on a mode called e.g. "goshopping"—as the person is ID'D as they approach—enter or are within a zone in the store relevant instore promotions are pitched based on where they are, what they are looking at and where they are moving.

Healthcare—ART application can assist in the characterisation of person/s in a mode of falling or in a mode where they have most likely fallen—from a known position of being upright or a non-upright defined class and the time duration of such an aberration. The same applies inversely for people in elevations that are unusual for example a person that was stationary has disappeared adjacent to an exterior drain pipe or widow reveal.

Monitoring home recovery—ART can be used to provide a real-time home exercises feedback mechanism for a person recovering from an injury and provided with a series of post-operative exercises for example. The real-time information can also be shared with the consultant and physio support team. Not only does the patient get much need feedback data (presented in an appropriate, compelling manner), but the medical team also get value post-operative exercise data not captured before. Alerts can be set up to establish whether the prescribed daily exercises are being done volume and accuracy. Couple with ART sensors for visitation and daily routine, provides a comprehensive view for the supporting medical team both in pre-op and recovery post-op Clinical Hygiene—In a clinical context where hygiene is concerned the ART application helps build a statistical understanding of whether cleansing stations are being used optimally. Further, can determine unique instances of people. The ART system provides the ability for a service provider to create a real-time incentive scheme to encourage and reward good hygiene behaviour. Pose, trajectory, identity and gesture data can be combined with other sensor data (soap dispensers) to generate positive reinforcement messaging, reporting and monitoring of specific behavioural. Normal or expected behaviours might be sanitising hands before progressing down a corridor—the ART system can normal vs abnormal behaviours and real-time data enables voice messaging (or other visual) can reward good behaviours or raise concerns of poor behaviours.

Home care—For home care applications ART can provide real-time understanding of person behaviour whether normal routines are followed entering kitchen, accessing fridge or home pharmacy cupboard. Abnormal behaviour can readily be identified, lack of access to kitchen, prolonged stationary periods (standing or sitting), identifying periods of isolation Environmental—Home/Commercial ART applications exist to understand real-time the relationships between people and the environment/appliances ranging from heater, HVAC, white goods, TV's etc to determine ID, people presence and numbers of people summarised in a room occupancy paradigm.

Education and Gaming—an example where gaming applications like Minecraft or SIMs are able to take real-time person presence/trajectory/gesture/ID data from a network of ART sensors to develop more realistic 'real' virtual environments. People can within Minecraft create a scaled model of their home or other environment and populate with virtual persons, a 'Marauder's Map' for Minecraft.

Education and Gaming—ART applications present a real-time people presence (and ID) when combined with historical data (allied to a 2.5-3D understanding of a physical place—indoors and outdoors) where gaming applications like Minecraft or SIMs for example operate in a real people based living mode a unique data feed to transmogrify the end garners experience, making locality of people/places & things inherent relevant to content of each game. The same in an adjusted manner applies to educational contexts whereby people can use the ART application to simulate learning about people and environments they are familiar with, or need to understand for planning purposes or general art of being human beings in a home or enterprise context.

Quarantine Areas: where there has been a clear warning in relation to public health e.g. a chemical or gas related issue ART applications identify in real-time the people present problem in concert with a responsive services response.

Misc Security—people presence in an attic space or other off limits area. Probable human detection in a home in a crawling position where there is only one pet registered in ART systems whereas there appear to be three dogs in the house.

New Business Model innovation—Art applications will enable practically every market from lighting, retail, transport, in home appliances, care to share data under license with all manner of commercial institutions from Insurance to consumer brands to monetise the data and share in future revenue generated on top of the application of ART data.

Automatic Teller Machines: Security & Protection for both machine and users—Any unusual behaviour at an ATM machine can be captured and recorded and subsequent transactions monitored e.g. for repetitive patterns of one person using multiple cards to take money out, or a person loitering with face pointing towards keypad while other users are entering their pin number, or unusual behaviour as someone physically tires to interfere with the ATM machine.

Automatic Ticketing Machines: Security & Protection for both machine and users—Any unusual behaviour at a ticketing machine can be captured and recorded and subsequent transactions monitored e.g. for repetitive patterns of one person using multiple cards to take money out, or a person loitering with face pointing towards keypad while other users are entering their pin number, or unusual behaviour as someone physically tires to interfere with the ticketing machine.

Merging End User Model with Machine Vision Observations: every person who receives notifications from an ART sensor system will naturally have their own personal internal way of describing their known regular environments. In order to make the notifications more effective in terms of understanding them, responding to them, reducing frustration and learning time, a front end for users allows their personal internal mental model of their surroundings to be described by them using voice or text input prompted by a scene of their surroundings captured by the ART sensor system. The system then merges this information with every observation that the sensor makes so that a notification system becomes highly personalised per individual. This has particular application for the elderly who each will have their own highly fixed vocabulary over a lifetime of using the same physical spaces and to which no computer vision system built by an unknown engineering team could possibly have the same language to provide relevant localised notifications to the user.

High Intelligence Spot Lighting Systems: a system whereby the information from the ART sensor is merged with a model of a spot lighting system so that for example individual diners who are eating or finished eating may have different spot lighting to help them see what they are dining on or relax when they are finished despite the fact that others around the table are doing different things. This is useful for the elderly who may need extra lighting for eating or reading or doing an individual task while in the company of others who would find the additional global lighting scheme to be too much for their activities.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

Computer-Vision System or Engine Concepts that are Implemented in the Invention

1. A computer-vision system or engine that (a) generates from a pixel stream a digital representation of a person or other object and (b) determines attributes or characteristics of the person or object from that digital representation and (c) enables one or more networked devices or sensors to be controlled.

2. The computer-vision system or engine of Concept1 that outputs a real-time stream of metadata from the pixel stream, the metadata describing the instantaneous attributes or characteristics of each object in the scene it has been trained to search for.

3. The computer-vision system or engine of preceding Concept 1 or 2 that directly processes raw image sensor data or video data in the form of RGB, YUV or other encoding formats.

4. The computer-vision system or engine of any preceding concept that is an ASIC based product embedded in a device.

5. The computer-vision system or engine of any preceding concept that sends or uses those attributes or characteristics to enable one or more networked devices or sensors to be controlled.

6. The computer-vision system or engine of any preceding concept that can detect multiple people in a scene and continuously track or detect one or more of their: trajectory, pose, gesture, identity.

7. The computer-vision system or engine of any preceding concept that can infer or describe a person's behaviour or intent by analysing one or more of the trajectory, pose, gesture, identity of that person.

8. The computer-vision system or engine of any preceding concept that performs real-time virtualisation of a scene, extracting objects from the scene and grouping their virtualised representations together.

9. The computer-vision system or engine of any preceding concept that applies feature extraction and classification to find objects of known characteristics in each video frame or applies a convolutional or recurrent neural network or another object detection algorithm to do so.

10. The computer-vision system or engine of any preceding concept that detects people by extracting independent characteristics including one or more of the following: the head, head & shoulders, hands and full body, each in different orientations, to enable an individual's head orientation, shoulder orientation and full body orientation to be independently evaluated for reliable people tracking.

11. The computer-vision system or engine of any preceding concept that continuously monitors the motion of individuals in the scene and predicts their next location to enable reliable tracking even when the subject is temporarily lost or passes behind another object.

12. The computer-vision system or engine of any preceding concept that contextualizes individual local representations to construct a global representation of each person as they move through an environment of multiple sensors in multiple locations.

13. The computer-vision system or engine of any preceding concept that uses data from multiple sensors, each capturing different parts of an environment, to track and show an object moving through that environment and to form a global representation that is not limited to the object when imaged from a single sensor.

14. The computer-vision system or engine of any preceding concept where the approximate location of an object in 3D is reconstructed using depth/distance estimation to assist accuracy of tracking and construction of the global representation from multiple sensors.

15. The computer-vision system or engine of any preceding concept that operates as an interface to enable control of multiple, networked computer-enabled sensors and devices in the smart home or office.

16. The computer-vision system or engine of any preceding concept where the digital representation conforms to an API.

17. The computer-vision system or engine of any preceding concept where the digital representation includes feature vectors that define the appearance of a generalized person.

18. The computer-vision system or engine of any preceding concept where the digital representation is used to display a person as a standardised shape.

19. The computer-vision system or engine of any preceding concept where the digital representation is used to display a person as a symbolic or simplified representation of a person.

20. The computer-vision system or engine of any preceding concept where the symbolic or simplified representation is a flat or 2-dimensional shape including head, body, arms and legs.

21. The computer-vision system or engine of any preceding concept where the symbolic or simplified representations of different people are distinguished using different colours.

22. The computer-vision system or engine of any preceding concept where the symbolic or simplified representation is an avatar.

23. The computer-vision system or engine of any preceding concept where the digital representation includes feature vectors that define the appearance of a specific person.

24. The computer-vision system or engine of any preceding concept where the digital representation of a person is used to analyse, or enable the analysis of one or more of trajectory, pose, gesture and identity of that person and smart home devices can respond to and predict the person's intent and/or needs based on that analysis.

25. The computer-vision system or engine of any preceding concept where the digital representation is not an image and does not enable an image of a person to be created from which that person can be recognised.

26. The computer-vision system or engine of any preceding concept that does not output continuous or streaming video but instead metadata that defines various attributes of individual persons.

27. The computer-vision system or engine of any preceding concept that outputs continuous or streaming video and also metadata that defines various attributes of individual persons.

28. The computer-vision system or engine of any preceding concept where the characteristics or attributes include one or more of trajectory, pose, gesture, identity.

29. The computer-vision system or engine of any preceding concept where the characteristics or attributes include each of trajectory, pose, gesture, and identity.

30. The computer-vision system or engine of any preceding concept that works with standard images sensors working with chip-level systems that generate real-time data that enables a digital representation of people or other objects to be created.

31. The computer-vision system or engine of any preceding concept that works with IP cameras to form a real-time metadata stream to accompany the output video stream providing an index of video content frame by frame.

32. The computer-vision system or engine of any preceding concept that works with smart sensors that use visual information, but never form imagery or video at a hardware level.

33. The computer-vision system or engine of any preceding concept that builds a virtualized digital representation of each individual in the home, comprising each individual's: Trajectory around the home, including for example the actions of standing and sitting, Pose, for example in which direction the person is facing, and/or in which direction they are looking; Gesture, for example motions made by the person's hands; and Identity, namely the ability to differentiate between people and assign a unique identity (e.g. name) to each person.

34. The computer-vision system or engine of any preceding concept that is programmed to understand a wide range of behaviours from the set: counting the number of people in the room, understanding people's pose, identifying persons using facial recognition data, determining where people are moving from/to, extracting specific gestures by an identified individual.

35. The computer-vision system or engine of any preceding concept where the data rate of the data sent from the computer-vision system or engine is throttled up or based on event-triggering.

36. The computer-vision system or engine of any preceding concept that where multiple computer-vision systems or engines send their data to a hub that stores and analyses that data and enables a digital representation of a person to be constructed from computer-vision systems with both shared and differing fields of view, tracking that person and also recognizing that person.

37. The computer-vision system or engine of preceding Concept 36 where the hub exposes an open, person-level digital representation API, enabling various appliances to use and to be controlled in dependence on the data encoded in the API.

38. The computer-vision system or engine of any preceding concept where the digital representation is created locally at a computer-vision system, or at a hub, or in the cloud, or distributed across computer-vision systems and one or more hubs and the cloud.

39. The computer-vision system or engine of any preceding concept where the digital representation is a 'track record' that uses the reformatting of real-time metadata into a per-object (e.g. per-person) record of one or more of their trajectory, pose and identity of that object.

40. The computer-vision system or engine of preceding Concept 39 where the track records are stored in a MySQL-type database, correlated with a video database.

41. The computer-vision system or engine of any preceding concept where the digital representation includes an estimate or measurement of depth or distance from the sensor of a person or object or part of the environment.

42. The computer-vision system or engine of preceding Concept 41 where depth sensing uses a calibration object of approximately known size, or stereoscopic cameras or structured light.

43. The computer-vision system or engine of any preceding concept where the digital representation includes facial recognition data.

44. The computer-vision system or engine of any preceding concept where sensor metadata is fed into a hub, gateway or controller that pushes events to smart devices in a network as specific commands, and differentiates the events created on a per service basis to allow each service to receive different data that is relevant to their service from the group of sensors as a single intelligent sensor.

45. The computer-vision system or engine of any preceding concept where event streams are sent to cloud analytics apps such as for example cloud-based data monitoring, data gathering or learning service.

46. The computer-vision system or engine of preceding Concept 45 where an event subscription service, to which a system controller subscribes, receives event notifications and data from the devices or sensors.

47. The computer-vision system or engine of preceding Concept 45 or 46 where a virtual output queued event switch is used so that events being pushed to the control system can be differentiated by a class of service marker.

48. The computer-vision system or engine of any preceding Concept 44-47 that generates event objects from a collection of individual sensor inputs in which each event object also contains subscriber information and class of service.

49. The computer-vision system or engine of preceding Concept 48 where the event objects are coded in JSON format so that they can be directly used in Javascript-based software on Browser User Interfaces (BUIs) and web servers, or easily interpreted by standard server side programming languages or server Application Programming Interfaces (APIs).

50. The computer-vision system or engine of any preceding concept where a system queues the generated events and switches them into an output channel based on destination and class of service using a virtual output queuing system.

51. The computer-vision system or engine of any preceding concept where the digital representation relates to other items selected from the list: animals, pets, inanimate objects, dynamic or moving objects like cars.

52. The computer-vision system or engine of any preceding concept where control is implemented using gesture recognition.

53. The computer-vision system or engine of any preceding concept where control is implemented using movement detection.

54. The computer-vision system or engine of any preceding concept where a voice-controlled system is enhanced since voice commands can be dis-ambiguated or reliably identified as commands and not background noise since a user can be seen to be looking at the microphone or other sensor or object to be controlled when giving the command.

55. The computer-vision system or engine of any preceding concept where a voice controlled system is set to monitor audio only when user is seen to be looking at the microphone object to enhance privacy.

56. The computer-vision system or engine of any preceding concept that is localised in a camera or other device including a sensor, or in a hub or gateway connected to that device, or in a remote server, or distributed across any permutation of these.

57. The computer-vision system or engine of any preceding concept that is localised in one or more of the following: (a) an edge layer that processes raw sensor data; (b) an aggregation layer that provides high level analytics by aggregating and processing data from the edge layer in the temporal and spatial domains; (c) a service layer that handles all connectivity to one or more system controllers and to the end customers for configuration of their home systems and the collection and analysis of the data produced.

58. A sensor that includes an embedded computer-vision engine that (a) generates from a pixel stream a digital representation of a person or other object and (b) determines attributes or characteristics of the person or object from that digital representation.

59. An appliance that includes a sensor that in turn includes an embedded computer-vision engine that (a) generates from a pixel stream a digital representation of a person or other object and (b) determines attributes or characteristics of the person or object from that digital representation and (c) enables one or more networked devices or sensors to be controlled.

60. A smart home or office system or other physical or logical environment including one or more computer-vision systems as defined in Concepts 1-57 and one or more sensors as defined in Concept 58.

61. A networked system including multiple computer-vision systems as defined in Concept 1-57.

62. Chip-level firmware that provides a computer vision engine as defined in Concept 1-57.

63. A method of controlling multiple, networked computer-enabled devices using the computer-vision systems as defined in Concept 1-57.

64. A computer vision engine as defined in Concept 1-57, when embedded in one of the following products: Camera; Cloud camera; Smart Door Bell; Light Switch; Garage entry system; Non-camera sensor based system; Fire alarm sensor or alarm; TV; Thermostat; Coffee machine; Light bulb; Music steaming device; Fridge; Oven; Microwave cooker; Washing machine; Any smart device; Any wearable computing device; Smartphone; Tablet; Any portable computing device.

65. A software architecture or system for a smart home or smart office, the architecture including
 (a) an edge layer that processes sensor data;
 (b) an aggregation layer that provides high level analytics by aggregating and processing data from the edge layer in the temporal and spatial domains;
 (c) a service layer that handles all connectivity to one or more system controllers and to the end customers for configuration of their home systems and the collection and analysis of the data produced.

66. The software architecture or system of Concept 65 in which the edge layer processes raw sensor data or video data at an ASIC embedded in a sensor or at a gateway/hub.

67. The software architecture or system of Concept 65-66 in which the edge layer includes a computer-vision system or engine that (a) generates from a pixel stream a digital representation of a person or other object and (b) determines attributes or characteristics of the person or object from that digital representation and (c) enables one or more networked devices or sensors to be controlled.

68. The software architecture or system of Concept 65-67 in which the edge layer detects multiple people in a scene and continuously tracks or detects one or more of their: trajectory, pose, gesture, identity.

69. The software architecture or system of Concept 65-68 in which the edge layer can infer or describe a person's behaviour or intent by analysing one or more of the trajectory, pose, gesture, identity of that person.

70. The software architecture or system of Concept 65-69 in which the computer vision system is a computer vision as defined in Concept 1-57.

71. The software architecture or system of Concept 65-70 that continuously analyses each person it is sensing and interprets certain behaviours as events.

72. The software architecture or system of Concept 65-71 in which the edge layer pushes real-time metadata from the raw sensor data to the aggregation layer.

73. The software architecture or system of Concept 65-72 in which the aggregation layer takes the metadata produced by the edge layer and analyses it further, combining multiple sources of data together to create events as functions of time.

74. The software architecture or system of Concept 65-73 in which the aggregation layer interprets a set of rules for the creation of events.

75. The software architecture or system of Concept 65-74 in which the aggregation layer prepares the events for delivery as a service, which includes scheduling algorithms that drive a multi-class of service event switch before passing the event data through to the service layer.

76. The software architecture or system of Concept 65-75 in which the service layer allows the system to interact with real-time control systems that subscribe for an event service that is packaged, delivered and monitored by the service layer.

77. The software architecture or system of Concept 65-76 in which all three layers of the architecture or system are contained within a gateway or hub device, to which cameras or other sensors are connected, and a portion of the service layer is in the cloud.

78. The software architecture or system of Concept 65-77 in which the gateway or hub component of the edge layer is used to centralise some management components of the architecture rather than replicate them across all of the cameras/sensors themselves.

79. The software architecture or system of Concept 65-78 in which cameras or other sensors include some of the edge layer, and these elements of the edge layer output real-time metadata: all 3 layers of the architecture are contained within a gateway or hub device, to which the cameras or other sensors are connected, and a portion of the service layer is in the cloud.

80. The software architecture or system of Concept 65-78 in which cameras or other sensors include some of the edge layer, and these elements of the edge layer output real-time metadata; all 3 layers of the architecture are in the cloud.

The invention claimed is:

1. A vehicle advanced driver assistance security system including a computer-vision system, in which the computer-vision system is an edge computing based system that is located in the vehicle, and in which the computer-vision system includes at least some of an edge layer, the computer-vision system including a neural network that has been trained to recognize objects, the objects recognizable by the neural network including a person, wherein the neural network is configured to recognize an object as a person, and the computer-vision system is configured to, in response to the neural network recognizing the object as a person, (a) generate from a pixel stream a digital representation of the person and (b) determine attributes or characteristics of the person from that digital representation and (c) based on the determined attributes or characteristics of the person, output data to a secure cloud-based analytics system that enables that secure cloud-based analytics system to identify and also to authenticate the person, in which the computer-vision system is configured to dynamically preserve resolution of selective areas, or regions of interest, within each frame.

2. The vehicle advanced driver assistance security system of claim 1 in which the determined attributes or characteristics of the person include their pose, and the computer-vision system analyses that pose to extract a facial image from the pixel stream that is a best facial image for use by the secure cloud-based analytics system to identify and authenticate the person.

3. The vehicle advanced driver assistance security system of claim 2 in which the computer-vision system outputs the facial image to the secure cloud-based analytics system, but does not output full-frame real-time video to the secure cloud-based analytics system.

4. The vehicle advanced driver assistance security system of claim 1,
   (i) in which the data output is indexed in real-time by the secure cloud-based analytics system with a respective identity of persons; or
   (ii) in which the computer-vision system is implanted in an ASIC or SoC located in a camera, such as a security camera; or
   (iii) in which the computer-vision system operates in real-time, directly processing raw image sensor data; or
   (iv) in which the secure cloud-based analytics system controls a digital advertising system or digital signage to provide one-to-one real time marketing to individuals whom it has recognised.

5. The vehicle advanced driver assistance security system of claim 1,
   (i) in which the computer-vision system dynamically adjusts an effective frame rate based on content and manages streaming level based on user control; or
   (ii) that outputs a real-time stream of metadata from the pixel stream, the metadata describing instantaneous attributes or characteristics of each object in a scene it has been trained to search for; or
   (iii) that outputs a real-time stream of metadata from the pixel stream, the metadata describing instantaneous attributes or characteristics of each object in a scene it has been trained to search for, and that sends or uses those attributes or characteristics to enable one or more networked devices or sensors to be controlled.

6. The vehicle advanced driver assistance security system of claim 1,
   (i) that can detect multiple people in a scene and continuously track or detect one or more of their: trajectory, pose, gesture, identity; or
   (ii) that can infer or describe a person's behaviour or intent by analysing one or more of a trajectory, pose, gesture, identity of that person; or
   (iii) that performs real-time virtualisation of a scene, extracting objects from the scene and grouping their virtualised representations together; or
   (iv) that applies feature extraction and classification to find objects of known characteristics in each video frame or applies a convolutional or recurrent neural network or another object detection algorithm to do so; or
   (v) that detects people by extracting independent characteristics including one or more of: a head, head & shoulders, hands and full body, each in different orientations, to enable an individual's head orientation, shoulder orientation and full body orientation to be independently evaluated for reliable people tracking; or
   (vi) that continuously monitors motion of individuals in a scene and predicts their next location to enable reliable tracking even when a subject is temporarily lost or passes behind another object; or
   (vii) that contextualizes individual local representations to construct a global representation of each person as they move through an environment of multiple sensors in multiple locations; or
   (viii) uses data from multiple sensors, each capturing different parts of an environment, to track and show an object moving through that environment and to form a global representation that is not limited to the object when imaged from a single sensor; or
   (ix) where an approximate location of an object in 3D is reconstructed using depth/distance estimation to assist accuracy of tracking and construction of a global representation from multiple sensors.

7. The vehicle advanced driver assistance security system of claim 1,
   (i) where the digital representation conforms to an API; or
   (ii) where the digital representation includes feature vectors that define an appearance of a generalized person; or
   (iii) where the digital representation is used to display a person as a standardised shape.

8. The vehicle advanced driver assistance security system of claim 1 where the digital representation is used to display a person as a graphical symbolic or simplified representation of a person.

9. The vehicle advanced driver assistance security system of claim 8,
   (i) where the symbolic or simplified representation is a flat or 2-dimensional shape including head, body, arms and legs; or
   (ii) where the symbolic or simplified representations of different people are distinguished using different colours; or
   (iii) where the symbolic or simplified representation is an avatar.

10. The vehicle advanced driver assistance security system of claim 1,
    (i) where the digital representation includes feature vectors that define an appearance of a specific person; or
    (ii) where the digital representation of a person is used to analyse, or enable an analysis of one or more of trajectory, pose, gesture and identity of that person; or
    (iii) where the digital representation is not an image and does not enable an image of a person to be created from which that person can be recognised; or (iv) that does not output continuous or streaming video but instead metadata that defines various attributes of individual persons.

11. The vehicle advanced driver assistance security system of claim 1, that outputs continuous or streaming video and also metadata that defines various attributes of individual persons.

12. The vehicle advanced driver assistance security system of claim 11,
   (i) where the characteristics or attributes include one or more of trajectory, pose, gesture, identity; or
   (ii) where the characteristics or attributes include each of trajectory, pose, gesture, and identity.

13. The vehicle advanced driver assistance security system of claim 1,
   (i) that works with standard images sensors working with chip-level systems that generate real-time data that enables a digital representation of people or other objects to be created; or
   (ii) that works with IP cameras to form a real-time metadata stream to accompany an output video stream providing an index of video content frame by frame; or
   (iii) that works with smart sensors that use visual information, but never form imagery or video at a hardware level; or
   (iv) is programmed to understand a wide range of behaviours from the set: counting a number of people in the vehicle, understanding people's pose, identifying persons using facial recognition data, determining where people are moving from/to, extracting specific gestures by an identified individual.

14. The vehicle advanced driver assistance security system of claim 1, where a data rate of the data sent from the computer-vision system is throttled up or is based on event-triggering.

15. The vehicle advanced driver assistance security system of claim 1, the computer-vision system including a hub and multiple computer-vision systems with shared fields of view or with different fields of view, which send their data to the hub that stores and analyses that data and enables a digital representation of a person to be constructed from the computer-vision systems with the shared fields of view or with the differing fields of view, tracking that person and also recognizing that person.

16. The vehicle advanced driver assistance security system of claim 15 where the hub exposes an open, person-level digital representation API, enabling various appliances to use and to be controlled in dependence on the data encoded in the API.

17. The vehicle advanced driver assistance security system of claim 1,
   (i) where the digital representation is created locally at the computer-vision system, or at a hub, or in the cloud, or distributed across computer-vision systems and one or more hubs and the cloud; or
   (ii) where the digital representation is included in a 'track record' that uses reformatting of real-time metadata into a per-person record of one or more of their trajectory, pose and identity of that person.

18. The vehicle advanced driver assistance security system of claim 1,
   (i) where the digital representation includes an estimate or measurement of depth or distance from a sensor of a person or object or part of an environment; or
   (ii) where the digital representation includes an estimate or measurement of depth or distance from a sensor of a person or object or part of an environment, and where depth sensing uses a calibration object of approximately known size, or stereoscopic cameras or structured light; or
   (iii) where the digital representation includes facial recognition data; or
   (iv) where sensor metadata is fed into a hub, gateway or controller that pushes events to smart devices in a network as specific commands, and differentiates the events created on a per service basis to allow each service to receive different data that is relevant to their service from a group of sensors as a single intelligent sensor; or
   (v) where event streams are sent to cloud analytics apps; or
   (vi) where event streams are sent to cloud analytics apps, and where an event subscription service, to which a system controller subscribes, receives event notifications and data from devices or sensors.

19. The vehicle advanced driver assistance security system of claim 1, wherein the computer-vision system is localised in the edge layer that processes raw sensor data.

20. A vehicle that includes an advanced driver assistance security system that includes a sensor that in turn includes an embedded computer-vision engine and a neural network that has been trained to recognize objects, in which the computer-vision engine is an edge computing based engine that is located in the vehicle, and in which the computer-vision engine includes at least some of an edge layer, the objects recognizable by the neural network including a person, wherein the neural network is configured to recognize an object as a person, and the embedded computer-vision engine is configured to, in response to the neural network recognizing the object as a person,
   (a) generate from a pixel stream a digital representation of the person and (b) determine attributes or characteristics of the person from that digital representation and (c) based on the determined attributes or characteristics of the person, output data to a secure cloud-based analytics system that enables that secure cloud-based analytics system to identify and also to authenticate the person, in which the computer-vision system is configured to dynamically preserve resolution of selective areas, or regions of interest, within each frame.

21. A vehicle including a vehicle advanced driver assistance security system including a computer-vision system, in which the computer-vision system is an edge computing based system that is located in the vehicle, and in which the computer-vision system includes at least some of an edge layer, the computer-vision system including a neural network that has been trained to recognize objects, the objects recognizable by the neural network including a person, wherein the neural network is configured to recognize an object as a person, and the computer-vision system is configured to, in response to the neural network recognizing the object as a person, (a) generate from a pixel stream a digital representation of the person and (b) determine attributes or characteristics of the person from that digital representation and (c) based on the determined attributes or characteristics of the person, output data to a secure cloud-based analytics system that enables that secure cloud-based analytics system to identify and also to authenticate the person, in which the computer-vision system is configured to dynamically preserve resolution of selective areas, or regions of interest, within each frame.

* * * * *